(12) United States Patent
Brazao et al.

(10) Patent No.: US 12,530,698 B2
(45) Date of Patent: Jan. 20, 2026

(54) SYSTEMS AND METHODS FOR MONITORING RECORDS IN AN INTERNET OF THINGS (IoT) DEVICE REGISTRY FOR CHANGES IN DEVICE PROPERTY DATA

(71) Applicant: Somos, Inc., East Brunswick, NJ (US)

(72) Inventors: Eduardo Correia da Silva Brazao, Potomac Falls, VA (US); Steven Norman Brumer, Vero Beach, FL (US); Ian Michael Klein, Loganville, GA (US); Li Kong, Potomac, MD (US); Marc Rudloff Plante, Mount Pleasant, SC (US); Sridhar Ramachandran, Rockville, MD (US); Kimberly Tashner Shyu, Chantilly, VA (US); Robert Janusz Sliwa, Chalfont, PA (US); Jeffrey Scott Smith, Overland Park, KS (US); Christopher Anton Wendt, Chester Springs, PA (US); Haofang Yu, Harvard, MA (US)

(73) Assignee: Somos, Inc., East Brunswick, NJ (US)

( * ) Notice: Subject to any disclaimer, the term of this patent is extended or adjusted under 35 U.S.C. 154(b) by 290 days.

(21) Appl. No.: 17/722,167

(22) Filed: Apr. 15, 2022

(65) Prior Publication Data

US 2022/0337611 A1    Oct. 20, 2022

Related U.S. Application Data

(60) Provisional application No. 63/175,920, filed on Apr. 16, 2021.

(51) Int. Cl.
*G06Q 30/018*    (2023.01)
*G06F 8/65*    (2018.01)
(Continued)

(52) U.S. Cl.
CPC ............. *G06Q 30/018* (2013.01); *G06F 8/65* (2013.01); *G06F 16/444* (2019.01); *G06F 21/44* (2013.01);
(Continued)

(58) Field of Classification Search
CPC ..... G06F 8/65; G06F 16/444; H04L 63/1425; G06Q 30/018
(Continued)

(56) References Cited

U.S. PATENT DOCUMENTS 7,843,197 B2    11/2010    Finlay et al.
9,922,539 B1    3/2018    Emigh et al.
(Continued)

FOREIGN PATENT DOCUMENTS

WO    2022221711 A1    10/2022

OTHER PUBLICATIONS

Google. Support, Devices audit log, Aug. 12, 2020, https://web.archive.org/web/20200812070222/https://support.google.com/a/answer/6350074?hl=en (Year: 2020).*

(Continued)

*Primary Examiner* — Zi Ye
(74) *Attorney, Agent, or Firm* — GTC Law Group PC & Affiliates

(57) ABSTRACT

An apparatus including a device property data processing circuit, a change detection circuit, an alert circuit, and an alert provisioning circuit. The device property data processing circuit is structured to at a first time, interpret, device property data corresponding to a device registered with an IoT device registry, and at a second time, interpret, the device property data corresponding to the device registered with the IoT device registry. The change detection circuit is structured to detect a change in the device property data between the first time and the second time. The alert circuit
(Continued)

is structured to generate, responsive to the detected change, a message that identifies the device corresponding to the device property data. The alert provisioning circuit is structured to transmit the message.

22 Claims, 104 Drawing Sheets

(51) Int. Cl.
| | |
|---|---|
| G06F 16/44 | (2019.01) |
| G06F 21/44 | (2013.01) |
| G06F 21/60 | (2013.01) |
| G06F 21/73 | (2013.01) |
| G06N 3/08 | (2023.01) |
| G06Q 20/40 | (2012.01) |
| G16Y 20/20 | (2020.01) |
| G16Y 30/10 | (2020.01) |
| G16Y 40/50 | (2020.01) |
| H04L 9/08 | (2006.01) |
| H04L 9/14 | (2006.01) |
| H04L 9/40 | (2022.01) |
| H04L 41/0806 | (2022.01) |
| H04L 41/0813 | (2022.01) |
| H04L 41/0853 | (2022.01) |
| H04L 43/0817 | (2022.01) |
| H04L 67/12 | (2022.01) |
| G16Y 30/00 | (2020.01) |

(52) U.S. Cl.
CPC ............ *G06F 21/602* (2013.01); *G06F 21/73* (2013.01); *G06N 3/08* (2013.01); *G06Q 20/4016* (2013.01); *G16Y 20/20* (2020.01); *G16Y 30/10* (2020.01); *G16Y 40/50* (2020.01); *H04L 9/0825* (2013.01); *H04L 9/0897* (2013.01); *H04L 9/14* (2013.01); *H04L 41/0806* (2013.01); *H04L 41/0813* (2013.01); *H04L 41/0853* (2013.01); *H04L 43/0817* (2013.01); *H04L 63/08* (2013.01); *H04L 63/126* (2013.01); *H04L 63/1425* (2013.01); *H04L 67/12* (2013.01); *G16Y 30/00* (2020.01)

(58) Field of Classification Search
USPC .......................................................... 726/25
See application file for complete search history.

(56) References Cited

U.S. PATENT DOCUMENTS

| | | | |
|---|---|---|---|
| 9,979,606 B2 | 5/2018 | Gupta et al. | |
| 10,002,526 B1 | 6/2018 | Dyer et al. | |
| 10,270,770 B1 | 4/2019 | Irwan et al. | |
| 10,621,849 B2 | 4/2020 | Brady et al. | |
| 10,878,428 B1 | 12/2020 | Comeaux et al. | |
| 11,017,464 B1 | 5/2021 | Harris et al. | |
| 11,100,506 B2 | 8/2021 | Zoldi et al. | |
| 11,321,718 B1 | 5/2022 | Narendranathan et al. | |
| 11,481,509 B1 | 10/2022 | Prasad et al. | |
| 11,625,728 B2 | 4/2023 | Brazao et al. | |
| 11,810,129 B2 | 11/2023 | Brazao et al. | |
| 12,155,657 B2 | 11/2024 | Ramachandran et al. | |
| 12,198,147 B2 | 1/2025 | Brazao et al. | |
| 12,236,435 B2 | 2/2025 | Brazao et al. | |
| 12,321,951 B2 | 6/2025 | Brazao et al. | |
| 2004/0024865 A1* | 2/2004 | Huang | H04L 41/0604 |
| | | | 709/224 |
| 2006/0150176 A1 | 7/2006 | Dorricott et al. | |
| 2008/0015889 A1 | 1/2008 | Fenster | |
| 2009/0036096 A1 | 2/2009 | Ibrahim | |
| 2009/0037642 A1 | 2/2009 | Ahn et al. | |
| 2013/0339504 A1 | 12/2013 | Montemurro | |
| 2014/0297210 A1 | 10/2014 | Kamel et al. | |
| 2014/0344946 A1 | 11/2014 | Ward et al. | |
| 2015/0033340 A1* | 1/2015 | Giokas | H04L 63/1433 |
| | | | 726/23 |
| 2016/0087933 A1 | 3/2016 | Johnson et al. | |
| 2016/0142428 A1 | 5/2016 | Pastore et al. | |
| 2016/0173293 A1 | 6/2016 | Kennedy | |
| 2016/0205097 A1 | 7/2016 | Yacoub et al. | |
| 2016/0261465 A1 | 9/2016 | Gupta et al. | |
| 2016/0344740 A1 | 11/2016 | Choi | |
| 2016/0364553 A1 | 12/2016 | Smith et al. | |
| 2016/0364787 A1 | 12/2016 | Walker et al. | |
| 2017/0046806 A1 | 2/2017 | Haldenby et al. | |
| 2017/0083175 A1 | 3/2017 | Layman et al. | |
| 2017/0187807 A1 | 6/2017 | Clernon | |
| 2017/0206532 A1 | 7/2017 | Choi | |
| 2017/0272316 A1 | 9/2017 | Johnson et al. | |
| 2017/0329966 A1* | 11/2017 | Koganti | G06F 21/56 |
| 2017/0331577 A1 | 11/2017 | Parkvall et al. | |
| 2017/0331670 A1 | 11/2017 | Parkvall et al. | |
| 2017/0331831 A1 | 11/2017 | Park et al. | |
| 2018/0020492 A1 | 1/2018 | Dao | |
| 2018/0034913 A1 | 2/2018 | Matthieu et al. | |
| 2018/0103047 A1 | 4/2018 | Turgeman et al. | |
| 2018/0150926 A1 | 5/2018 | Darden | |
| 2018/0174434 A1 | 6/2018 | Dyer et al. | |
| 2018/0176198 A1 | 6/2018 | Rajapaksa | |
| 2018/0183587 A1 | 6/2018 | Won et al. | |
| 2018/0234294 A1 | 8/2018 | Wadekar et al. | |
| 2018/0234787 A1 | 8/2018 | Karimli et al. | |
| 2018/0262589 A1 | 9/2018 | Spina et al. | |
| 2018/0270064 A1 | 9/2018 | Gehrmann | |
| 2018/0284758 A1 | 10/2018 | Cella et al. | |
| 2018/0295016 A1 | 10/2018 | Frahim et al. | |
| 2019/0036906 A1* | 1/2019 | Biyani | H04L 63/102 |
| 2019/0041842 A1 | 2/2019 | Cella et al. | |
| 2019/0044957 A1 | 2/2019 | David et al. | |
| 2019/0050949 A1 | 2/2019 | Orsini | |
| 2019/0094827 A1 | 3/2019 | Park et al. | |
| 2019/0095520 A1 | 3/2019 | Park et al. | |
| 2019/0098028 A1 | 3/2019 | Ektare et al. | |
| 2019/0098089 A1 | 3/2019 | Shim et al. | |
| 2019/0163912 A1 | 5/2019 | Kumar et al. | |
| 2019/0222594 A1 | 7/2019 | Davis et al. | |
| 2019/0250898 A1 | 8/2019 | Yang | |
| 2019/0306232 A1 | 10/2019 | Brock | |
| 2019/0319808 A1 | 10/2019 | Fallah et al. | |
| 2019/0319861 A1 | 10/2019 | Pan et al. | |
| 2019/0340623 A1 | 11/2019 | Rivkind et al. | |
| 2019/0349426 A1 | 11/2019 | Smith et al. | |
| 2019/0373472 A1 | 12/2019 | Smith et al. | |
| 2019/0394224 A1* | 12/2019 | Hamdi | H04L 63/1458 |
| 2020/0099749 A1 | 3/2020 | Bawa et al. | |
| 2020/0111068 A1 | 4/2020 | Scarselli | |
| 2020/0145409 A1 | 5/2020 | Pochuev et al. | |
| 2020/0162503 A1 | 5/2020 | Shurtleff et al. | |
| 2020/0177589 A1 | 6/2020 | Mangalvedkar et al. | |
| 2020/0201988 A1 | 6/2020 | Park et al. | |
| 2020/0210869 A1 | 7/2020 | Anicic et al. | |
| 2020/0244656 A1 | 7/2020 | Manepalli et al. | |
| 2020/0259896 A1 | 8/2020 | Sachs et al. | |
| 2020/0274766 A1 | 8/2020 | Notari et al. | |
| 2020/0293663 A1 | 9/2020 | Mugundan et al. | |
| 2020/0313909 A1 | 10/2020 | Mondello et al. | |
| 2020/0322884 A1 | 10/2020 | Di Girolamo et al. | |
| 2020/0327231 A1 | 10/2020 | Smith | |
| 2020/0334751 A1 | 10/2020 | Lagge et al. | |
| 2020/0351101 A1 | 11/2020 | Becker et al. | |
| 2021/0012278 A1 | 1/2021 | Alon et al. | |
| 2021/0014313 A1 | 1/2021 | Shim et al. | |
| 2021/0029156 A1* | 1/2021 | Sharifi Mehr | H04L 67/303 |
| 2021/0037142 A1 | 2/2021 | Sharma et al. | |
| 2021/0051177 A1 | 2/2021 | White et al. | |
| 2021/0064725 A1 | 3/2021 | Miller et al. | |
| 2021/0090011 A1 | 3/2021 | Rae | |
| 2021/0118582 A1 | 4/2021 | Lee et al. | |
| 2021/0152545 A1 | 5/2021 | Park et al. | |
| 2021/0158930 A1 | 5/2021 | Tweedie et al. | |

(56) References Cited

U.S. PATENT DOCUMENTS

| | | |
|---|---|---|
| 2021/0176638 A1 | 6/2021 | Heldt-sheller et al. |
| 2021/0258296 A1 | 8/2021 | Mckenzie et al. |
| 2021/0266326 A1 | 8/2021 | Chen et al. |
| 2021/0297978 A1 | 9/2021 | Lee et al. |
| 2021/0334876 A1 | 10/2021 | Trim et al. |
| 2021/0337031 A1 | 10/2021 | Patil et al. |
| 2021/0377047 A1 | 12/2021 | Haque et al. |
| 2021/0377735 A1 | 12/2021 | Latour et al. |
| 2022/0027803 A1 | 1/2022 | Irazabal et al. |
| 2022/0027894 A1 | 1/2022 | Smith et al. |
| 2022/0070292 A1 | 3/2022 | Casal et al. |
| 2022/0138634 A1 | 5/2022 | Covell et al. |
| 2022/0164681 A1 | 5/2022 | Aurongzeb et al. |
| 2022/0174544 A1 | 6/2022 | Taft et al. |
| 2022/0200861 A1 | 6/2022 | Kotalwar |
| 2022/0223035 A1 | 7/2022 | Yang et al. |
| 2022/0224518 A1 | 7/2022 | Sarkar et al. |
| 2022/0224704 A1 | 7/2022 | Cohen et al. |
| 2022/0239648 A1 | 7/2022 | Ramachandran et al. |
| 2022/0335116 A1 | 10/2022 | Brazao et al. |
| 2022/0335165 A1 | 10/2022 | Brazao et al. |
| 2022/0335431 A1 | 10/2022 | Brazao et al. |
| 2022/0335440 A1 | 10/2022 | Brazao et al. |
| 2022/0337410 A1 | 10/2022 | Brazao et al. |
| 2022/0337478 A1 | 10/2022 | Brazao et al. |
| 2022/0337482 A1 | 10/2022 | Brazao et al. |
| 2022/0337574 A1 | 10/2022 | Brazao et al. |
| 2022/0365885 A1 | 11/2022 | Chhabra et al. |
| 2022/0394044 A1 | 12/2022 | Brazao et al. |
| 2022/0417086 A1 | 12/2022 | Klitte et al. |
| 2023/0130548 A1 | 4/2023 | Brazao et al. |
| 2023/0131432 A1 | 4/2023 | Brazao et al. |
| 2023/0342511 A1 | 10/2023 | Wodrich et al. |
| 2025/0047673 A1 | 2/2025 | Ramachandran et al. |
| 2025/0104098 A1 | 3/2025 | Brazao et al. |

OTHER PUBLICATIONS

Vaidya, IoT-ID: A novel device-specific identifier based on unique hardware fingerprints, May 21, 2020, IEEE, https://ieeexplore.ieee.org/abstract/document/9097592 (Year: 2020).*

CyberReef, Network Outages From Cyberattacks: Downtime Danger, Cyberreef.com, https://www.cyberreef.com/network-outages-from-cyberattacks/ (Year: 2019).*

International Standard (ISO), "26324", 2nd ed. Aug. 2022, Information and Documentation—Digital Object Identifier System, International Standard, ISO 26324:2022, 11 Pages.

PCT/US2022/025092, "International Application Serial No. PCT/US2022/025092, International Search Report and Written Opinion mailed Sep. 23, 2022", Somos, Inc., 14 pages.

PCT/US2022/025092, "International Application Serial No. PCT/US2022/025092, Invitation to Pay Additional Fees mailed Aug. 4, 2022", Somos, Inc., 2 pages.

M., Al-Hawawreh, et al., "Developing a Security Testbed for Industrial Internet of Things", IEEE Internet of Things Journal, vol. 8, No. 7, doi: 10.1109/JIOT.2020.3032093, Apr. 1, 2021, pp. 5558-5573.

PCT/US2022/025092, "International Application Serial No. PCT/US2022/025092, International Preliminary Report on Patentability mailed Oct. 12, 2023", Somos, Inc., 13 pages.

S., Jeong, et al., "Enabling Transparent Communication with Global ID for the Internet of Things", 2012 Sixth International Conference on Innovative Mobile and Internet Services in Ubiquitous Computing, Palermo, Italy, doi: 10.1109/IMIS.2012.91., 2012, pp. 695-701.

"European Application Serial No. 22789044.9, Extended European Search Report mailed Nov. 26, 2024", Somos, Inc., 9 pages.

* cited by examiner

FIG. 28

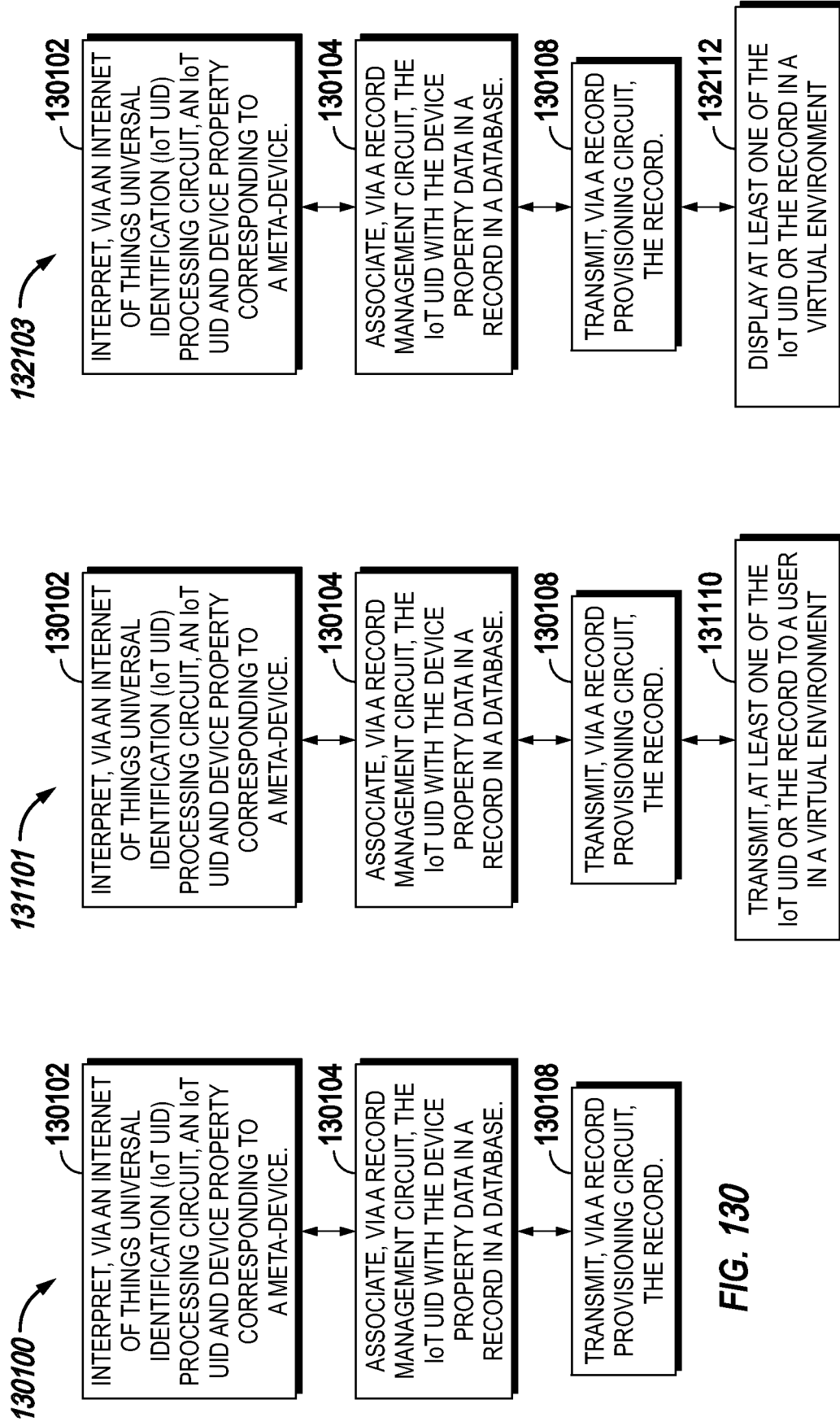

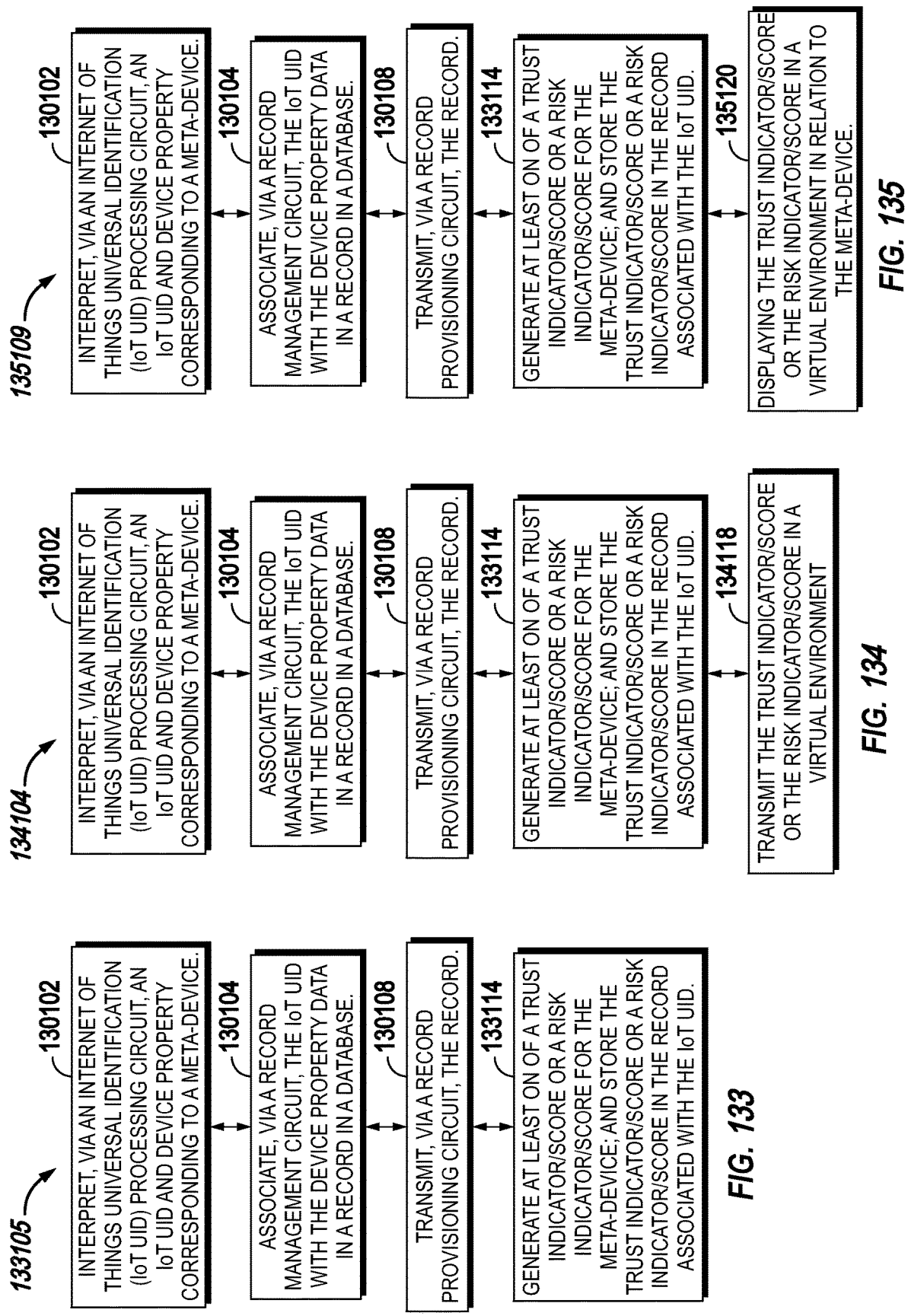

FIG. *138*

SYSTEMS AND METHODS FOR MONITORING RECORDS IN AN INTERNET OF THINGS (IoT) DEVICE REGISTRY FOR CHANGES IN DEVICE PROPERTY DATA

CROSS-REFERENCE TO RELATED APPLICATIONS

This application claims benefit of priority to U.S. Provisional Patent Application 63/175,920, filed Apr. 16, 2021, and entitled "NETWORK CONNECTED DEVICE MANAGEMENT PLATFORM".

The above application is hereby incorporated by reference in its entirety.

FIELD OF INVENTION

This disclosure is related to the control and management of network connected devices, e.g., Internet of Things (IoT) devices.

BACKGROUND

The number of IoT devices that can collect and communicate data over a network, e.g., the Internet, is increasing. Many businesses use IoT devices to track assets across supply chains and/or manufacturing lines. Many consumer goods also include IoT devices to provide "smart" functionality to end users. IoT devices, however, have lifecycles that typically need to be managed. For example, a typical IoT device needs to be provisioned, modified during its active life, and eventually retired from use at the end of its useful life. Many traditional systems for managing IoT devices are susceptible to attack, e.g., hacking, by malicious actors and/or do not provide for trusted transfers of IoT devices from one entity to another and/or across administrative boundaries, e.g., different zones of liability and/or custody in a supply chain or other environment.

SUMMARY

Embodiments of the present disclosure provide for a registry for Internet of Things (IoT) devices that, in turn, may provide for a device identity authorization process. The registry may be maintained by a central trusted authority, e.g., a registrar, such that devices owned and/or operated by different entities and/or user may authenticate each other prior to interacting. Registration of an IoT device may be accomplished via an IoT Universal Identification (IoT UID), as described herein. A registered device may store its assigned IoT UID in the device itself such that the device can present its IoT UID to other devices for verification with the registrar. In embodiments, the IoT UID is associated in a record in the registry with properties of the device that may be unique to the device. As such, registered devices may exchange their IoT UIDs to learn each other's capabilities, e.g., memory capacity, number and types of connections, processing capacity, operating system compatibility, and the like. The IoT UID may also be associated in a record in the registry with a trust and/or risk indicator. As such, registered devices may be prohibited from interacting with devices that do not meet a trust and/or risk level threshold. Thus, embodiments of the current disclosure mitigate the need for an entity's domain controller servers to manage security groups. Such embodiments also improve the ability of a device to trust other devices in real-time without the need to check an approved list maintained by the device (or its domain administrator(s)) and/or to add other devices to the approved list. Embodiments of the registry may provide for the ability to track the histories and/or trust and/or risk indicators of at least hundreds, thousands, hundreds of thousands, millions, billions, and/or trillions of devices.

Accordingly, various applications of apparatuses, methods, and systems may be provided by embodiments, including, as non-limiting examples, an IoT UID registry, a single pane of glass (SPG) system, setup of embedded IoT UIDs for Brownfield devices, setup of embedded IoT UIDs for Greenfield devices, setup of virtual IoT UIDs for Brownfield devices, setup of virtual IoT UIDs for Greenfield devices, lifecycle management for registered IoT devices, tracking of a chain of title for registered IoT devices, a dynamic trust indication/level/rating/score for registered IoT devices, a Device Sentry for registered IoT devices, and fraud detection for registered IoT devices.

Embodiments of an IoT device registry may track and/or provide updates and/or alerts with respect to events relating to registered IoT devices. As explained in greater detail herein, the registrar and the registry are trusted sources that can be used to determine and/or verify data relating to an IoT device. Embodiments of the present disclosure may provide a database that contains records for embedded and virtual IoT UIDs. Embedded IoT UIDs may be present within an associated device/module and the registry. Virtual IoT UIDs may be present within the registry, and may not necessarily be present in an associated device/module. A device may include one or more modules. A module may be any type of electronic device and/or physical asset having properties giving rise to a unique signature. Each module may have its own IoT UID, and each device may also have its own IoT UID in addition to those of its modules.

As such, in an aspect of the present disclosure, there may be provided an apparatus may include an IoT UID processing circuit, a record management circuit, and a record provisioning circuit. The IoT UID processing circuit may be structured to interpret an IoT UID and device property data. The record management circuit may be structured to associate the IoT UID with the device property data via a record. The record provisioning circuit may be structured to transmit the record. In embodiments, the device property data may include an owner identifier value, a manufacturer identifier value, a trusted platform module key, a media access control address, a software version identifier, and/or or a firmware identifier.

In some embodiments of the present disclosure, any information managed by the IoT registry that a user wishes to access and has authority to access may be displayed on one display, or may be all visible at the same time, which may be, for example, on a single display monitor or across a multiple-monitor display system. Embodiments may determine which information regarding a device (or devices) and/or IoT UID is likely to be the most relevant to a particular type of user during a particular use case. The SPG may provide a graphical user interface (GUI) for the user to interact with, such as to input data, commands, and queries, as well as to display the IoT registry data. Embodiments of an SPG, may provide for simplified access to and/or viewing of the status of one or more IoT UIDs associated with a particular entity. For example, embodiments of an SPG may present a view of the data within the IoT device registry that is tailored to a particular user of the SPG. Thus, an SPG may provide an overview of all registered devices owned and/or operated by an end enterprise user, and/or provide for a manufacturer to view registered devices which it made. Embodiments of an SPG may also use filtering to depict only devices and/or corresponding device property data to which an entity using the SPG is authorized to access. For example, an SPG may allow a manufacturer to view certain properties of devices it made, but not view ownership information of said devices. Similarly, an SPG may prevent a current owner of a device from viewing previous ownership data of the device.

As such, in an aspect of the present disclosure, there may be provided an apparatus including a user input processing circuit structured to interpret one or more user input command values, an Internet of Things Universal Identification (IoT UID) identification circuit structured to determine one or more IoT UIDs, based at least in part on the one or more user input command values, a device lookup circuit structured to: generate a query that includes the one or more IoT UIDs, and retrieve device property data corresponding to the one or more IoT UIDs, a query provisioning circuit structured to transmit the query to an IoT device registrar server, a device property processing circuit structured to interpret the device property data generated by the IoT device registrar server in response to the query, and a display circuit structured to display the device property data with the corresponding one or more IoT UIDs.

Embodiments of the present disclosure may provide for a process of capturing a Brownfield device and embedding an IoT UID in it and registering it with the registry. Such capturing may provide for a previously untrusted device to build up its reputation, e.g., its trust level, over time. The process may begin with an end user using an SPG and/or some other interface to send a list of devices to the IoT device registrar that they would like to register via embedded IoT UIDs. The IoT device registrar may then generate/ provision IoT UIDs, which may be new or recycled, and may transmit the list of IoT UIDs to the end user for installation/embedding into the devices. The IoT UIDs may be stored in a database in an IoT device registry at the IoT device registrar in association with the device property data so that the IoT UIDs may be associated in the registry with the device. Embodiments may wait to piggyback the provisioned IoT UIDs on an update or another type of event or message sent to the devices via the device management platform. The IoT UID may be stored in a writable memory device on a module of the device.

As such, in an aspect of the present disclosure, there may be provided a method including identifying one or more Brownfield devices, and generating device property data, based at least in part on the one or more Brownfield devices. The method may further include transmitting, to an IoT device registrar server, a registration request that includes the device property data, interpreting one or more IoT UIDs generated in response to the transmitting of the registration request, and embedding the one or more IoT UIDs in the one or more Brownfield devices.

Embodiments of the present disclosure may provide for a process of installing IoT UIDs into Greenfield devices, which may be presale, e.g., prior to their release from a manufacturer for use by end users, or post-sale, e.g., when an end user turns the device on after purchasing from the manufacturer. In a non-limiting pre-sale example, a manufacturer may send device property data for newly-minted devices and/or modules to a device management platform, that then may relay the data to the IoT device registrar, which may generate and send the IoT UIDs to the device management platform, which may then provide them to the manufacturer for installation into the Greenfield devices before they are released to end users. The IoT UIDs may be stored in a database in an IoT device registry at the IoT device registrar in association with the device property data so that the IoT UIDs may be associated in the registry with the device. Embodiments may provide for a bootstrapping IoT UID registration process, which may occur pre-sale or post-sale. Embodiments may provide for batch registration of newly-minted Greenfield devices. Embodiments may provide for a device to be "claimed" upon activation by an end user before registration can proceed, which may include updating ownership information stored in the registry, updating a chain of title stored in the registry, etc. Registering a Greenfield device with the registry may provide for verification of the Greenfield device's entire history.

As such, in an aspect of the present disclosure, there may be provided a method including manufacturing one or more Greenfield devices, and generating device property data based at least in part on the one or more Greenfield devices. The method may further include transmitting, to an IoT device registrar server, a registration request that includes the device property data. The method may further include interpreting one or more IoT UIDs generated in response to the transmitting of the registration request. The method may further include embedding the one or more IoT UIDs in the one or more Greenfield devices.

Embodiments of the present disclosure may provide for a process of capturing a Brownfield device, generating an IoT UID for the Brownfield device, and registering it with the IoT device registry without embedding the IoT UID into the Brownfield device, i.e., the IoT UID for the device may be virtual. For example, a virtual IoT UID may be used in scenarios in which a manufacturer and/or end user does not want to manage the presence of an embedded IoT UID. In embodiments a virtual IoT UID may be generated using a combination of device attributes, e.g., device property data, such that the virtual IoT UID may uniquely correspond to a particular device. The IoT device registry may associate device property data for the Brownfield device with the IoT UIDs in a record in an IoT registry. In a non-limiting scenario, a company with existing unregistered devices may want to track said devices with virtual IoT UIDs. The process may begin with an end user using an SPG and/or some other interface to send a list of devices with corresponding device property data to the IoT device registrar that they would like to register via virtual IoT UIDs. The IoT device registrar may then generate/provision IoT UIDs, which may be new or recycled, and then may pair each IoT UID to a specific set of the device property data corresponding to a particular device. In embodiments, the IoT device registrar may send a notification back to a device management platform indicating that the devices have been registered. Registering a Brownfield device may improve its trust indicator/rating/level/score value as recorded in its associated record in the IoT device registry. Embodiments may provide for the registration process to be initiated by a device management platform when a Brownfield device is added to the device management platform.

As such, in an aspect of the present disclosure, there may be provided a method including identifying one or more Brownfield devices, generating device property data based at least in part on the one or more Brownfield devices, and transmitting, to an IoT device registrar server, a registration request that includes the device property data. The method may further include interpreting one or more IoT UIDs generated in response to the transmitting of the registration request.

Embodiments of the present disclosure may provide for a process of registering Greenfield devices with virtual IoT UIDs, which may be presale, e.g., prior to their release from a manufacturer for use by end users, or post-sale, e.g., when an end user turns the device on after purchasing from the manufacturer. For example, a virtual IoT UID may be used in scenarios in which a manufacturer and/or end user does not want to manage the presence of an embedded IoT UID. In a non-limiting pre-sale example, a manufacturer may send device property data for newly-minted devices (and/or modules) to a device management platform, that then may relay the data to the IoT device registrar, which may generate IoT UIDs and associate each of them with portions of the device property data corresponding to one of the Greenfield devices to be registered in a record in an IoT registry. The IoT device registrar may then send a notification back to the device management platform that the devices have been registered. Embodiments may provide for a bootstrapping IoT UID registration process, which may occur pre-sale or post-sale. In a non-limiting example of the bootstrap registration process, a manufacturer (e.g., pre-sale) or an end user (e.g., post-sale) may boot up a newly-minted Greenfield device, which may then proceeds to contact the device management platform, which may then request the IoT device registrar to register the Greenfield device via a virtual IoT UID. Embodiments may provide for batch registration of newly-minted Greenfield devices. Embodiment may provide for a device to be "claimed" upon activation by an end user before registration can proceed, which may include updating ownership information stored in the registry, updating a chain of title stored in the registry, etc.

As such, in an aspect of the present disclosure, there may be provided a method including identifying one or more Greenfield devices, generating device property data based at least in part on the one or more Greenfield devices, and transmitting, to an IoT device registrar server, a registration request that includes the device property data. The method may further include interpreting one or more IoT UIDs generated in response to the transmitting of the registration request.

Embodiments of the present disclosure may provide for lifecycle management for registered IoT devices. Examples of lifecycle management may include performing status checks of devices and their current configuration states, e.g., installed patches, installed hardware, number of active network cards, etc. Lifecycle management may include detecting changes in the properties of a device, e.g., detecting and/or recording events. Events may come from a device manager, connection management platform (CMP), a Remote Authentication Dial-In User Service (RADIUS) feed (e.g., event stream), and/or a Home Location Register (HLR). Lifecycle management may include detecting security events. Lifecycle management may include tracking of ownership changes in the IoT device registry. Embodiments may provide for retirement of Greenfield and/or Brownfield devices. Embodiments may monitor for instances in which a permanently retired immutable device property, e.g., an International Mobile Equipment Identity (IMEI), appears in another device. Embodiments may provide for reincarnation/reuse/recycling of old IoT UIDs and/or for their permanent retirement. Embodiments may provide for checks on whether data collection makes sense. Down detection may be provided by certain embodiments. Embodiments may facilitate the pushing of updates and/or patches to devices. Lifecycle management may include modifying a trust indicator/rating/level/score of a device based on events. Embodiments may decrease/lower/reduce/drop a device's trust indicator/rating/level/score if the corresponding information in the IoT device registry starts to get stale, for example, if it has not been updated and/or queried for at least a predetermined time. Embodiments may provide for polling of devices to provide updates to their stored property data.

As such, in an aspect of the present disclosure, there may be provided an apparatus including a property-monitoring circuit structured to generate a query for device property data for an IoT device to an IoT device registrar server, interpret the device property data received from the IoT device registrar server to determine whether there is a change in the device property data, if the property-monitoring circuit determines that there is a change in the device property data, generate a notification of the change, and transmit the notification of the change to the IoT device registrar server.

Embodiments of the present disclosure may provide for the maintaining/recording of chain of title for devices. Maintaining and/or recording of the chain of title may be provided via a distributed ledger, e.g., a blockchain. Embodiments may provide for certification that a device is not a stolen device and/or has a fully accountable chain of title. Certification may be used to evaluate an asking price for a registered device, or for a group of devices that may include one or more registered devices. Embodiments provide for an entity to claim ownership of a device. The trust indicator/rating/level/score may be numeric based, color based, symbol based, alphanumeric based, letter based, or any combination thereof. Non-limiting examples of events resulting in title changes include: creation of a device, sale of a device, decommissioning of a device, license of a device, etc. Embodiments may provide for supply chain validation. As non-limiting examples, validation may include determining whether device modules were sourced from authorized vendors, or from fair trade certified sources. Embodiments may provide for determining a carbon rating of a device based on known ratings of their modules' sources. Embodiments may provide for the detection of device properties, e.g., location, usage profile, network, interface language, device settings, associated telephone number, that may be indicative of a change in ownership.

As such, in an aspect of the present disclosure, there may be provided an apparatus including an IoT UID processing circuit, a record management circuit, an ownership analysis circuit, and an ownership provisioning circuit. The IoT UID processing circuit may be structured to interpret an IoT UID corresponding to a device. The record management circuit may be structured to identify, based at least in part on the IoT UID, a record in a database, the record including device ownership data associated with the device. The ownership analysis circuit may be structured to interpret, based at least in part on the record, the device ownership data associated with the device. The ownership provisioning circuit may be structured to transmit the device ownership data.

Embodiments of the present disclosure may provide for a rating of the "trustworthiness" of a device, which may be capable of changing over time as the device experiences "life" events, e.g., ecosystem events. For example, Greenfield devices may automatically start out with a high value trust indicator/rating/level/score because their whole existence history may be known and verifiable. The trust indicator/rating/level/score may be numeric based, color based, symbol based, alphanumeric based, letter based, or any combination thereof. A trust indicator (e.g., trust rating/level/score value) may decrease as software/hardware grows older and/or out of date. Patching may improve a device's trust indicator. Trust indicators may be determined, in part, by device location, e.g., geo-fenced trust indicators. Embodiments may provide for user-defined scores and/or scales. Scores may be converted from one paradigm/entity to another, in which the IoT device registry may serve as a baseline score to which the others can be compared. Embodiments may provide for trust indicators for online servers to include game/metaverse servers. Embodiments may provide for augmented reality (AR) trust indicators to be shown in relation to devices, e.g., ATM and/or card readers, in the real world. Trust indicators may be applied to device manufacturers.

As such, in an aspect of the present disclosure, there may be provided an apparatus including an IoT UID processing circuit structured to interpret an IoT UID corresponding to a device, a record management circuit structured to identify, based at least in part on the IoT UID, a record in a database corresponding to the device, a trust analysis circuit structured to determine, based at least in part on the record, a risk indicator of the device, and an indicator provisioning circuit structured to transmit the risk indicator.

Embodiments of the present disclosure may provide for risk and/or trust scores/indicators and/or certification of servers and/or other physical assets supporting metaverse activities. For example, a user in the metaverse may be provided with a risk score of a server before entering an area (e.g., a room) in the metaverse hosted by that server. Embodiments may provide for risk scores of users within the metaverse. Such risk score may be based on the risk score of devices associated with the user. Embodiments may depict/express the risk scores within the metaverse as a trust indicator/rating/level/score that may be numeric based, color based, symbol based, alphanumeric based, letter based, or any combination thereof. Embodiments of the disclosure may provide for an end user application that restricts a user from accessing or interacting with a device/entity in the metaverse, for example, a device, a server, an area, an object, an avatar, or another user, that does not meet a minimum risk threshold and/or does not present a certification. Embodiments of the application may be a parental control software agent. The risk scores may be determined, stored, and/or maintained by an IoT UID device registrar, e.g., in an IoT device registrar server. A device may be a virtual device (an object in the metaverse having a real-world counterpart, e.g., a real-world device counterpart), a real-world device (an object in the real-world having a metaverse counterpart), or a meta-device (an object in the metaverse lacking a real-world counterparts or, in some instances, having one or more real-world counterparts). A device may include virtual devices and meta-devices. A virtual device may be a digital twin of a real-world device. The risk and/or trust indicator/rating/level/score may be tailored to a user. Trust and/or risk scores may be shown with respect to a virtual store for metaverse purchases.

As such, in an aspect of the present disclosure, there may be provided an apparatus including an IoT UID processing circuit, a record management circuit, a trust analysis circuit, and a trust indicator provisioning circuit. The IoT UID processing circuit may be structured to interpret an IoT UID corresponding to a device in a metaverse. The record management circuit may be structured to identify, based at least in part on the IoT UID, a record in a database corresponding to the device in the metaverse. The trust analysis circuit may be structured to determine, based at least in part on the record, a trust indicator of the device in the metaverse. The trust indicator provisioning circuit may be structured to transmit the trust indicator.

Embodiments of the present disclosure may provide for the depiction and use of a risk and/or trust indicator/rating/level/score and/or certification via augmented reality (AR). Embodiments may depict risk/trust scores of objected encountered by a user. As a non-limiting example, a user wearing an AR device, such as an AR headset, AR contact lenses, AR glasses, or AR goggles, may see an ATM colored green if the device has a sufficiently high trust indicator (e.g., trust score/rating/level value), or red if the device has a sufficiently low trust indicator. Embodiments may depict trust indicators for individuals based on the trust indicators of devices associated with the scored individuals. Devices may be virtual devices, real-world devices, or meta-devices. Applications of the trust and/or risk scores may be used for virtual stores in a metaverse.

As such, in an aspect of the present disclosure, there may be provided an apparatus including an IoT UID processing circuit structured to interpret an IoT UID corresponding to a device in an AR, a record management circuit structured to identify, based at least in part on the IoT UID, a record in a database corresponding to the device in the AR, a trust analysis circuit structured to determine, based at least in part on the record, a trust indicator of the device in the AR, a trust indicator provisioning circuit structured to transmit the trust indicator.

Embodiments of the present disclosure may provide for an agent that monitors registered devices for known vulnerabilities and provides alerts and/or access to remedial measures, e.g., patches. The agent may execute on the same system as the IoT device registry and/or on a system owned and/or operated by an end user, manufacturer, and/or device management platform. Embodiments may provide for the collection of remedial measures from a device manufacturer and/or other source, e.g., the National Security Agency (NSA), Linux Distros, Microsoft, Apple, Google, etc., and may provide the generation of campaigns to manage and/or track implementing the remedial action of a plurality of affected devices, e.g., "software Bill of Materials (SBoM)" and/or "Cybersecurity Bill of materials (CBoM)." Embodiments may provide for the aggregation of hardware and/or software version data, which the agent may use to detect vulnerabilities. Embodiments may access a vulnerability database. Embodiments may generate a vulnerability database. The agent/sentry may send an alert when it detects a configuration change of a module, e.g., when a new network interface controller (NIC) has been installed. In embodiments, the agent/sentry may poll and/or otherwise monitor security sources for relevant information and automatically generate matches, generate alerts/notifications, and/or highlight potentially affected devices (via an alert and/or event message, which may be in an SPG, as disclosed herein) to device users, administrators, manufacturers, etc. In embodiments, the agent/sentry may change/adjust the trust and/or risk levels of the affected devices, e.g., decrease the trust levels (or increase the risk levels) where the devices fall out of compliance due to a new patch. Once action is taken to remedy the vulnerabilities, the trust and/or risk levels will revert to the relevant trust and/or risk level and/or security state. In embodiments, the agent/sentry may maintain audited logs of actions taken to address the vulnerabilities.

As such, in an aspect of the present disclosure, there may be provided an apparatus including a device property data processing circuit structured to: at a first time, interpret, device property data corresponding to a device registered with an IoT device registry, and at a second time, interpret, the device property data corresponding to the device registered with the IoT device registry, a change detection circuit structured to detect a change in the device property data between the first time and the second time, an alert circuit structured to generate, responsive to the detected change, a message that identifies the device corresponding to the device property data, and an alert provisioning circuit structured to transmit the message.

Embodiments of the present disclosure may provide for an agent that monitors registered devices for loss of one or more network connections. Monitoring may be for a single device and/or for multiple devices, e.g., a fleet of devices. The agent may not necessarily be concerned with hardware and/or software version of components; rather, the agent may look at the IoT device registry to detect outage patterns. The IoT device registrar may be in a unique position to view a large number of devices simultaneously, which may provide for greater insight into the existence of a device outage.

As such, in an aspect of the present disclosure, there may be provided an apparatus including a device property data processing circuit, an outage detection circuit, an alert circuit, and an alert provisioning circuit. The device property data processing circuit may be structured to interpret device property data corresponding to one or more devices registered with an IoT device registry. The outage detection circuit may be structured to detect an outage pattern in the device property data. The outage pattern may correspond to an outage of the one or more devices. The alert circuit may be structured to, responsive to the outage pattern, generate an alert message that identifies the one or more devices. The alert provisioning circuit may be structured to transmit the alert message.

Embodiments of the present disclosure may provide for an agent that monitors the IoT device registry for signs of fraudulent activity. This may provide for detection of unusual behavior that may be indicative of fraud and/or a security risk. Correlation of device properties across the various spectrums may provide for a unique ability to detect unusual relationships that may indicate fraud and/or warrant further investigation. Embodiments may send messages to various parties, e.g., manufacturers that may include restricted views of device property data, which may enable the various parties to detect unusual behavior and/or fraud.

As such, in an aspect of the present disclosure, there may be provided an apparatus including a device property data processing circuit, a security analysis circuit, an alert circuit, and an alert provisioning circuit. The device property data processing circuit may be structured to interpret device property data corresponding to a device registered with an IoT device registry. The security analysis circuit may be structured to determine, based at least in part on the device property data, that the device is subject to a fraud event. The alert circuit may be structured to generate, responsive to the determined fraud event, a message that identifies the device. The alert provisioning circuit may be structured to transmit the message.

Embodiments of the present disclosure may provide for the registering of meta-devices with the IoT UID registry. A meta-device, in embodiments, may be a device and/or module that exists in a computer environment, e.g., a metaverse, a virtual environment apart from a metaverse, a software object, etc. A meta-device may have one or more real-world counterparts, or no real-world counterpart. A meta-device with at least one real-world counterpart may be a virtual device. A meta-device may have a set of properties forming a unique signature for the meta-device, e.g., device property data, which may include one or more non-fungible tokens (NFTs). A meta-device may be a Greenfield device and/or a Brownfield device. A non-limiting use case of registering a meta-device includes a programmer registering a newly programmed and instantiated car for use in a multi-player/avatar virtual environment, e.g., a meta-verse, with an IoT device registrar as a Greenfield meta-device.

The car may then be purchased by a user/customer, and then event messages may be transmitted to the IoT device registrar to track the life cycle events of the car. The car may also have a NFT, which may be stored by the registry as part of the device property data. In embodiments, a meta-device may be a point-of-sale device in a virtual convenience store where the meta-device may correspond to multiple real-world devices that are not real-world point-of-sale devices, e.g., a server, payment gateway, and/or a firewall.

As such, in an aspect of the present disclosure, there may be provided an apparatus including an IoT UID processing circuit structured to interpret an IoT UID and device property data corresponding to a meta-device, a record management circuit structured to associate the IoT UID with the device property data via a record, and a record provisioning circuit structured to transmit the record.

The description herein references various applications as non-limiting examples of apparatuses, methods, and systems, and for clarity of the present description. However, embodiments herein are applicable to other applications having similar challenges and/or implementations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains. It is to be understood that both the foregoing general description and the following detailed description are examples and explanatory and are intended to provide further explanation of the invention as claimed.

BRIEF DESCRIPTION OF THE FIGURES

For the purposes of promoting an understanding of the principles of the disclosure, reference will now be made to the embodiments illustrated in the figures and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains. Further, skilled artisans will appreciate that elements in the figures are illustrated for simplicity and clarity and may not necessarily be drawn to scale. For example, the dimensions of some of the elements in the figures may be exaggerated relative to other elements to help to improve understanding of embodiments of the methods and systems disclosed herein. Accordingly:

FIG. 28 is a diagram of graphical user interfaces for an IoT device registry display, in accordance with an embodiment of the current disclosure;

FIG. 119 is a flowchart depicting a method for training an artificial intelligence (AI) to detect device outages, in accordance with an embodiment of the current disclosure;

FIG. 120 is a schematic diagram of an apparatus for detecting fraudulent activity, in accordance with an embodiment of the current disclosure;

FIG. 121 is a flowchart depicting a method for detecting fraudulent activity, in accordance with an embodiment of the current disclosure;

FIG. 122 is a flowchart depicting a method for detecting fraudulent activity, in accordance with an embodiment of the current disclosure;

FIG. 123 is a flowchart depicting a method for detecting fraudulent activity, in accordance with an embodiment of the current disclosure;

FIG. 124 is a schematic diagram of an apparatus for detecting fraudulent activity, in accordance with an embodiment of the current disclosure;

FIG. 125 is a flowchart depicting a method for detecting fraudulent activity, in accordance with an embodiment of the current disclosure;

FIG. 126 is a flowchart depicting a method for detecting fraudulent activity, in accordance with an embodiment of the current disclosure;

FIG. 127 is a schematic diagram of a system for detecting fraudulent activity, in accordance with an embodiment of the current disclosure;

FIG. 128 is a flowchart depicting a method for detecting fraudulent activity, in accordance with an embodiment of the current disclosure;

FIG. 129 is a flowchart depicting a method for detecting fraudulent activity, in accordance with an embodiment of the current disclosure;

FIGS. 130-135 are flowcharts depicting methods for registering meta-devices with an Internet of Things (IoT) device registry, in accordance with embodiments of the current disclosure;

Figure 136:
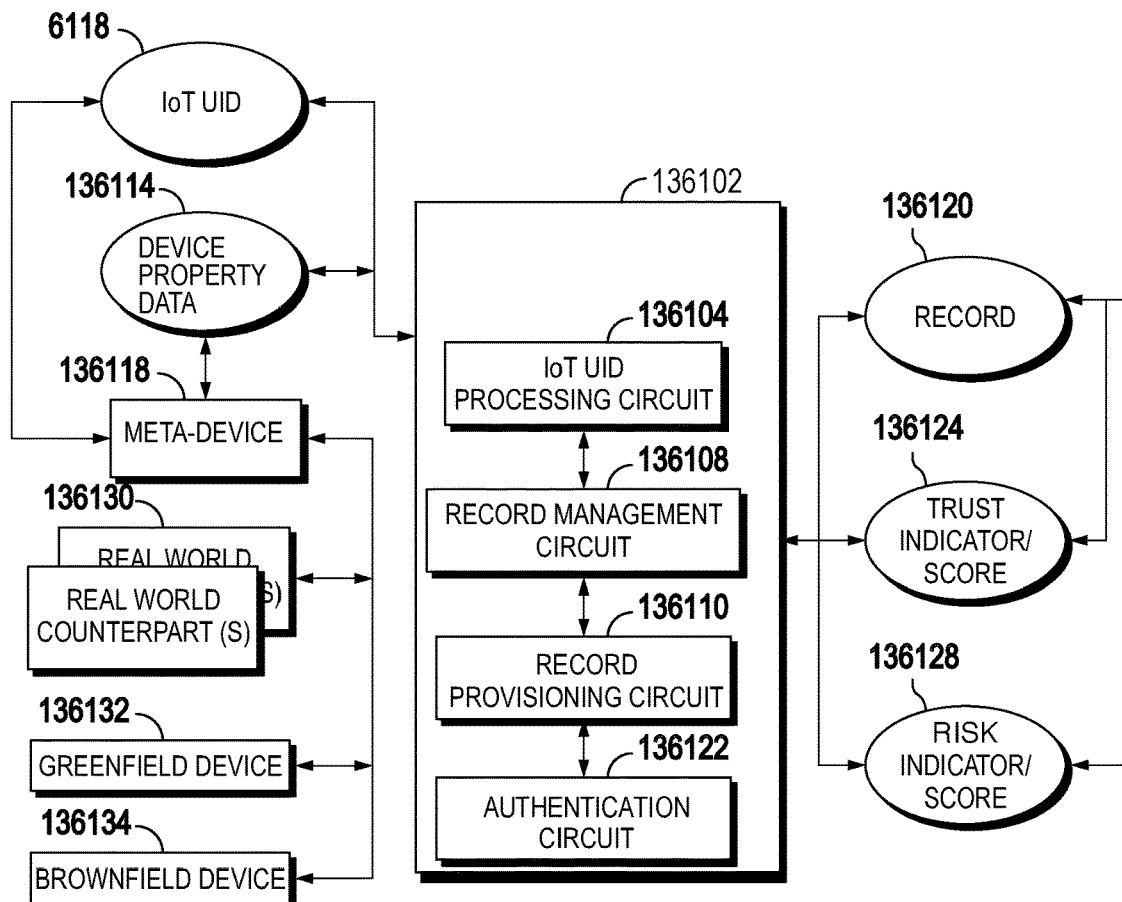
Figure 137:
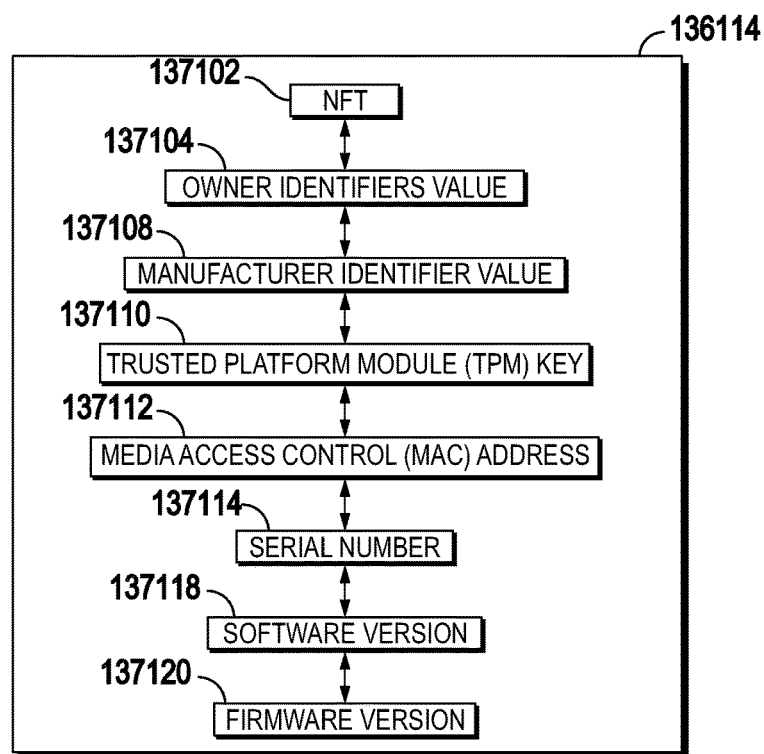
Figure 138:
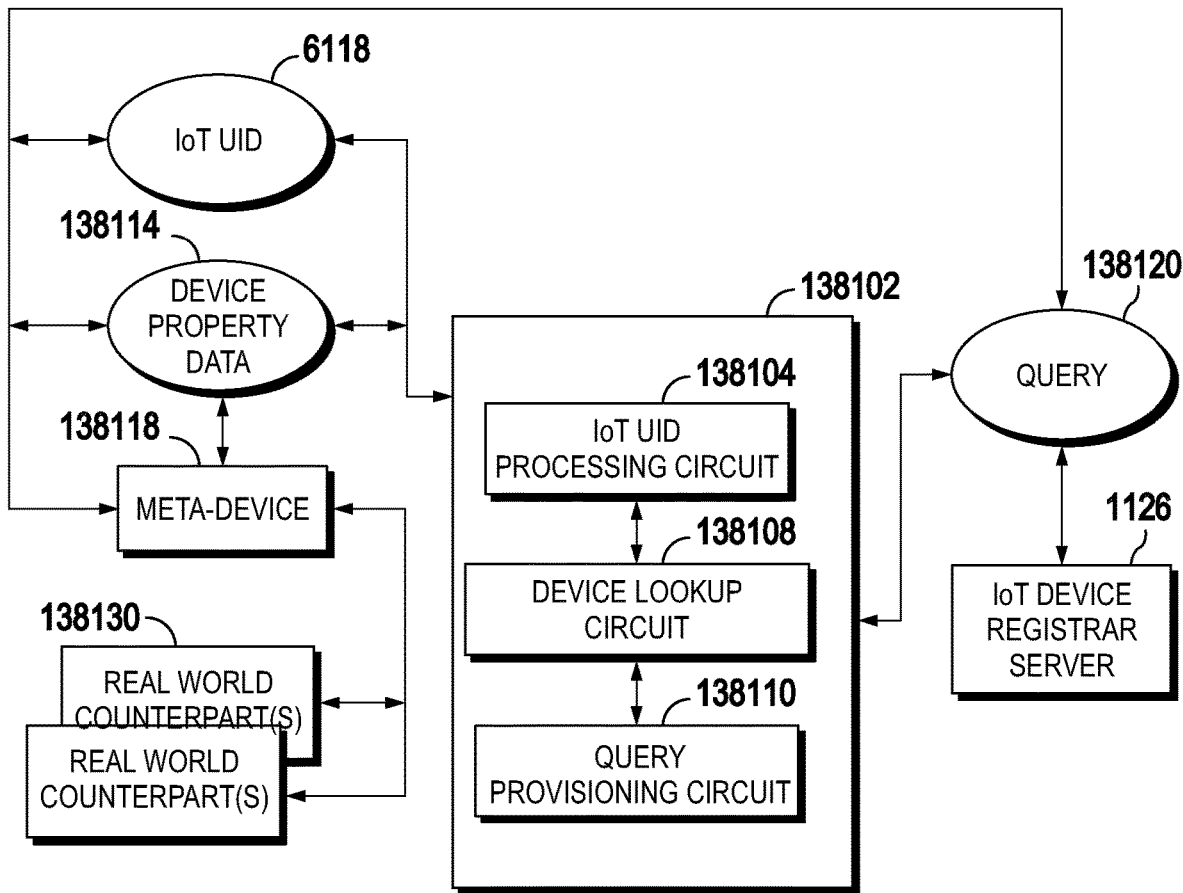
Figure 139:
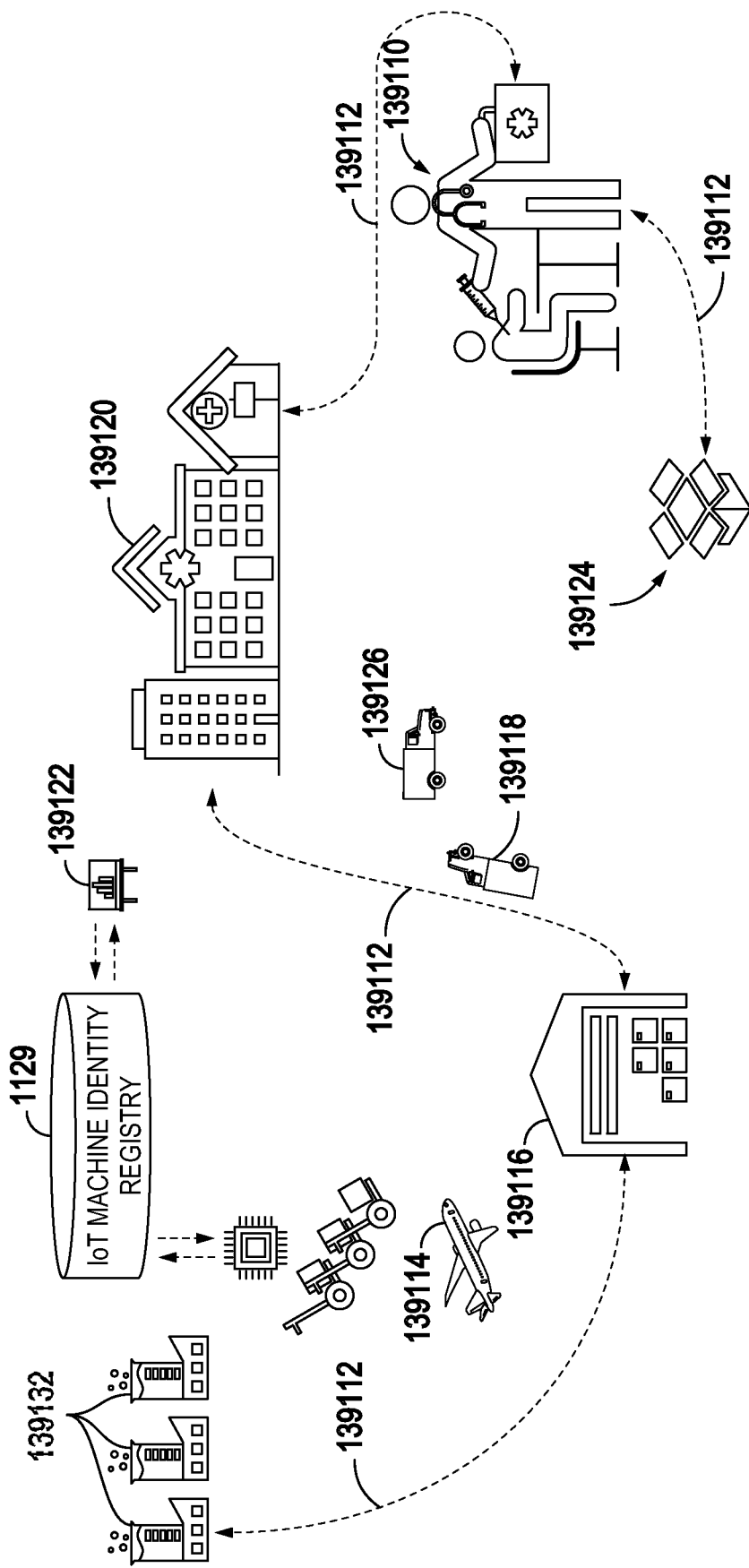

FIG. 136 depicts an apparatus for registering meta-devices with an Internet of Things (IoT) device registry, in accordance with an embodiment of the current disclosure;

FIG. 137 depicts device property data types, in accordance with an embodiment of the current disclosure;

FIG. 138 depicts an apparatus for querying an Internet of Things (IoT) device registry, in accordance with an embodiment of the current disclosure; and FIG. 139 is a schematic diagram depicting a supply chain, in accordance with an embodiment of the current disclosure.

DETAILED DESCRIPTION

The present disclosure will now be described in detail by describing various illustrative, non-limiting embodiments thereof with reference to the accompanying figures and exhibits. The disclosure may be embodied in many different forms and should not be construed as being limited to the illustrative embodiments set forth herein. Rather, the embodiments are provided so that this disclosure will be thorough and will fully convey the concept of the disclosure to those skilled in the art.

Embodiments of the current disclosure are described herein with respect to devices, which includes devices that may form a connected ecosystem of various machines, sensors, and/or other types of devices working together and/or independently with or without human interaction. Devices may be modules, e.g., network interface cards, that can be combined with other modules to form other types of devices, e.g., a desktop computer having an ethernet network interface card, an 802.11 Wi-Fi network interface card, a serial RS232 card, etc. Non-limiting examples of modules include network interface cards, processors, memory chips, display controllers/cards, process logic controllers (PLCs), etc. For example, as used herein, the term "device" may refer to a module for a product, a set of modules for a product, or the entirety of the product that may have one or more modules incorporated therein. Devices may also be Internet of Things (IoT) devices. In embodiments a device may be a collection of chipsets and/or modules contained in a device to perform a specific function and/or set of functions. In embodiments, a device may be a collection of associated chipsets and/or modules and/or their accompanying identification attributes combined with attributes of a containing device. Such embodiments may associate embedded components absolutely with respect to a device containing the embedded components.

Traditional approaches of physically securing an enterprise's perimeter do not meet the needs of an enterprise deploying IoT devices. For example, IoT devices used to track products along a supply chain must often pass through several entities, each having their own physical security perimeters where products are allowed to pass between the security perimeters without verifying ownership (and/or security credentials) of IoT devices used to monitor the products.

Accordingly, embodiments of the current disclosure provide for a registry for IoT devices that, in turn, may provide for a device identity authorization process that validates identities of endpoints in an IoT system. Registration of an IoT device may be accomplished via an IoT Universal Identification (IoT UID), as described herein.

In embodiments, a device identity certification process may be configured upon enrollment/entry of a device to a platform or other management system, and informs a service provider of the method to be used when checking a device's identity during the registration process. Embodiments of the present disclosure may also provide for systems and methods for managing a Machine Identity Management platform that instills confidence in a device's identity when it interacts with other devices, applications, clouds, and/or gateways. As will be explained in greater detail herein, embodiments of the current disclosure may provide for the verification of an IoT device prior to joining of the IoT device to a network, thereby fortifying the perimeter of the network. In other words, embodiments of the current disclosure may require (or encourage) an identification and/or verification of an IoT device's identity prior to allowing the IoT device to join a network. In certain aspects, embodiments of the current disclosure provide for a reliable, scalable backbone for an IoT device registry. In certain aspects, embodiments of the current disclosure provide for a subscriber identity module (SIM) for Things, e.g., digital devices, which enables global IoT device monitoring via business intelligence (BI) tools. As will also be explained in greater detail herein, embodiments of the current disclosure provide for systems, methods, and apparatuses that improve an entity's confidence in an IoT device's registration, security, and lifecycle management.

Figure 1:
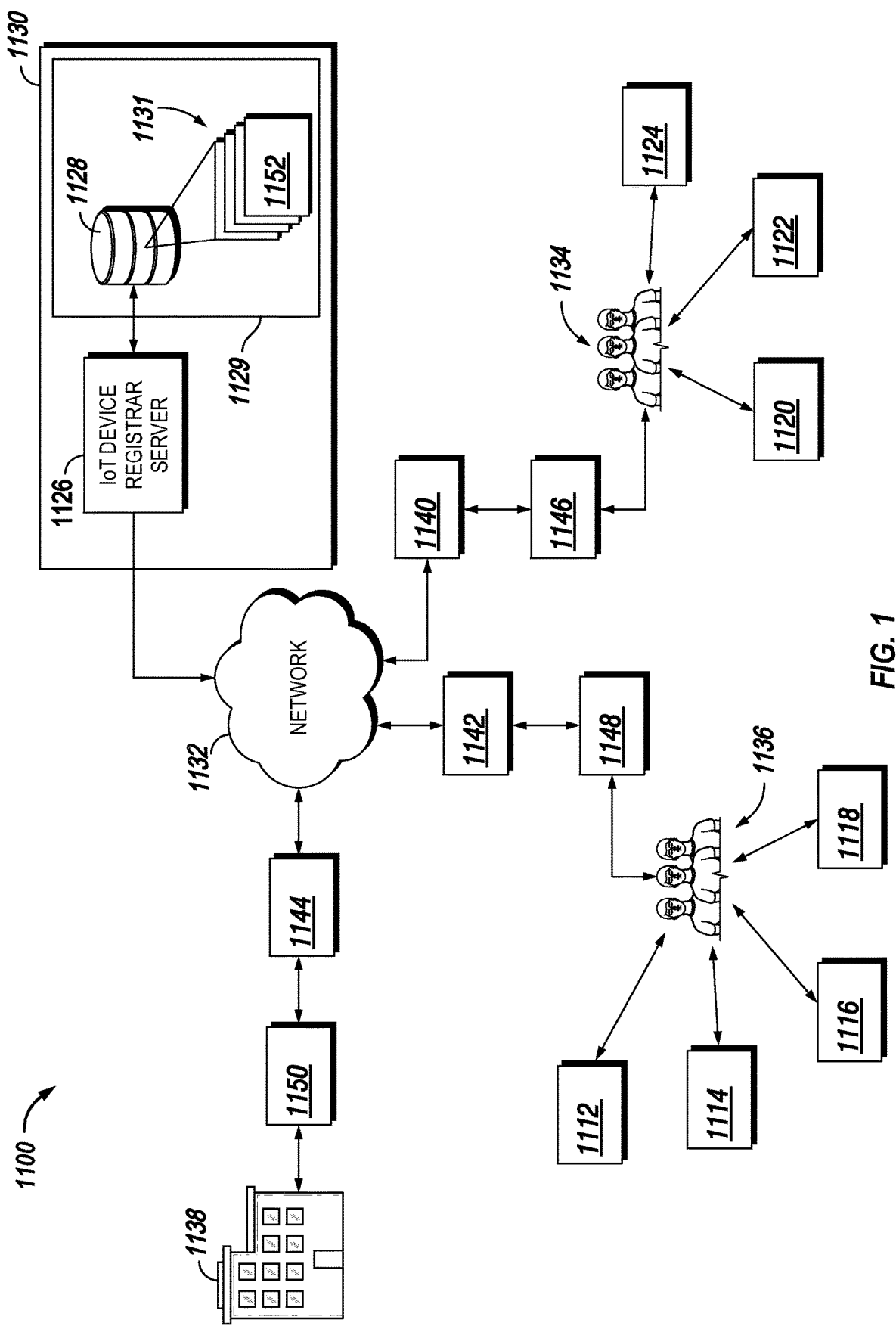
FIG. 1 is a schematic diagram of a system for managing one or more devices, in accordance with an embodiment of the current disclosure.

Referring now to FIG. 1, a system 1100 for managing network connected devices 1112, 1114, 1116, 1118, 1120, 1122, and 1124, in accordance with an embodiment of the current disclosure, includes one or more IoT device registrar/registry servers 1126 and one or more IoT memory devices 1128, which may collectively form an IoT device registry 1129, also referred to herein as "registry". For example, in embodiments, the one or more memory devices 1128 may form a database that hosts the registry 1129. The one or more servers 1126 and/or the registry 1129 may be operated by a registrar 1130, e.g., an entity that provides registration services for IoT devices. The one or more servers 1126 may each have at least one processor, and may be structured to communicate with the registry 1129. The registry 1129 may include a plurality of records 1131. In embodiments, the one or more servers 1126 may be included and/or otherwise may form part of the registry 1129.

In embodiments, the IoT device registry 1129 may be accessible via a network 1132 to one or more entities 1134, 1136, and/or 1138 that own, possess, operate, and/or otherwise have an interest in the one or more devices 1112, 1114, 1116, 1118, 1120, 1122, and 1124. Non-limiting examples of the entities include a manufacturer 1134 of the devices, an end user 1136 of the devices, and a third party 1138. The manufacturer 1134 may be an original equipment manufacturer (OEM). The end user 1136 may be an enterprise/corporate user and/or a retail user. The third party 1138 may include entities that perform services related to the one or more devices 1112, 1114, 1116, 1118, 1120, 1122, and 1124, such as monitoring the one or more devices 1112, 1114, 1116, 1118, 1120, 1122, and 1124 for security vulnerabilities and/or providing software/firmware updates. In embodiments, the third party 1138 may be a party who has a financial interest in the one or more devices 1112, 1114, 1116, 1118, 1120, 1122, and 1124, such as a lender of a loan used by an enterprise 1136 to purchase the one or more devices 1112, 1114, 1116, 1118, 1120, 1122, and 1124 from a manufacturer 1134.

As explained in greater detail herein, the entities 1134, 1136, and/or 1138 may send communication data 1140, 1142, 1144 to the IoT device registrar 1130 and/or may receive communication data 1146, 1148, 1150 from the IoT device registrar 1130. For example, an enterprise user 1136 may send a registration request 1142 for a device 1114 to the registrar 1130, which may then register the device 1114 via a record 1152, in the registry 1129, as being owned by the enterprise 1136. An employee of the enterprise 1136 operating the device 1114 may then wish to interact, via the device 1114, with another device, e.g., a remote server, operated by a third party 1138. As the device 1114 is registered with the registry 1129, the third party 1138 may send a query to the IoT device registrar server 1126 asking who the registered owner of the device 1114 is. The IoT device registrar server 1126 may then execute the query 1114 against the registry 1129, and may send the result 1150 back to the third party 1138, who may then grant or deny the device 1114 access to its device based on the result 1150. For example, access may be granted if the device 1114 is owned by an approved party, or may be denied if the device 1114 is not owned by an approved party. As will be appreciated, other use case examples of the system 1100 are disclosed herein.

Figure 2:
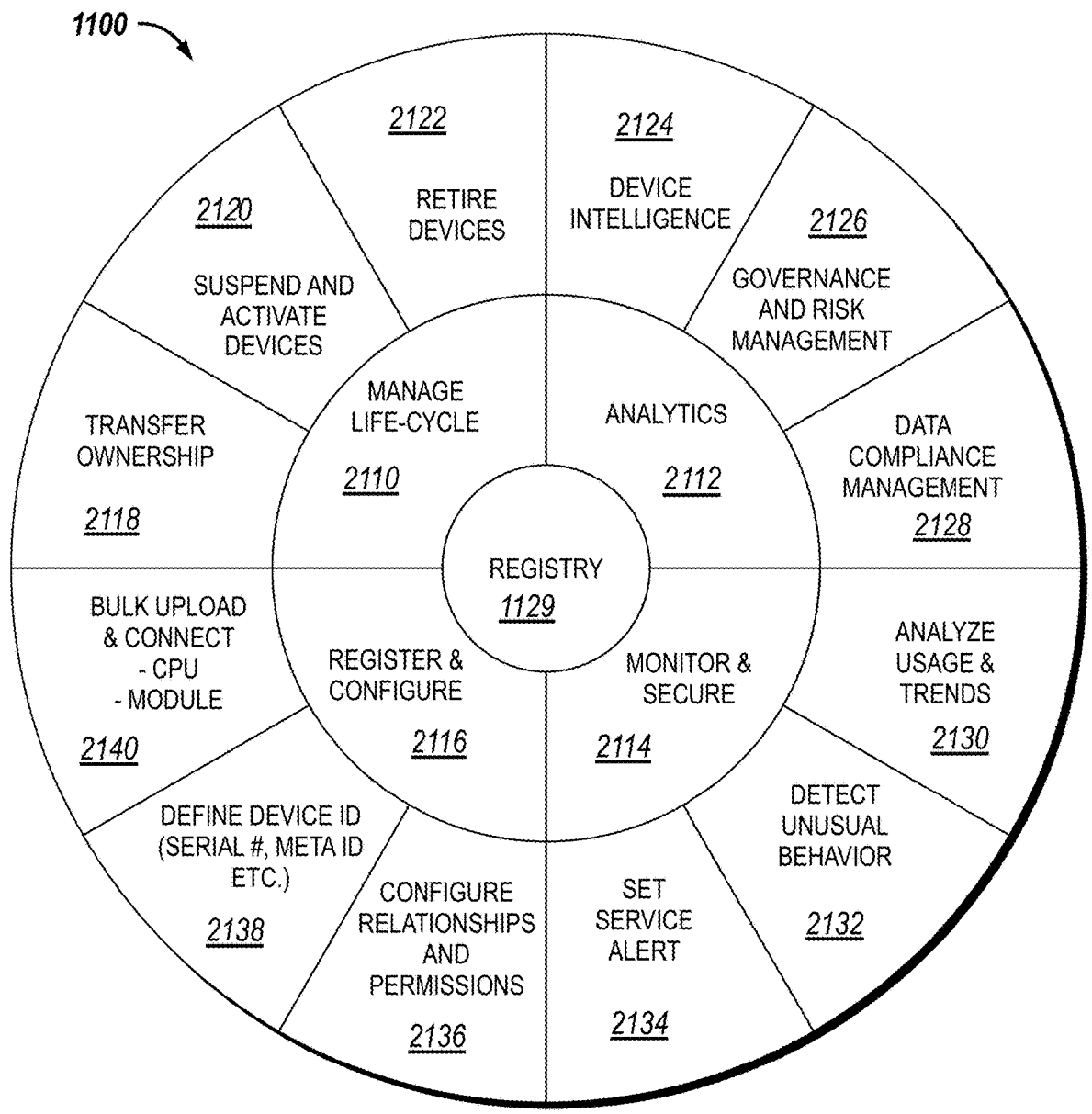
FIG. 2 is a component diagram of a system for managing one or more devices, in accordance with an embodiment of the current disclosure.

Turning to FIG. 2, embodiments of the system 1100 may also include a lifecycle management component 2110, an analytics component 2112, a monitoring and security component 2114, and a registration and configuration component 2116. The lifecycle management component 2110 may include a transfer and ownership subcomponent 2118, a suspend and activate device subcomponent 2120, and/or a retire device subcomponent 2122. The analytics component 2112 may include a device intelligence subcomponent 2124, a government and risk management subcomponent 2126, and/or a data compliance management subcomponent 2128. The monitor and secure component 2114 may include a usage and trend analysis subcomponent 2130, a detect unusual behavior subcomponent 2132, and/or a set service alerts subcomponent 2134. The register and configure component 2116 may include a relationships and permission subcomponent 2136, a device ID definition subcomponent 2138, and/or a bulk upload and connect subcomponent 2140. The bulk upload and connect subcomponent 2140 may facilitate communication with network connected devices across multiple cloud environments for bulk registrations and/or provisioning one or more devices with respect to the IoT device registry 1129, as disclosed herein.

Figure 3:
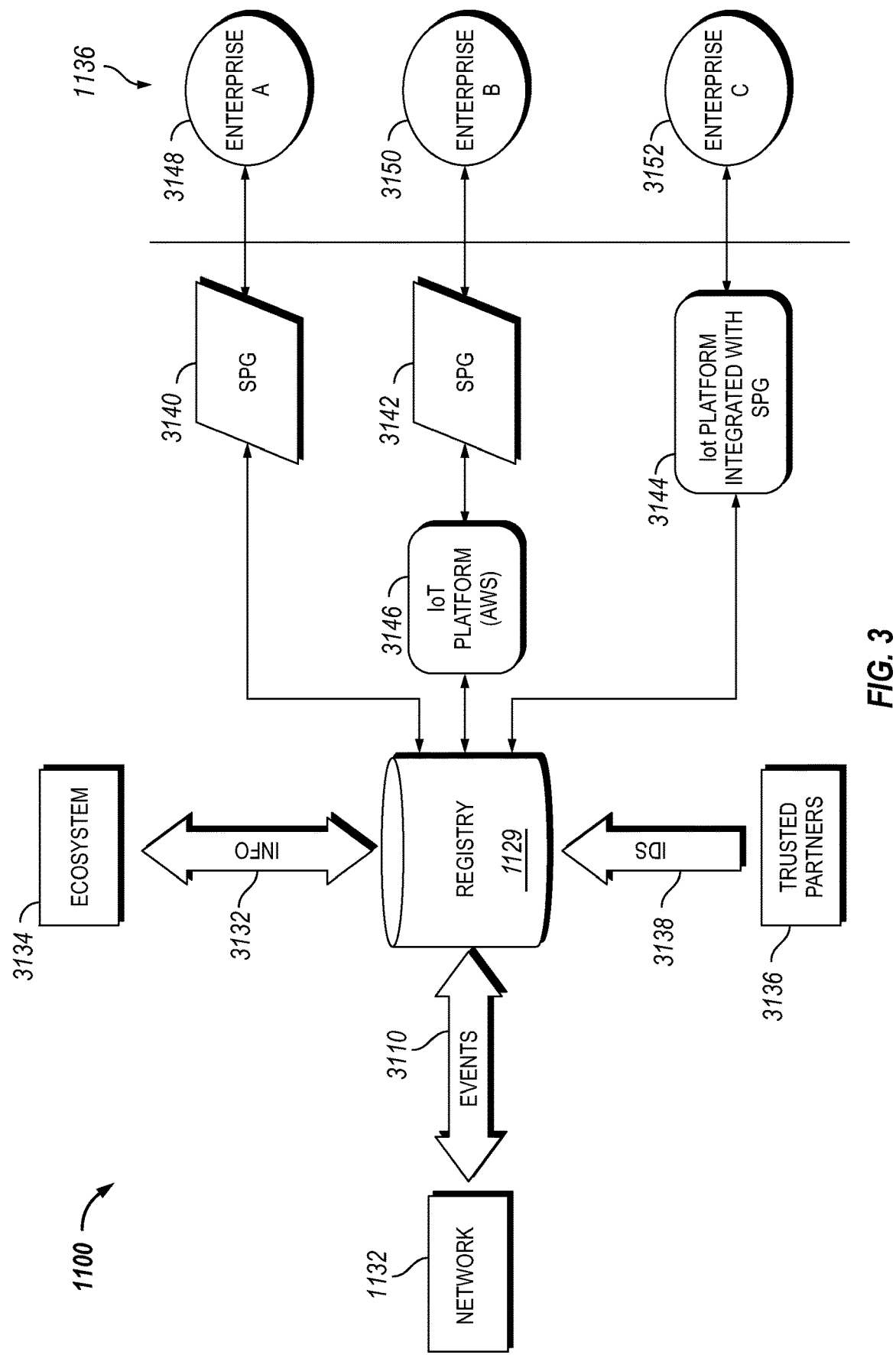
FIG. 3 is a schematic diagram of another embodiment of a system for managing one or more devices, in accordance with the current disclosure.

As illustrated in FIG. 3, in embodiments of the system 1100, the registry 1129 may receive events 3110 relating to the one or more devices 1112, 1114, 1116, 1118, 1120, 1122, and 1124 (FIG. 1), via the network 1132, and/or other information/data 3132 related to the one or more devices 1112, 1114, 1116, 1118, 1120, 1122, and 1124 from the ecosystems 3134, e.g., environments relating to entities 1134, 1136, 1138, in which the one or more devices 1112, 1114, 1116, 1118, 1120, 1122, and 1124 exist/operate. Events may also come and/or relate to software libraries, software development kits (SDKs), drivers, other modules, devices, and/or the like. The events 3110 and/or information 3132 may be processed by the registry 1129 and/or stored in one or more applicable records 1131 (FIG. 1). As explained in greater detail herein, one or more trusted partners/entities 3136 may supply device property data 3138, e.g., IDs such as Trusted Platform Module (TPM) keys and/or Media Access Control (MAC) addresses, that can be mapped by the registry 1129 (FIG. 1) to an IoT UID within a record 1131. The system 1100 may include one or more interfaces 3140, 3142, 3144 that allow one or more entities, e.g., end users 1136, to interact with and/or access the information stored within the registry 1129. Embodiments of the interfaces 3140, 3142, 3144, may provide access to the registry 1129 via single panes of glass (SPGs), which may be integrated into a device management platform, e.g., interface 3144; offered as an application within an IT/web service platform 3146, e.g., Amazon Web Services, Microsoft Azure, Google Cloud Platform, etc., e.g., interface 3142; and/or hosted on a server independent of an IT/web service platform, e.g., interface 3140. For example, as shown in FIG. 3, enterprise user A 3148 may interact with the registry 1129 via an SPG 3140 provided by a server operated by the registrar 1130, a manufacturer 1134, enterprise A 3148 itself, and/or another entity. Enterprise B 3150 may interact with the registry 1129 via a SPG 3142 offered as an application for purchase on an existing IT/web service platform 3146. Enterprise C 3152 may interact with the registry 1129 via an SPG 3144 integrated into a device management platform.

Figure 4:
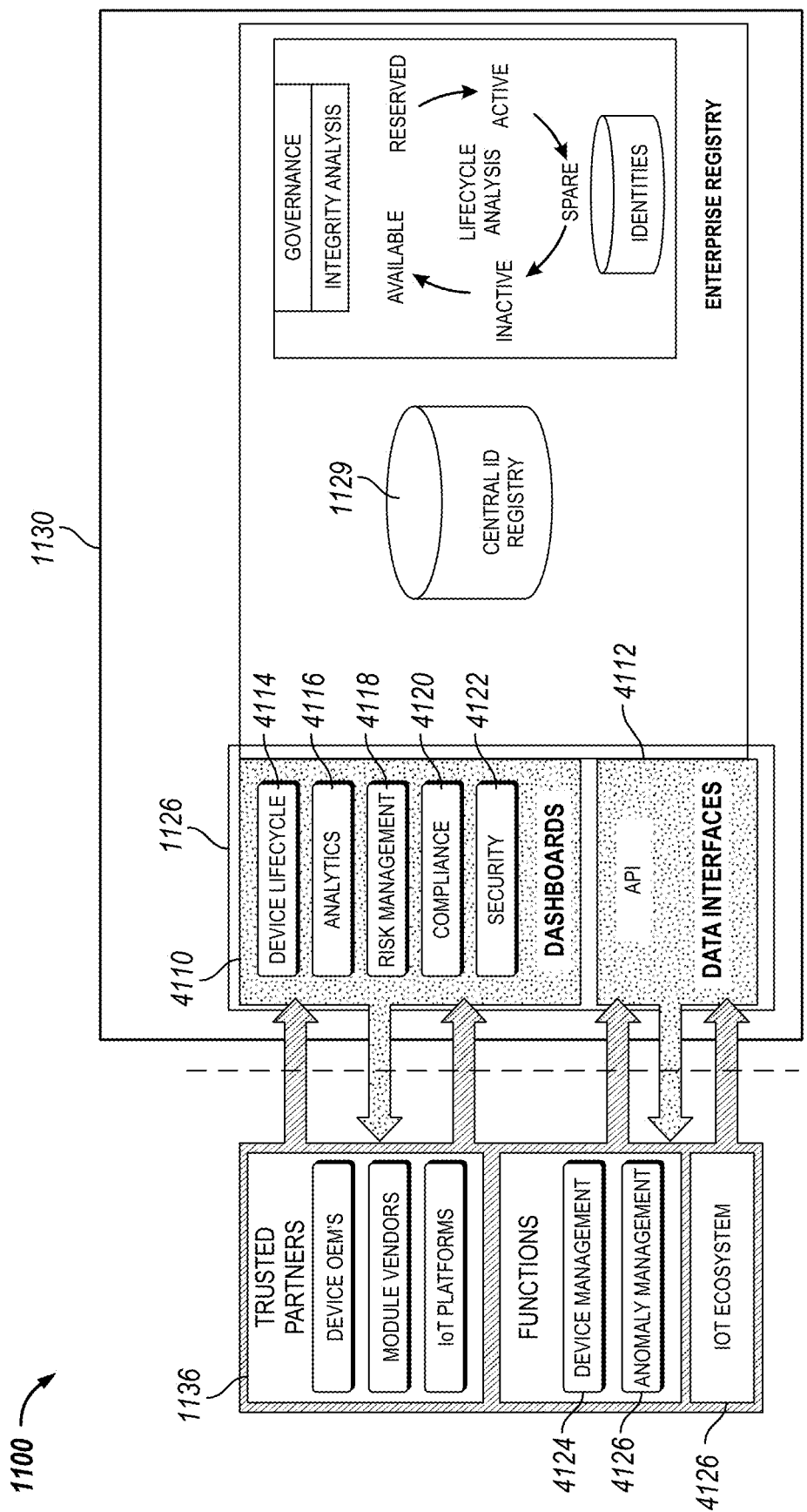
FIG. 4 is a block diagram of another embodiment of a system for managing one or more devices, in accordance with the current disclosure.

FIG. 4 depicts another embodiment of the system 1100 having one or more interfaces 4110 and/or 4112 tailored to particular functions that may support one or more of the components shown in FIG. 2. In embodiments, the one or more interfaces 4110 and/or 4112 may be SPGs. The one or more interfaces 4110 may include dashboards/graphical user interfaces 4110. The dashboards 4110 may provide for a user to manage a network connected device lifecycle 4114, perform analytical analysis 4116, manage risks 4118, check and/or ensure compliance 4120 with government and/or industry regulations and/or standards, and manage security 4122. The one or more interfaces may also include application programming interfaces (APIs) 4112. The APIs 4112 may provide for device management 4124 and/or anomaly management 4126, as described herein.

Figure 5:
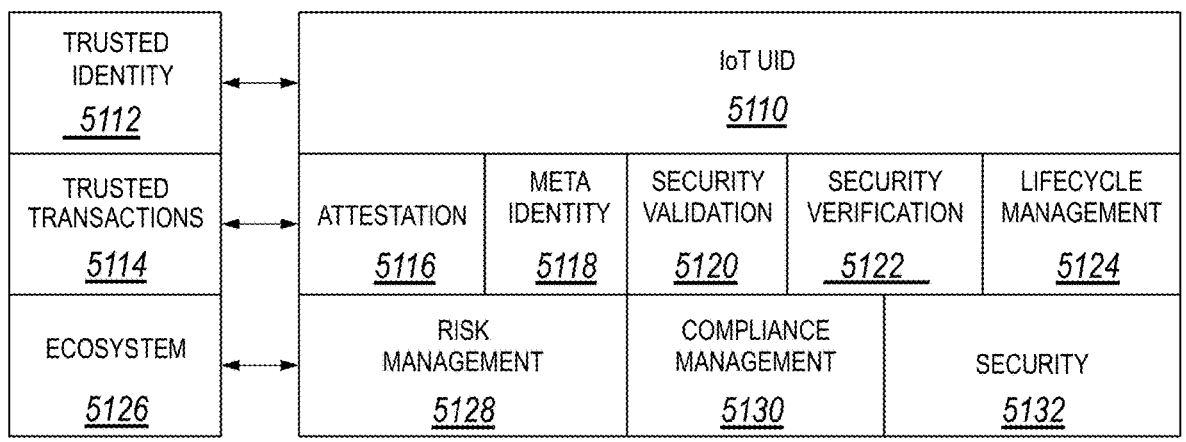
FIG. 5 is a block diagram of an Internet of Things Universal Identifier, in accordance with an embodiment of the current disclosure.

Accordingly, and referring to FIG. 5, IoT UIDs 5110 (also shown as 6118 in FIG. 6), and the supporting registry 1129, as described herein, may provide for a trusted identity 5112 that facilitates trusted interactions 5114, such as attestations 5116, meta identity 5118 engagements, security validations 5120, security verifications 5122, and lifecycle management 5124 for IoT devices. IoT UIDs 5110, and the supporting registry 1129, may also provide for the detection and handling of events arising from ecosystems 5126 that may relate to risk management 5128, compliance management 5130, and/or security 5132.

Referring again to FIG. 1, embodiments of the current disclosure may provide for an Internet of Things (IoT) device registry 1129, which, in embodiments, may be a backend database 1128 that associates Internet of Things Universal Identifications (IoT UIDs) with device property data in records 1131. Embodiments of the device registry 1129 may also track and/or provide updates and/or alerts with respect to events relating to registered IoT devices. As explained in greater detail herein, the registry 1129 may provide for Seeds of Trust, e.g., the registrar 1130 is a trusted source that can be used to determine and/or verify data relating to an IoT device.

In certain aspects, a manufacturer and/or other entity may be permitted by the registry 1129 to advertise a network connected device as "trusted by [the registry's name]". In certain aspects, the registry 1129 may enable an end consumer to receive continued support and/or tracking capabilities of a network connected device in the event the manufacturer (OEM) goes out of business and/or otherwise ceases support of the network connected device. In certain aspects, the registry 1129 provides manufacturers (e.g., an OEM, module manufacturer, chipset vendor, IoT edge gateway vendor) of network connected devices with the ability to improve consumer trust in their products, which, in turn, may preserve and/or improve the manufacturer's reputation. In certain aspects, the registry 1129 may provide enterprises, e.g., end users of network connected devices, with improved trust in supply chains and/or other industrial and/or commercial processes. Embodiments of the disclosure may also provide internet service providers (ISPs), mobile network operators (MNOs), and mobile virtual network operators (MVNOs) with improved confidence that network connected devices operating on their networks are hardened against network attack and/or exploitation. Embodiments of the current disclosure may also provide consumers with improved confidence in purchasing a network connected device due to the fact that the network connected device can be vetted though the registry. Embodiments of the current disclosure may also enable enterprises to scale their IoT deployments with the knowledge that they will have tools to manage and/or mitigate risks, for example, to include those associated with non-conformance with government and/or industry regulations. Certain aspects of the current disclosure also provide for entities that interact with network connected devices to be agnostic with respect to the type of network connected devices and/or networks on which such devices operate. Embodiments of the current disclosure may provide for centralized identity management in combination with robust device management, and/or for a highly scalable network connected device management system based on an API-centric framework that is suited for exponential growth and deployment of IoT devices. Certain aspects of the registry, as disclosed herein, may also provide for advanced tracking and auditing of network connected devices and/or assets which they monitor.

Figure 6:
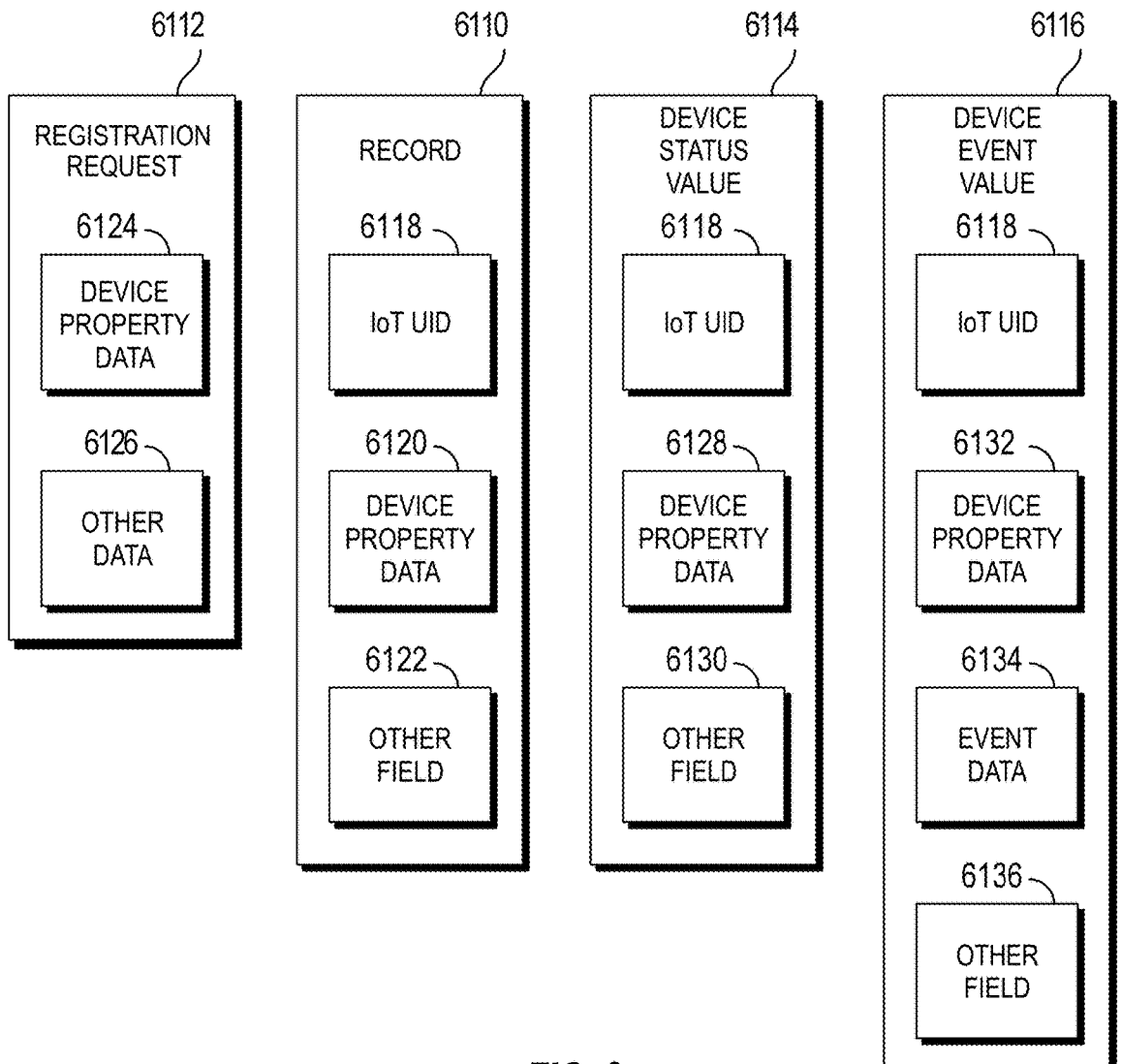
FIG. 6 is a block diagram of data types for providing and Internet of Things (IoT) device registry, in accordance with an embodiment of the current disclosure.

Illustrated in FIG. 6 are non-limiting examples of a record 6110, a registration request 6112, a device status value 6114. and a device event message 6116. Records 6110 may be stored in the registry 1129 (FIG. 1), and may include a device IoT UID 6118, device property data 6120, and/or other fields 6122. In embodiments, one or more of the record 6110, the registration request 6112, the device status value 6114. and/or the device event message 6116 may correspond to one or more of the communication data 1140, 1142, 1144, 1146, 1148, and/or 1150 (FIG. 1).

Figure 7:
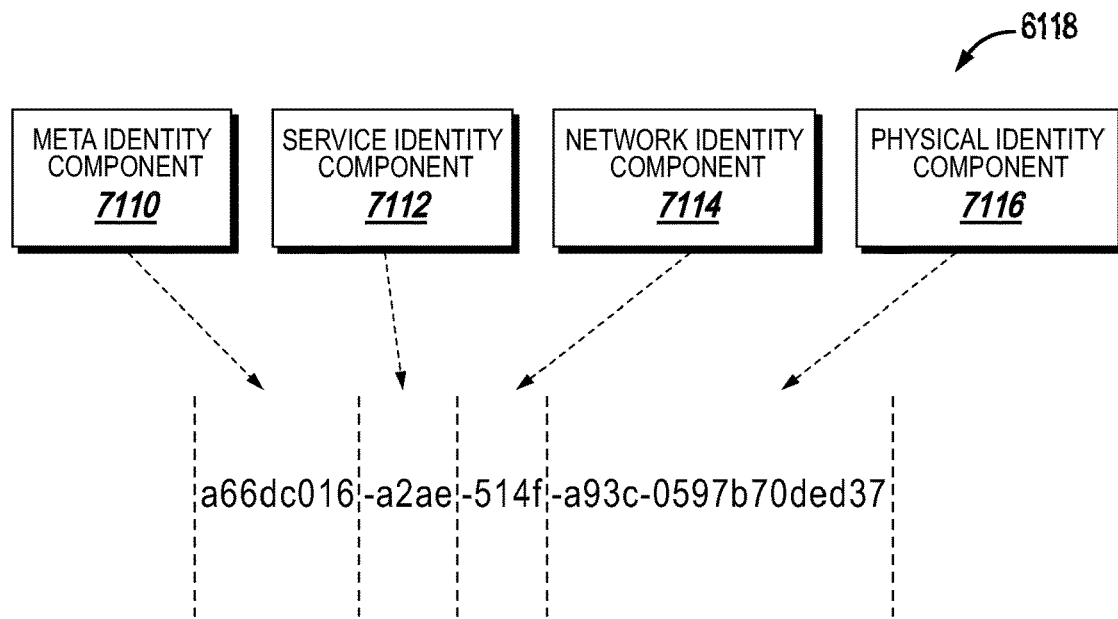
FIG. 7 is a diagram depicting an IoT Universal Identifier (IoT UID), in accordance with an embodiment of the current disclosure.

Referring to FIG. 7, a connected device may have multiple device identification values, e.g., a MAC address, a user-friendly name, e.g., "bathroom scale", and a serial number. For example, an IoT UID may incorporate and/or represents one or more nested identifications (IDs), such as service, meta, network etc., as disclosed herein. Accordingly, an IoT UID 6118 may be associated with one or more components, e.g., a meta identity component 7110, a service identity component 7112, a network identity component 7114, a physical identity component 7116, and/or other types of components, e.g., data types that identify network connected device. While FIG. 7 depicts an IoT UID 6118 as being split, it is to be understood that embodiments of the IoT UID may not be split. In embodiments, the components incorporated into an IoT UID and/or used to generate the IoT UID may not be sequential within an IoT UID. The meta identity component 7110 may correspond to smart devices, such as smart thermostats, lock systems, lighting systems, etc. The meta identity component 7110 may also correspond to identifications for individuals, entities, and/or business processes. Non-limiting examples of meta identities 7110 include identifications used by consumers e.g., people, and/or business processes and/or facilities. For example, a meta identity 7110 may associate a smart thermostat, a lock system, lighting, etc., with one or more processes, such as a distribution center, manufacturing line and/or other components of a supply chain, as well as provide for tracking and management of network connected devices in residential environments, e.g., homes. The service identity component 7112 may correspond to an international mobile subscriber identity (IMSI), integrated circuit card ID (ICCID), and/or other types of service identifiers. The service identity component 7112 may also correspond to identifications for different service profiles. Non-limiting examples of service identities 7112 include international mobile subscriber identities (IMSI), integrated circuit card identifiers (ICCID), and types of data used to identify and/or differentiate service profiles. The network identity component 7114 may correspond to a media access control (MAC) address, an international mobile equipment identity (IMEI), a Bluetooth ID, and/or another type of network-based identifier. Non-limiting examples of network identities 7114 include media access control (MAC) addresses, international mobile equipment identities (IMEI), Bluetooth IDs, and types of data typically presented to a network to identify a device. The physical identity component 7116 may correspond to a serial number, a vehicle identification number (VIN), and/or other types of physical object identifiers, which may be generated at the time of manufacture of the physical object marked by the physical identifier. Non-limiting examples of physical identities 7116 include serial numbers, vehicle identification numbers (VIN), and types of data created at the time of manufacture of the device that can be used to identify the device. While FIG. 7 depicts an IoT UID 6118 of "a66dc016-a2ae-514f-a93c-0597b70ded37" it is to be understood that IoT UIDs 6118 may take other forms. For example, in embodiments, an IoT UID 6118 may have a meta identity component 7110 of "Batch358789", a service identity component 7112 of "313460000345001", a network identity component 7114 of "351615080091234", and/or a physical identity component 7116 of "4CE0460D0G". In embodiments, the meta identity component 7110, service identity component 7112, network identity component 7114, physical identity component 7116, and/or other components may be used as inputs to a process that generates a new value. In embodiments, the process may be a hashing algorithm designed to generate unique and/or near unique values based on the meta identity component 7110, service identity component 7112, network identity component 7114, physical identity component 7116, and/or other components. In embodiments, the process may be reversible, e.g., the meta identity component 7110, service identity component 7112, network identity component 7114, physical identity component 7116, and/or other components may be (or easily/practically) derivable from the value generated by the process. In embodiments, the process may not be (or not easily/practically) reversable, e.g., the meta identity component 7110, service identity component 7112, network identity component 7114, physical identity component 7116, and/or other components may not be (or not easily/practically) derivable from the value generated by the process.

IoT UIDs may be embedded, e.g., a copy of the IoT UID is stored in a memory device of the corresponding device, or virtual, e.g., a copy of the IoT UID is not stored in a memory device of the corresponding device. A record 1152 corresponding to an embedded IoT UID may be referred to herein as an "embedded record" and/or "an embedded registration". A record 1152 corresponding to a virtual IoT UID may be referred to herein as a "virtual record" and/or "a virtual registration". In embodiments, the property data of a device, e.g., 1112, may form and/or contain a unique signature for the device 1112. As such, associating the device data, corresponding to a device, to an IoT UID in a record of the IoT device registry 1129 provides for the ability to either use the IoT UID to identify the device property data or use the device property data to identify the IoT UID. In embodiments, the relationship between unique device property data signatures and IoT UIDs may be one-to-one.

Turning back to FIG. 6, as disclosed herein, device property data 6120 stored within a record 6110 may form a unique signature for a particular device, e.g., 1118 (FIG. 1). As such, in embodiments, the device property data 6120 within a record 6110 may be distinguishable from the device property data 6120 in other records within the registry 1129 (FIG. 1). In other words, the device property data 6120 in a record 6110 may constitute a unique signature for the corresponding device that can be mapped, via the record 6110, to an IoT UID 6118. Non-limiting examples of device property data 6120 include: meta IDs, e.g., a meta identity hash; serial numbers; module IDs; module descriptions; manufacturer related data (name, address, phone number, identifier, etc.); manufacture date; batch number; status; firmware version; supported frequency bands; network capabilities (LTE, LTE-A, 5G NR NSA, 5G NR SA, etc.); supported communications protocols; last update (old status, new status, date/time stamp, requesting party, reason code); update history; TAC*IMEI; chipset type; chipset manufacturer; central processing unit (CPU); country/regions supported; Universal Integrated Circuit Card (UICC)/embedded Universal Integrated Circuit Card (eUICC) data, e.g., Integrated Circuit Card ID (ICCID), Embedded Identity Document (EID), International Mobile Subscriber Identity (IMSI), Mobile Station Integrated Services Digital Network (MISISDN) data, IoT Safe Credentials, etc.; device type/category/class; device label; location data, e.g., address, city, zip code, county, country, including historical location data, e.g., a record of past and/or current locations of the device; jurisdictional data; encryption keys, e.g., Trusted Platform Management (TPM) keys, public key infrastructure (PKI) keys, etc.; media access control (MAC) address, Internet Protocol (IP) address; cloud hosting company; current and/or past owner information, e.g., name, address, email, phone number, etc., which may be in the form of an owner identifier value; device specific metrics, e.g., temperature, location, accelerometer and gyration monitoring data, storage condition data, etc.; and/or other types of data corresponding to a measurable, quantifiable, and/or identifiable property of a device. In embodiments, device property data may include sensor data, e.g., temperature, pressure, conductivity, amperage, voltage, etc.

Other fields 6122 stored within a record 6110 may include: various types of metadata associated with a record, e.g., the generation data of the record, a last modified date of the record, access control data concerning the record; pointers to other records in the registry 1129 (FIG. 1) and/or other external data sources, e.g., a point to a set or events associated with the device corresponding to the IoT UID 6118 of the record 6110. In embodiments, the other field 6122 may be a list of one or more events associated with the device corresponding to the IoT UID 6118 of the record 6110. Non-limiting examples of events associated with a device include: lifecycle events, e.g., manufacturing events, such as generation/completion of manufacture, incorporation into another device, repairs, etc.; activation events, such as initial device activation, initial network access, initial assignment to an entity and/or user; retirement/deactivation events, such a removal from another device, deactivation, etc.; security events, such as date of discovery of the device being compromised and/or being accessed without authorization; outage events, such as experiencing a network outage, power outage, etc.; ownership events, such as claiming of the device by a new owner, transfer of ownership, licensing of the device, etc.; device property events, such as low battery detected, powered on, powered off, connected to network, disconnected from network, etc.; and/or other types of events that can occur to a device. Additional non-limiting examples of events include: module/device registration, e.g., original registration of a module/device; module/device shipment, e.g., registration of a departure of a module/device from manufacturing; module/device integration into another device, e.g., manufacture date of the module into a larger device and/or addition of device attributes/properties; module/device activation, e.g., initial activation of device and its associated module(s); device/module communication activation, e.g., addition of communication attributes to a module to assign it to a network/location, which may facilitate binding of network and device/module identifiers; credential activation, e.g., provision of cloud and/or secondary credentials (such as PKI certificates, private/public keys, etc.); firmware availability notification, e.g., notification of firmware availability; firmware update, e.g., confirmation of a firmware update; locality/network transition, e.g., confirmation of a module's/device's locality; chain of custody and/or jurisdictional transition, e.g., confirmation of updates to a module's/device's jurisdiction and/or chain of custody; device/module suspension and/or quarantine, e.g., suspension of a module/device from operating and/or having network connectivity; and/or power state/battery notifications, e.g., a notification of a critical battery event associated quarantine, and/or other notifications.

A registration request 6112, as disclosed herein, may include device property data 6124 for one or more devices intended to be registered via the registry 1129 (FIG. 1), and/or other data 6126. In embodiments, the device property data 6124 may be the same as the device property data 6120 that gets stored in a record 6110, e.g., where the registration request 6112 is for a single device. In embodiments, the device property data 6124 may be a larger set of data as compared to the device property data 6120 that gets stored in a record 6110, e.g., where the registration request 6112 is for multiple devices and the device property data 6124 is a cumulative set of the properties for the devices to be registered. In embodiments, the device property data 6124 may be a smaller set of data as compared to the device property data 6120 that gets stored in a record 6110, e.g., where not all of the data in the device property data 6124 is stored in records 6110 in the registry 1129. The other data 6126 may include an indication of how many devices the registration request 6112 is for and/or what portions of the device property data 6124 correspond to which device which is to be registered. In embodiments, the other data 6126 may indicate who the requesting entity is, and may include security credentials demonstrating that the requesting entity is authorized to register the devices, and/or other data applicable for registering one or more devices with the registry 1129.

A device status value 6114, as disclosed herein, may include data retrieved via querying the registry 1129 (FIG. 1) and/or data sent to the registry 1129 to update a record 6110. For example, in embodiments, a device status value 6114 may include device property data 6128, an IoT UID 6118, and/or other data 6130. In embodiments, the device property data 6128 may be the same as the device property data 6120 in a record 6110, e.g., where an entire record is transmitted. In embodiments, the device property data 6128 may be less than the device property data 6120 in a record 6110, e.g., where only portions of the device property data 6120 in a record are transmitted and/or where portions of the device property data 6120 in a record are redated due to lack of credentialed access by an entity querying the registry 1129. Other data 6130 in a device status value 6114 may include events and/or event messages 6116, metadata regarding the device status value 6114, e.g., the entity to whom the device status value 6114 is being transmitted to, and/or other data 6130 relevant to the device status value 6114, record 6110, and/or the device corresponding to the IoT UID 6118.

Device event messages 6116 may be generated in response to querying the registry 1129 and/or transmitted to the registry 1129 for association with an IoT UID 6118, as disclosed herein. Device event messages 6116 may include an IoT UID 6118, device property data 6132, event data 6134, and/or other data 6136. In embodiments, device property data 6132 may include device property data, as disclosed herein, regarding affected properties of a device resulting from undergoing/experiencing an event and/or data relating to the event. Event data 6134 may include data relating to an event, but may not be associated to an IoT UID 6118 within the device event message 6116, e.g., a message indicating that a weather event is occurring in a particular geographic region. Other data 6136 may include metadata related to the event message 6116, e.g., a time of the message, to whom/what the message is being transmitted, etc.

As disclosed therein, a device, e.g., 1112, may include one or more modules, where each module may have its own IoT UID 6118 and/or record 6110 (if registered and/or pre-registered, e.g., where a device has a record but may need to be claimed, as disclosed herein). Accordingly, in embodiments, the device property data 6120 and/or other field/data 6122 of a record 6110 corresponding to a device, e.g., a cell phone, may include the IoT UIDs of other devices/modules, e.g., subscriber identity modules, memory chips, Wi-Fi network interface cards (NICs), etc., that are related to and/or form part of the device and which can be used to retrieve/identify records in the registry 1129 corresponding to such other devices/modules.

In embodiments, the registrar 1130 may provide for an application programming interface (API) and/or web interface that allows a user to register one or more devices and/or to view and/or enter device events. The user may be a manufacturer 1134, an end user 1136, and/or a third party 1138. Non-limiting examples of such interfaces/APIs are described and shown in other portions of this disclosure, e.g., FIG. 28.

In embodiments, events may be transmitted to the registry 1129 via a device manager, connection management platform (CMP), and/or a Remote Authentication Dial-In User Service (RADIUS) feed, e.g., an event stream, or otherwise. In embodiments, events may be retrieved from a Home Location Register (HLR) of a device. Non-limiting examples of events from a device management platform include device provisioning events, device operational events, firmware and/or software update events, battery status events, and/or the like. Non-limiting examples of events from a CMP include, international mobile subscriber identity related events, subscriber identify module (SIM) related events such as activated and/or suspended. Non-limiting examples of RADIUS feed events include network related events, e.g., attached and/or detached to and from a network, data consumption related events, billing events, e.g., indication of a bill being ready for processing. Non-limiting examples of Home Location Register (HLR) events include device on and reachable, device out of coverage, and/or other types of events related to and/or data stored in a device's HLR.

As disclosed herein, the registry 1129 may respond to queries regarding IoT UIDs, e.g., "is X the true owner of the device associated with IoT UID Y?" via transmitting device property data 6128 and/or a device status value 6114, which may include the device property data 6128, IoT UID 6118, and/or other data 6130, e.g., a listing of events. The registry 1129 may provide for restricted access based on permission levels, e.g., an original equipment manufacturer (OEM), may be able to see the patch status of its devices, but not the end users of said devices.

In embodiments, the registry 1129 may provide the provisioning of a record for an IoT UID prior to registration of a corresponding device. For example, a manufacturer 1134 may provide device property data for one or more devices to the registry 1129 that may not have been powered up for the first time. The registry 1129 may then generate IoT UIDs and/or records for the one or more devices, where each record may contain an "claimed" field, e.g., other data 6130, indicating that a corresponding device is unclaimed. When a corresponding device is subsequently powered on, it may contact the registry 1129 to finish the registration process, wherein the registry 1129 updates the "claimed" field to reflect that the corresponding device is active and has been registered.

Figure 8:
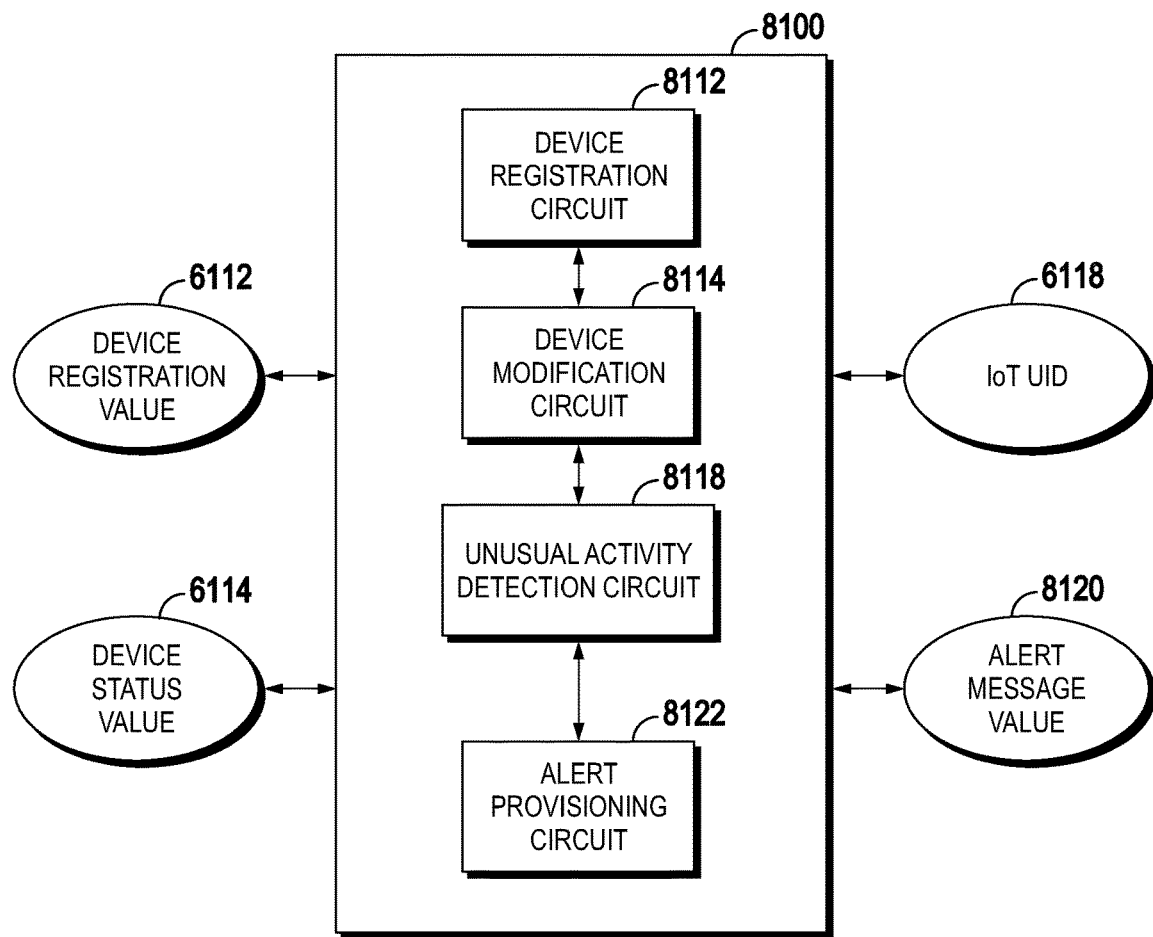
FIG. 8 is a schematic diagram of an apparatus for managing network connected devices, in accordance with an embodiment of the current disclosure.

FIG. 8 depicts a schematic diagram of an apparatus 8100 for managing network connected devices 1112, 1114, 1116, 1118, 1120, 1122, 1124 (FIG. 1), in accordance with an embodiment of the current disclosure. The apparatus 8100 may form part of the server 1126 (FIG. 1), e.g., the at least one processor, and/or any other electronic computing device described herein. The apparatus 8100 may include a device registration circuit 8112 and a device modification circuit 8114. The device registration circuit 8112 may be structured to interpret a device registration request/value 6112 (FIG. 6) that includes device property data 6124 (FIG. 6) having an owner identification value. The device property data 6124 may correspond to at least one of the network connected devices 1112, 1114, 1116, 1118, 1120, 1122, 1124 and the owner identification value may correspond to an owner 1134, 1136, and/or 1138 (FIG. 1) of the at least one network connected device 1112, 1114, 1116, 1118, 1120, 1122, 1124. The device registration circuit 8112 may be further structured to store, in a database 1128 (FIG. 1), the device property data 6120 in a record 6110 (FIG. 6) as corresponding to the owner identification value, and may assign/generate and store an IoT UID 6118 in the same record 6110. The device modification circuit 8114 may be structured to interpret a device status value 6114 (FIG. 6) that includes the IoT UID 6118 and device property data 6128. The device property data 6128 may correspond to an attribute of the at least one network connected device 1112, 1114, 1116, 1118, 1120, 1122, 1124. The device modification circuit 8114 may be further structured to identify, based at least in part on the IoT UID 6118, the record 6110 and, in response, modify a field, e.g., 6120 and/or 6122 of the record 6110, based at least in part on the device property data 6128.

In embodiments, the apparatus 8100 may further include an unusual activity detection circuit 8118 structured to detect unusual activity corresponding to ownership and/or use of a network connected device 1112, 1114, 1116, 1118, 1120, 1122, 1124. The unusual activity detection circuit 8118 may detect the unusual activity by analyzing one or more of the plurality of records 1131 (FIG. 1). In response to detecting unusual activity, the unusual activity detection circuit 8118 may generate an alert message value 8120. The apparatus 8100 may further include an alert provisioning circuit 8122 structured to transmit the alert message value 8120.

Figure 9:
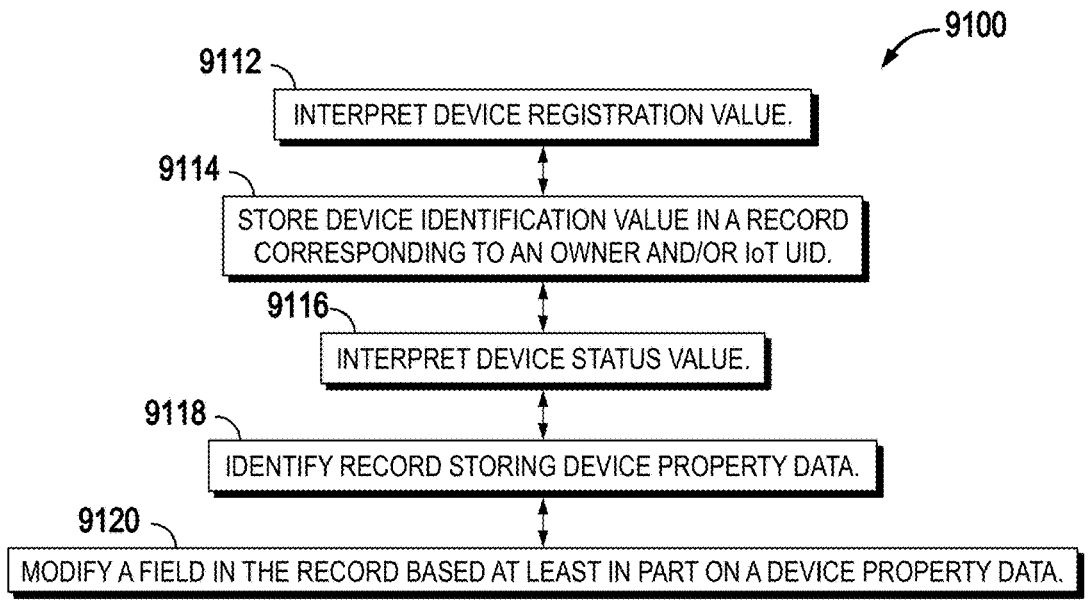
FIG. 9 is a flowchart depicting a method for managing network connected devices, in accordance with an embodiment of the current disclosure.

Illustrated in FIG. 9 is a method 9100 for managing network connected devices 1112, 1114, 1116, 1118, 1120, 1122, 1124 (FIG. 1), in accordance with an embodiment of the current disclosure. The method 9100 may be performed by the apparatus 8100 and/or any other computing device described herein. The method 9100 may include interpreting a device registration value 9112. The device registration value may include a device property data having an owner identification value. The device property data may correspond to at least one of the network connected devices and the owner identification value may correspond to an owner of the at least one network connected device. The method 9100 may further include storing, in a database, the device property data in a record corresponding to the owner identification value 9114 and/or an assigned/generated IoT UID. The method 9100 may further include interpreting a device status value that includes the IoT UID and a device property data 9116. The device property data may correspond to an attribute of the at least one network connected device. The method 9100 may further include identifying the record storing the device property data 9118 using the IoT UID. The method 9100 may further include modifying a field of the record based at least in part on the device property data 9120.

Figure 10:
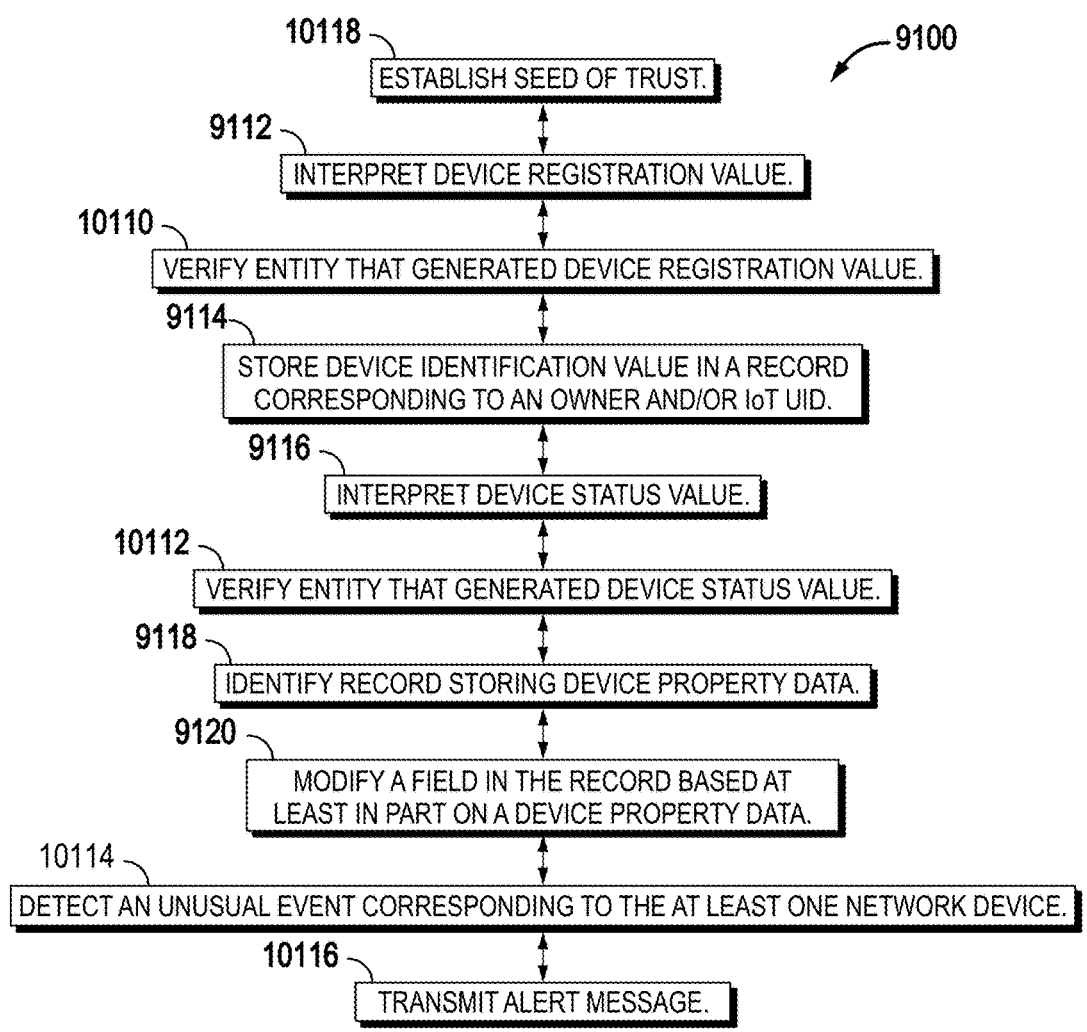
FIG. 10 is another flowchart depicting a method for managing network connected devices, in accordance with an embodiment of the current disclosure.

As shown in FIG. 10, the method 9100 may further include verifying that at least one of the device registration value or the device status value was generated by an authorized entity 10110 and 10112. In embodiments, the method 9100 may further include detecting, based at least in part on at least one of the device registration value or the device status value, an unusual event corresponding to the at least one network connected device 10114. The method 9100 may further include transmitting an alert message corresponding to the unusual event 10116. The method 9100 may further include establishing a Seed of Trust between a registry and an entity that generated at least one of the device registration value or the device status value 10118. In Seed of Trust may be embodied in the IoT UID, e.g., the IoT UID may represent a collection of known information (device property data) about a device from its time of manufacturer (a Greenfield device) or capture (a Brownfield device) through the device's end of life. As disclosed herein, a device's IoT UID may be used to authenticate and/or verify the device during its lifecycle, which may include random attribute challenges in an authentication process, including multi-factor authentication. As such, an IoT UID may become a trusted identifier that acts as a core kernel of trust.

Figure 11:
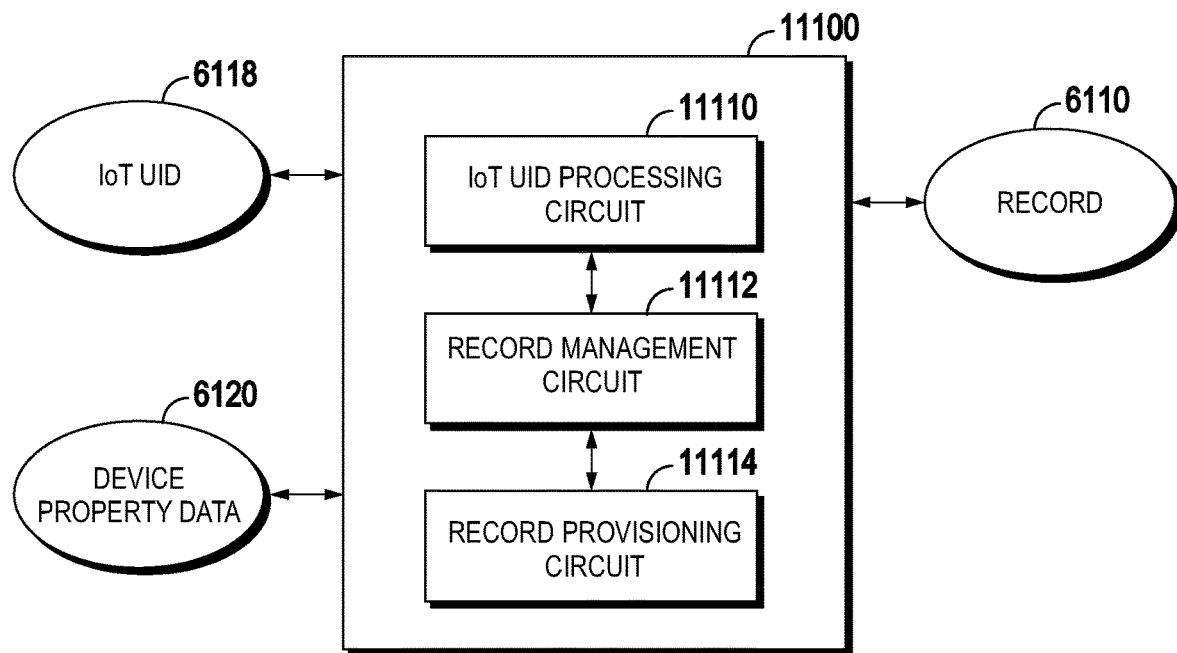
FIG. 11 is schematic diagram of an apparatus for registering devices, in accordance with an embodiment of the current disclosure.
Figure 12:
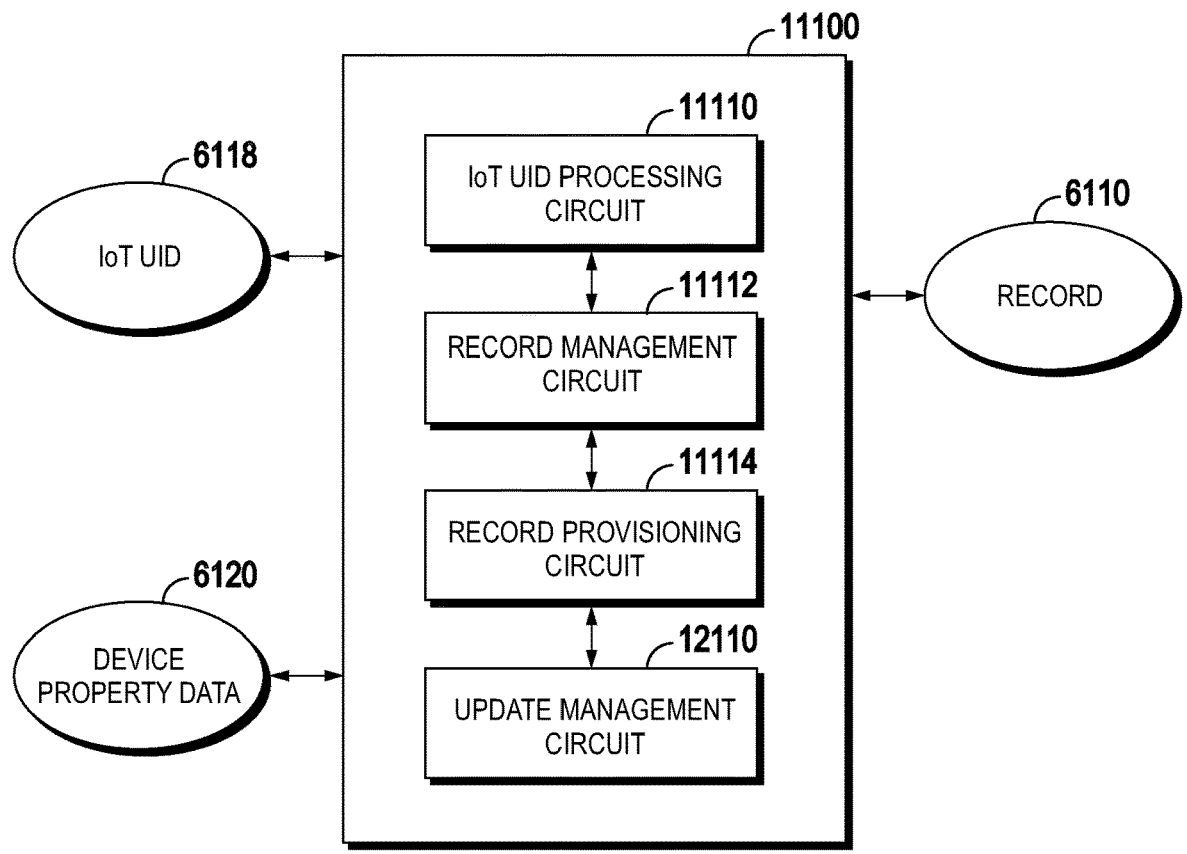
FIG. 12 is another schematic diagram of an apparatus for registering devices, in accordance with an embodiment of the current disclosure.

Referring now to FIG. 11, an apparatus 11100 for registering devices, in accordance with an embodiment of the current disclosure, may include an IoT UID processing circuit 11110, a record management circuit 11112, and/or a record provisioning circuit 11114. In embodiments, the apparatus 11100 may form part of the IoT device registrar server 1126, the database 1128, another component of the registrar 1130, and/or any other computing device described herein. The IoT UID processing circuit 11110 may be structured to interpret an IoT UID 6118 (FIG. 6) and device property data 6120 (FIG. 6). The record management circuit 11112 may be structured to associate the IoT UID 6118 with the device property data 6120 via a record 6110 (FIG. 6). The record provisioning circuit 11114 may be structured to transmit the record 6110. As shown in FIG. 12, in embodiments, the apparatus 11100 may further include an update management circuit 12110 structured to poll an external data source to identify changes to a device corresponding to the device property data 6120 and/or the IoT UID 6118, and update the record 6110 to reflect the changes.

Figure 13:
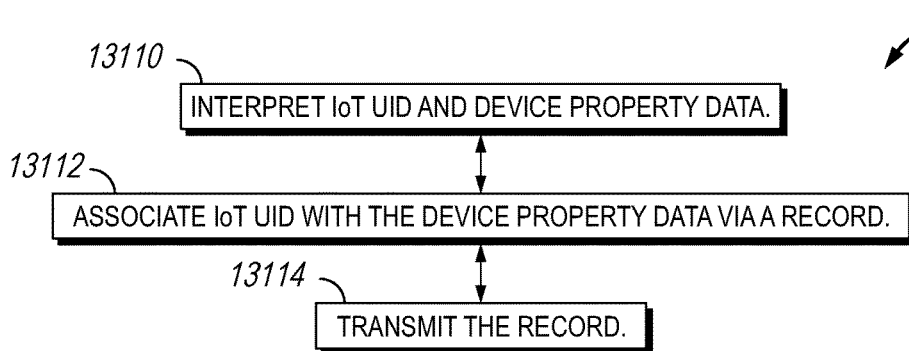
FIG. 13 is a flowchart depicting a method for registering devices, in accordance with an embodiment of the current disclosure.

Illustrated in FIG. 13 is a method 13100 for registering devices, in accordance with the current disclosure. The method 13100 may be performed by the apparatus 11100 and/or any other computing device described herein. The method 13100 may include interpreting an IoT UID and device property data 13110, and associating the IoT UID with the device property data via a record 13112. The method 13100 may further include transmitting the record 13114.

Figure 14:
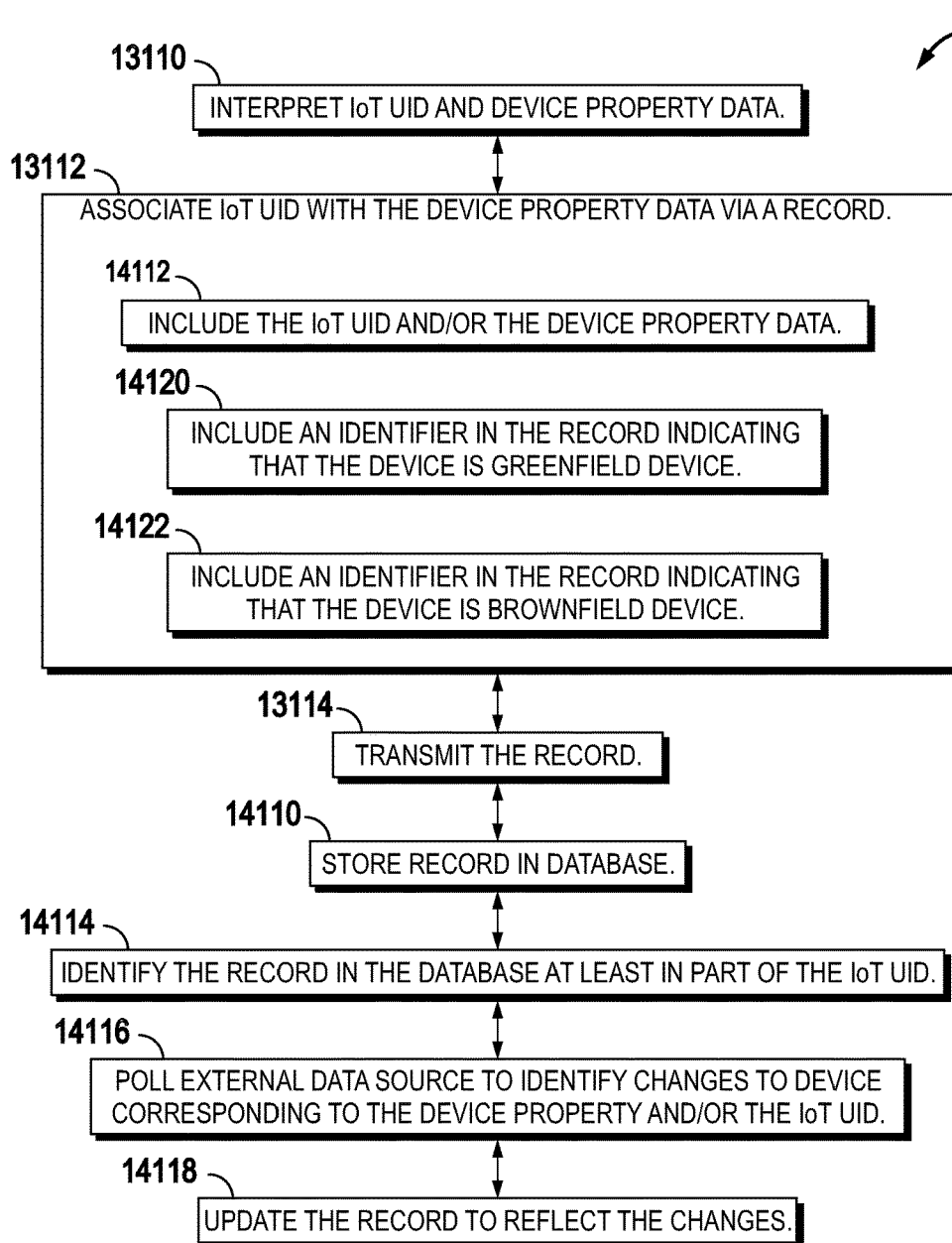
FIG. 14 is another flowchart depicting a method for registering devices, in accordance with an embodiment of the current disclosure.

Turning to FIG. 14, the method 13100 may further include storing the record in a database 14110. In embodiments, associating the IoT UID with the device property data via a record 13122 may comprise including the IoT UID and/or the device property data in the record. The method 13100 may further include identifying the record in the database based at least in part on the IoT UID. The method 13100 may further include polling an external data source to identify changes to a device corresponding to the device property data and/or the IoT UID 14116, and/or updating the record to reflect the changes. In embodiments, the device property data may indicate that a corresponding device is a Greenfield device. In such embodiments, associating the IoT UID with the device property data via the record 13112 may include including an identifier in the record that indicates the device is a Greenfield device 14120. In embodiments, the device property data may indicate that a corresponding device is a Brownfield device. In such embodiments, associating the IoT UID with the device property data via the record 13112 may include including an identifier in the record that indicates the device is a Brownfield device 14122.

Figure 15:
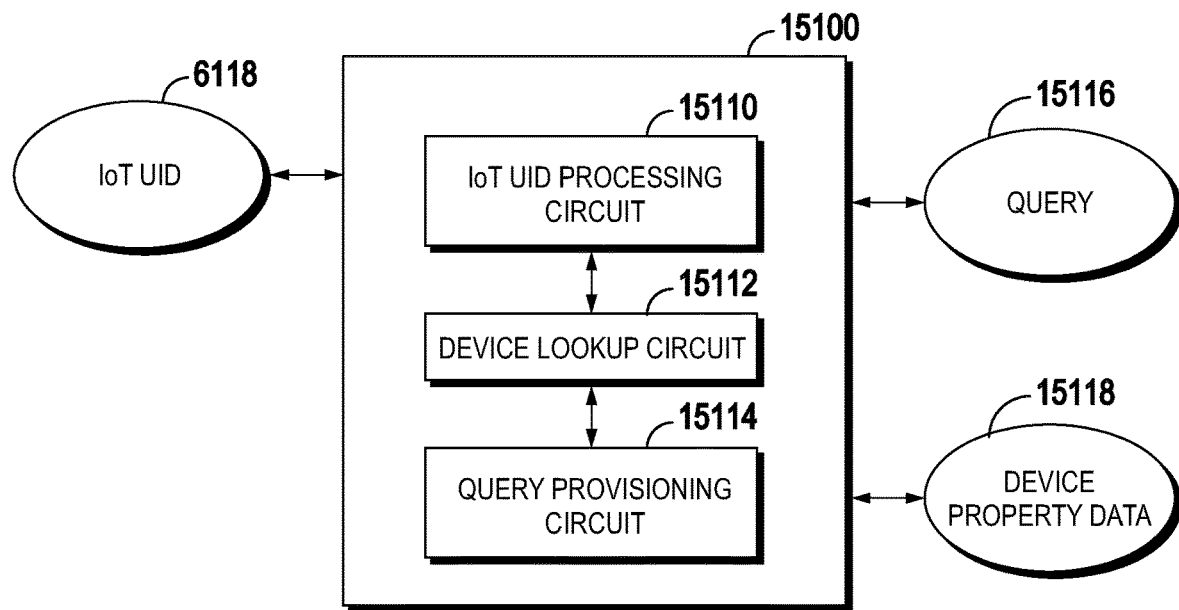
FIG. 15 is another schematic diagram of an apparatus for registering devices, in accordance with an embodiment of the current disclosure.
Figure 16:
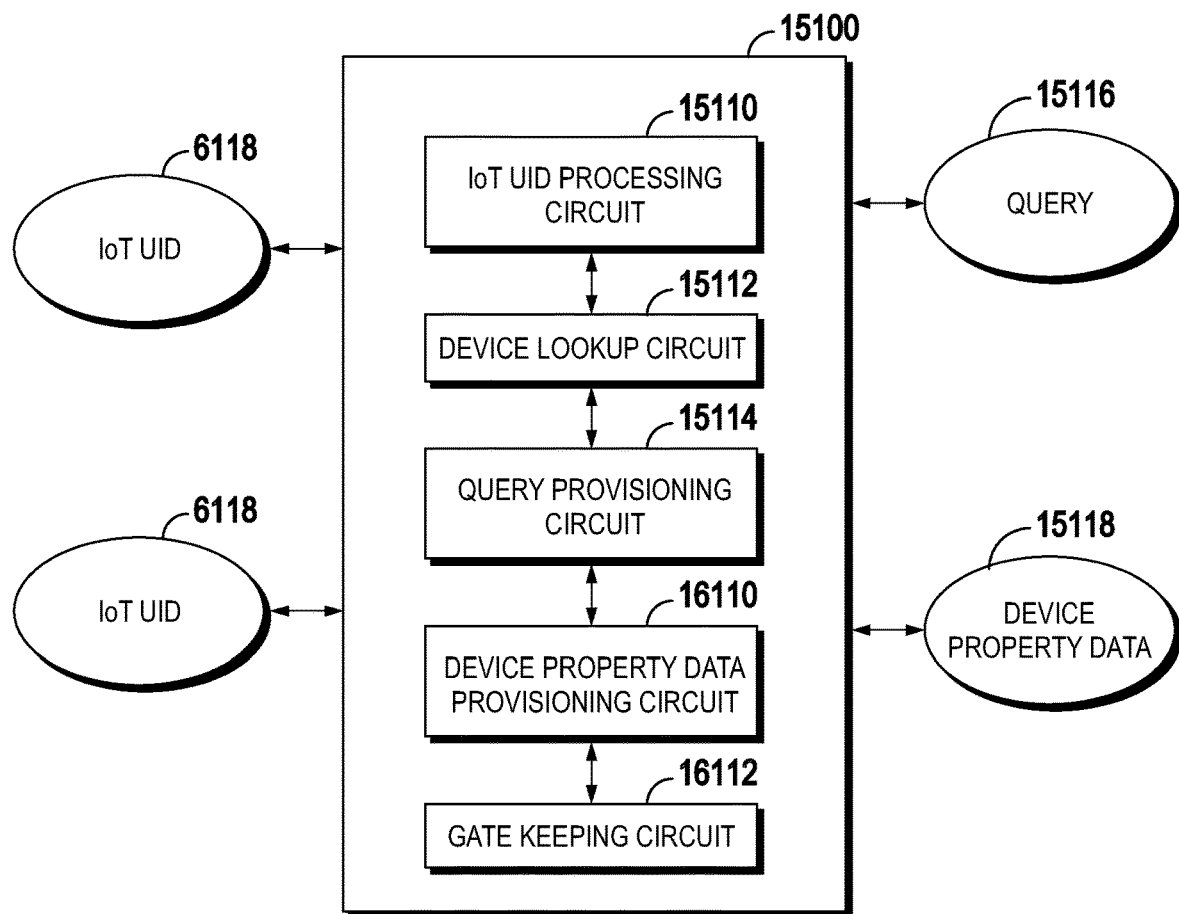
FIG. 16 is another schematic diagram of an apparatus for registering devices, in accordance with an embodiment of the current disclosure.

Referring now to FIG. 15, an apparatus 15100 for registering a device, in accordance with an embodiment of the current disclosure, may include an IoT UID processing circuit 15110, a device lookup circuit 15112, and a query provisioning circuit 15114. The IoT UID processing circuit 15110 may be structured to interpret an IoT UID 6118. The device lookup circuit 15112 may be structured to generate a query 15116 that includes the IoT UID 6118. The query 15116 may be structured to retrieve device property data 15118. The query provisioning circuit 15114 may be structured to transmit the query 15116, for example, to an IoT device registrar 1130 (FIG. 1). As shown in FIG. 16, in embodiments, the apparatus 15100 may further include a device property data provisioning circuit 16110 structured to interpret the device property data 15118 retrieved by the query 15116. The apparatus 15100 may further include a gatekeeping circuit 16112 structured to grant and/or deny the device associated with the IoT UID 6118 access to another device, e.g., a third-party resource 1138 (FIG. 1) based at least in part on a trust indicator associated with the device associated with the IoT UID 6118.

Figure 17:
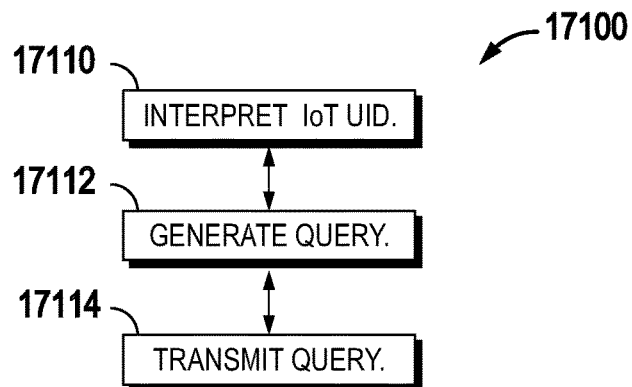
FIG. 17 is another flowchart depicting a method for registering devices, in accordance with an embodiment of the current disclosure.

Illustrated in FIG. 17 is a method 17100 for registering a device, in accordance with an embodiment of the current disclosure. The method 17100 may be performed by the apparatus 15100 (FIG. 15) and/or any computing device disclosed herein. The method 17112 includes interpreting an IoT UID 17112, generating a query that includes the IoT UID 17112. The query may be structured to retrieve device property data corresponding to the IoT UID. The method 17100 may further include transmitting the query 17114, for example, to an IoT device registrar 1130 (FIG. 1).

Figure 18:
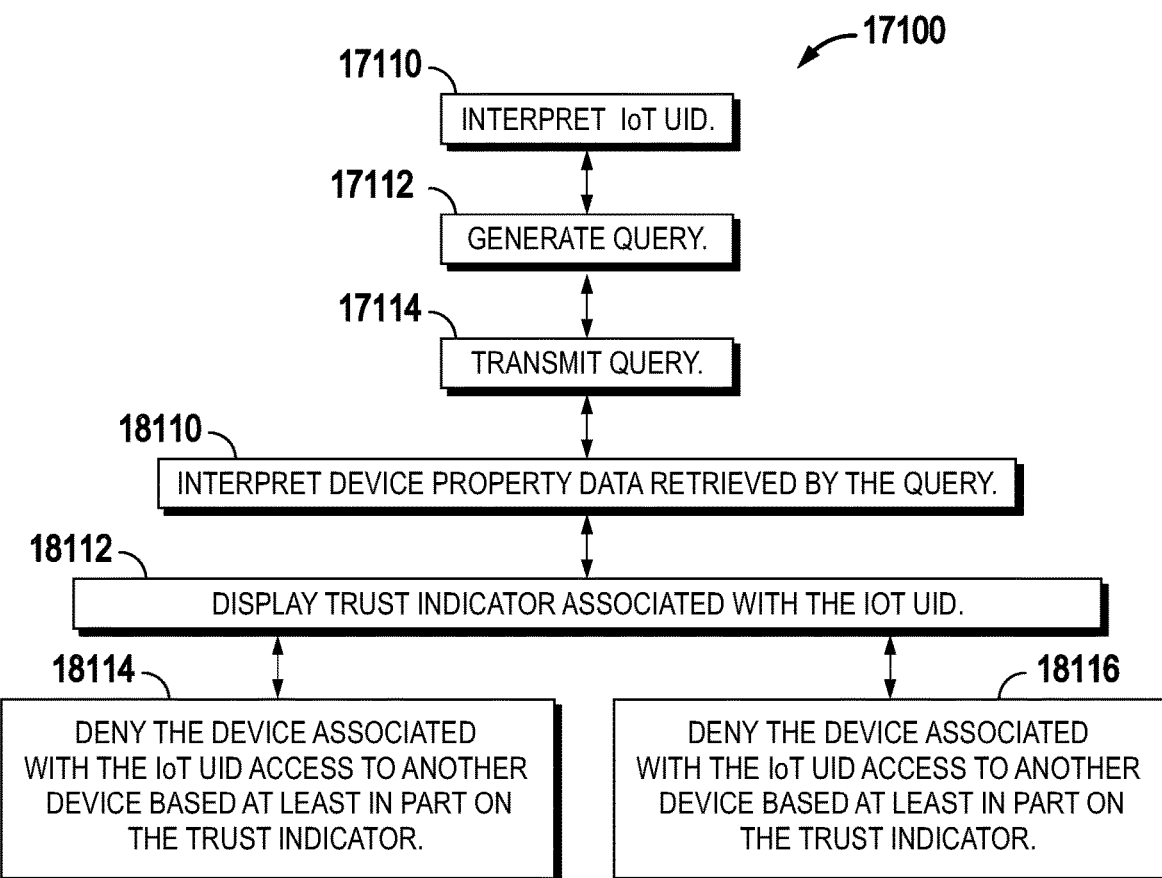
FIG. 18 is another flowchart depicting a method for registering devices, in accordance with an embodiment of the current disclosure.

As shown in FIG. 18, the method 17100 may further include interpreting the device property data retrieved by the query 18110. The method 17100 may further include displaying a trust indicator associated with the device associated with the IoT UID 18112. The method 17100 may further include denying the device associated with the IoT UID access to another device, based at least in part on the trust indicator 18114. The method 17100 may further include denying the device associated with the IoT UID access to another device, based at least in part on the trust indicator 18116.

Referring again to FIG. 1, embodiments of the current disclosure may provide for an interface for a user, i.e., a user interface, that provides a succinct view of information related to one or more registered devices, e.g., devices 1112, 1114, 1116, 1118, 1120, 1122, and 1124, or other information managed by the registrar 1130, e.g., in the registry 1129, for a user, e.g., an end user 1136, which may be a Single Pane of Glass (SPG). In certain aspects, any information managed by the IoT registry 1129 that a user wishes to access and has authority to access is displayed on one display or is all visible at the same time, which may be, for example, on a single display monitor or across a multiple-monitor display system. Embodiments may determine which information regarding a device (or devices) and/or IoT UID is likely to be the most relevant to a particular type of user during a particular use case. Non-limiting examples of user types include one or more end users 1136 e.g., enterprise, manufacturer 1134, e.g., an original equipment manufacturer (OEM) and/or factory employees, the IoT device registrar 1130, and/or a third party 1138. Non-limiting examples of use cases include determining the patch states of a fleet of devices, preparing a device for registration, medical device or medication tracking, and the like. The SPG may provide a graphical user interface (GUI) for the user to interact with, such as to input data, commands, and queries, as well as to display the IoT registry data. The GUI may provide access to any of the embodiments of the system 1100 (FIG. 2), for example, the lifecycle management component 2110, the analytics component 2112, the monitoring and security component 2114, and/or the registration and configuration component 2116.

Figure 19:
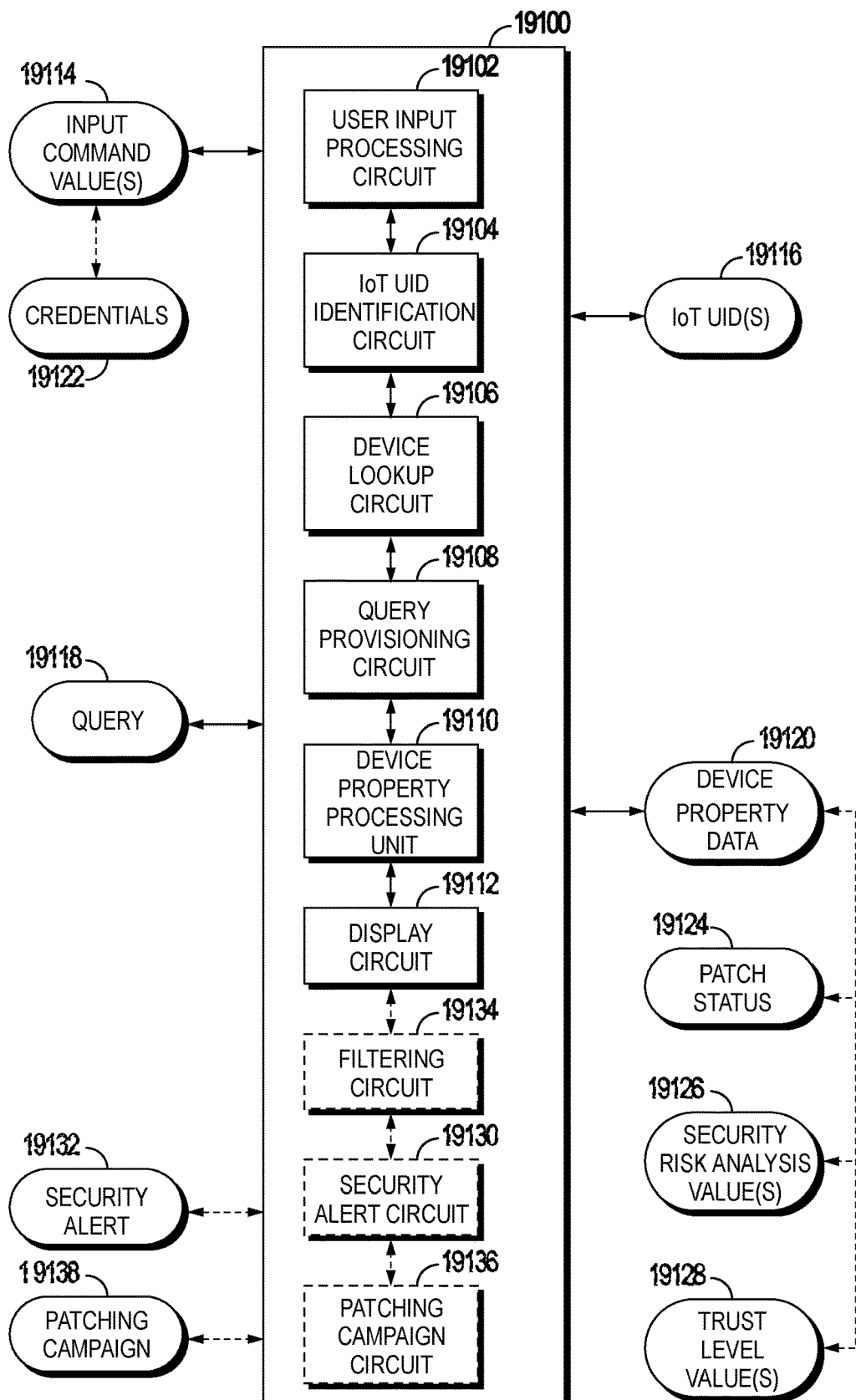
FIG. 19 is a schematic diagram of an apparatus for an Internet of Things (IoT) device registry display, in accordance with an embodiment of the current disclosure.

FIG. 19 depicts a schematic diagram of an example apparatus 19100 for displaying Internet of Things (IoT) device registry data, e.g., for network connected devices 1112, 1114, 1116, 1118, 1120, 1122, 1124 (FIG. 1), in accordance with an embodiment of the current disclosure. The apparatus 19100 may form part of the server 1126 (FIG. 1), e.g., the at least one processor, and/or any other electronic computing device described herein.

With reference to FIG. 19, the apparatus 19100 is for an Internet of Things (IoT) device registry display, e.g., an SPG. The apparatus 19100 may include a user input processing circuit 19102, an Internet of Things Universal Identification (IoT UID) identification circuit 19104, a device lookup circuit 19106, a query provisioning circuit 19108, a device property processing circuit 19110, and a display circuit 19112. The user input processing circuit 19102 may be structured to interpret one or more user input command values 19114. The IoT UID identification circuit 19104 may be structured to determine one or more IoT UIDs 19116, based at least in part on the one or more user input command values 19114. The device lookup circuit 19106 may be structured to generate a query 19118 that includes the one or more IoT UIDs 19116, and to retrieve device property data 19120 corresponding to the one or more IoT UIDs 19116. The query provisioning circuit 19108 may be structured to transmit the query 19118 to an IoT device registrar server, e.g., the server 1126 (FIG. 1). The device property processing circuit 19110 may be structured to interpret the device property data 19120 generated by the IoT device registrar server in response to the query 19118. The display circuit 19112 may be structured to display the device property data 19120 with the corresponding one or more IoT UIDs 19116 (also shown as 6118 in FIG. 6).

Certain further aspects of the example system are described as following, any one or more of which may be present in certain embodiments. In the apparatus 19100, the user input command values 19114 may include the one or more IoT UIDs 19116. In the apparatus 19100, the user input command values 19114 may include credentials 19122. Non-limiting examples of credentials 19122 include public key infrastructure (PKI) encryption keys, username and password, non-PKI encryption keys, and the like. In the apparatus 19100, the IoT UID identification circuit 19104 may be further structured to determine the one or more IoT UIDs 19116 based at least in part on the credentials 19122. The apparatus 19100 may further include a filtering circuit 19134 structured to filter data in the device property data 19120, based at least in part on the one or more user input command values 19114. In the apparatus 19100, the filtered data may relate to historical ownership of a device, e.g., any of devices 1112, 1114, 1116, 1118, 1120, 1122, 1124 (FIG. 1), corresponding to one of the IoT UIDs 19116. In the apparatus 19100, the device property data 19120 may include a patch status 19124 for a device of the corresponding IoT UID. In the apparatus 19100, the device property data 19120 may include a security risk analysis value 19126 for a device of the corresponding IoT UID. In the apparatus 19100, the device property data 19120 may include a trust level value 19128 for a device of the corresponding IoT UID. The apparatus 19100 may further include a security alert circuit 19130 structured to generate a security alert 19132, based at least in part on the security risk analysis value 19126 and/or the trust level value 19128. The apparatus 19100 may further include a patching campaign circuit 19136 structured to generate and track a patching campaign 19138 for devices corresponding to one or more IoT UIDs 19116.

Figure 20:
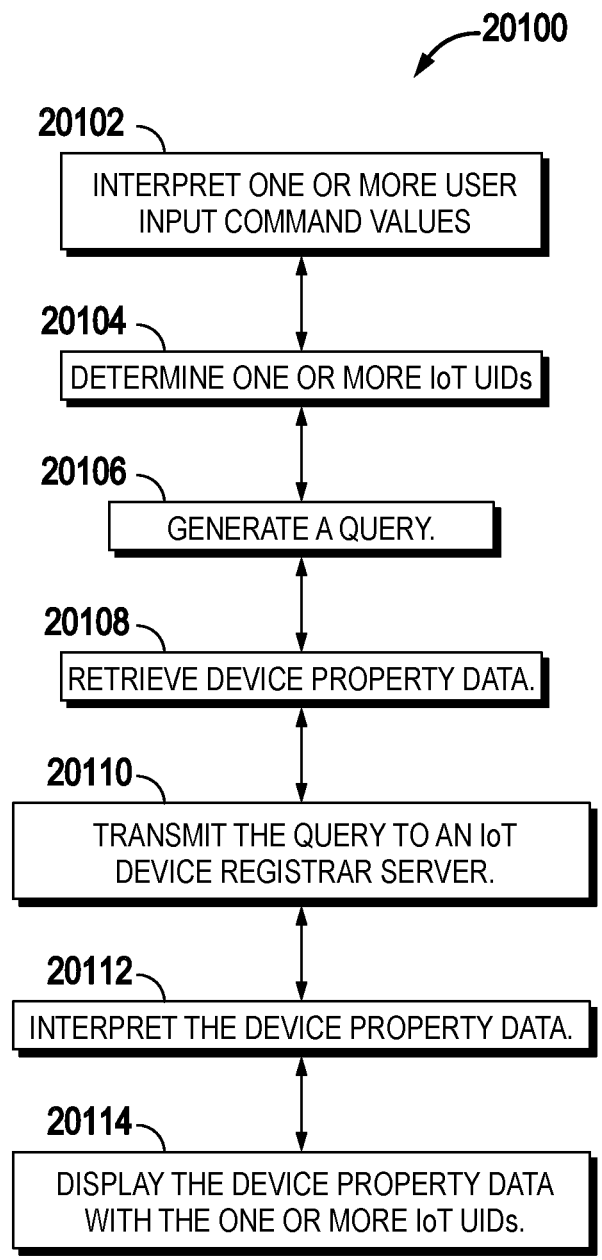
FIG. 20 is a flowchart depicting a method for an IoT device registry display, in accordance with an embodiment of the current disclosure.

FIG. 20 illustrates a flowchart of an example method 20100 for displaying IoT device registry data, e.g., for network connected devices 1112, 1114, 1116, 1118, 1120, 1122, 1124 (FIG. 1), in accordance with an embodiment of the current disclosure. The method 20100 may be performed by the apparatus 19100 and/or any other computing device described herein.

The method 20100 may include interpreting, via a user input processing circuit, one or more user input command values 20102. The method 20100 may further include determining, via an IoT UID identification circuit, one or more IoT UIDs, based at least in part on the one or more user input command values 20104. The method 20100 may further include generating, via a device lookup circuit, a query that includes the one or more IoT UIDs 20106. The method 20100 may further include retrieving, via the device lookup circuit, device property data corresponding to the one or more IoT UIDs 20108. The method 20100 may further include transmitting, via a query provisioning circuit, the query to an IoT device registrar server 20110. The method 20100 may further include interpreting, via a device property processing circuit, the device property data generated by the IoT UID registrar server in response to the query 20112. The method 20100 may further include displaying, via a display circuit, the device property data with the corresponding one or more IoT UIDs 20114.

Figure 21:
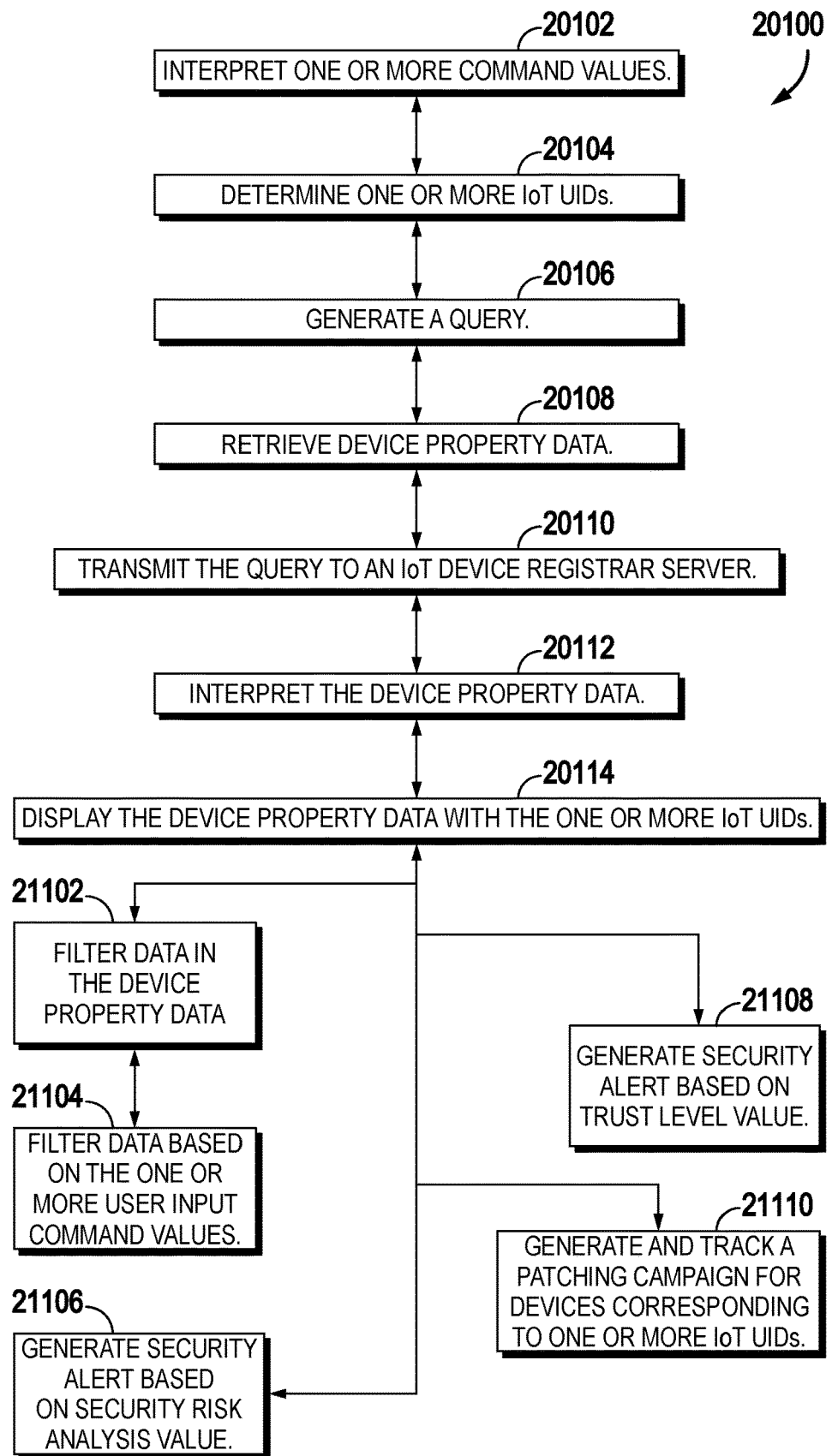
FIG. 21 is a flowchart depicting a method for an IoT device registry display, in accordance with an embodiment of the current disclosure.

FIG. 21 is another flowchart depicting an embodiment of method 20100 for an IoT device registry display, in accordance with an embodiment of the current disclosure. Certain further aspects of the example method are described as following, any one or more of which may be present in certain embodiments. In the method 20100, the user input command values may include the one or more IoT UIDs. In the method 20100, the user input command values may include credentials. In the method 20100, the determining the one or more IoT UIDs may be based at least in part on the credentials 21104. With reference to FIG. 21, the method 20100 may further include filtering data in the device property data 21102. The filtering may be based at least in part on the one or more user input command values 19114. In the method 20100, the filtered data may relate to historical ownership of a device corresponding to one of the IoT UIDs. In the method 20100, the device property data may include a patch status for a device of the corresponding IoT UID. In the method 20100, the device property data may include a security risk analysis value for a device of the corresponding IoT UID. The method 20100 may further include generating a security alert, based at least in part on the security risk analysis value 21106. In the method 20100, the device property data may include a trust level value for a device of the corresponding IoT UID. The method 20100 may further include generating a security alert, based at least in part on the trust level value 21108. The method 20100 may further include generating and tracking a patching campaign for devices corresponding to one or more IoT UIDs 21110.

Figure 22:
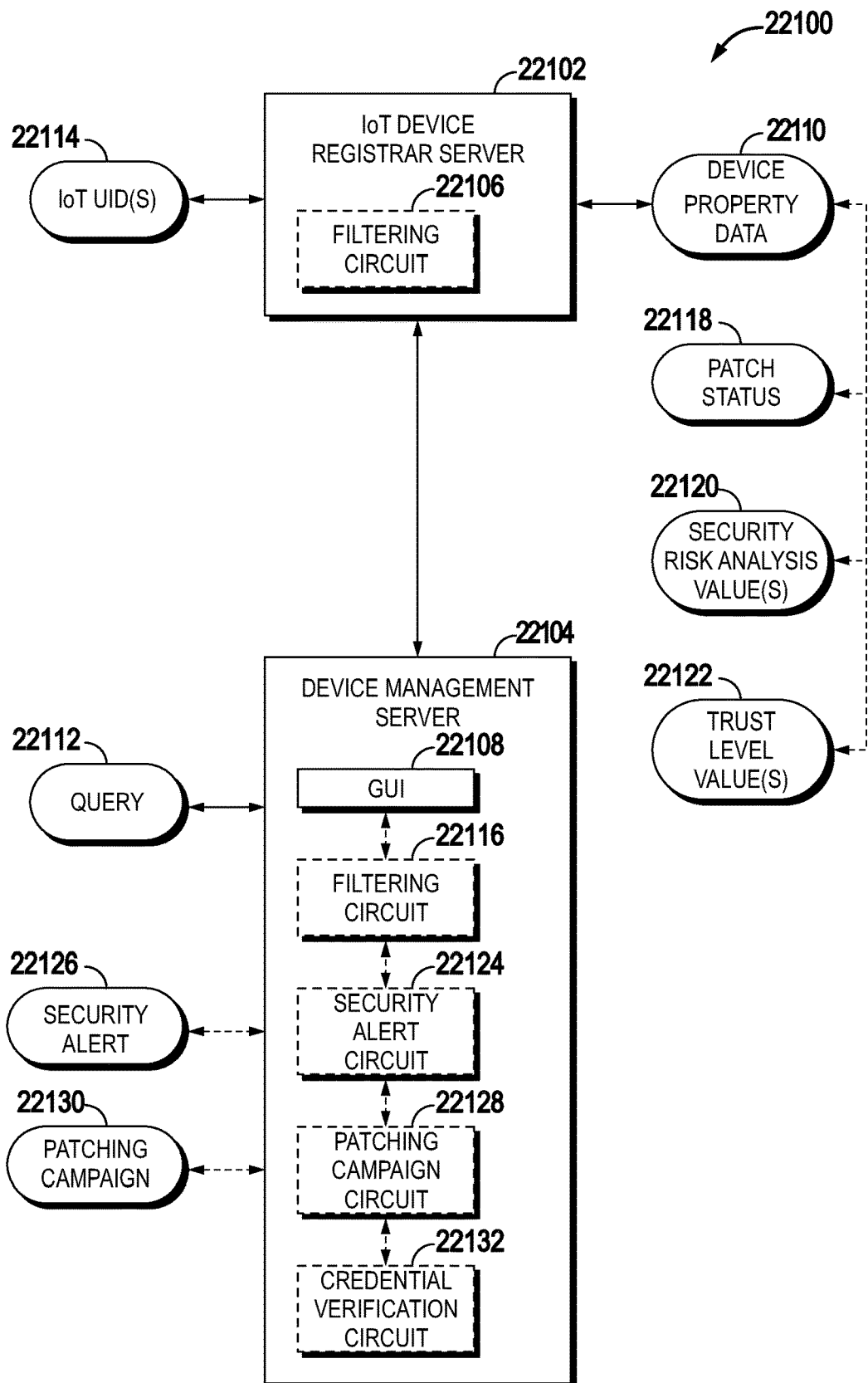
FIG. 22 is a schematic diagram of a system for an IoT device registry display, in accordance with an embodiment of the current disclosure.

FIG. 22 depicts a schematic diagram of an example system 22100 for displaying Internet of Things (IoT) device registry data, e.g., for network connected devices 1112, 1114, 1116, 1118, 1120, 1122, 1124 (FIG. 1), in accordance with an embodiment of the current disclosure. The system 22100 may form part of the server 1126 (FIG. 1), e.g., the at least one processor, and/or any other electronic computing device described herein.

With reference to FIG. 22, the system 22100 is for an IoT device registry display. The system 22100 may include an IoT device registrar server 22102 and a device management server 22104. The IoT device registrar server 22102 may be structured to provide access to an IoT device registry 22106, e.g., the IoT device registry 1129 (FIG. 1). The device management server 22104 may be structured to communicate with the IoT device registrar server 22102, and to provide a graphical user interface (GUI) 22108 structured to display device property data 22110 for one or more devices, e.g., devices 1112, 1114, 1116, 1118, 1120, 1122, 1124 (FIG. 1), registered with the IoT device registry 22106. The device property data 22110 may be retrieved by the graphical user interface 22108 from the IoT device registry via querying the IoT device registrar server 22102, e.g., by a query 22112.

Certain further aspects of the example system are described herein any one or more of which may be present in certain embodiments. In the system 22100, each of the one or more devices may have an IoT Universal Identification (UID) 22114 associated with the device. The system 22100 may further include a filtering circuit 22116, in communication with the device management server, structured to filter data in the device property data 22110. In the system 22100, the filtered data may relate to historical ownership of a device having an IoT UID associated with the device. In the system 22100, the device property data 22110 may include a patch status 22118 for a device having an IoT UID associated with the device. In the system 22100, the device property data 22110 may include a security risk analysis value 22120 for a device of the corresponding IoT UID. In the system 22100, the device property data 22110 may include a trust level value 22122 for a device of the corresponding IoT UID. The system 22100 may further include a security alert circuit 22124 structured to generate a security alert 22126, based at least in part on the security risk analysis value and/or the trust level value. The system 22100 may further include a patching campaign circuit 22128, in communication with the device management server, structured to generate and track a patching campaign 22130 for devices corresponding to one or more IoT UIDs 22114. The system 22100 may further include a credential verification circuit 22132, in communication with the device management server 22104, structured to determine whether a user of the graphical user interface 22108 is authorized to access the device property data 22110 for the one or more devices. If it is determined that the user of the graphical user interface 22108 is not authorized to access the device property data 22110 for the one or more devices, the credential verification circuit 22132 is further structured to restrict the display of the device property data 22110 for one or more devices.

Figure 23:
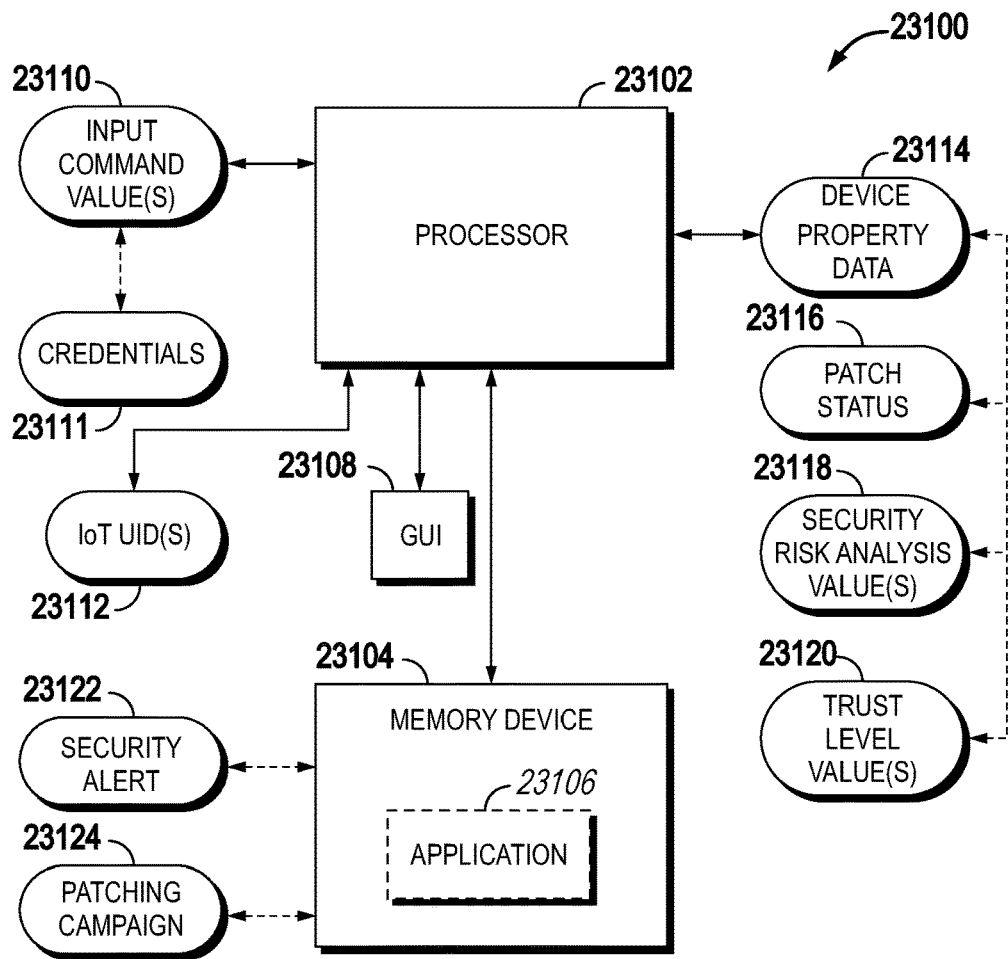
FIG. 23 is a schematic diagram of an apparatus for an IoT device registry display, in accordance with an embodiment of the current disclosure.

FIG. 23 depicts a schematic diagram of another example apparatus 23100 for displaying IoT device registry data, e.g., for network connected devices 1112, 1114, 1116, 1118, 1120, 1122, 1124 (FIG. 1), in accordance with an embodiment of the current disclosure. The apparatus 23100 may form part of the server 1126 (FIG. 1), e.g., the at least one processor, and/or any other electronic computing device described herein.

With reference to FIG. 23, the apparatus 23100 is for an Internet of Things (IoT) device registry display. The apparatus 23100 may include at least one processor 23102 and a memory device 23104. The memory device 23104 may store an application 23106 structured to adapt the at least one processor 23102 to generate a graphical user interface (GUI) 23108 structured to receive one or more user input command values 23110, determine, based at least in part on the one or more user input command values 23110, one or more devices registered with an IoT device registry, e.g., the IoT device registry 1129 (FIG. 1), via corresponding IoT UIDs 23112, and display property data 23114 for the one or more devices.

Certain further aspects of the example apparatus are described as following, any one or more of which may be present in certain embodiments. In the apparatus 23100, the user input command values 23110 may include the one or more IoT UIDs 23112. In the apparatus 23100, the user input command values 23110 may include credentials 23111. In the apparatus 23100, the application 23106 stored in the memory device 23104 may be further structured to adapt the at least one processor 23102 to determine the one or more IoT UIDs 23112 based at least in part on the credentials 23111. In the apparatus 23100, the application 23106 stored in the memory device 23104 may be further structured to adapt the at least one processor 23102 to filter data in the device property data 23114, based at least in part on the one or more user input command values 23110. In the apparatus 23100, the filtered data may relate to historical ownership of a device, e.g., any of devices 1112, 1114, 1116, 1118, 1120, 1122, 1124 (FIG. 1), corresponding to one of the IoT UIDs 23112. In the apparatus 23100, the device property data 23114 may include a patch status 23116 for a device of the corresponding IoT UID. In the apparatus 23100, the device property data 23114 may include a security risk analysis value 23118 for a device of the corresponding IoT UID. In the apparatus 23100, the device property data 23114 may include a trust level value 23120 for a device of the corresponding IoT UID. In the apparatus 23100, the application 23106 stored in the memory device 23104 may be further structured to adapt the at least one processor 23102 to generate a security alert 23122, based at least in part on the security risk analysis value 23118 and/or the trust level value 23120, and provide the security alert 23122 to the graphical user interface 23108 to be displayed by the graphical user interface 23108. In the apparatus 23100, the application 23106 stored in the memory device 23104 may be further structured to adapt the at least one processor 23102 to generate and track a patching campaign 23124 for devices corresponding to one or more IoT UIDs 23112 (also shown herein as 6118).

Figure 24:
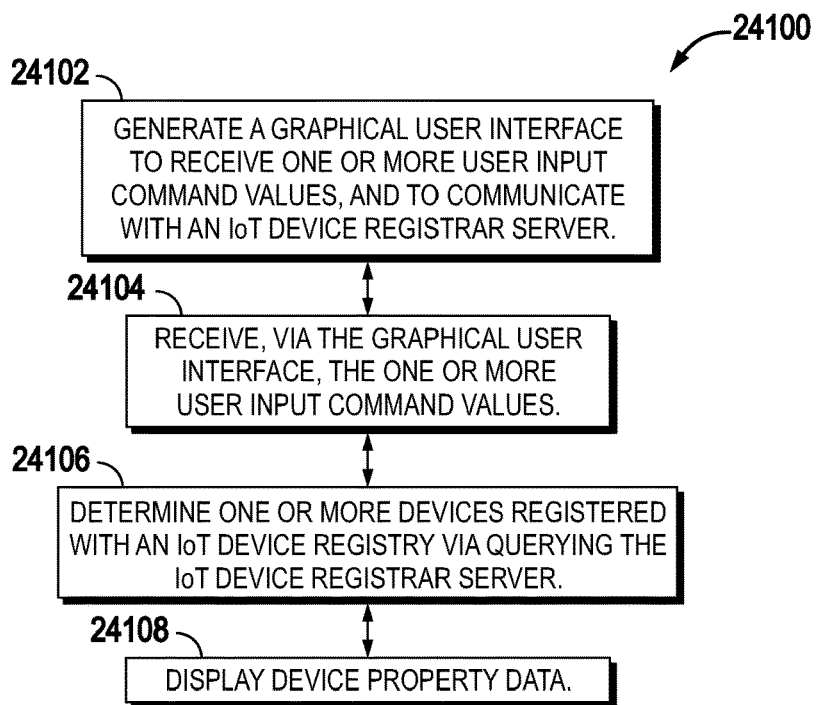
FIG. 24 is a flowchart depicting a method for an IoT device registry display, in accordance with an embodiment of the current disclosure.

FIG. 24 illustrates a flowchart of an example method 24100 for displaying IoT device registry data, e.g., for network connected devices 1112, 1114, 1116, 1118, 1120, 1122, 1124 (FIG. 1), in accordance with an embodiment of the current disclosure. The method 24100 may be performed by the apparatus 19100 and/or any other computing device described herein.

The method 24100 may include generating, via a processor, a graphical user interface structured to receive one or more user input command values, and to communicate with an IoT device registrar server 24102, e.g., server 1126 (FIG. 1). The method 24100 may further include receiving, via the graphical user interface, the one or more user input command values 24104. The method 24100 may further include determining, via the at least one processor, one or more devices registered with an IoT device registry via querying the IoT device registrar server, based at least in part on the one or more user input command values 24106. The method 24100 may further include displaying device property data for the one or more devices received in response to querying the IoT device registrar server 24108.

Figure 25:
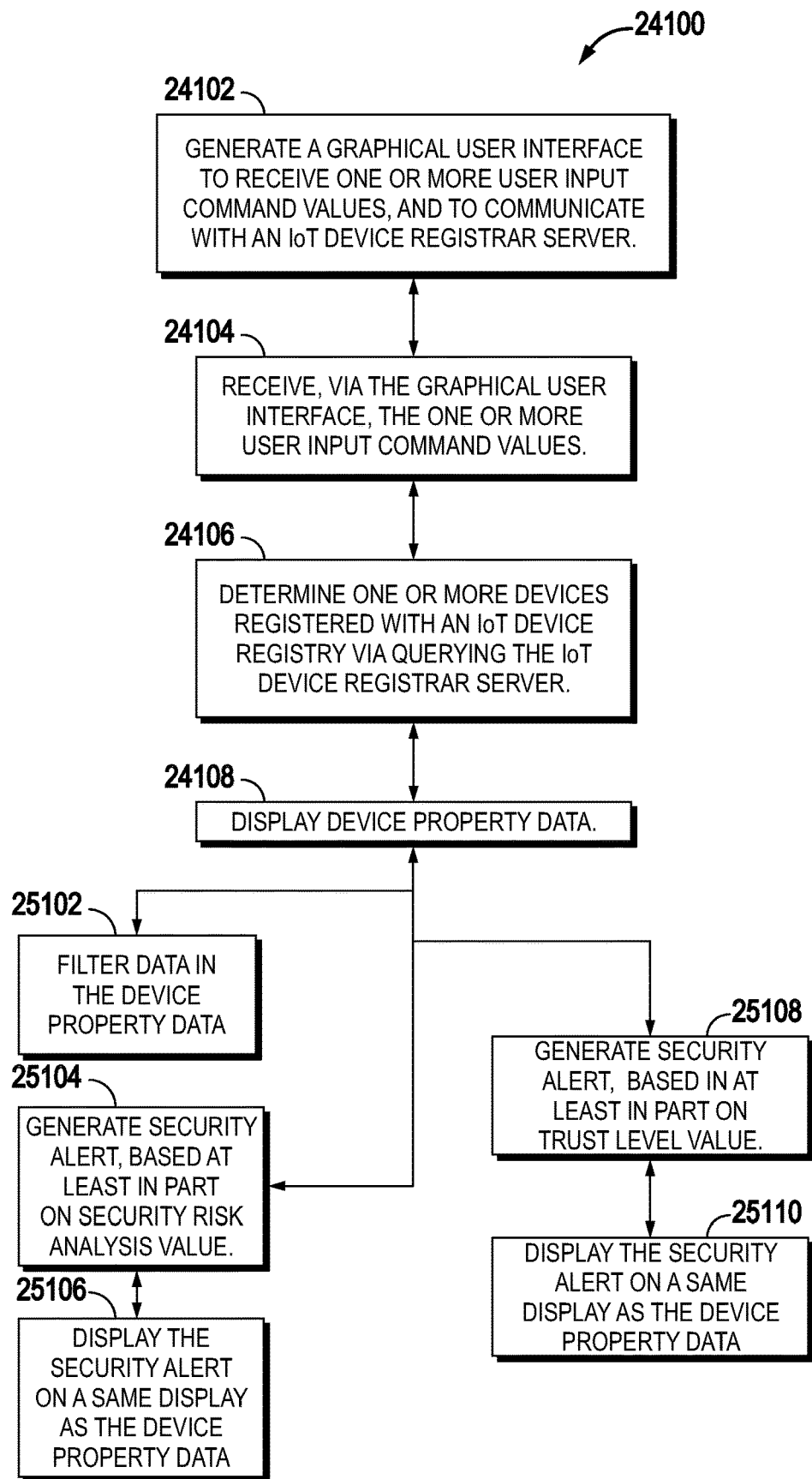
FIG. 25 is a flowchart depicting a method for an IoT device registry display, in accordance with an embodiment of the current disclosure.
Figure 26:
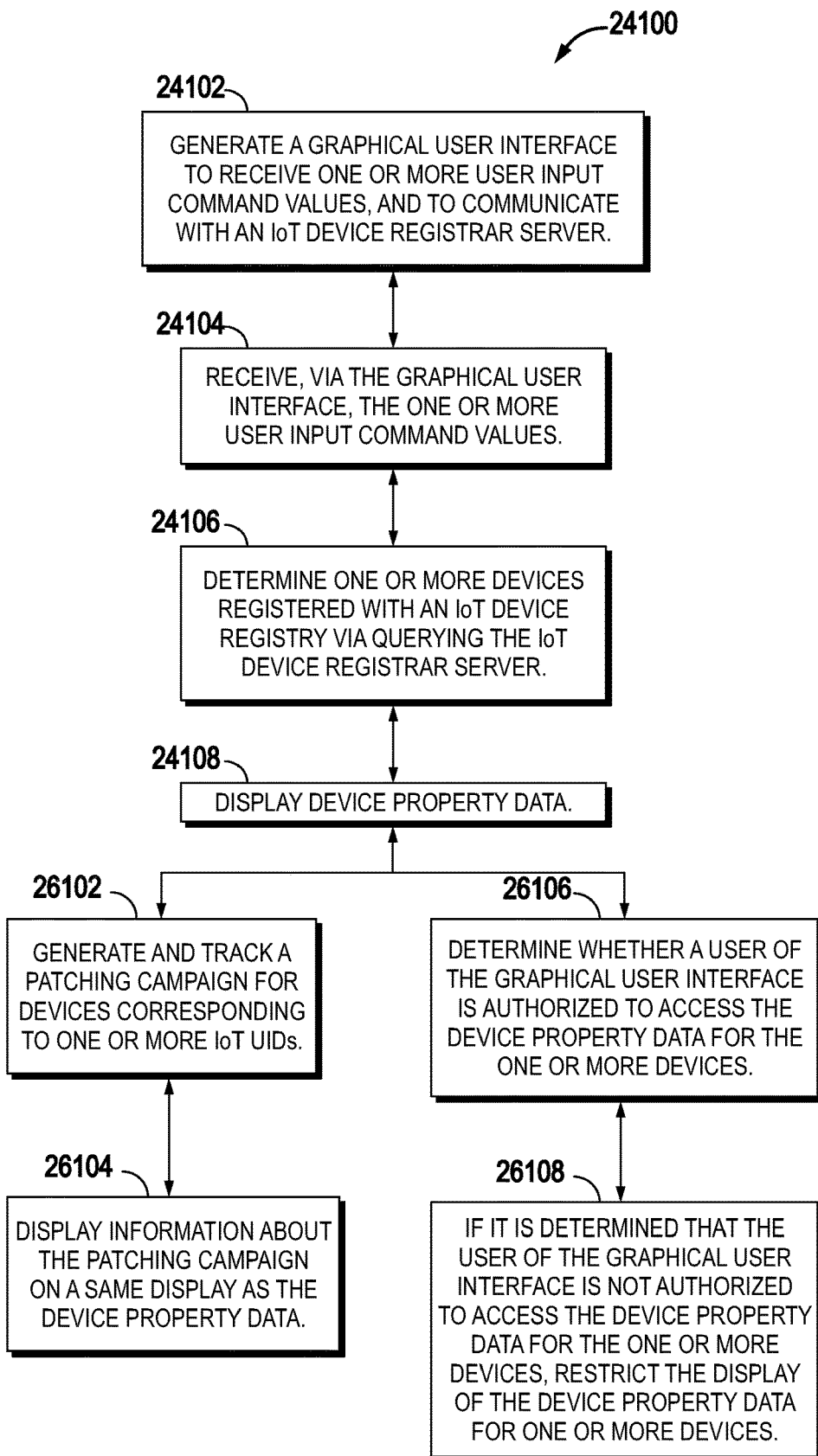
FIG. 26 is a flowchart depicting a method for an IoT device registry display, in accordance with an embodiment of the current disclosure.

FIG. 25 is another flowchart depicting a method for an Internet of Things (IoT) device registry display, in accordance with an embodiment of the current disclosure. FIG. 26 is another flowchart depicting a method for an IoT device registry display, in accordance with an embodiment of the current disclosure.

Certain further aspects of the example method are described as following, any one or more of which may be present in certain embodiments. In the method 24100, each of the one or more devices may have an IoT Universal Identification (UID) associated with the device. With reference to FIG. 25, the method 24100 may further include filtering data in the device property data 25102. In the method 24100, the filtered data may relate to historical ownership of a device having an IoT UID associated with the device. In the method 24100, the device property data may include a patch status for a device having an IoT UID associated with the device. In the method 24100, the device property data may include a security risk analysis value for a device of the corresponding IoT UID. The method 24100 may further include generating a security alert, based at least in part on the security risk analysis value 25104, and displaying the security alert on a same display as the device property data 25106. In the method 24100, the device property data may include a trust level value for a device of the corresponding IoT UID. The method 24100 may further include generating a security alert, based at least in part on the trust level value 25108, and displaying the security alert on a same display as the device property data 25110.

With reference to FIG. 26, the method 24100 may further include generating and tracking a patching campaign for devices corresponding to one or more IoT UIDs 26102, and displaying information about the patching campaign on a same display as the device property data 26104. The method 24100 may further include determining whether a user of the graphical user interface is authorized to access the device property data for the one or more devices 26106, and if it is determined that the user of the graphical user interface is not authorized to access the device property data for the one or more devices, restricting the display of the device property data for one or more devices 26108.

Figure 27:
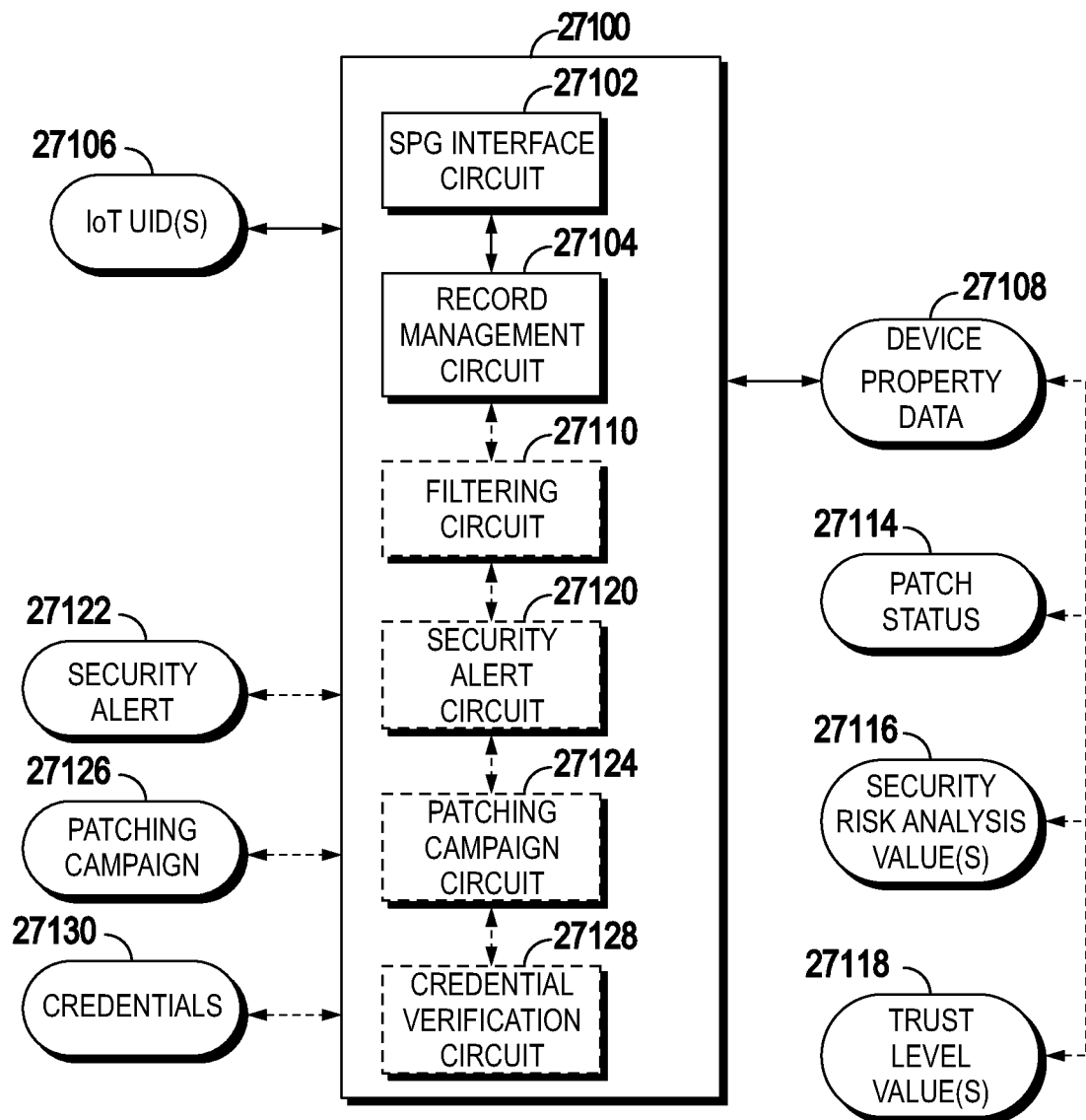
FIG. 27 is a schematic diagram of an apparatus for an IoT device registry display, in accordance with an embodiment of the current disclosure.

FIG. 27 depicts a schematic diagram of an example apparatus 27100 for displaying IoT device registry data, e.g., for network connected devices 1112, 1114, 1116, 1118, 1120, 1122, 1124 (FIG. 1), in accordance with an embodiment of the current disclosure. The apparatus 27100 may form part of the server 1126 (FIG. 1), e.g., the at least one processor, and/or any other electronic computing device described herein.

With reference to FIG. 27, the apparatus 27100 is for an Internet of Things (IoT) device registry display. The apparatus 27100 may include a single pane of glass (SPG) interface circuit 27102 and a record management circuit 27104. The SPG interface circuit 27102 is structured to interpret an IoT UID 27106 received from an SPG. The record management circuit 27104 is structured to retrieve device property data 27108 corresponding to the IoT UID. The SPG interface circuit 27102 is further structured to transmit the device property data 27108 to the SPG.

Certain further aspects of the example apparatus are described herein, any one or more of which may be present in certain embodiments. In the apparatus 27100, the IoT UID 27106 and device property data 27108 may be associated with a device, e.g., any of devices 1112, 1114, 1116, 1118, 1120, 1122, 1124 (FIG. 1). The apparatus 27100 may further include a filtering circuit 27110, in communication with the record management circuit 27104, structured to filter data in the device property data 27108. In the apparatus 27100, the filtered data may relate to historical ownership of the device. In the apparatus 27100, the device property data 27108 may include a patch status 27114 for the device. In the apparatus 27100, the device property data 27108 may include a security risk analysis value 27116 for a device of the corresponding IoT UID. In the apparatus 27100, the device property data 27108 may include a trust level value 27118 for a device of the corresponding IoT UID. The apparatus 27100 may include, in communication with the record management circuit, a security alert circuit 27120 structured to generate a security alert 27122, based at least in part on the security risk analysis value 27116 and/or the trust level value 27118, and provide the security alert 27122 to the SPG interface circuit 27102 to be displayed by the SPG. The apparatus 27100 may further include a patching campaign circuit 27124, in communication with the record management circuit, structured to generate and track a patching campaign 27126 for devices corresponding to one or more IoT UIDs 27106; and provide information about the patching campaign 27126 to the SPG interface circuit 27102 to be displayed by the SPG.

The apparatus 27100 may further include a credential verification circuit 27128, in communication with the record management circuit 27104, structured to determine whether a user of the SPG is authorized to access the device property data 27108 corresponding to the IoT UID. The determination may be based on credentials 27130 provided by the record management circuit 27104. If it is determined that the user of the SPG is not authorized to access the device property data 27108 corresponding to the IoT UID, the credential verification circuit 27128 is further structured to restrict the display of the device property data 27108 on the SPG.

Figure 28:
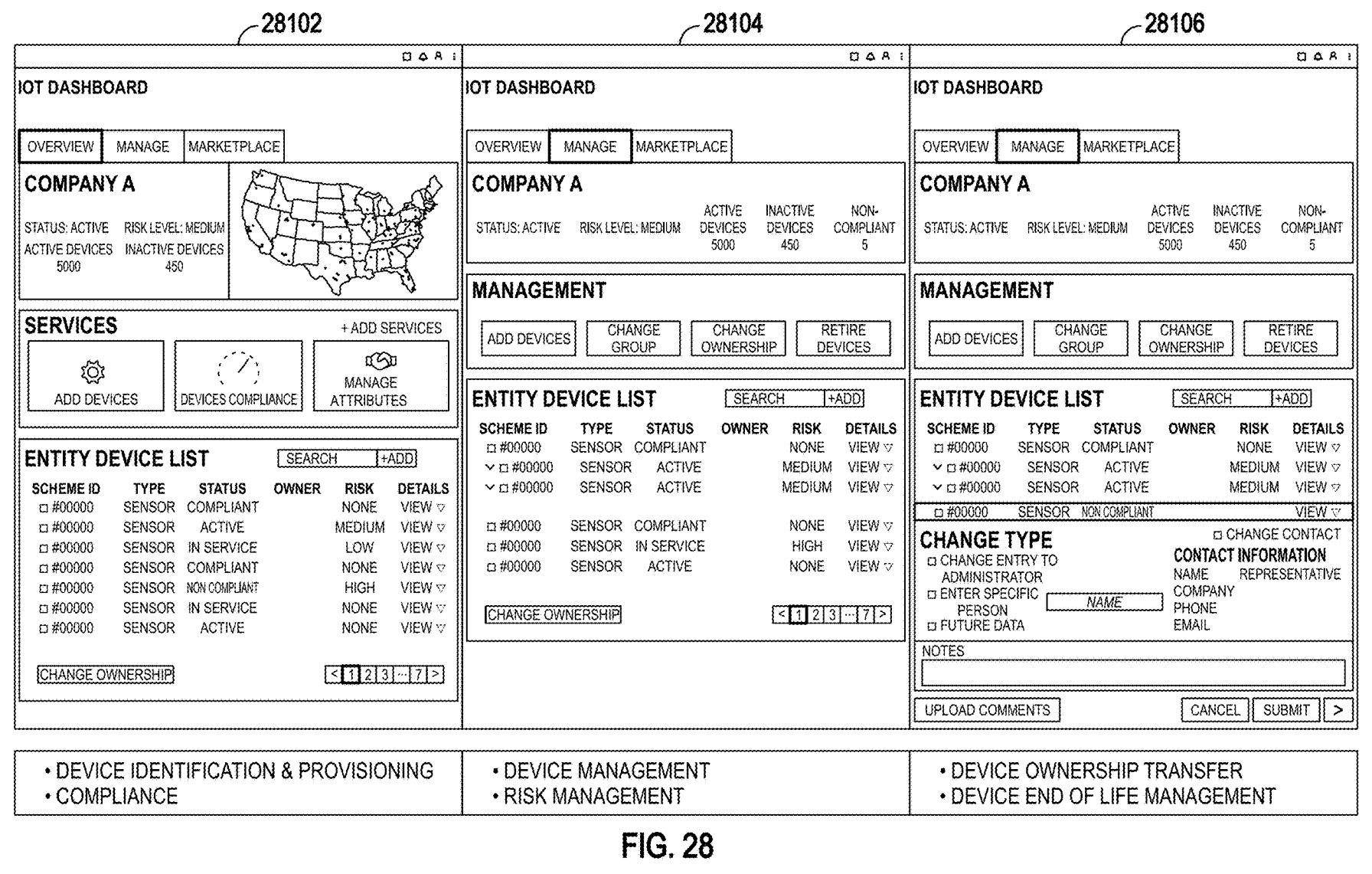

FIG. 28 is a diagram of graphical user interfaces, e.g., an SPG, of the system of FIG. 1, in accordance with an embodiment of the current disclosure.

FIG. 28 depicts non-limiting examples of GUIs that may be used by one or more users to interact with various components of the system 1100 (FIG. 1), e.g., the IoT device registry 1129. GUI 28102 may include interactive displays, e.g., a map, and/or other fields for identifying and/or provisioning network connected devices and/or for ensuring that a registered network connected device is in compliance with applicable government and/or industry standards and/or regulations. GUI 28104 may include interactive displays and/or other fields for managing risks associated with registered network connected devices. GUI 28106 may include interactive displays and/or other fields, e.g., SIM address, for transferring ownership of a network connected device and/or for managing end of life, e.g., decommissioning, of a network connected device. In embodiments, the GUIs and/or other interfaces described herein, may be hosted via a serverless architecture.

In certain aspects, access to an SPG may be based on a subscription model. In certain aspects, access to an SPG may be provided via an Application Programming Interface (API) or via a GUI, which may be a web-based user interface (UI). Embodiments of the SPG may provide for a user to modify a data record in the IoT device registry for one or more devices. Embodiments of the SPG may provide for the generation and execution of queries against the IoT device registry. Embodiments of the SPG may provide for a user to validate, e.g., visually, a chain of title for a device and/or to inform the IoT device registry of a change in ownership for one or more devices. Embodiments may provide for a user to verify a supply chain for a device and/or associated product. Embodiments may provide for a user to see a list of network entry points into a device, which the user can then monitor for security purposes. In certain aspects, the SPG may restrict and/or filter out displayed devices based on access rights, e.g., an enterprise user may only be able to view devices that they control and/or own. For example, embodiments may provide for a manufacturer to see a patch version of a module they made, but not its location and/or current owner. The filtering may also comprise a search for a subset of device property data, e.g., based on one or more user input command values. In certain aspects, the SPG may be a standalone application, e.g., an Amazon Web Services (AWS) application ("app"), and/or it may be integrated into an existing platform/system.

Thus, embodiments of an SPG, as disclosed herein, provide for simplified access to and/or viewing of the status of one or more IoT UIDs associated with a particular entity, e.g., end user, manufacturer, third party, etc., as compared to traditional systems. For example, embodiments of an SPG may present a view of the data within the IoT device registry that is tailored to a particular user of the SPG, e.g., end user, manufacturer, third part, etc. Thus, an SPG may provide an overview of all registered devices owned and/or operated by an end enterprise user, and/or provide for a manufacturer to view registered devices which it made. Embodiments of an SPG may also use filtering, as described herein, to depict only devices and/or corresponding device property data to which an entity using the SPG is authorized to access. For example, an SPG may allow a manufacturer to view certain properties of devices it made but not view ownership information of said devices. Similarly, an SPG may prevent a current owner of a device from viewing previous ownership data of the device.

Figure 29:
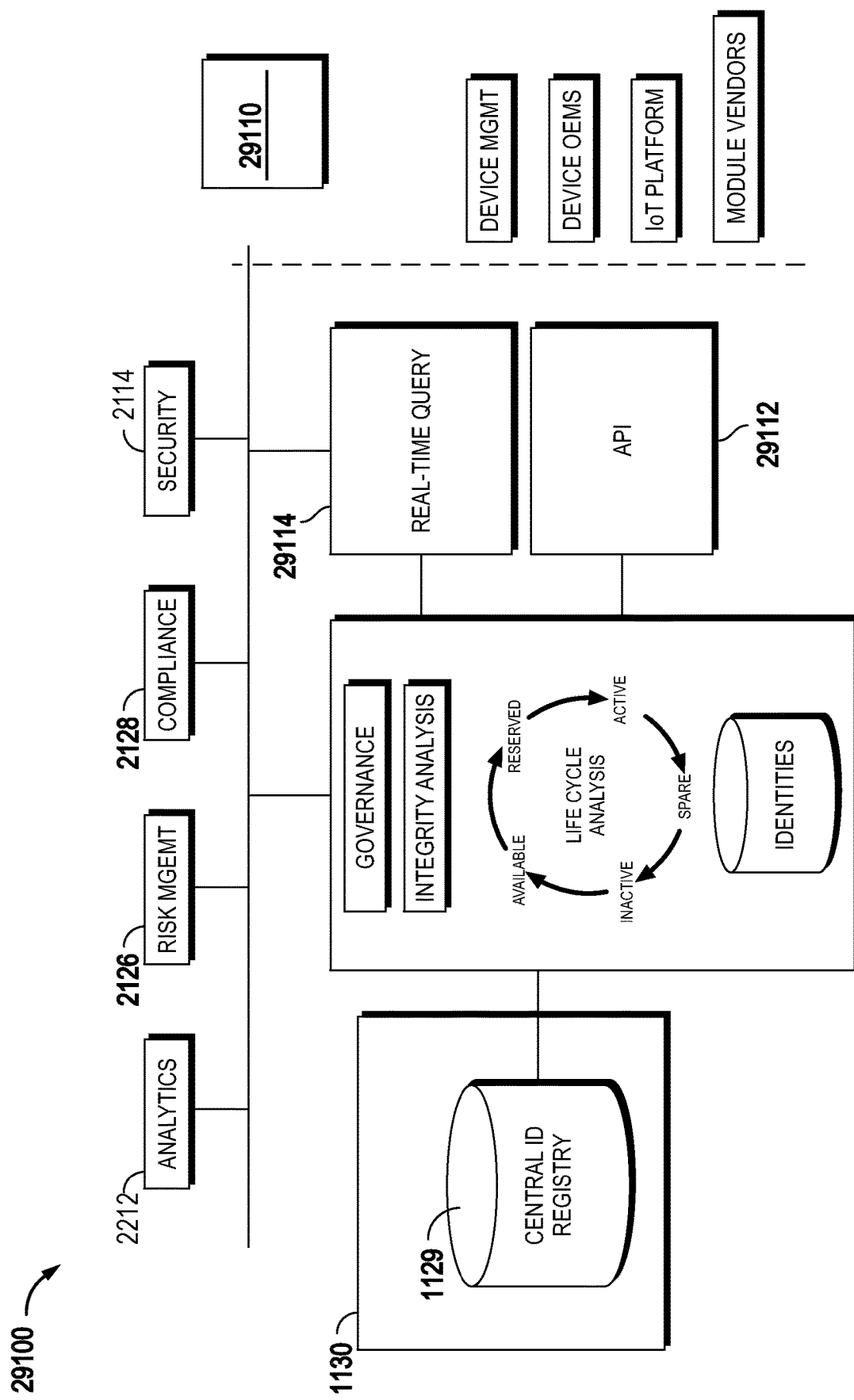
FIG. 29 is a schematic diagram of an architecture for implementing trusted relationships between entities, in accordance with an embodiment of the current disclosure.

Illustrated in FIG. 29 is an architecture 29100 for implementing trusted relationships between various entities, e.g., 1134, 1136, 1138, and/or 1130 (FIG. 1), that manufacture, use, and/or otherwise interact with network connected devices. As will be understood, in embodiments, an initial trusted relationship, also referred to herein as a "seed of trust", may be formed between a manufacturer, e.g., 1134 (FIG. 1) and the registry 1129. A seed of trust may be a trustable identity credential, e.g., an IoT UID, embedded within a network connected device and/or an association of a device with an IoT UID within the registry 1129. In embodiments, the seed of trust may be created at the time of manufacturer of a network connected device, e.g., a network connected device may utilize trusted platform module (TPM) technologies. In embodiments, the registrar 1130 and a manufacturer 1134 (FIG. 1) may exchange cryptographic keys for one or more network connected devices over a secure electrical (e.g., secure network connection) and/or traditional (e.g., secure mail and/or other transport) channel. Once the initial seed of trust is established, the registrar 1130 can provide verification services to other entities 29110 that may need to interact with network connected devices registered with the registry 1129. Such verification services may be provided via one or more application programming interfaces (APIs) 29112 and/or a real-time query component 29114. In certain aspects, embodiments of the disclosure, as disclosed herein, may provide for accurate classification, categorization, and management of the network connected devices, which in turn, may improve the level of trust between the network connected devices and the entities interacting with them.

Referring again to FIGS. 1 and 2, embodiments of the current disclosure may provide for the embedding of an IoT UID 6118 (FIG. 6) into Brownfield devices, e.g., 1112 and 1114. A Brownfield device, as disclosed herein, may be a device that was previously provisioned and/or in use prior to being associated with and/or assigned an IoT UID 6118. A Brownfield device may be a device that was previously deployed for its intended purpose, e.g., a device that has left a manufacturer, e.g., manufacturer 1134 (FIG. 1), and/or has been in operation prior to being associated with an IoT UID. As a non-limiting example, an enterprise user 1136 (FIG. 1) may purchase a previously used temperature sensor from a vendor of used industrial data acquisition devices, wherein the temperature sensor was never registered with an IoT UID registrar, e.g., registrar 1130 (FIG. 1), as disclosed herein. The enterprise user 1136 may then wish to register the newly purchased used temperature sensor with the IoT UID registrar, e.g., registrar 1130, as a Brownfield device using the apparatuses and/or method disclosed herein. Brownfield devices may also include devices that were previously retired and repurposed, e.g., an old temperature sensor that may have been previously registered with an IoT device registrar but was retired/decommissioned, refurbished, and introduced back into use. Apparatuses and/or methods for embedding IoT UIDs 6118 into Brownfield devices may form part of the register and configure component 2116 (FIG. 2), to include the bulk upload & connect 2140, define device ID 2138, and/or configure relationships and permissions 2136 subcomponents.

Figure 30:
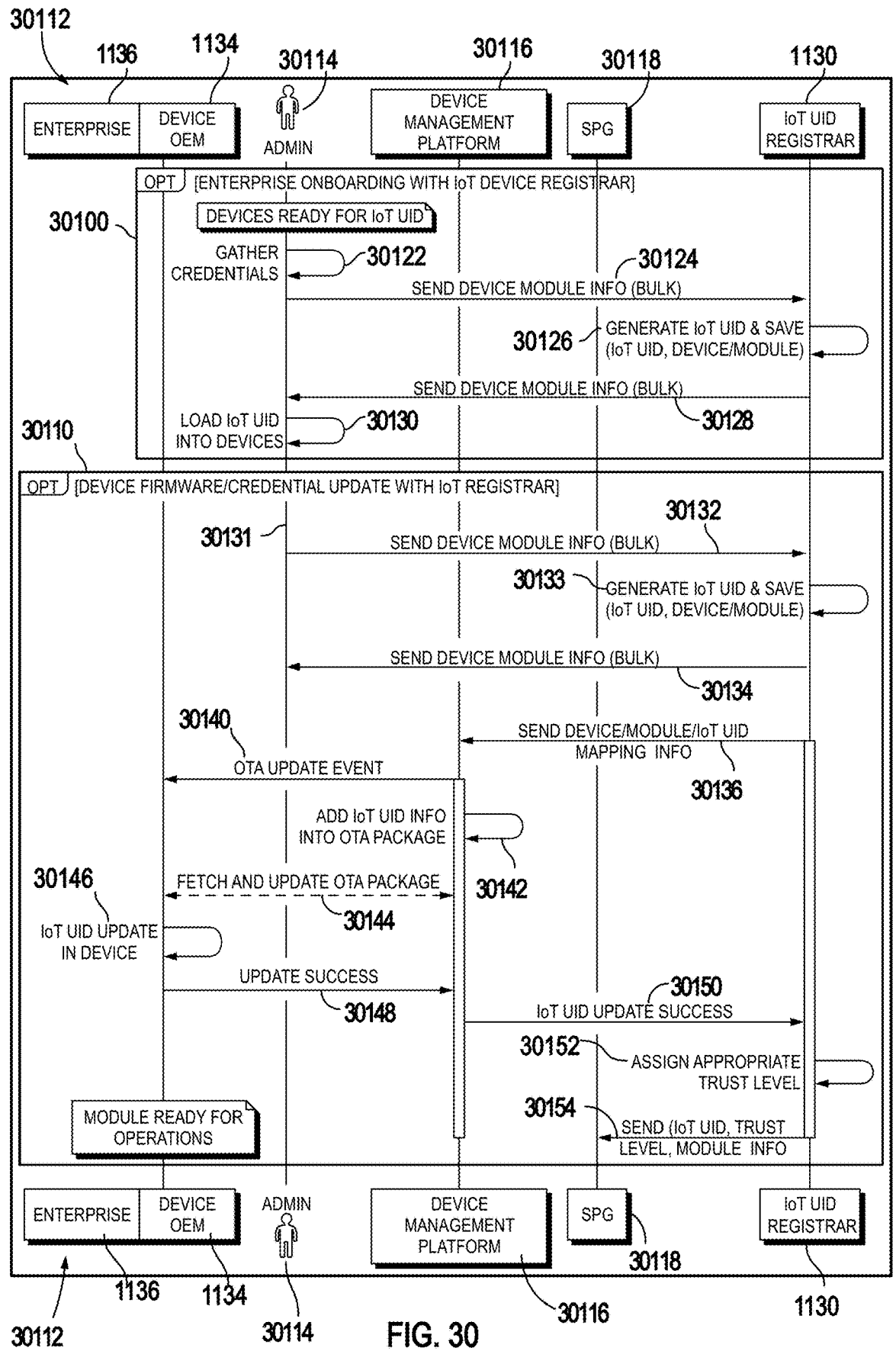
FIG. 30 is a process flow diagram depicting process flows for embedding IoT UIDs into Brownfield devices, in accordance with embodiments of the current disclosure.

Illustrated in FIG. 30 is a process flow diagram depicting two process flows 30100 and 30110 for embedding IoT UIDs into Brownfield devices involving the exchange of data between: a registering party 30112 wishing to register Brownfield devices, e.g., an enterprise end user 1136 or a manufacturer 1134; an administrator 30114; a device management platform 30116; a single pane of glass (SPG) 30118; and an IoT device registrar 1130.

Flow 30100 concerns a scenario in which the registering party 30112 wants to register one or more Brownfield devices with embedded IoT UIDs prior to the Brownfield devices entering service within an operational network, e.g., the registering party 30112 may be an enterprise user provisioning the Brownfield devices for use in the enterprise user's corporate network. At 30122, the administrator 30114 may prepare the one or more Brownfield devices for embedding of an IoT UID. Such preparation may include updating the firmware and/or software of the one or more Brownfield devices, installing security credentials, e.g., public key infrastructure (PKI) keys and/or certificates, joining to a network domain, etc. The administrator 30114 may then collect/gather/generate device property data from the prepared one or more Brownfield devices, and then provide/transmit 30124 the gathered device property data to the IoT device registrar 1130. Upon receipt of the device property data, the IoT device registrar 1130 may generate 30126 IoT UIDs for each of the one or more Brownfield devices and associates each IoT UID with portions of the device property data corresponding to a particular Brownfield device. As disclosed herein, such associations may be accomplished via a record 1152 (FIG. 1), 6110 (FIG. 6) in a registry 1129 (FIG. 1). The IoT device registrar 1130 then transmits 30128 the IoT UIDs to the admin 30114, who then embeds/loads/installs 30130 each of the IoT UIDs into the corresponding Brownfield device.

Flow 30110 also concerns a scenario in which the registering party 30112 wants to register one or more Brownfield devices with embedded IoT UIDs, where the Brownfield devices are already in service within an operational network, e.g., the registering party 30112 may be an enterprise user wishing to register Brownfield devices already in use in the enterprise user's corporate network. Non-limiting examples of such devices/scenarios may include: Brownfield devices forming part of an existing supervisory control and data acquisition (SCADA) network, e.g., weather and/or power monitors on existing powerline towers; Brownfield devices deployed to corporate employees, e.g., cell phone, laptops, printers, tablets, etc.; and/or other devices where it would be beneficial to embed an IoT UID without having to physically bring the Brownfield device to a particular location, e.g., an in-house IT department, for embedding. At 30131, an administrator 30114 may then collect/gather/generate device property data from one or more Brownfield devices, which may currently be deployed on a network managed by the administrator 30114, and provide/transmit 30132 the gathered device property data to the IoT device registrar 1130. Upon receipt of the device property data, the IoT device registrar 1130 may generate 30133 IoT UIDs for each of the one or more Brownfield devices and associates each IoT UID with portions of the device property data corresponding to a particular Brownfield device. As disclosed herein, such association may be accomplished via a record 1152 (FIG. 1) 6110 (FIG. 6) in a registry 1129 (FIG. 1). The IoT device registrar 1130 may then transmit 30134 the IoT UIDs to the admin 30114 and/or transmit 30136 the IoT UIDs to a device management platform 30116 that may integrate with a SPG 30118. Transmission 30136 of the IoT UIDs to the device management platform 30116 may also include a mapping of the IoT UIDs to the one or more Brownfield devices. The IoT UIDs may then be embedded/installed into the corresponding Brownfield devices by piggybacking on messages, e.g., base messages, transmitted 30140 to the Brownfield devices, e.g., via over the air (OTA) updates. In embodiments, the device management platform 30116 may insert 30142 the IoT UIDs into software packages intended to be installed into the Brownfield devices via push and/or pull updates, as represented by the dashed line 30144. Upon receipt of such a software package, the Brownfield devices may install 30146 the packages (having the piggybacked IoT UID) and transmit 30148 confirmation messages, indicating that the IoT UIDs were successfully installed, back to the device management platform 30116, which may in turn relay 30150 the confirmation messages to the IoT device registrar 1130, which may then generate 30152 and transmit 30154 trust level indicators for each of the one or more Brownfield devices, as disclosed herein. Transmission 30154 of the trust level indicators may be to an SPG 30118, device management platform 30116, the administrator 30114, and/or to the Brownfield devices themselves. In embodiments, piggybacking of the IoT UID, as disclosed herein, may way for a device management interaction with an endpoint device (the device for which the IoT UID corresponds to) to provision the IoT UID. The device management interaction may be initiated by one or more of: the device, a regularly scheduled event by the device or device management platform, and/or or an event initiated by the device management platform to the device. In embodiments, the IoT UID may piggyback on this event to ensure the IoT UID is provisioned and may include other software, software libraries, drivers, etc. that enable greater functionality and interaction between the device and the IoT device registry, such as enhanced authentication and security capabilities.

Figure 31:
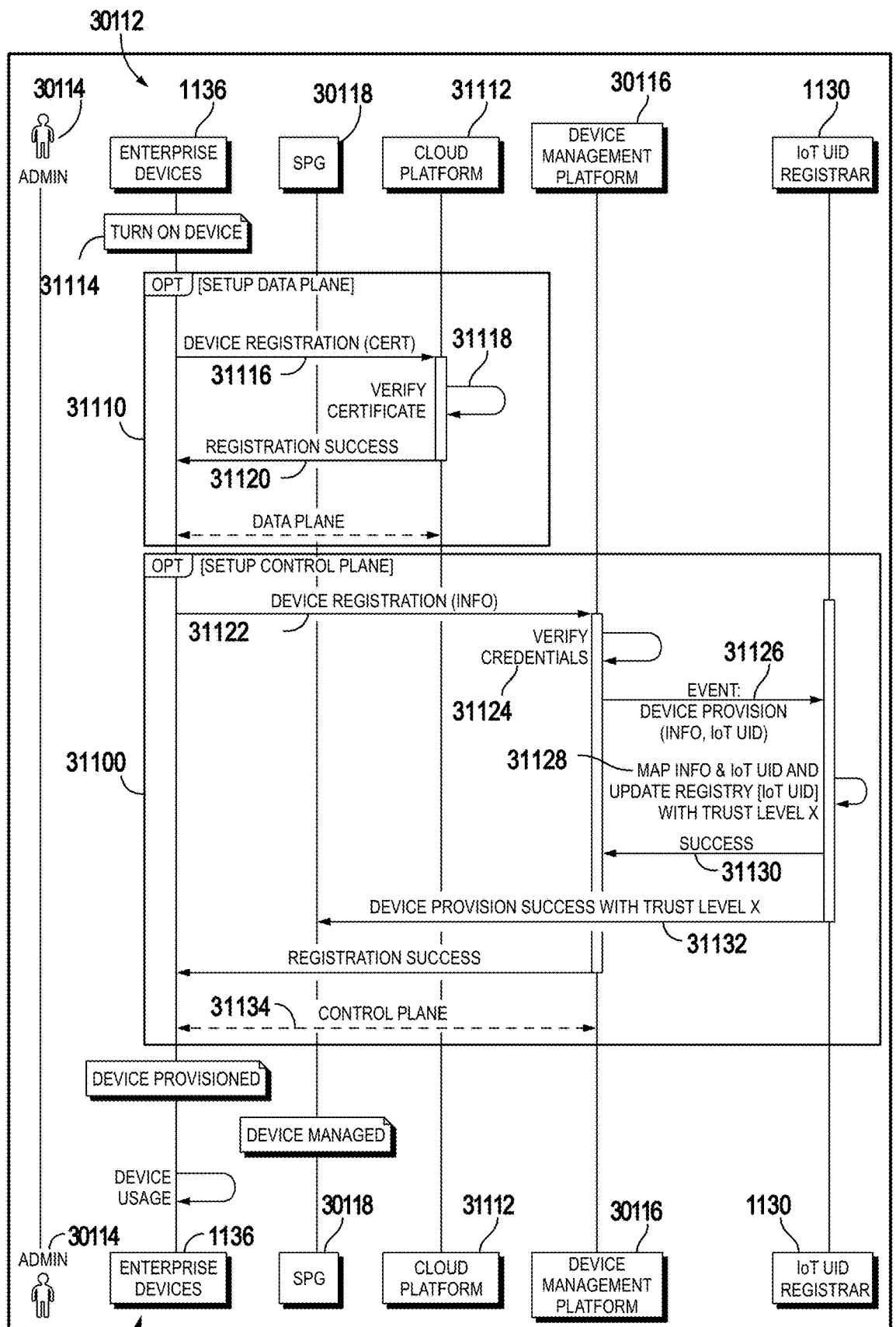
FIG. 31 is a process flow diagram depicting registration of a Brownfield device with an IoT device registrar, in accordance with an embodiment of the current disclosure.

Illustrated in FIG. 31 is a process flow diagram depicting registration of a Brownfield device with an IoT device registrar 1130, e.g., flow 31100, performed in conjunction with a network registration, e.g., flow 31110. As will be understood, the functionality and/or control of Brownfield devices may be divided between: 1) a data plane, e.g., functionality related to the core intended use of a device such as executing a spreadsheet application, collecting and displaying temperature readings, etc.; and 2) a control plane, e.g., functionality related to regulating network/resource access based on credentials. In embodiments, flow 31110 may correspond to a setup process for Brownfield device data plane functionality, e.g., registration/provisioning with a cloud platform 31112 and/or local network, and flow 31100 may correspond to a setup process for Brownfield device registration with the IoT device registrar 1130. Accordingly, at 31114, a Brownfield device may be turned on after having been acquired from a previous owner and begin a registration process with a cloud platform 31112 via transmitting 31116 a security certificate to the cloud platform 31112. The cloud platform 31112 may then verify 31118 the security certificate and transmit 31120 a confirmation message back to the Brownfield device that indicates registration with the cloud platform 31112 was successful after which the Brownfield device may have access to a variety of resources provided by the cloud platform 31112, e.g., the Brownfield device's data plane functionality becomes enabled.

The Brownfield device may then proceed to setup its control plane functionality by transmitting 31122 device registration data to a device management platform 30116. The device registration data may include the security certificate the Brownfield device used to register with the cloud platform 31112, other device property data, and/or any data the Brownfield device received from the cloud platform 31112 during the data plane setup process 31110. The device management platform 30116 may then verify 31124 the device registration data and transmit 31126 an event message, e.g., 6116 (FIG. 6) to the IoT device registrar 1130. The IoT device registrar 1130 may then generate IoT UIDs for the Brownfield device, as disclosed herein, and/or map 31128 the Brownfield IoT device to a preexisting record. For example, in embodiments, the administrator 30114 may have used the SPG 30118 to submit device property data for the Brownfield device to the IoT UID device registrar 1130 prior to the execution of the data plane setup, e.g., flow 31110, to provision a record for subsequent claiming by the Brownfield device during the control plane setup, e.g., flow 31100. Accordingly, mapping 31128 may include setting a flag and/or other indicator within the record corresponding to the Brownfield device indicating that the IoT UID has been claimed by the IoT UID device. The IoT device registrar 1130 may also generate and/or set a trust level indicator in the record and transmit 31130 a confirmation message and/or the trust level indicator to the device management platform 30116, SPG 30118, registering entity 30112, and/or any other interested entity. The device management platform 30116 may also relay 31132 the confirmation message to the registering entity 30112 and/or other interested entity. In embodiments, successful registration of a Brownfield device with an IoT device registrar 1130 may provide for a device management platform 30116 to adjust and/or manipulate the control plane functionality of the Brownfield device, as depicted by dashed line 31134.

Figure 32:
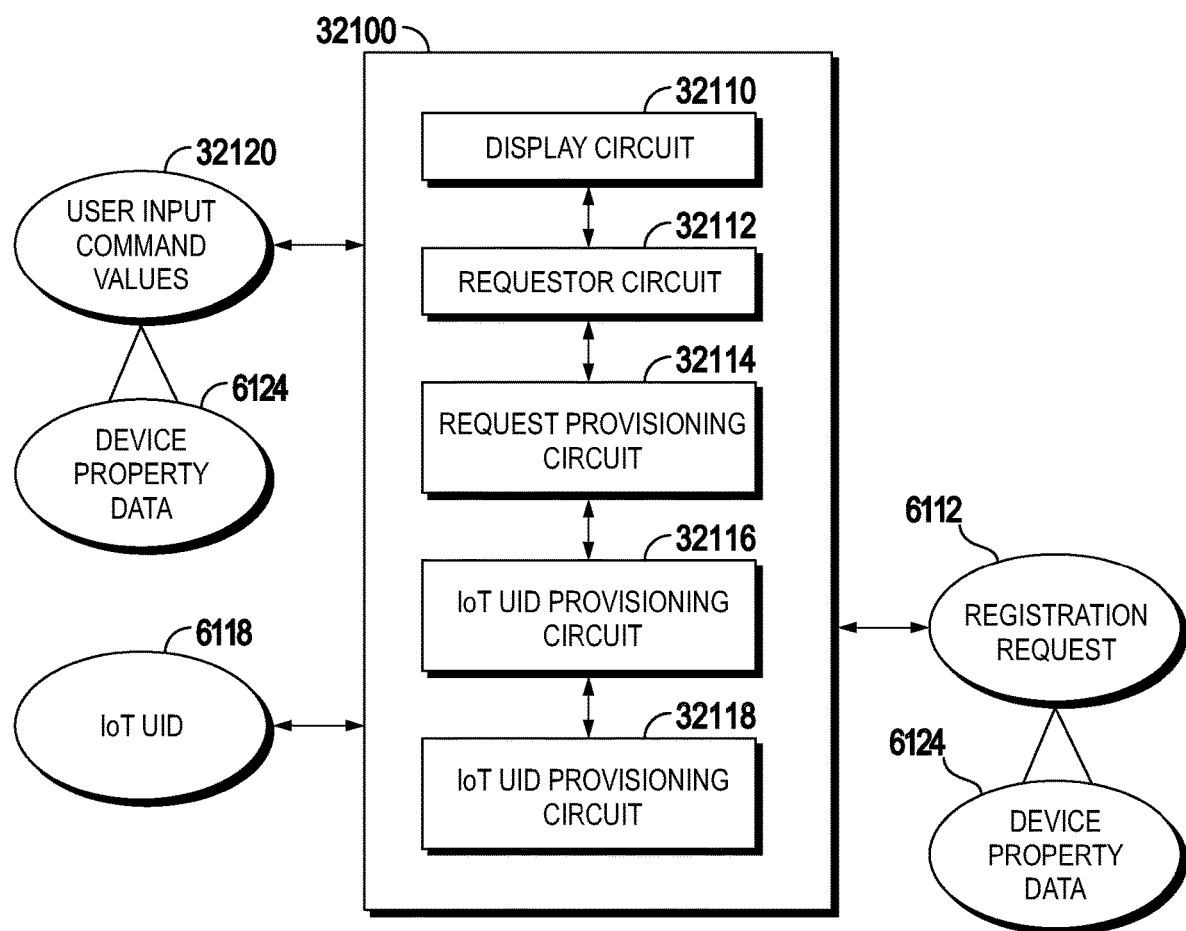
FIG. 32 is schematic diagram of an apparatus for provisioning embedded IoT UIDs in Brownfield devices, in accordance with an embodiment of the current disclosure.

Illustrated in FIG. 32 is an apparatus 32100 for provisioning embedded IoT UIDs in Brownfield devices. The apparatus 32100 may form part of the registry 1129 (FIG. 1), the IoT device registrar server 1126 (FIG. 1), another component of the registrar 1130, a device management platform associated with and/or operated by a manufacturer 1134, end user 1136, third party 1138, and/or any computing device described herein. In embodiments, the apparatus 32100 may include a display circuit 32110, a requestor circuit 32112, a request provisioning circuit 32114, an IoT UID processing circuit 32116, and/or an IoT UID provisioning circuit 32118. The display circuit 32110 is structured to generate a graphical user interface (GUI), e.g., a SPG, configured to receive one or more user input command values 32120 corresponding to device property data 6124 (FIG. 6) for one or more Brownfield devices, e.g., 1112, 1114 (FIG. 1). The requestor circuit 32112 is structured to generate a registration request 6112 (FIG. 6) that includes the device property data 6124. The request provisioning circuit 32114 is structured to transmit the registration request 6112 to an IoT device registrar server 1126 (FIG. 1). The IoT UID processing circuit 32116 is structured to interpret one or more IoT UIDs 6118 generated by the IoT device registrar server 1126 in response to the registration request 6112. The IoT UID provisioning circuit 32118 is structured to at least one of: transmit the one or more IoT UIDs 6118, or display the one or more IoT UIDs 6118 on an electronic display.

Figure 33:
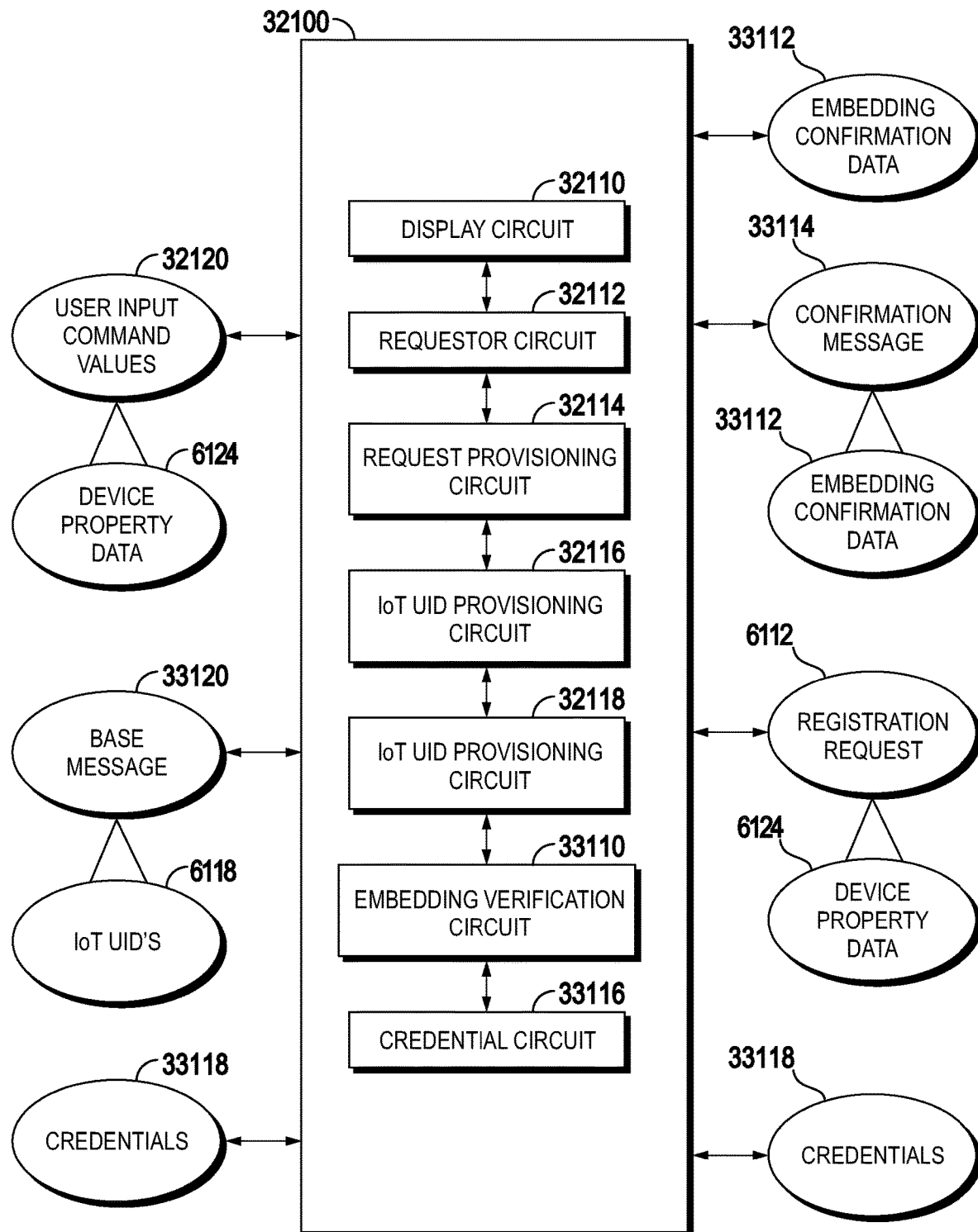
FIG. 33 is another schematic diagram of an apparatus for provisioning embedded IoT UIDs in Brownfield devices, in accordance with an embodiment of the current disclosure.

Moving to FIG. 33, in embodiments, the apparatus 32100 may further include an embedding verification circuit 33110 structured to interpret embedding confirmation data 33112 that indicates the one or more IoT UIDs 6118 were embedded into the one or more Brownfield devices. The embedding verification circuit 33110 may be further structured to transmit one or more confirmation messages 33114 indicating the one or more IoT UIDs were embedded in the one or more Brownfield devices. The one or more confirmation messages 33114 may include all or some of the embedding confirmation data 33112. In embodiments, the embedding circuit 33110 may transmit the confirmation messages 33114 to the display circuit 32110 which may be further structured to display the embedding confirmation data 33112 in the GUI, e.g., an SPG. In embodiments, the apparatus 32100 may further include a credential circuit 33116 structured to interpret a set of credentials 33118. In embodiments, the credentials 33118 may correspond to a user using the GUI, e.g., an SPG. The credential circuit 33116 may be further structured to transmit the set of credentials 33118 to the IoT device registrar server 1126 (FIG. 1). In embodiments, the credentials 33118 may provide authorization to register the one or more Brownfield devices with an IoT device registry 1129 (FIG. 1) associated with the IoT device registrar server 1126 (FIG. 1). In embodiments, the IoT UID provisioning circuit 32118 may be structured to transmit the one or more IoT UIDs 6118 via piggybacking the one or more IoT UIDs 6118 off of one or more base messages 33120, e.g., transported within and/or with the base messages. The one or more base messages 33120 may be part of a software and/or firmware update to/for the one or more Brownfield devices. A non-limiting example of such piggybacking is provided herein with respect to the disclosed process flow 30110 in FIG. 30. In embodiments, the one or more base messages 33120 may be transmitted to the one or more Brownfield devices at one or more predetermined and/or scheduled times, e.g., planned OTA updates. In embodiments, the one or more base messages 33120 may be transmitted to the one or more Brownfield devices in response to polling by the one or more Brownfield devices, e.g., the Brownfield devices may poll a device management platform to check for available updates.

Figure 34:
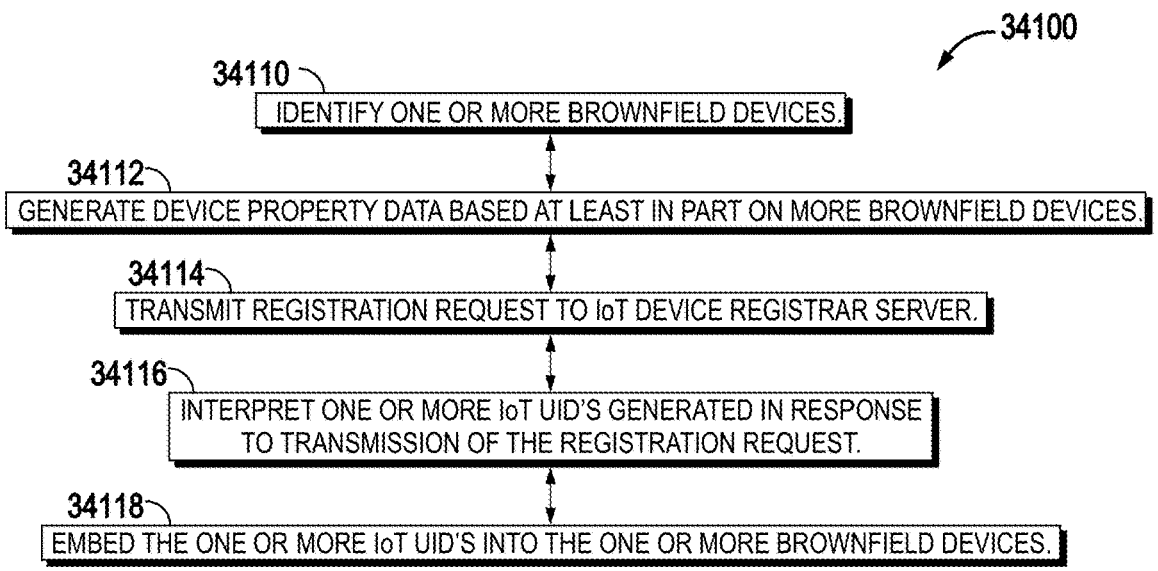
FIG. 34 is a flowchart depicting a method for provisioning embedded IoT UIDs in Brownfield devices, in accordance with an embodiment of the current disclosure.

Referring to FIG. 34, a method 34100 for provisioning embedded IoT UIDs in Brownfield devices, in accordance with embodiments of the current disclosure, is shown. The method 34100 may be performed via the apparatus 32100 (FIGS. 32 and 33) and/or any other computing device described herein. The method 34100 may include identifying one or more Brownfield devices 34110, and generating device property data, based at least in part on the one or more Brownfield devices 34112. The method 34100 may further include transmitting, to an IoT device registrar server, a registration request that includes the device property data 34114, interpreting one or more IoT UIDs generated in response to the transmitting of the registration request 34116, and embedding the one or more IoT UIDs in the one or more Brownfield devices 34118.

Figure 35:
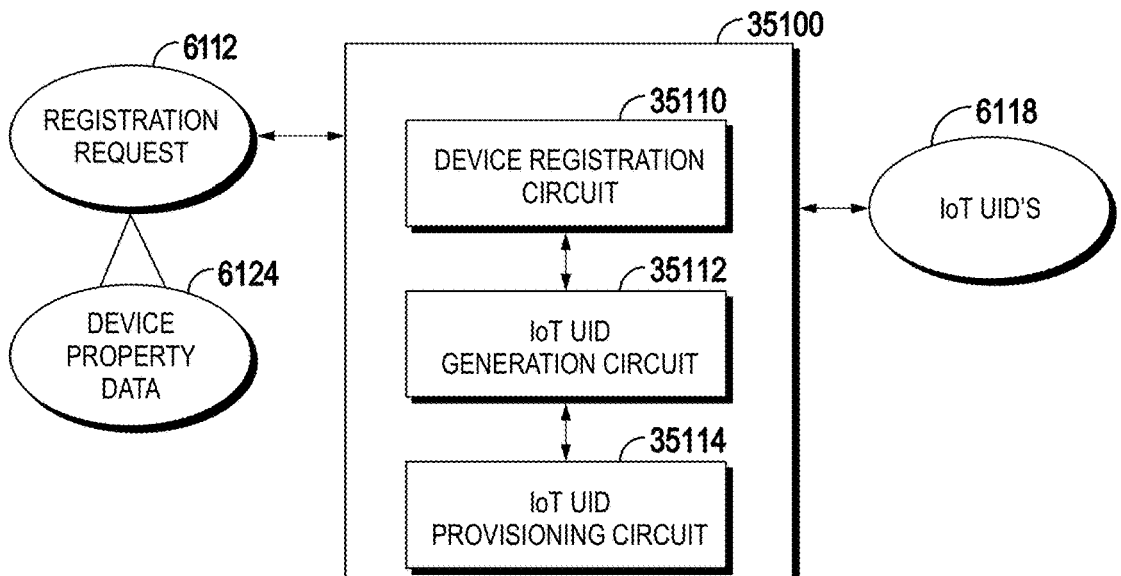
FIG. 35 is a schematic diagram of an apparatus for provisioning embedded IoT UIDs in Brownfield devices, in accordance with an embodiment of the current disclosure.

Illustrated in FIG. 35 is another apparatus 35100 for provisioning embedded IoT UIDs in Brownfield devices, in accordance with an embodiment of the current disclosure. The apparatus 35100 may form part of the database 1128 (FIG. 1), the registry 1129 (FIG. 1), the IoT device registrar server 1126 (FIG. 1), and/or any other computing device described herein. The apparatus 35100 may include a device registration circuit 35110 structured to interpret a registration request 6112, which may map device property data 6124 to one or more Brownfield devices. The apparatus 35100 may further include an IoT UID generation circuit 35112 structured to generate an IoT UID 6118 for each of the one or more Brownfield devices based at least in part on the registration request 6112. The apparatus 35100 may further include an IoT UID provisioning circuit 35114 structured to transmit the IoT UIDs 6118.

Figure 36:
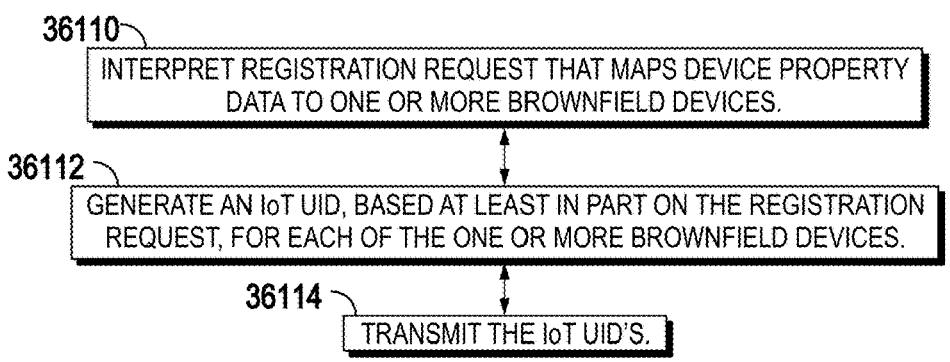
FIG. 36 is a flowchart depicting a method for provisioning embedded IoT UIDs in Brownfield devices, in accordance with an embodiment of the current disclosure.

Shown in FIG. 36 is another method 36100 for provisioning embedded IoT UIDs in Brownfield devices, in accordance with embodiments of the current disclosure. The method 36100 may be performed by the apparatus 35100 (FIG. 35) and/or any other computing device disclosed herein. The method 36100 may include interpreting, via a device registration request circuit, a registration request that maps device property data to one or more Brownfield devices 36110. The method 36100 may further include generating, via an IoT UID generation circuit, based at least in part on the registration request, an IoT UID for each of the one or more Brownfield devices 36112. The method 36100 may further include transmitting, via an IoT UID provisioning circuit, the IoT UIDs 36114.

Figure 37:
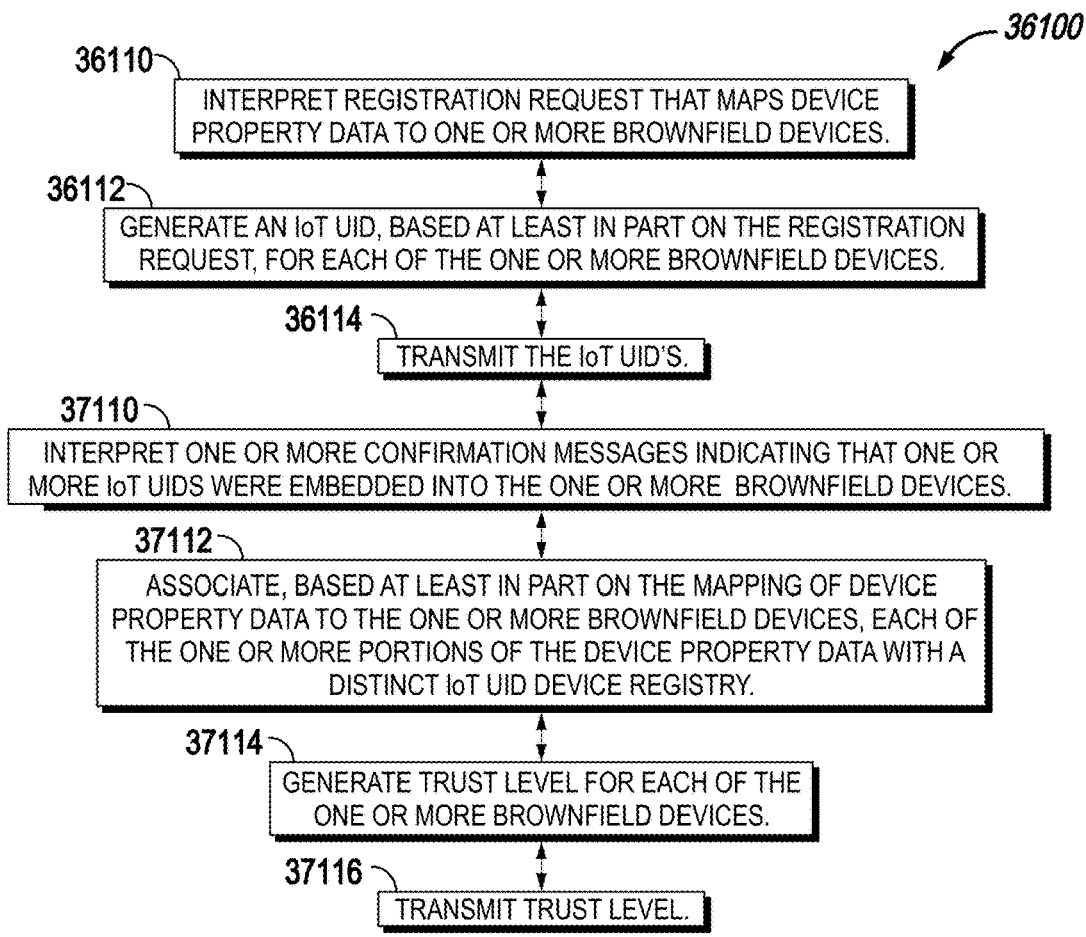
FIG. 37 is another flowchart depicting a method for provisioning embedded IoT UIDs in Brownfield devices, in accordance with an embodiment of the current disclosure.

As illustrated in FIG. 37, the method 36100 may further include interpreting one or more confirmation messages indicating that the one or more IoT UIDs were embedded into the one or more Brownfield devices 37110. The method 36100 may further include associating, based at least in part on the mapping of device property data to the one or more Brownfield devices, each of the one or more portions of the device property data with a distinct IoT UID of one or more IoT UIDs in an IoT UID device registry 37112. The method 36100 may further include generating a trust level value for each of the one or more Brownfield devices 37114, and transmitting the trust level value 37116.

Figure 38:
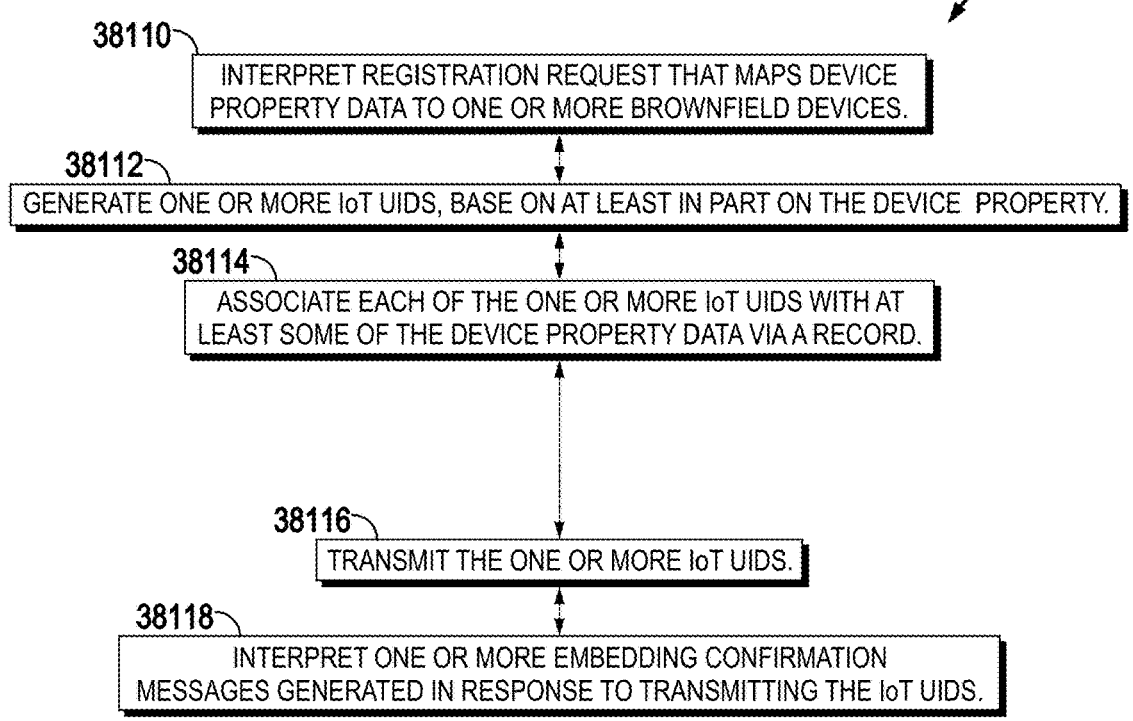
FIG. 38 is another flowchart depicting a method for provisioning embedded IoT UIDs in Brownfield devices, in accordance with an embodiment of the current disclosure.

Illustrated in FIG. 38 is another method 38100 for provisioning embedded IoT UIDs in Brownfield devices. The method 38100 includes interpreting, via a request processing circuit, a registration request that includes device property data for one or more Brownfield devices 38110. The method 38100 further includes generating, via an IoT UID generation circuit, one or more IoT UIDs, based at least in part on the device property data 38112. The method 38100 may further include associating, via a record management circuit, each of the one or more IoT UIDs with at least some of the device property data via a record 38114. In embodiments, the method 38100 may further include transmitting, via an IoT UID provisioning circuit, the one or more IoT UIDs 38116, and interpreting, via a registration confirmation circuit, one or more embedding confirmation messages generated in response to transmitting the IoT UIDs 38118. The one or more embedding confirmation messages may indicate embedding of the one or more IoT UIDs into the one or more Brownfield devices.

Figure 39:
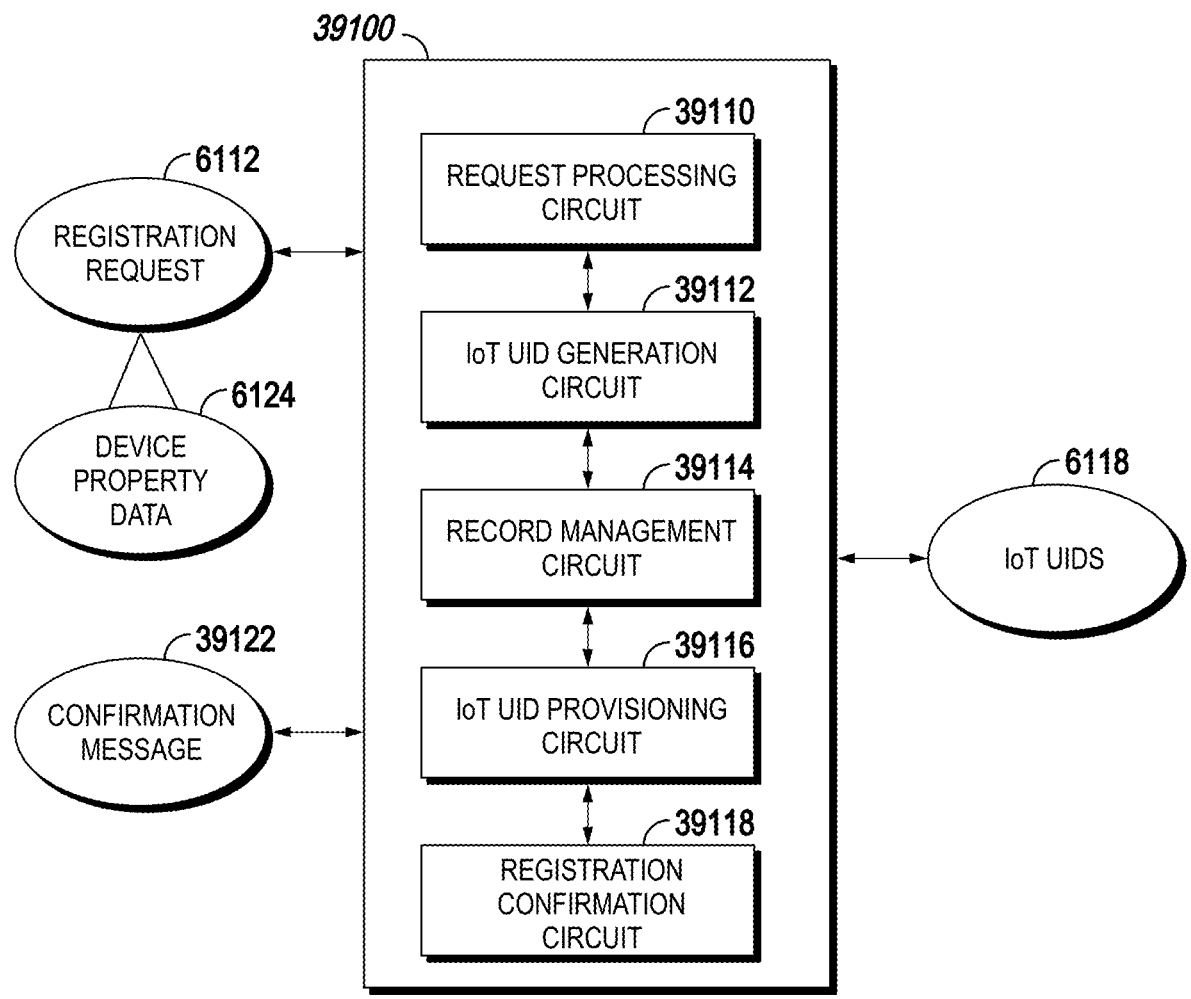
FIG. 39 is another schematic diagram of an apparatus for provisioning embedded IoT UIDs in Brownfield devices, in accordance with an embodiment of the current disclosure.

Referring to FIG. 39, another apparatus 39100 for provisioning IoT UIDs in Brownfield devices is shown. The apparatus 39100 may form part of the IoT registration server 1126 (FIG. 1), the database 1128 (FIG. 1), another portion of the registry 1129, and/or any other computing device described herein. The apparatus 39100 may include a request processing circuit 39110, an IoT UID generation circuit 39112, a record management circuit 39114, an IoT UID provisioning circuit 39116, and a registration confirmation circuit 39118. The request processing circuit 39110 may be structured to interpret a registration request 6112 that includes device property data 6124 for one or more Brownfield devices. The IoT UID generation circuit 39112 may be structured to generate one or more IoT UIDs 6118, based at least in part on the device property data. The record management circuit 39114 may be structured to associate each of the one or more IoT UIDs 6118 with at least some of the device property data 6124 via a record 6110. The IoT UID provisioning circuit 39116 may be structured to transmit the one or more IoT UIDs 6118. The registration confirmation circuit 39118 may be structured to interpret one or more embedding confirmation messages 39122 generated in response to transmitting the IoT UIDs 6118. The one or more embedding confirmation messages 39122 may indicate the one or more IoT UIDs 6118 were embedded into the one or more Brownfield devices.

An additional non-limiting use case for the methods and/or apparatuses disclosed herein for provisioning IoT UIDs in Brownfield devices includes registering sensors on a resource distribution system, e.g., a water, gas/oil, and/or electricity, distribution system, with an IoT UID device registry without an administrator to physical contact and/or visit each of the sensors at their operating location. Another non-limiting use case for the methods and/or apparatuses disclosed herein for provisioning IoT UIDs in Brownfield devices includes registering satellites already in orbit with an IoT UID device registry. Another non-limiting use case for the methods and/or apparatuses disclosed herein for provisioning IoT UIDs in Brownfield devices includes registering vehicles in a fleet with an IoT UID device registry. Another non-limiting use case for the methods and/or apparatuses disclosed herein for provisioning IoT UIDs in Brownfield devices includes registering pallet tracking device already in the field, e.g., attached to pallets, with an IoT UID device registry.

Referring again to FIGS. 1 and 2, embodiments of the current disclosure may provide for the embedding of an Internet of Things Universal Identifier (IoT UID) 6118 (FIG. 6) into Greenfield devices, e.g., 1116, 1118, 1122, and/or 1124. The process of embedding, e.g., installing, IoT UIDs into Greenfield devices may be presale or post-sale. Presale embedding of an IoT UID 6118 into a Greenfield device may occur prior to release of the Greenfield device from a manufacturer, for example, an original equipment manufacturer (OEM), for use by end users. Post-sale embedding of an IoT UID 6118 may occur when an end user turns the Greenfield device on after purchasing from the manufacturer. A Greenfield device, as disclosed herein, may be a device that has yet to be provisioned and/or yet to be used for its intended purpose, e.g., a newly manufactured device and/or a device that has not yet left a manufacturer, e.g., manufacturer 1134 (FIG. 1) (even though the device may have been purchased), and/or a device that leaves the manufacturer after having been associated with an IoT UID. In embodiments, a Greenfield device may be a device obtained by an end user, e.g., 1136, prior to be being provisioned and/or used by another end user, e.g., a new device purchased from a manufacturer and/or a distributor.

As a non-limiting example, an enterprise user 1136 (FIG. 1) may purchase brand new laptops 1122 and 1124 from a manufacturer 1134 (FIG. 1). Prior to the purchase, the manufacturer 1134 may have provided device property data to an IoT device registrar 1130 (FIG. 1) for the new laptops 1122 and 1124, and the IoT device registrar 1130 may have registered the laptops 1122 and 1124 with the registry 1129 (FIG. 1) as disclosed herein. In embodiments, the records 1131 corresponding to the laptops 1122 and 1124 may indicate that the manufacturer 1134 is the manufacturer of the laptops 1122 and 1124 and/or the owner of the laptops 1122 and 1124. Upon executing the sale of the laptops 1122 and 1124 to the end user 1136, the manufacturer may transmit an event message 6116 (FIG. 6) to the registrar 1130, which updates the records 1131 corresponding to the laptops 1122 and 1124 to reflect that the end user 1136 is now the owner of these devices but has yet to claim them. Upon taking possession of the laptops 1122 and 1124 after the sale, the user 1136 may send registration requests 6112 (FIG. 6) to the registrar 1130 to register/claim the laptops 1122 and 1124 so that the corresponding records 1131 reflect that the end user 1136 is now the owner and that the devices have been claimed. The registrar 1130 may then provide the IoT UIDs 6118 to the end user 1136, who may embed them on memory devices in the laptops 1122 and 1124.

In another non-limiting example, the registrar 1130 may provide the IoT UIDs to the manufacturer 1134 prior to the sale of the laptops 1122 and 1124 to the end user, wherein the manufacturer 1134 is the entity who embeds the IoT UIDs 6118 into the laptops 1122 and 1124 prior to sale of and/or transfer of possession of the laptops 1122 and/or 1124 to the end user 1136.

In another non-limiting example, the end user 1136 may be the first entity to provide the device property data 6124 corresponding to the laptops 1122 and 1124 to the registrar 1130, after purchasing and taking possession of the devices, to register them in the name of the end user 1136. In other words, in embodiments, a manufacturer need not interact with the registrar 1130 to embed IoT UIDs 6118 into devices.

In another non-limiting presale example, a manufacturer 1134 may send device property data 6132 (FIG. 6) for newly-minted Greenfield devices (and/or modules) to a device management platform, that may then relay the device property data to an IoT device registrar 1130 (FIG. 1). The registrar 1130 may then generate and send the IoT UIDs 6118 to the device management platform, which then provides them to the manufacturer 1134 for installation into the Greenfield devices before they are released to end users. The IoT UIDs 6118 are stored in a database 1128 in an IoT device registry 1129 for the IoT device registrar 1130 in association with the device property data 6120 so that the IoT UIDs 6118 are associated in the registry 1129 with the devices.

As explained in greater detail herein, embodiments of the current disclosure may provide for bootstrapping the IoT UID registration process, which may occur presale or post-sale. In a non-limiting example of the bootstrap, a manufacturer 1134, e.g., a presale embedding, or an end user, e.g., post-sale embedding, boots up a newly-minted Greenfield device, which then proceeds to contact the device management platform to get an IoT UID 6118 from the IoT device registrar 1130. Embodiments of the current disclosure may provide for batch registration of newly-minted Greenfield devices. Embodiments of the current disclosure may provide for a device to be "claimed" upon activation by an end user before registration can proceed, which may include updating ownership information stored in the registry 1129, updating a chain of title stored in the registry, etc.

Figure 40:
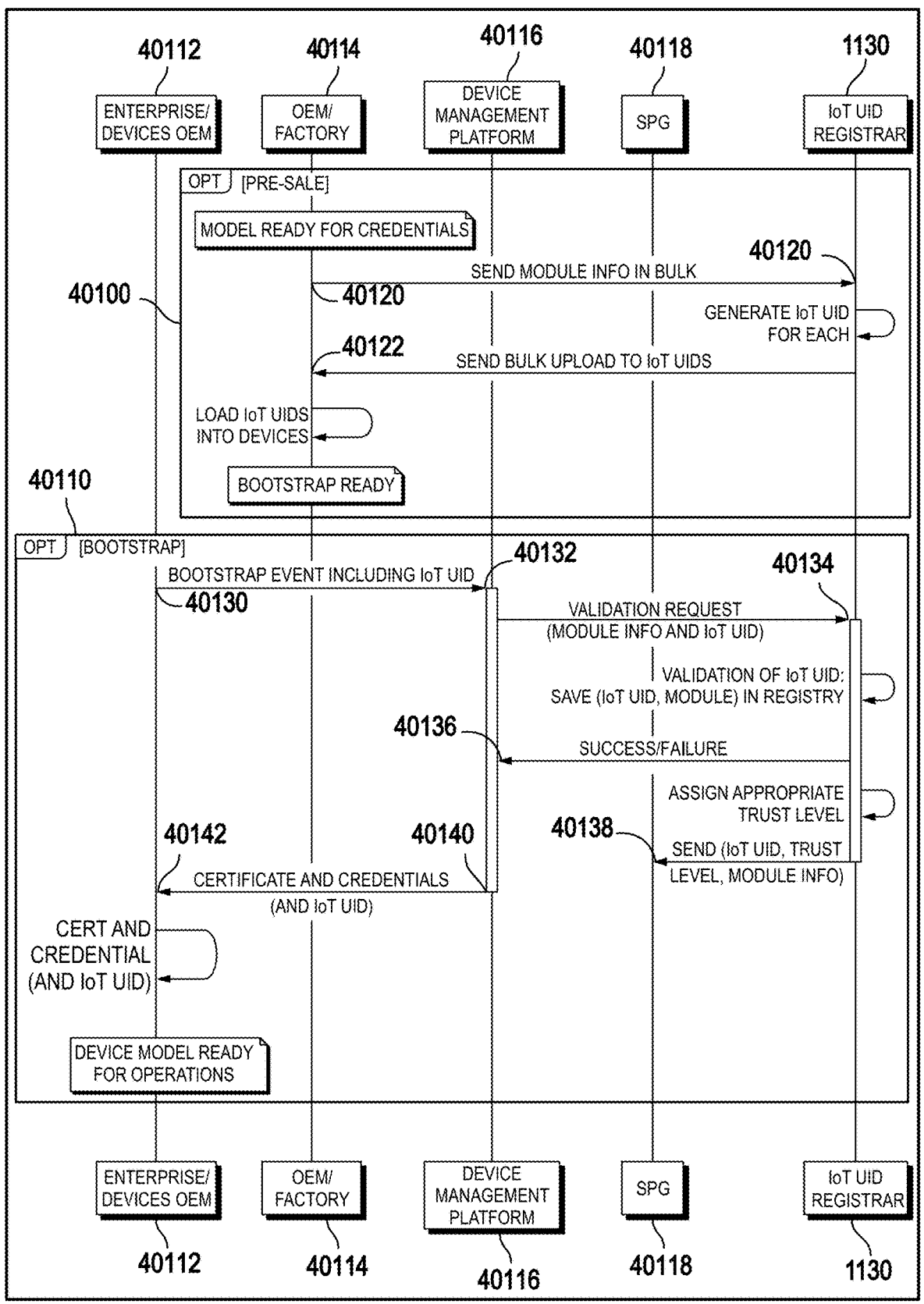
FIG. 40 is a process flow diagram depicting process flows for embedding IoT UIDs into Greenfield devices, in accordance with embodiments of the current disclosure.

Accordingly, illustrated in FIG. 40 is a process flow diagram depicting two process flows 40100 and 40110 for the embedding of IoT UIDs 6118 into Greenfield devices involving the exchange of data between: a registering party, e.g., an enterprise user/device OEM 40112, a manufacturer 40114, a device management platform 40116; a single pane of glass (SPG) 40118; and an IoT device registrar 1130.

Flow 40100 concerns a scenario in which the device manufacturer 40114 is the entity embedding the IoT UIDs 6118 into Greenfield devices, which, in embodiments, may be prior to a sale of the Greenfield devices to an Enterprise/Device OEM 40112. Accordingly, at 40120, the manufacturer 40114 may generate and transmit device property data of one or more manufactured Greenfield device to the IoT device registrar 1130. At 40120, the IoT device registrar 1130 may then generate an IoT UID 6118 for each of the one or more Greenfield devices corresponding to the received device property data and transmit the IoT UIDs back to the manufacturer 40114. At 40122, the manufacturer 40114 may load/install/embed the IoT UIDs received from the registrar 1130 into the one or more Greenfield devices. In embodiments, the registrar 1130 may generate records in the registry for the Greenfield devices when the IoT UIDs 6118 are generated but indicate, in the records, that Greenfield devices are "unclaimed", e.g., that they have not been provisioned by their eventual first end users. In embodiments, the manufacturer 40114 may fully register the one or more Greenfield devices after receiving the IoT UIDs 6118 at 40122, such that the IoT device registrar 1130 records the manufacturer 40114 as the owner of the one or more Greenfield devices.

Flow 40110 concerns post-sale registration and/or claiming of the one or more Greenfield devices from flow 40100 upon a bootstrap event, e.g., turning a device on by a registering party 40112. Accordingly, at 40130 the registering party 40112 may turn on the one or more newly purchased and/or acquired Greenfield devices, which triggers a bootstrap event/process in each of the one or more Greenfield devices. In embodiments, the bootstrap process may cause each of the one or more Greenfield devices to transmit their embedded IoT UID 6118 and/or device property data to the device management platform 40116. At 40132, the device management platform 40116 receives the IoT UIDs 6118 and/or device property data and sends a registration request 6112 (FIG. 6) to the IoT device registrar 1130. In embodiments, the registration request 6112 may include the device property data and/or a request for the IoT device registrar 1130 to validate the IoT UIDs and corresponding Greenfield devices prior to completing registration of the one or more Greenfield devices in the name of the registering party 40112. At 40134, the IoT device registrar 1130 may validate that the device property data and corresponding IoT UIDs in the registration request 6112 based at least in part on the IoT UID 6118 to device property data associations in the records created by the IoT device registrar 1130 in flow 40100 at 4120. In embodiments, credentials, e.g., cryptographic keys, such as PKI keys, may be used to validate that a Greenfield device claiming to be associated with a particular IoT UID at 40134 is the same device made by the manufacturer 40114. Upon validating the device property data and corresponding IoT UIDs in the registration request, the IoT device registrar 1130 may update the corresponding records for the one or more Greenfield devices to reflect that the devices have been claimed and are owned by the registering party 40112. In embodiments, the IoT device registrar 1130 may then generate trust and/or risk scores for each of the one or more Greenfield devices, which may be stored in the corresponding records in the registry and/or transmitted back to the device management platform 40116 in a device status value/message 6114 that indicates registration of the one or more Greenfield devices is complete. In embodiments, the device status value/message 6114 may be received by the device management platform at 40136 and/or by the SPG 40118 at 40138. At 40140, the device management platform 40116 may transmit certificates, other credentials, and/or the IoT UIDs 6118 to the registering entity 40112 and/or load/store/embed the IoT UIDs 6118 into the one or more Greenfield devices at 40142. In embodiments, the IoT device registrar 1130 may assign a Greenfield device a higher trust level/score (or a lower risk level/score) than a corresponding Brownfield device.

Figure 41:
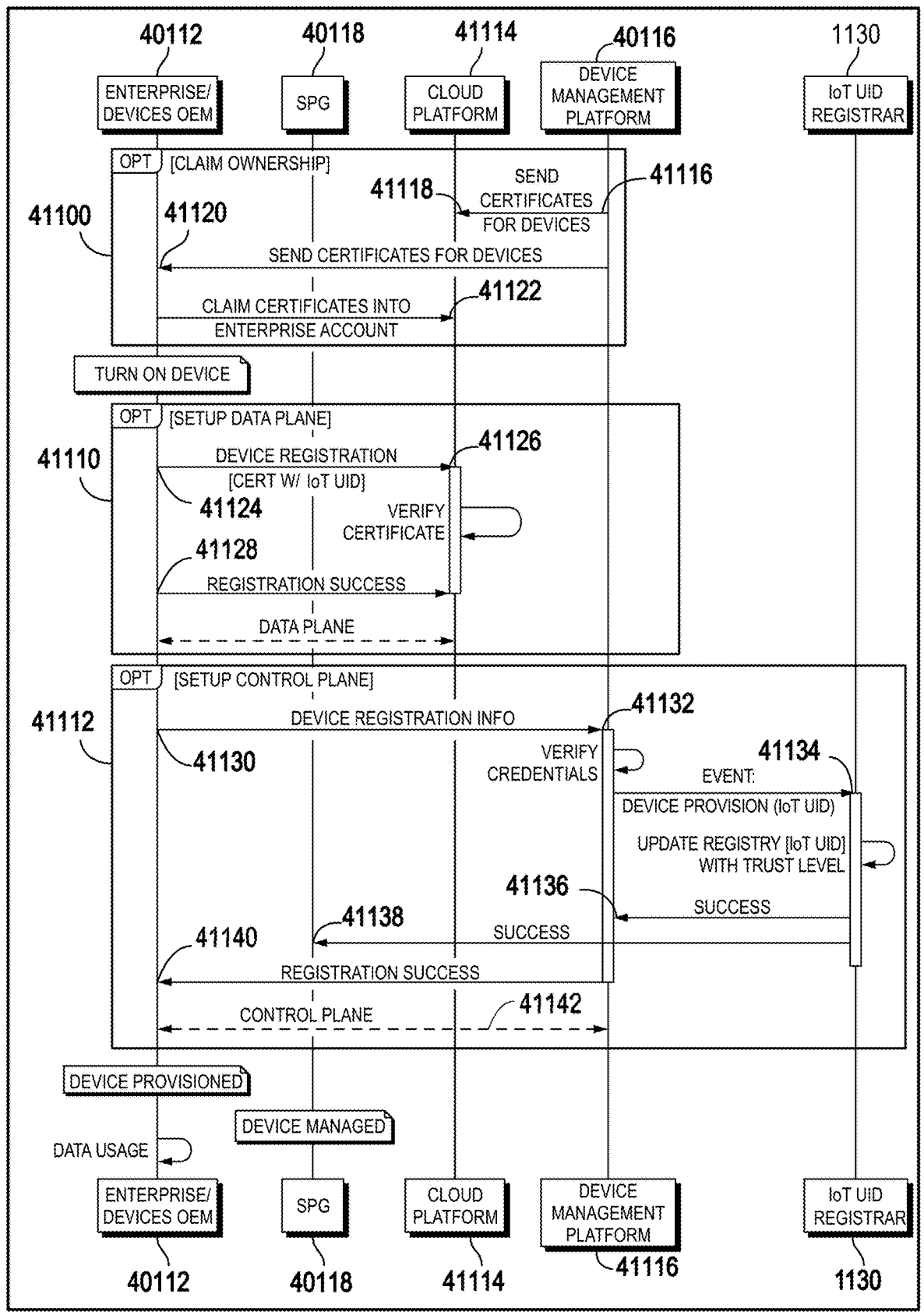
FIG. 41 is a process flow diagram for provisioning Greenfield devices having embedded IoT UIDs with a cloud platform, in accordance with an embodiment of the current disclosure.

Illustrated in FIG. 41 are three flows 41100, 41110, and 41112 for provisioning one or more Greenfield devices associated with a cloud platform 41114, as described herein, for use with the end user 40112. In embodiments, the one or more Greenfield devices may have previously been embedded with IoT UIDs 6118, as disclosed herein. Flow 41100 depicts the installation of certificates from a device management platform 40116 into the one or more Greenfield devices. At 41116, the device management platform 40116 may transmit certificates for the one or more Greenfield devices to the cloud management platform 41114 (received at 41118) and/or the registering entity 40112 (which may be received at 41120 via the one or more Greenfield devices). The registering entity 40112 may then claim the certificates from the cloud platform at 41122. Flow 41110 depicts the setup of the data plane, as disclosed herein, for the one or more Greenfield devices. At 41124, the registering entity 40112 may transmit the certificates and IoT UID 6118 to the cloud platform 41114 for verification at 41126 and registration (with the cloud platform 41114). Upon successful registration of the one or more Greenfield devices, the cloud platform 41114 may transmit a registration confirmation message to the registering entity 40112 (received at 41128). Flow 41112 depicts the setup of the control plane, as disclosed herein, for the one or more Greenfield devices. At 41130, the registering entity 40112 transmits its cloud platform registration information/data/credentials to the device management platform 40116 which verifies the same at 41132. Upon successful verification, the device management platform 40116 may then transmit one or more device event messages 6116 (FIG. 6) to the IoT device registrar 1130 indicating that the one or more Greenfield devices have registered with the cloud platform 41114 and/or device management platform 40116 and/or are claiming their IoT UIDs 6118 with the registrar 1130. At 41134, the registrar 1130 may update the corresponding records in the registry 1129 to reflect the one or more Greenfield devices are active and/or have claimed their IoT UIDs 6118. The registrar 1130 may then generate one or more trust levels/scores (or risk levels/scores) for the one or more Greenfield devices and transmit the same, and/or with a successful claiming confirmation message, to the device management platform 40116 (received at 41136) and/or to the SPG 40118 (received at 41138). The device management platform 40116 may then relay the one or more trust levels/scores (or risk levels/scores) for the one or more Greenfield devices to the registering entity 40112 (which may be received by the one or more Greenfield devices at 41140). In embodiments, the conclusion of flow 41112 may enable the data planes of the one or more Greenfield devices for control via the device management platform 40116, as shown by dashed arrow 41142.

Figure 42:
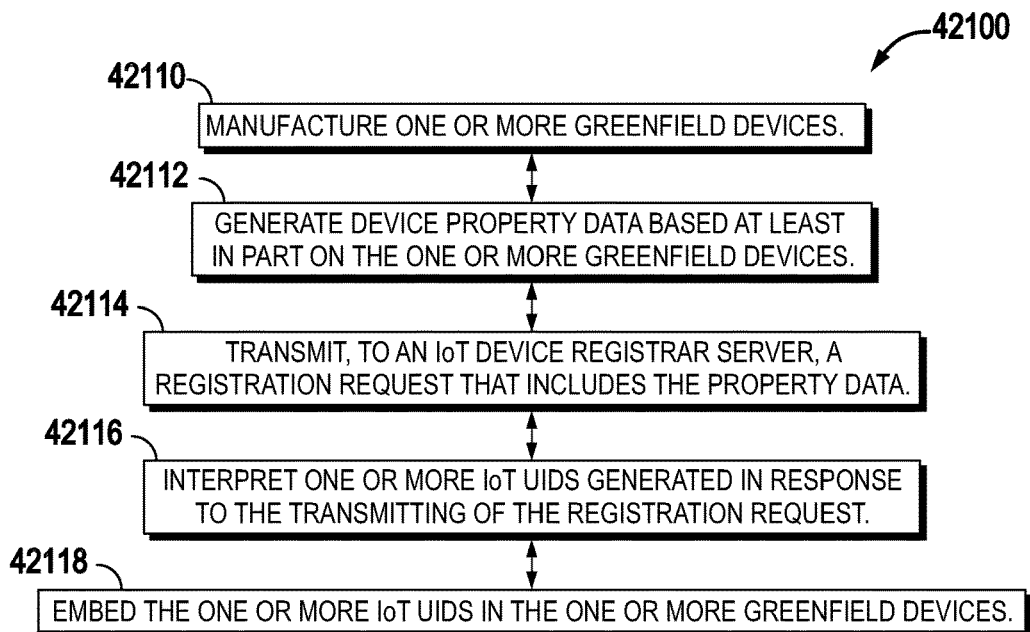
FIG. 42 is a flowchart depicting a method for embedding IoT UIDs into one or more Greenfield devices, in accordance with an embodiment of the current disclosure.

Turning to FIG. 42, a method 42100 for embedding one or more Greenfield devices with an IoT UID 6118 is shown. The method 42100 may be performed by a manufacturer 1134, e.g., a module manufacturer and/or a manufacturer of a device that includes one or more modules. One or more processes of the method 42100 may be facilitated by an SPG, as disclosed herein. The method 42100 includes manufacturing one or more Greenfield devices 42110. Manufacturing may include fabricating and/or assembling one or more components that form a module and/or assembling one or more modules into a device. The method 42100 further includes generating device property data based at based at least in part on the one or more Greenfield devices 42112. For example, the device property data of the one or more Greenfield devices may be entered into and/or collected by a device management platform, as disclosed herein. The method 42100 further includes transmitting, to an IoT device registrar server, a registration request that includes the device property data 42114. The method 42100 further includes interpreting one or more IoT UIDs generated in response to the transmitting of the registration request 42116. The method 42100 further includes embedding the one or more IoT UIDs in the one or more Greenfield devices 42118. In embodiments, embedding the one or more IoT UIDs in the one or more Greenfield devices 42118 may occur prior to a sale of the one or more Greenfield devices. In embodiments, embedding the one or more IoT UIDs in the one or more Greenfield devices 42118 may occur after a sale of the one or more Greenfield devices.

Figure 43:
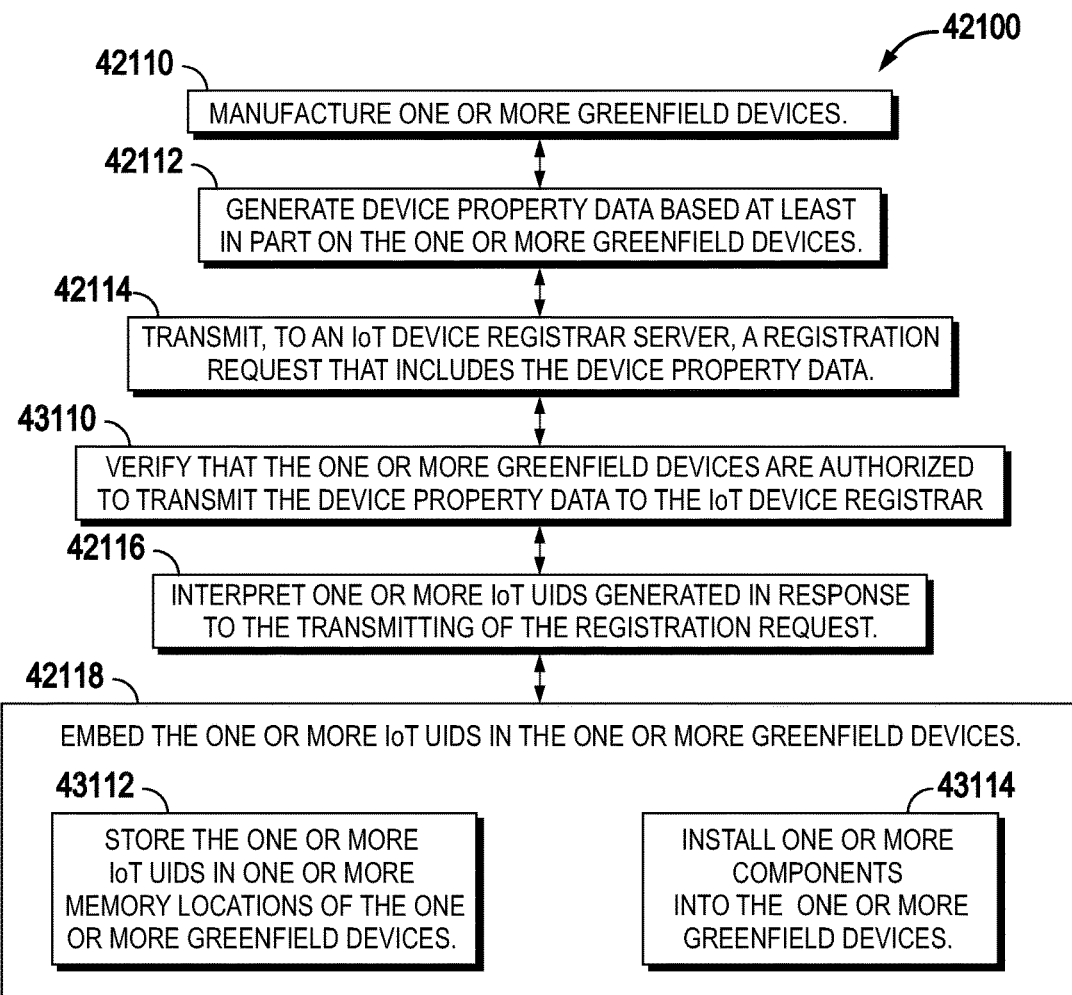
FIG. 43 is another flowchart depicting a method for embedding IoT UIDs into one or more Greenfield devices, in accordance with an embodiment of the current disclosure.

As shown in FIG. 43, the method 42100 may further include verifying that the one or more Greenfield devices are authorized to transmit the device property data to the IoT device registrar 43110. In embodiments, embedding the one or more IoT UIDs 42118 may include storing the one or more IoT UIDs in one or more memory locations of the one or more Greenfield devices 43112. For example, a device management platform may be used to push/install the IoT UIDs to the Greenfield devices, as disclosed herein. In embodiments, embedding the one or more IoT UIDs 42118 may include installing one or more components into the one or more Greenfield devices 43114. In embodiments, the one or more components may include the one or more IoT UIDs. For example, such components may include memory chips having IoT UIDs burned and/or programmed into them. In embodiments, the entire method 42100 may be performed prior to a sale of the one or more Greenfield devices.

Figure 44:
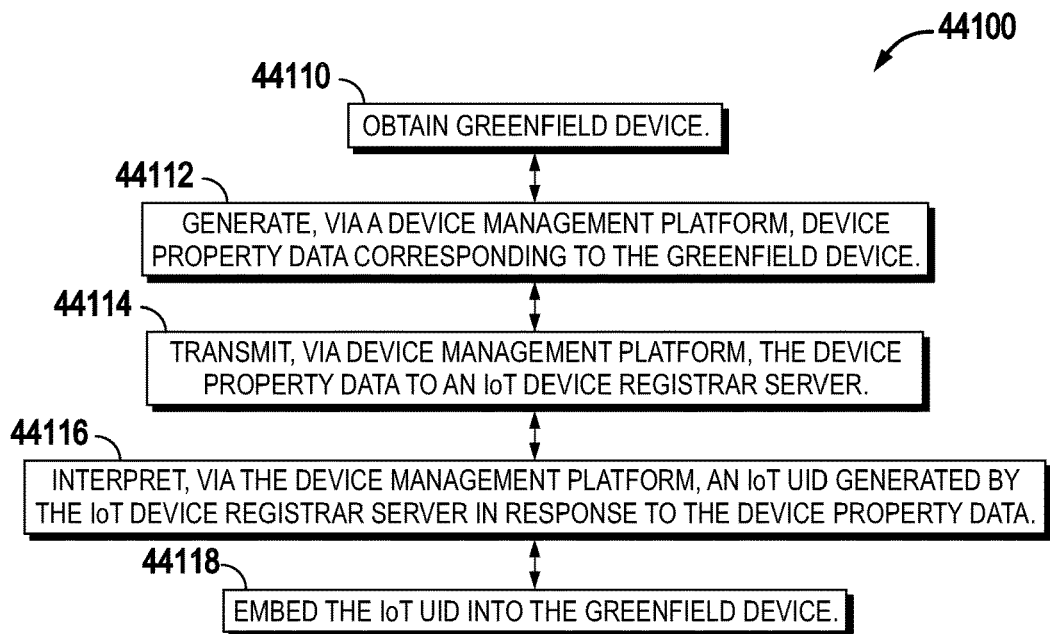
FIG. 44 is a flowchart depicting a method for embedding an IoT UID into a Greenfield device, in accordance with an embodiment of the current disclosure.

Illustrated in FIG. 44 is another method 44100 for embedding an IoT UID into a Greenfield device. The method 44100 may be performed by a manufacturer 1134, an end user 1136, and/or a third party 1138. The method 44100 includes obtaining a Greenfield device 44110, and generating, via a device management platform, device property data corresponding to the Greenfield device 44110. Obtaining a Greenfield device 44110 may include receiving, by a first manufacturer, a device and/or module from a second manufacturer. Obtaining a Greenfield device 44110 may include receiving, by a distributor, a device and/or module from another entity, e.g., a manufacturer and/or another distributor. Obtaining a Greenfield device 44110 may include receiving, by an end user, a device and/or module from another entity, e.g., a distributor and/or a manufacturer. The method 44100 further includes transmitting, via the device management platform, the device property data to an IoT device registrar server 44114. The method 44100 further includes interpreting, via the device management platform, an IoT UID generated by the IoT device registrar server in response to the device property data 44116. The method 44100 further includes embedding the IoT UID into the Greenfield device 44118. In embodiments, at least one of generating the device property data 44112 or transmitting the device property data 44114 forms part of a bootstrapping process, e.g., a bootstrap process initiated by the Greenfield device.

Figure 45:
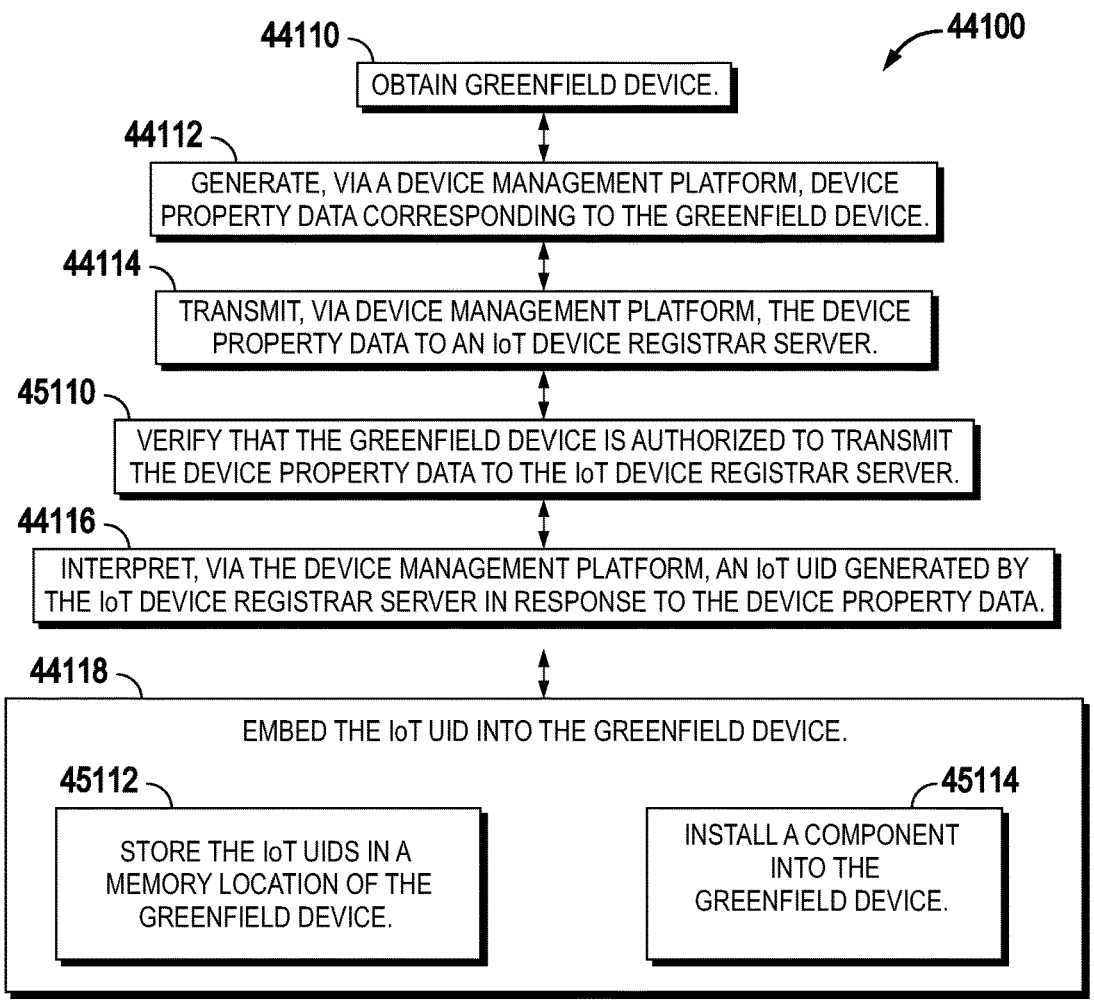
FIG. 45 is another flowchart depicting a method for embedding an IoT UID into a Greenfield device, in accordance with an embodiment of the current disclosure.

As shown in FIG. 45, in embodiments, the method 44100 further includes verifying that the Greenfield device is authorized to transmit the device property data to the IoT device registrar server 45110. Such authorization may include having ownership rights to the Greenfield device and the verification process may include transmitting encryption keys and/or certificates, as disclosed herein, which may be based at least in part on a public key infrastructure (PKI). In embodiments, at least one of generating the device property data 44112 or transmitting the device property data 44112 is performed via a device management platform, as disclosed herein. In embodiments, embedding the IoT UID into the Greenfield device 44118 may include storing the IoT UID into a memory location of the Greenfield device 45112. In embodiments, embedding the IoT UID into the Greenfield device 44118 may include installing a component into the Greenfield device 45114. In embodiments, embedding the IoT UID into the Greenfield device 44118 may occur prior to a sale of the Greenfield device. In embodiments, embedding the IoT UID into the Greenfield device 44118 may occur after a sale of the Greenfield device.

Figure 46:
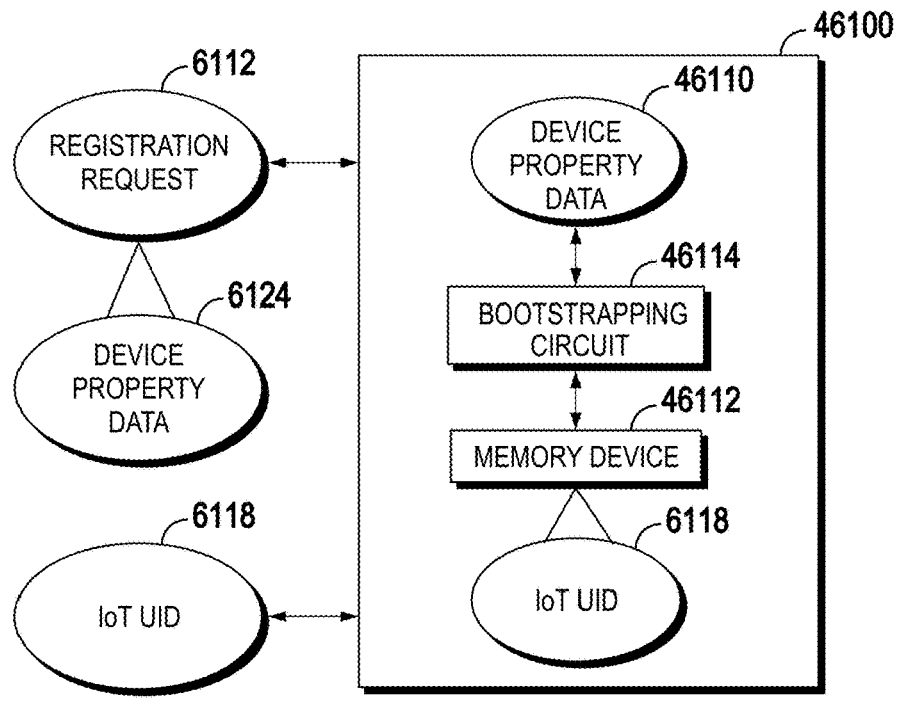
FIG. 46 is a schematic diagram of an apparatus that initiates a bootstrap process for registering with an IoT device registrar, in accordance with an embodiment of the current disclosure.

Referring to FIG. 46, an apparatus 46100 that initiates a bootstrap process for registering with an IoT device registrar 1130 (FIG. 1) is shown. In embodiments, the apparatus 46100 may be incorporated into a Greenfield device, e.g., 1116, 1118, 1122, and/or 1124. The apparatus 46100 includes device property data 46110, a memory device 46112, and a bootstrapping circuit 46114. The bootstrapping circuit 46114 is structured to initiate a request 6112, e.g., a registration request, for an IoT UID 6118 from an IoT UID device registrar server 1126 (FIG. 1). The request 6112 may include the device property data 6124 which may be the same and/or based in part on the device property data 46110. The bootstrapping circuit 46114 may be further structured to transmit the request 6112, e.g., to a device management platform for relay to the IoT device registrar, or directly to the IoT device registrar. The bootstrapping circuit 46114 may be further structured to interpret an IoT UID 6118 generated in response to the request 6112, e.g., sent by the IoT device registrar 1130 and/or the device management platform. The bootstrapping circuit 46114 may be further structured to store the IoT UID 6118 in the memory device 46112.

Figure 47:
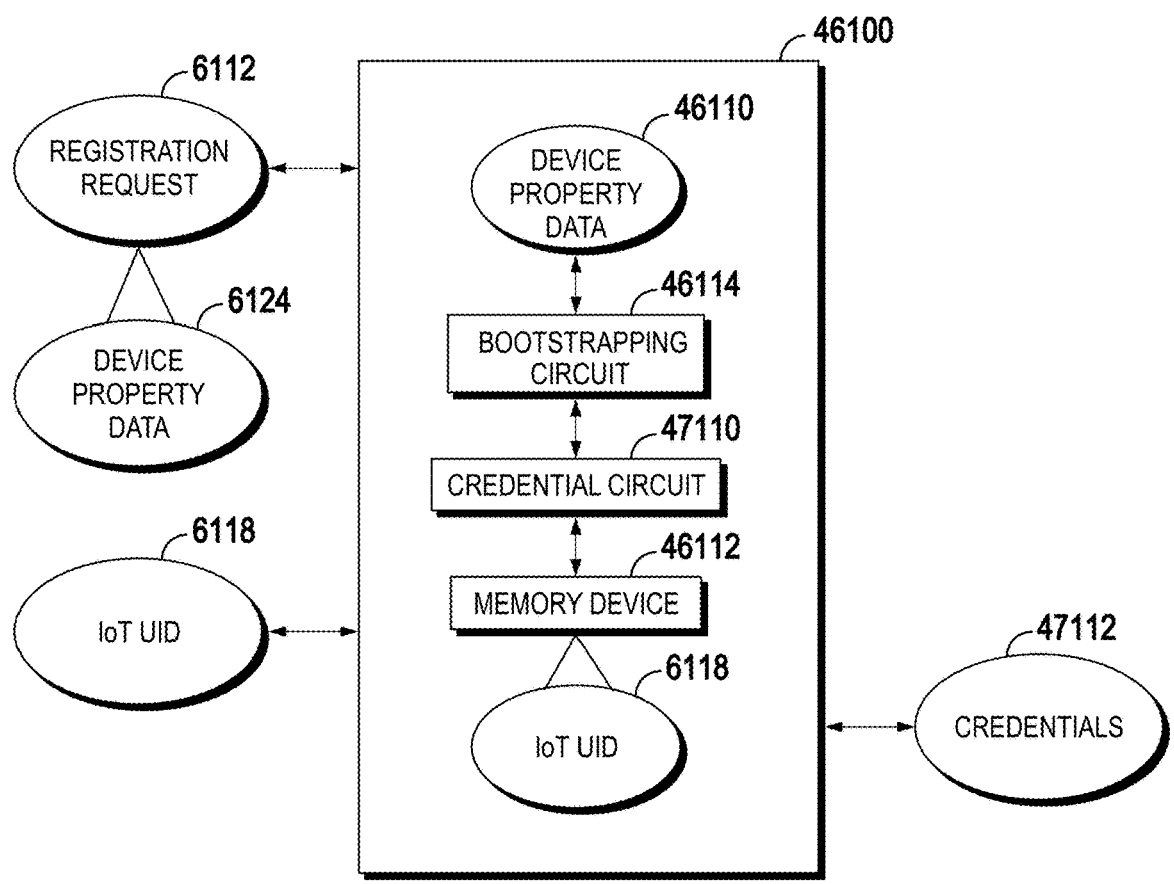
FIG. 47 is another schematic diagram of an apparatus that at initiates a bootstrap process for registering with an IoT device registrar, in accordance with an embodiment of the current disclosure.

As shown in FIG. 47, in embodiments, the apparatus 46100 may further include a credential circuit 47110 structured to transmit one or more credentials 47112 that demonstrate authorization to register the apparatus 46100 with an IoT device registrar 1130. In embodiments, the one or more credentials 47112 may be encryption keys, e.g., PKI keys, and/or other types of electronic credentials, as disclosed herein.

Figure 48:
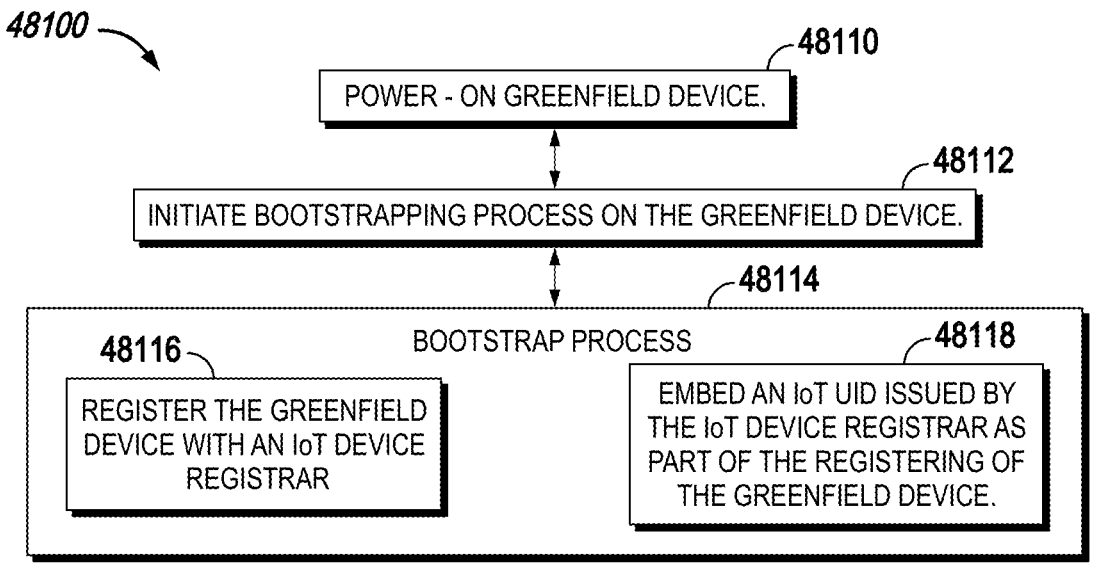
FIG. 48 is a flowchart depicting another method of embedding an IoT UID into a Greenfield device, in accordance with an embodiment of the current disclosure.

FIG. 48 depicts another method 48100 for embedding an IoT UID 6118 in a Greenfield device. The method 48100 may be performed via the apparatus 46100 and/or any other computing device disclosed herein. The method 48100 includes powering-on a Greenfield device 48110, and initiating a bootstrapping process (48114) on the Greenfield device 48112. The bootstrapping process 48114 may be structured to register the Greenfield device with an IoT device registrar 48116, as disclosed herein. The bootstrapping process 48114 may be structured to embed an IoT UID issued by the IoT device registrar as part of the registering of the Greenfield device 48118. In embodiments, powering-on the Greenfield device 48110 may occur prior to a first sale of the Greenfield device. In embodiments, powering-on the Greenfield device 48110 may be performed by a first owner of the Greenfield device.

Figure 49:
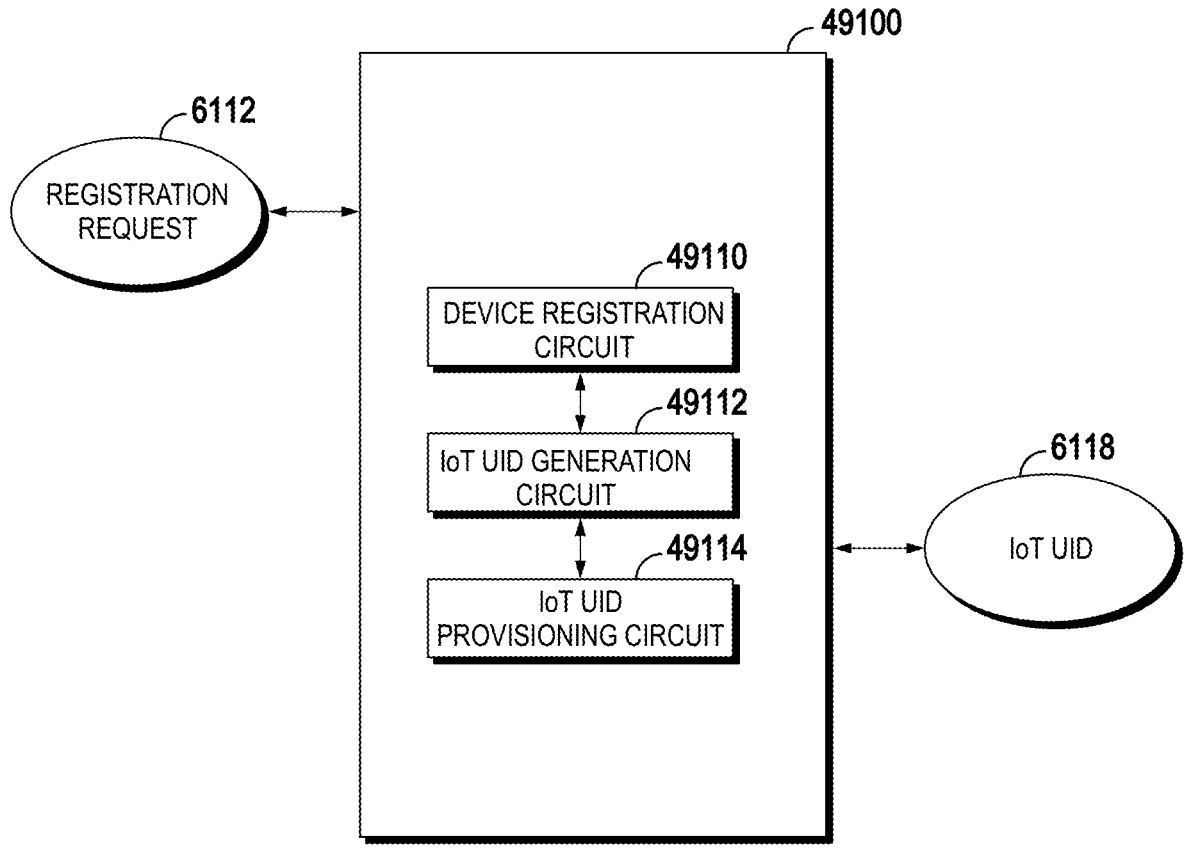
FIG. 49 is a schematic diagram of an apparatus for registering a Greenfield device with an IoT device registrar, in accordance with an embodiment of the current disclosure.

Illustrated in FIG. 49 is an apparatus 49100 for registering one or more Greenfield devices with an IoT device registrar 1130 (FIG. 1). The apparatus 49100 may form part of the IoT device registrar server 1126, the database 1128 (FIG. 1), and/or any other computing device disclosed herein. The apparatus 49100 may include a device registration circuit 49110, an IoT UID generation circuit 49112, and an IoT UID provisioning circuit 49114. The device registration circuit 49110 is structured to interpret a registration request 6112 that maps device property data to one or more Greenfield devices, as disclosed herein. The IoT UID generation circuit 49112 is structured to generate, based at least in part on the registration request 6112, an IoT UID 6118 for each of the one or more Greenfield devices. The IoT UID provisioning circuit 49114 is structured to transmit the IoT UID 6118 for each of the one or more Greenfield devices.

Figure 50:
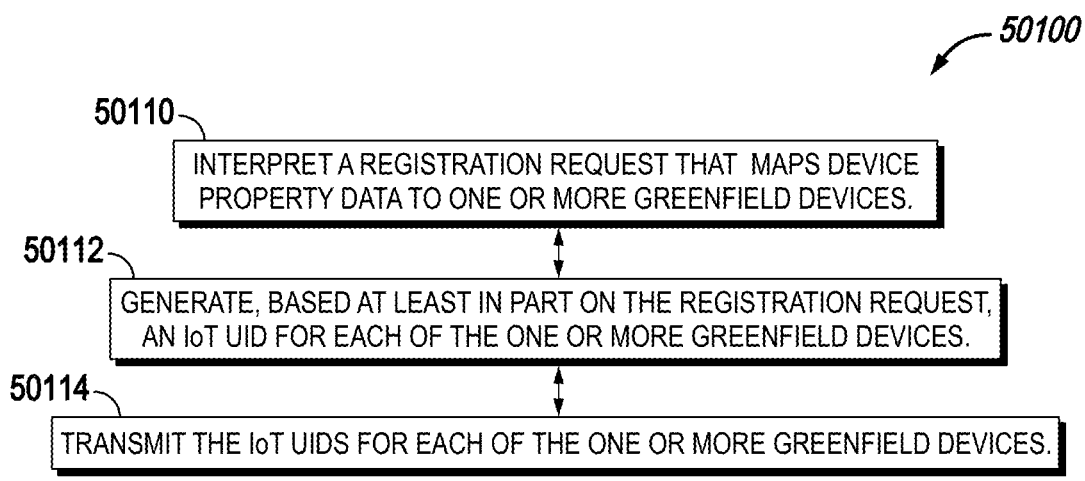
FIG. 50 is a flowchart depicting a method of registering a Greenfield device with an IoT device registrar, in accordance with an embodiment of the current disclosure.

Shown in FIG. 50 is a method 50100 for registering one or more Greenfield devices with an IoT device registrar. The method 50100 may be performed by the apparatus 49100 and/or any other computing device disclosed herein. The method 50100 includes interpreting a registration request that maps device property data to one or more Greenfield devices 50110. The method 50100 further includes generating, based at least in part on the registration request, an IoT UID for each of the one or more Greenfield devices 50112. The method further includes transmitting the IoT UIDs for each of the one or more Greenfield devices 50114.

In embodiments, an embedding tool may be used to embed IoT UIDs 6118 into devices (Greenfield and/or Brownfield). Non-limiting examples of embedding tools include USB cables and/or other type of communication cables, flash memory chips and/or writers, CDs, DVDs, network cards, and/or any type of device capable of loading data to an electronic device.

Referring again to FIGS. 1 and 2, embodiments of the current disclosure may provide for the registration and/or provisioning of Brownfield devices, e.g., 1112 and 1114 using virtual Internet of Things Universal Identifiers (IoT UIDs). A virtual IoT UID occurs where a Brownfield (or Greenfield) device does not include the IoT UID, e.g., a local copy of the IoT UID is not stored in the device.

As a non-limiting example, an enterprise user 1136 (FIG. 1) may purchase previously used cellular pressure sensors from a vendor for use in a natural gas pipeline, wherein the cellular pressure sensors were never registered with an IoT UID registrar, e.g., registrar 1130 (FIG. 1), as disclosed herein. The enterprise user 1136 may then wish to register the newly purchased cellular pressure sensors with the IoT UID registrar, e.g., registrar 1130, as Brownfield devices using the apparatuses and/or method disclosed herein. The used cellular pressure sensors, however, may not have the capacity and/or ability to store an IoT UID locally in their memory banks. As such, while the cellular pressure sensors may not be able to be registered with the IoT device registrar, the cellular pressure sensors may be registered with the IoT device registrar using a virtual IoT UID. The apparatuses and/or methods for registering Brownfield devices with virtual IoT UIDs 6118, as disclosed herein, may form part of the register and configure component 2116 (FIG. 2), to include the bulk upload & connect 2140, define device ID 2138, and/or configure relationships and permissions 2136 subcomponents.

Figure 51:
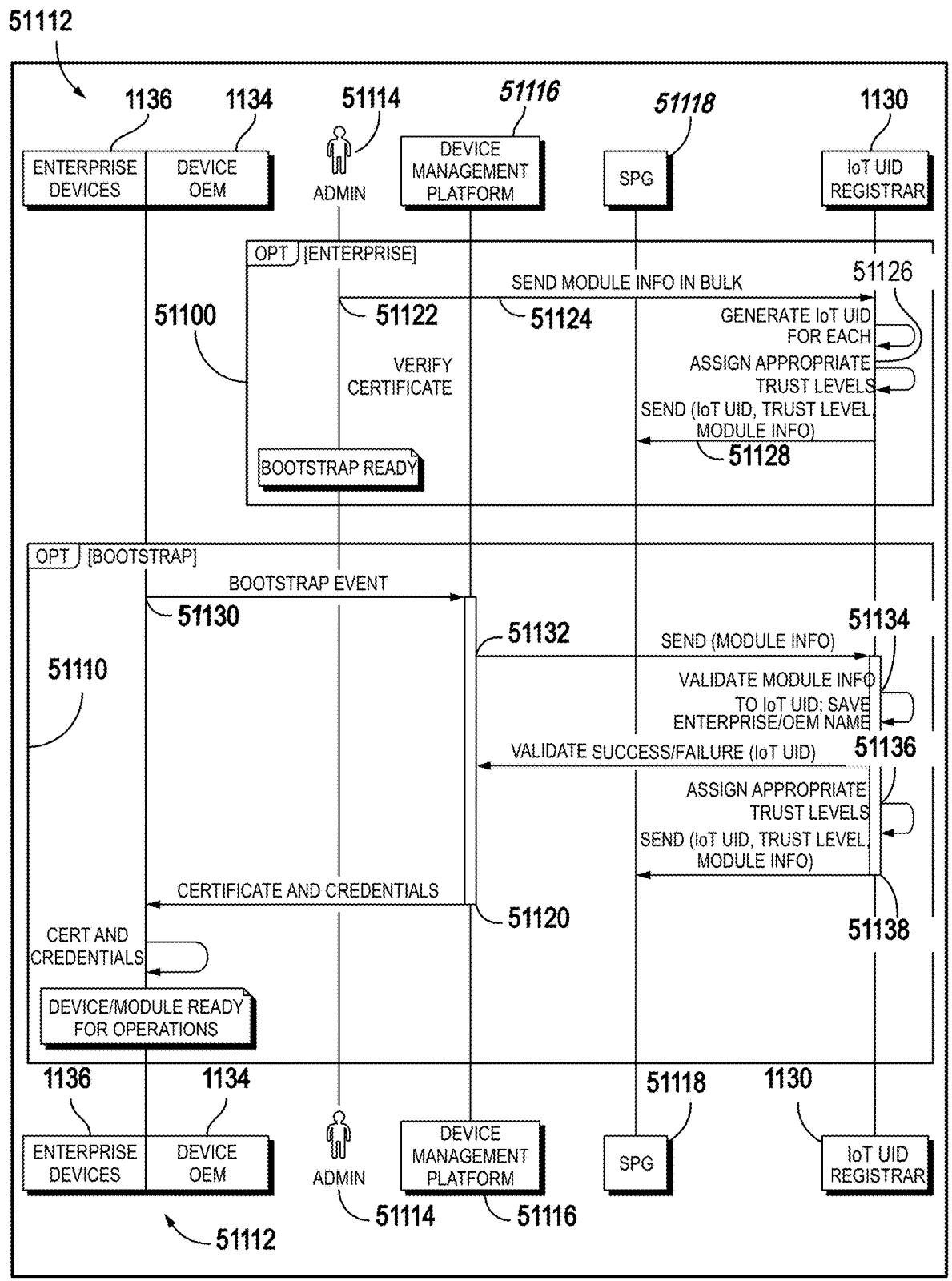
FIG. 51 is a process flow diagram depicting a process for registering one or more Brownfield devices via a virtual Internet of Things Universal Identifier (IoT UID), in accordance with an embodiment of the current disclosure.

Illustrated in FIG. 51 is a process flow diagram depicting two process flows 51100 and 51110 for embedding IoT UIDs into Brownfield devices involving the exchange of data between: a registering party 51112 wishing to register Brownfield devices, e.g., an enterprise end-user 1136 or a manufacturer 1134; an administrator 51114; a device management platform 51116; a single pane of glass (SPG) 51118; and an IoT device registrar 1130.

Flow 51100 concerns a scenario in which the registering party 51112 wants to register one or more Brownfield devices with virtual IoT UIDs prior to the Brownfield devices entering service within an operational network, e.g., the registering party 51112 may be an enterprise user provisioning the Brownfield devices for use in the enterprise user's corporate network. At 51122, the administrator 51114 may prepare the one or more Brownfield devices for registration with the IoT device registrar 1130. Such preparation may include updating the firmware and/or software of the one or more Brownfield devices, installing security credentials, e.g., public key infrastructure (PKI) keys and/or certificates, joining to a network domain, etc. The administrator 51114 may then collect/gather/generate device property data from the prepared one or more Brownfield devices, and then provide/transmit 51124 the gathered device property data to the IoT device registrar 1130. Upon receipt of the device property data, the IoT device registrar 1130 may generate 51126 IoT UIDs for each of the one or more Brownfield devices and associates each IoT UID with portions of the device property data corresponding to a particular Brownfield device. As disclosed herein, such associations may be accomplished via a record 1152 (FIG. 1), 6110 (FIG. 6) in a registry 1129 (FIG. 1). The IoT device registrar 1130 may also generate 51126 trust and/or risk level/indicator/score for each of the Brownfield devices being registered and store/update 51128 the corresponding records to reflect the trust and/or risk level/indicator/score. The IoT device registrar 1130 may then transmit 51128 the generated IoT UIDs, trust and/or risk levels/indicators/scores, and/or device property data for the Brownfield devices to the SPG 51118.

Flow 51110 concerns a scenario where a bootstrap event/process is initiated by the registering party 51112 on a Brownfield device and registers with the IoT device registrar 1130. At 51130, the registering party 51112 initiates the bootstrap event on the Brownfield device which transmits device property data 6124 to the device management platform 51116. The device management platform 51116 may then relay 51132 the device property data 6124 to the IoT device registrar 1130. At 51134, the IoT device registrar 1130 may validate that device property data, e.g., check that the registering party 51112 is authorized to register the Brownfield device using encryption certificates, as disclosed herein; and/or verify that the device property data matches any device property data for the Brownfield device previously submitted to the IoT device registrar 1130 by the administrator, such as in flow 51100. At 51136, the IoT device registrar 1130 may transmit a registration confirmation message to the device management platform 51116 with may include the IoT UID and/or a generated trust and/or risk indicator/level/score for the Brownfield device. At 51138, the IoT device registrar 1130 may transmit the IoT UID, device property data, and/or a trust and/or risk indicator/level/score for the Brownfield device to the SPG 51118. In embodiments, at 51120, the device management platform 51116 may transmit credentials to the Brownfield device.

Figure 52:
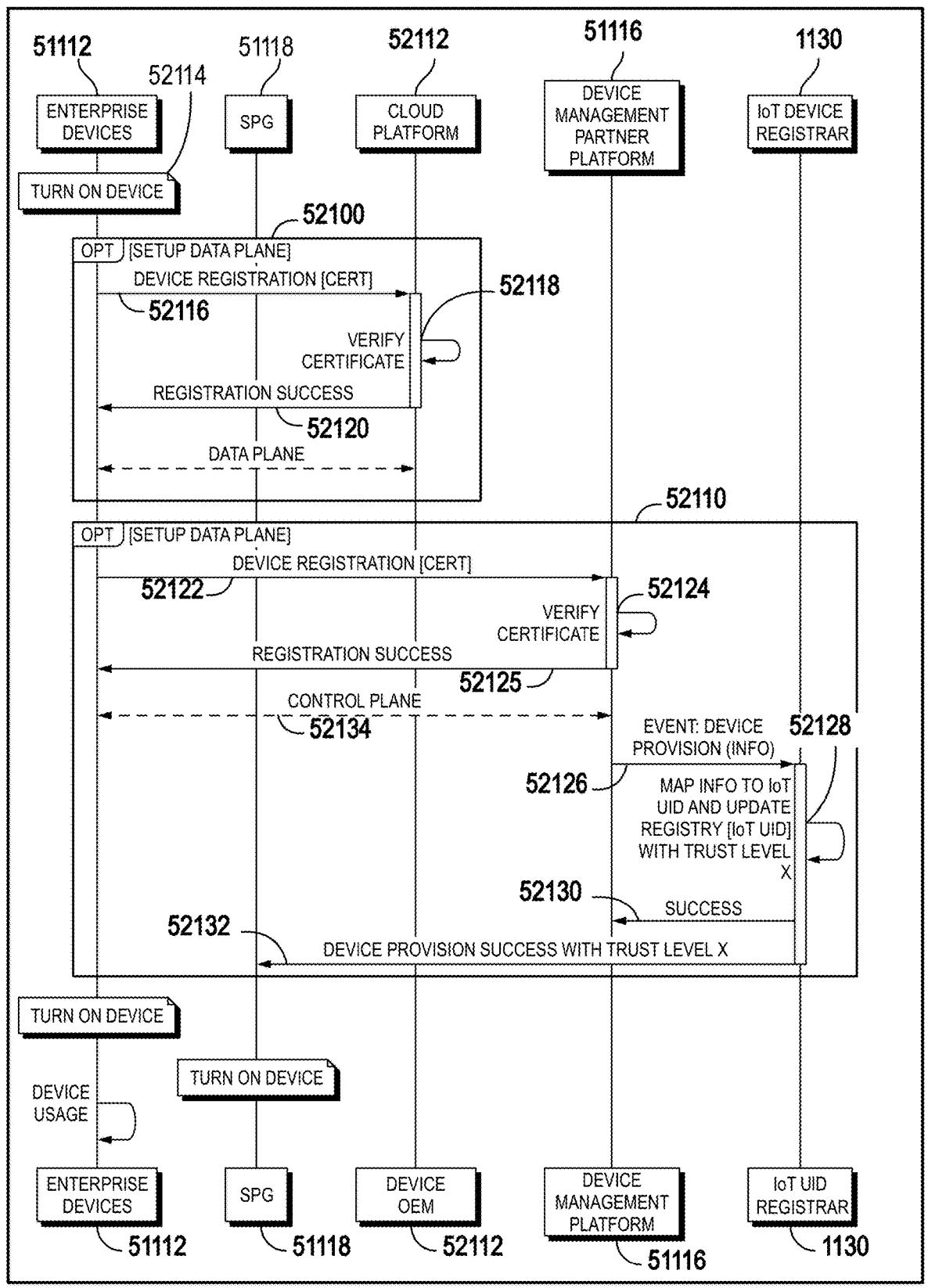
FIG. 52 is another process flow diagram depicting a process for registering one or more Brownfield devices via a virtual IoT UID, in accordance with an embodiment of the current disclosure.

Illustrated in FIG. 52 is a process flow diagram depicting registration of a Brownfield device with an IoT device registrar 1130, e.g., flow 52100, using a virtual IoT UID 6118 performed in conjunction with a network registration, e.g., flow 52110. As disclosed herein, the functionality and/or control of Brownfield devices may be divided between a data plane and a control plane. In embodiments, flow 52100 may correspond to a setup process for Brownfield device data plane functionality, e.g., registration/provisioning with a cloud platform 52112 and/or local network, and flow 52110 may correspond to a setup process for Brownfield device registration with the IoT device registrar 1130. Accordingly, at 52114, a Brownfield device may be turned on after having been acquired from a previous owner and begin a registration process with a cloud platform 52112 via transmitting 52116 a security certificate to the cloud platform 52112. The cloud platform 52112 may then verify 52118 the security certificate and transmit 52120 a confirmation message back to the Brownfield device that indicates registration with the cloud platform 52112 was successful after which the Brownfield device may have access to a variety of resources provided by the cloud platform 52112, e.g., the Brownfield device's data plane functionality becomes enabled.

The Brownfield device may then proceed to set up its control plane functionality by transmitting 52122 device registration data to a device management platform 51116. The device registration data may include the security certificate the Brownfield device used to register with the cloud platform 52112, other device property data, and/or any data the Brownfield device received from the cloud platform 52112 during the data plane setup process 52100. The device management platform 51116 may then verify 52124 the device registration data and transmit 52126 an event message, e.g., 6116 (FIG. 6) to the IoT device registrar 1130. In embodiments, the device management platform 51116 may transmit 52125 a confirmation message to the Brownfield device. The IoT device registrar 1130 may then generate IoT UIDs for the Brownfield device, as disclosed herein, and/or map 52128 the Brownfield IoT device to a preexisting record. For example, in embodiments, the administrator 51114 (FIG. 51) may have used the SPG 51118 to submit device property data for the Brownfield device to the IoT UID device registrar 1130 prior to the execution of the data plane setup, e.g., flow 52100, to provision a record for subsequent claiming by the Brownfield device during the control plane setup, e.g., flow 52110. Accordingly, mapping 52128 may include setting a flag and/or other indicator within the record corresponding to the Brownfield device indicating that the IoT UID has been claimed by the IoT UID device. The IoT device registrar 1130 may also generate and/or set a trust level indicator in the record and transmit 52130 a confirmation message and/or the trust level indicator to the device management platform 51116, SPG 51118, registering entity 51112, and/or any other interested entity. The IoT device registrar 1130 may also transmit 52132 the confirmation message to the SPG 51118. In embodiments, successful registration of a Brownfield device with an IoT device registrar 1130 using a virtual IoT UID 6118 may provide for a device management platform 51116 to adjust and/or manipulate the control plane functionality of the Brownfield device, as depicted by dashed line 52134.

Figure 53:
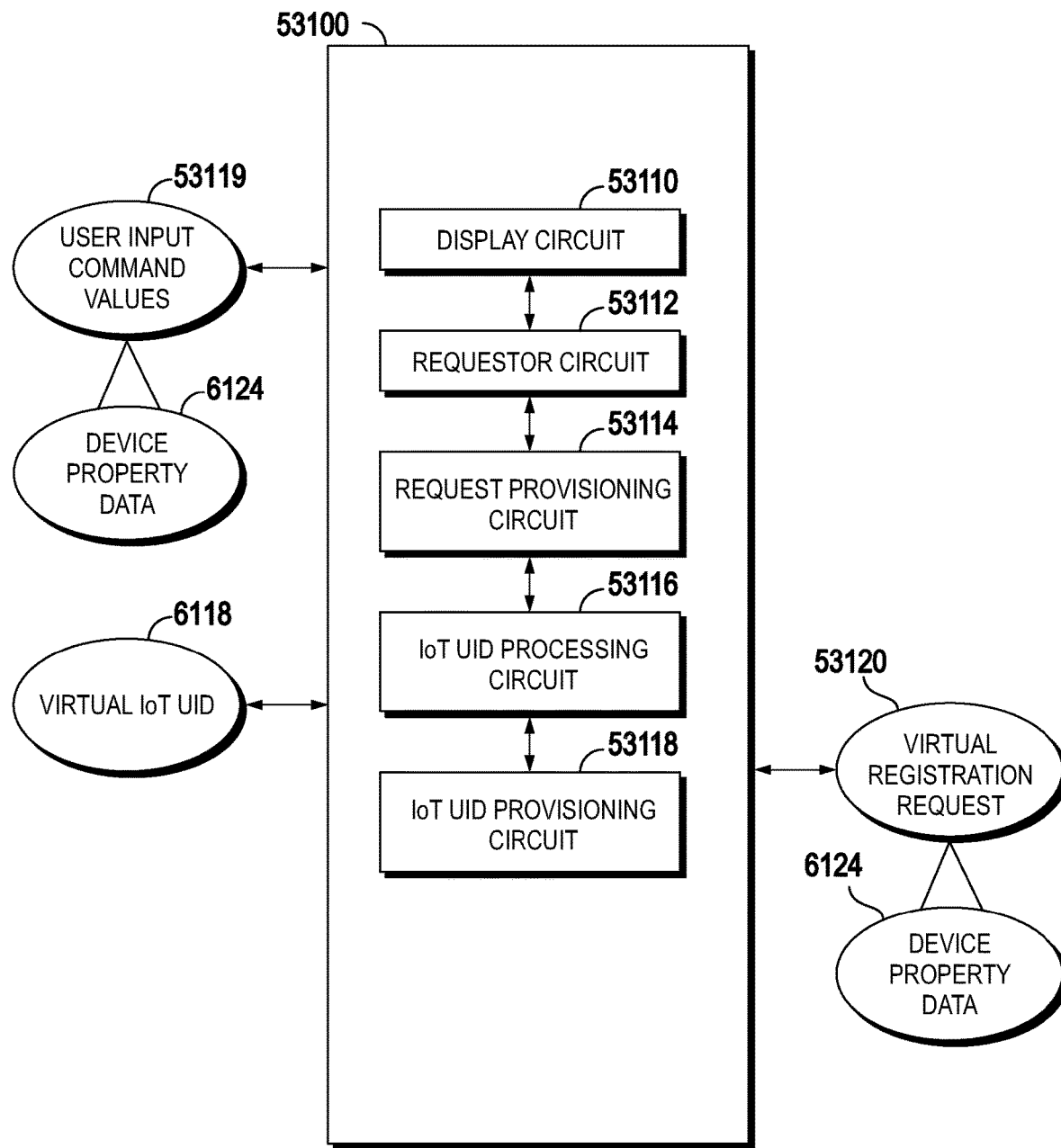
FIG. 53 is a schematic diagram of an apparatus for registering one or more Brownfield devices via a virtual IoT UID, in accordance with an embodiment of the current disclosure.

Shown in FIG. 53 is an apparatus 53100 for registering one or more Brownfield devices via a virtual Internet of Things Universal Identifier (IoT UID). In embodiments, the apparatus 53100 may form part of a device management platform and/or SPG, as disclosed herein. In embodiments, the apparatus 53100 may form part of an IoT device registrar server 1126, a computing system operated and/or used by an end-user 1136 and/or a third party 1138, and/or any other computing device described herein. The apparatus 53100 includes a display circuit 53110, a requestor circuit 53112, a request provisioning circuit 53114, an IoT UID processing circuit 53116, and an IoT UID provisioning circuit 53118. The display circuit 53110 may be structured to generate a graphical user interface, e.g., a SPG (as disclosed herein), configured to receive one or more user input command values 53119 corresponding to device property data 6124 from one or more Brownfield devices, e.g., 1112, 1114, 1120, (FIG. 1). The requestor circuit 53112 may be structured to generate a virtual registration request 53120 that includes the device property data 6124. A virtual registration request may include a field and/or other indication that the registration is to be via a virtual IoT UID, as opposed to an embedded IoT UID, as disclosed herein. The request provisioning circuit 53114 may be structured to transmit the virtual registration request 53120 to an IoT device registrar server 1126 (FIG. 1). The IoT UID processing circuit 53116 may be structured to interpret one or more virtual IoT UIDs 6118 generated by the IoT device registrar server 1126 in response to the virtual registration request 53120. The IoT UID provisioning circuit 53118 may be structured to transmit the one or more virtual IoT UIDs 6118 and/or display the one or more virtual IoT UIDs 6118 on an electronic display, e.g., a SPG as disclosed herein.

Figure 54:
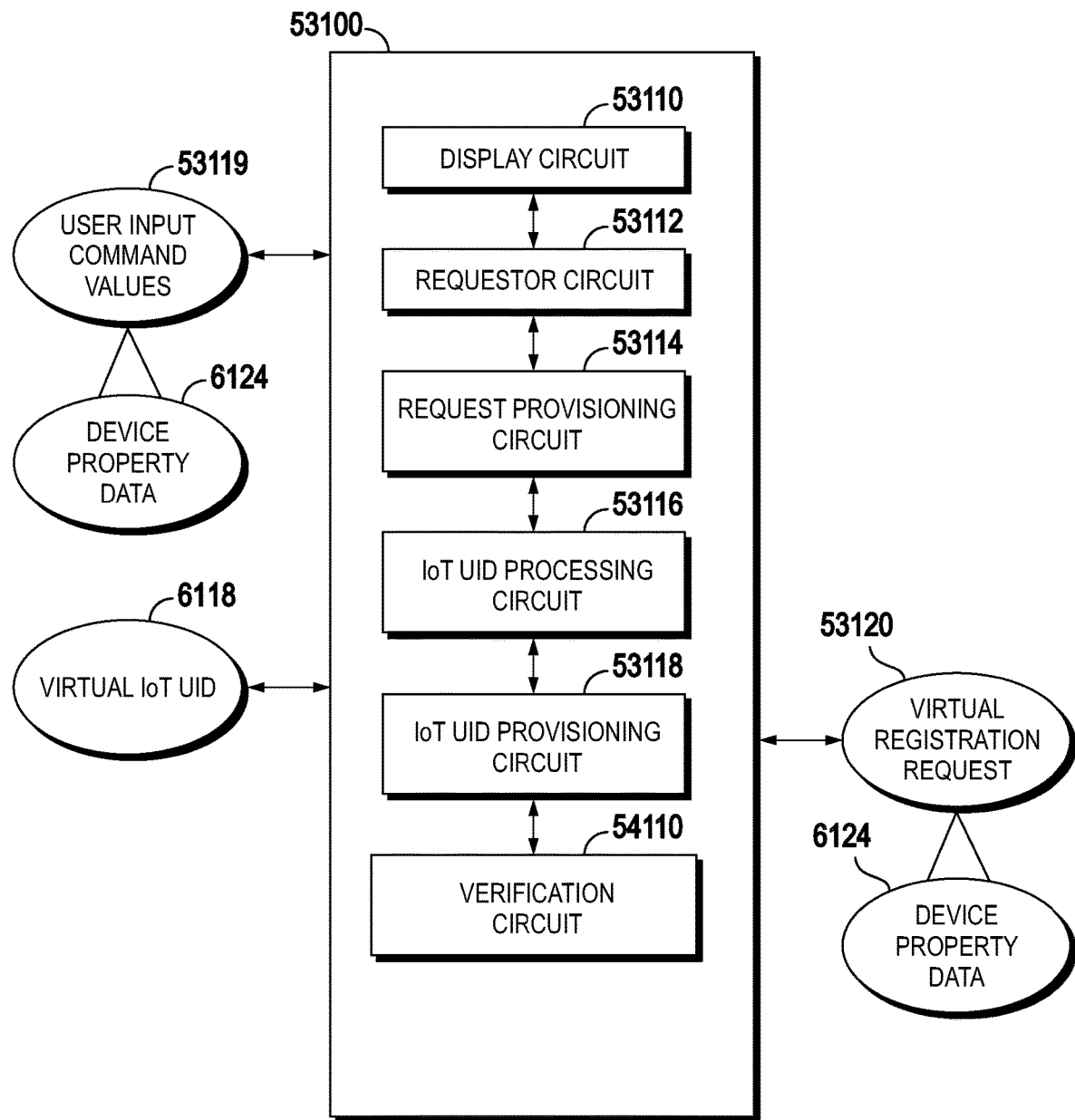
FIG. 54 is another schematic diagram of an apparatus for registering one or more Brownfield devices via a virtual IoT UID, in accordance with an embodiment of the current disclosure.

As shown in FIG. 54, embodiments of the apparatus 53100 may include a verification circuit 54110 structured to verify that an entity requesting registration of the one or more Brownfield devices is authorized to do so. Such verification may involve inspecting and/or verifying one or more cryptographic keys and/or certificates, which may be based on a public key infrastructure (PKI).

Figure 55:
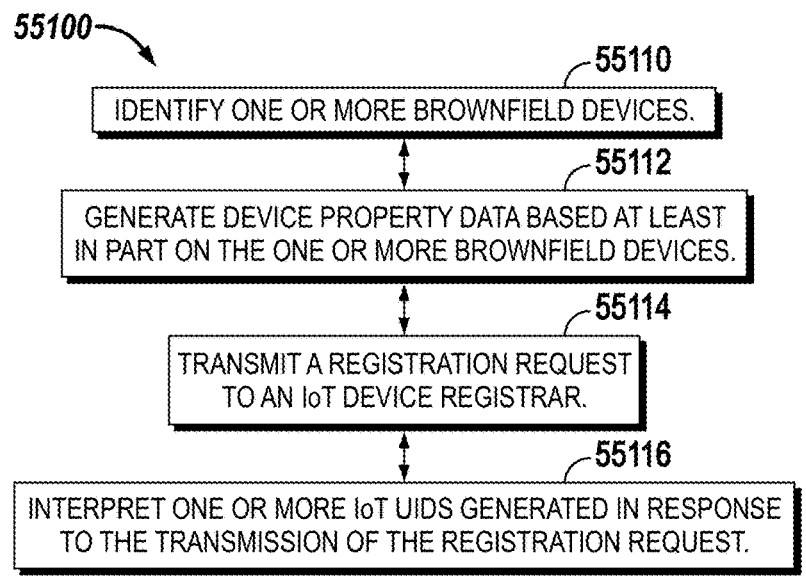
FIG. 55 is a flowchart depicting a method for registering one or more Brownfield devices via a virtual IoT UID, in accordance with an embodiment of the current disclosure.

Illustrated in FIG. 55 is a method 55100 for registering one or more Brownfield devices via a virtual Internet of Things Universal Identifier (IoT UID). The method 55100 may be performed via the apparatus 53100 and/or any other computing device described herein. The method 55100 includes identifying one or more Brownfield devices 55110; generating device property data based at least in part on the one or more Brownfield devices 55112, and transmitting, to an IoT device registrar, a registration request (which may be a virtual registration request) that includes the device property data 55114. The method 55100 may further include interpreting one or more IoT UIDs generated in response to the transmission of the registration request 55116.

Figure 56:
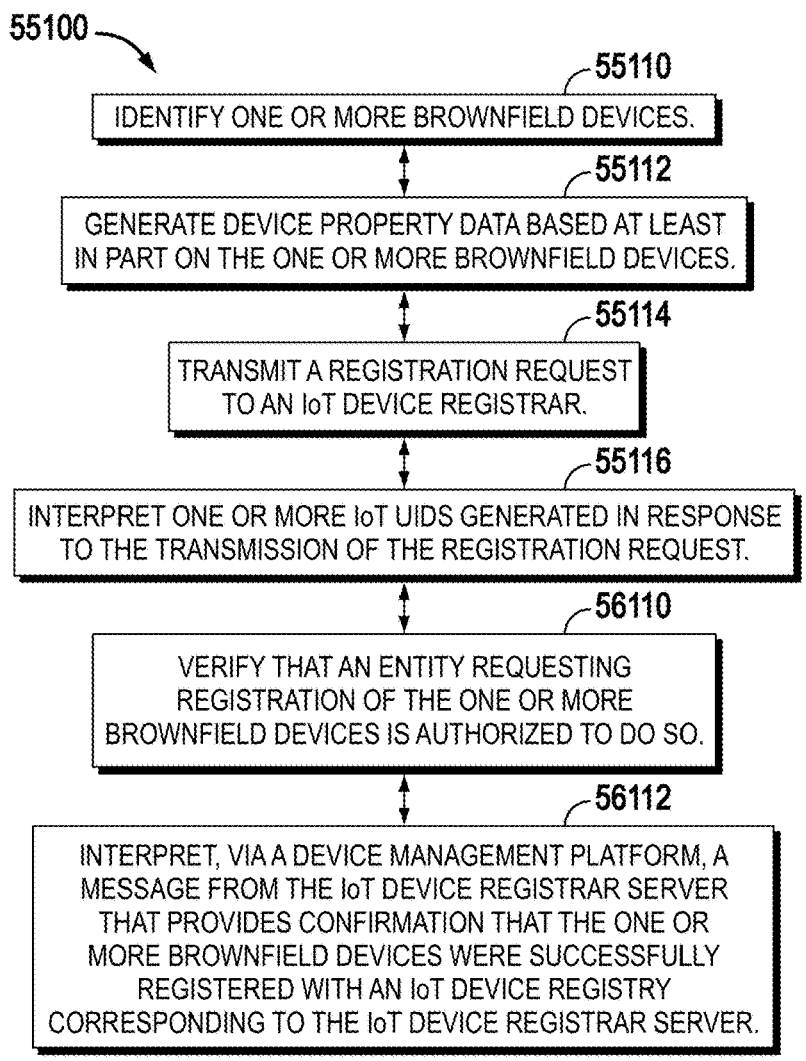
FIG. 56 is another flowchart depicting a method for registering one or more Brownfield devices via a virtual IoT UID, in accordance with an embodiment of the current disclosure.

As shown in FIG. 56, the method 55100 may further include verifying that an entity requesting registration of the one or more Brownfield devices is authorized to do so 56110. The method 55100 may further include interpreting, via a device management platform, a message from the IoT device registrar server that provides confirmation that the one or more Brownfield devices were successfully registered with an IoT device registry corresponding to the IoT device registrar server 56112.

Figure 57:
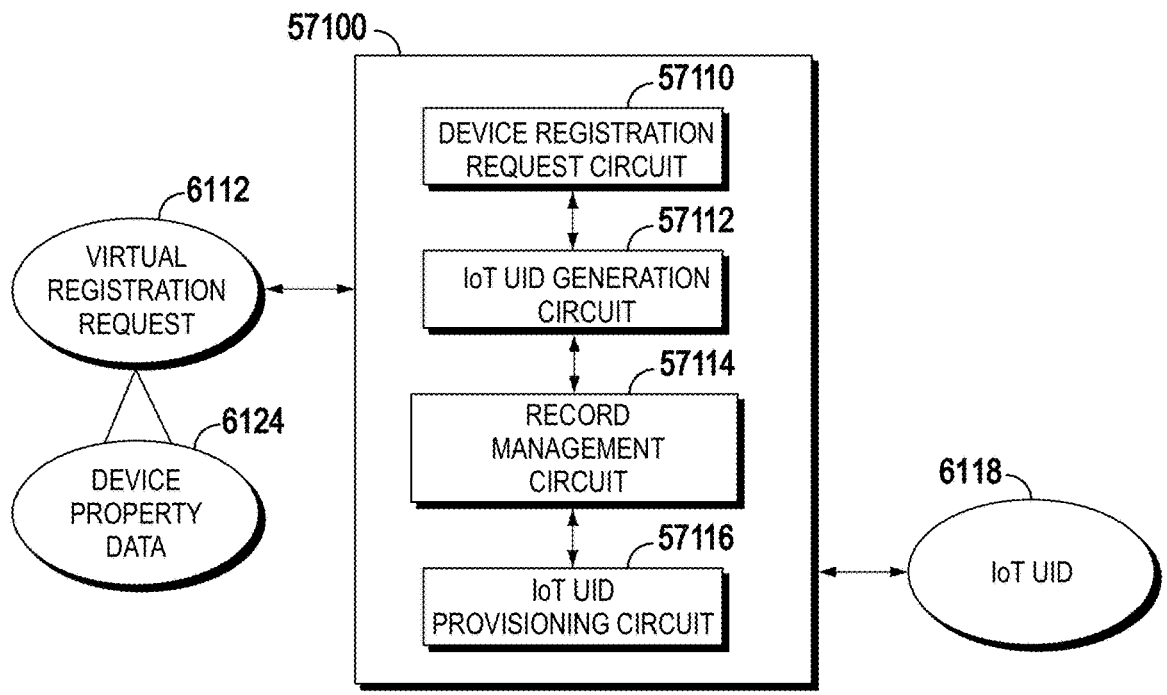
FIG. 57 is another schematic diagram of an apparatus for registering one or more Brownfield devices via a virtual IoT UID, in accordance with an embodiment of the current disclosure.

Illustrated in FIG. 57 is another apparatus 57100 for registering one or more Brownfield devices via a virtual Internet of Things Universal Identifier (IoT UID). In embodiments, the apparatus 57100 may form part of a device management platform and/or SPG, as disclosed herein. In embodiments, the apparatus 57100 may form part of an IoT device registrar server 1126, a computing system operated and/or used by an end-user 1136 and/or a third party 1138, and/or any other computing device described herein. The apparatus 57100 includes a device registration request circuit 57110, an IoT UID generation circuit 57112, a record management circuit 57114, and an IoT UID provisioning circuit 57116. The device registration request circuit 57110 may be structured to interpret a virtual registration request 6112 that maps device property data 6124 to the one or more Brownfield devices. The IoT UID generation circuit 57112 may be structured to generate, based at least in part on the virtual registration request 6112, an IoT UID 6118 for each of the one or more Brownfield devices. The record management circuit 57114 may be structured to generate a record 6110 (FIG. 6) for each of the IoT UIDs 6118. The record management circuit 57114 may be further structured to associate each of the IoT UIDs 6118 with portions of the device property data 6124 corresponding to a distinct one of the one or more Brownfield devices. The IoT UID provisioning circuit 57116 may be structured to transmit the IoT UIDs.

Figure 58:
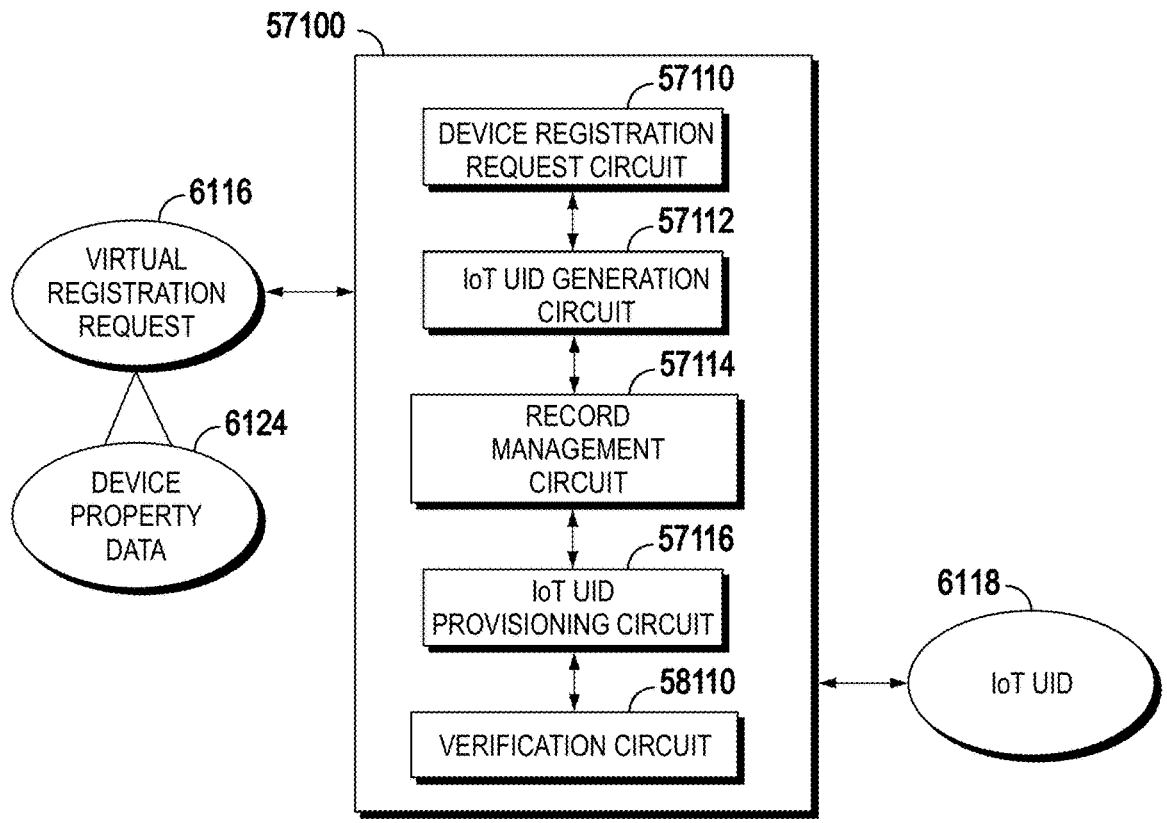
FIG. 58 is another schematic diagram of an apparatus for registering one or more Brownfield devices via a virtual IoT UID, in accordance with an embodiment of the current disclosure.

As shown in FIG. 58, the apparatus 57100 may further include a verification circuit 58110 structured to verify that an entity requesting registration of the one or more Brownfield devices is authorized to do so, in accordance with the methods described herein.

Figure 59:
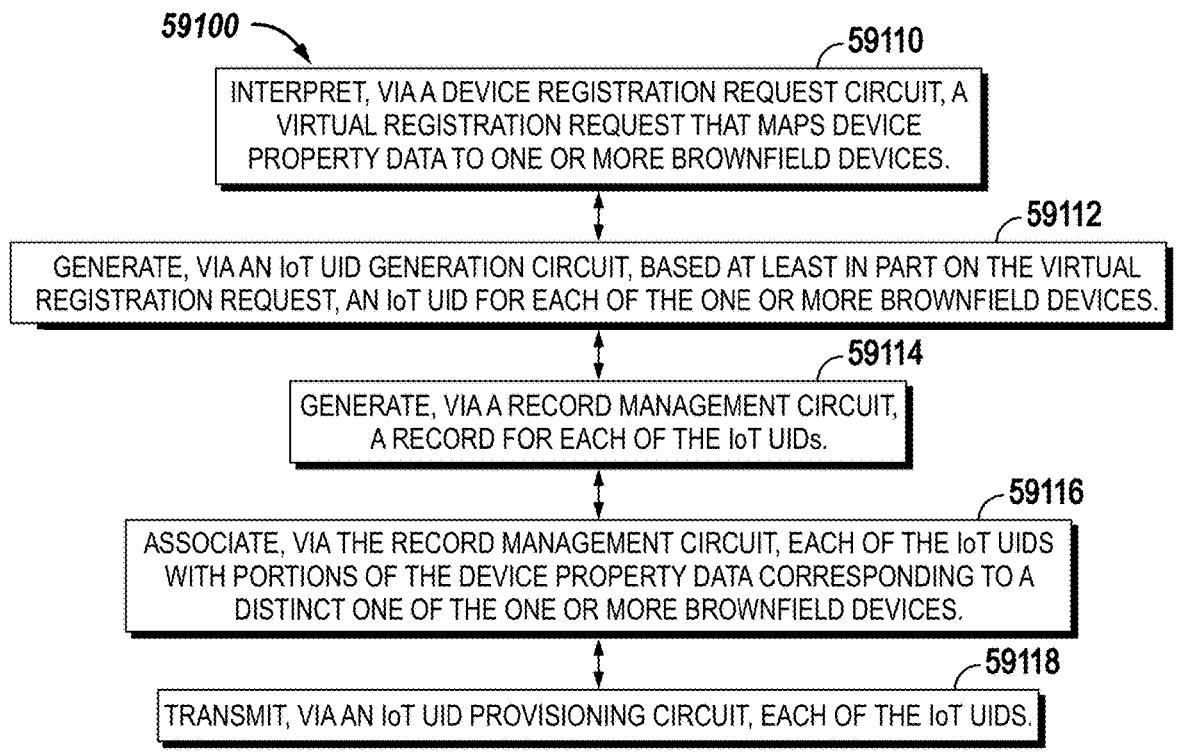
FIG. 59 is another flowchart depicting a method for registering one or more Brownfield devices via a virtual IoT UID, in accordance with an embodiment of the current disclosure.

Illustrated in FIG. 59 is another method 59100 for registering one or more Brownfield devices via a virtual Internet of Things Universal Identifier (IoT UID). The method 59100 includes interpreting, via a device registration request circuit, a virtual registration request that maps device property data to one or more Brownfield devices 59110. The method 59100 further includes generating, via an IoT UID generation circuit, based at least in part on the virtual registration request, an IoT UID for each of the one or more Brownfield devices 59112. The method 59100 further includes generating, via a record management circuit, a record for each of the IoT UIDs 59114. The method 59100 further includes associating, via the record management circuit, each of the IoT UIDs with portions of the device property data corresponding to a distinct one of the one or more Brownfield devices 59116. The method 59100 further includes transmitting, via an IoT UID provisioning circuit, each of the IoT UIDs 59118.

Figure 60:
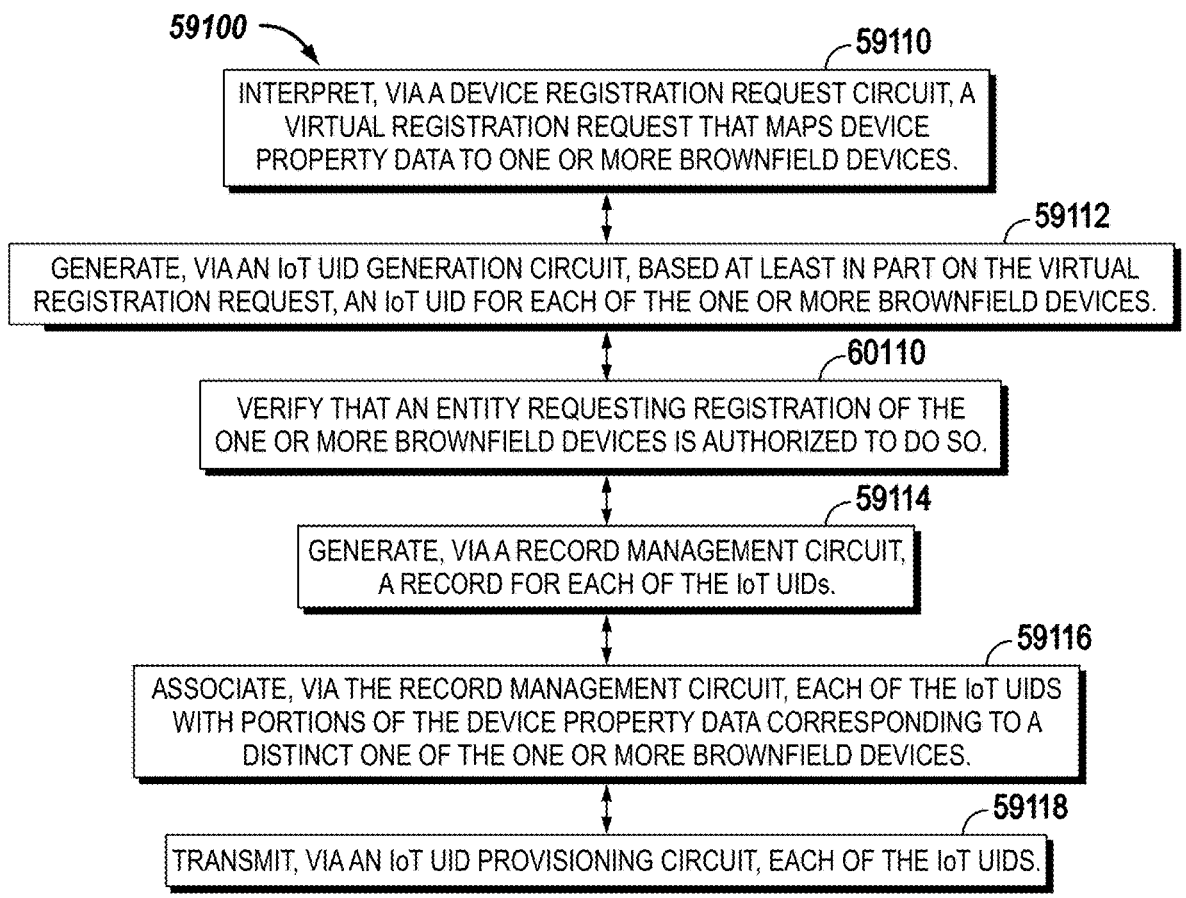
FIG. 60 is another flowchart depicting a method for registering one or more Brownfield devices via a virtual IoT UID, in accordance with an embodiment of the current disclosure.

As shown in FIG. 60, in embodiments, the method 59100 may further include verifying that an entity requesting registration of the one or more brownfield devices is authorized to do so 60110.

An additional non-limiting use case for the methods and/or apparatuses disclosed herein for provisioning IoT UIDs in Brownfield devices includes registering sensors on a resource distribution system, e.g., a water, gas/oil, and/or electricity, distribution system, with an IoT UID device registry without an administrator to physical contact and/or visit each of the sensors at their operating location. Another non-limiting use case for the methods and/or apparatuses disclosed herein for provisioning IoT UIDs in Brownfield devices includes registering satellites already in orbit with an IoT UID device registry. Another non-limiting use case for the methods and/or apparatuses disclosed herein for provisioning IoT UIDs in Brownfield devices includes registering vehicles in a fleet with an IoT UID device registry. Another non-limiting use case for the methods and/or apparatuses disclosed herein for provisioning IoT UIDs in Brownfield devices includes registering pallet tracking devices already in the field, e.g., attached to pallets, with an IoT UID device registry.

Referring again to FIGS. 1 and 2, embodiments of the current disclosure may provide for the registration and/or provisioning Greenfield devices using virtual Internet of Things Universal Identifiers (IoT UIDs). A virtual IoT UID occurs where a Greenfield (or Brownfield) device does not include the IoT UID, e.g., a local copy of the IoT UID is not stored in the device. A virtual IoT UID may be converted to an embedded IoT UID by embedding the IoT UID in the device, e.g., storing the IoT UID in a memory location on the device. An embedded IoT UID may be converted to a virtual IoT UID by removing the IoT UID from the device.

Figure 61:
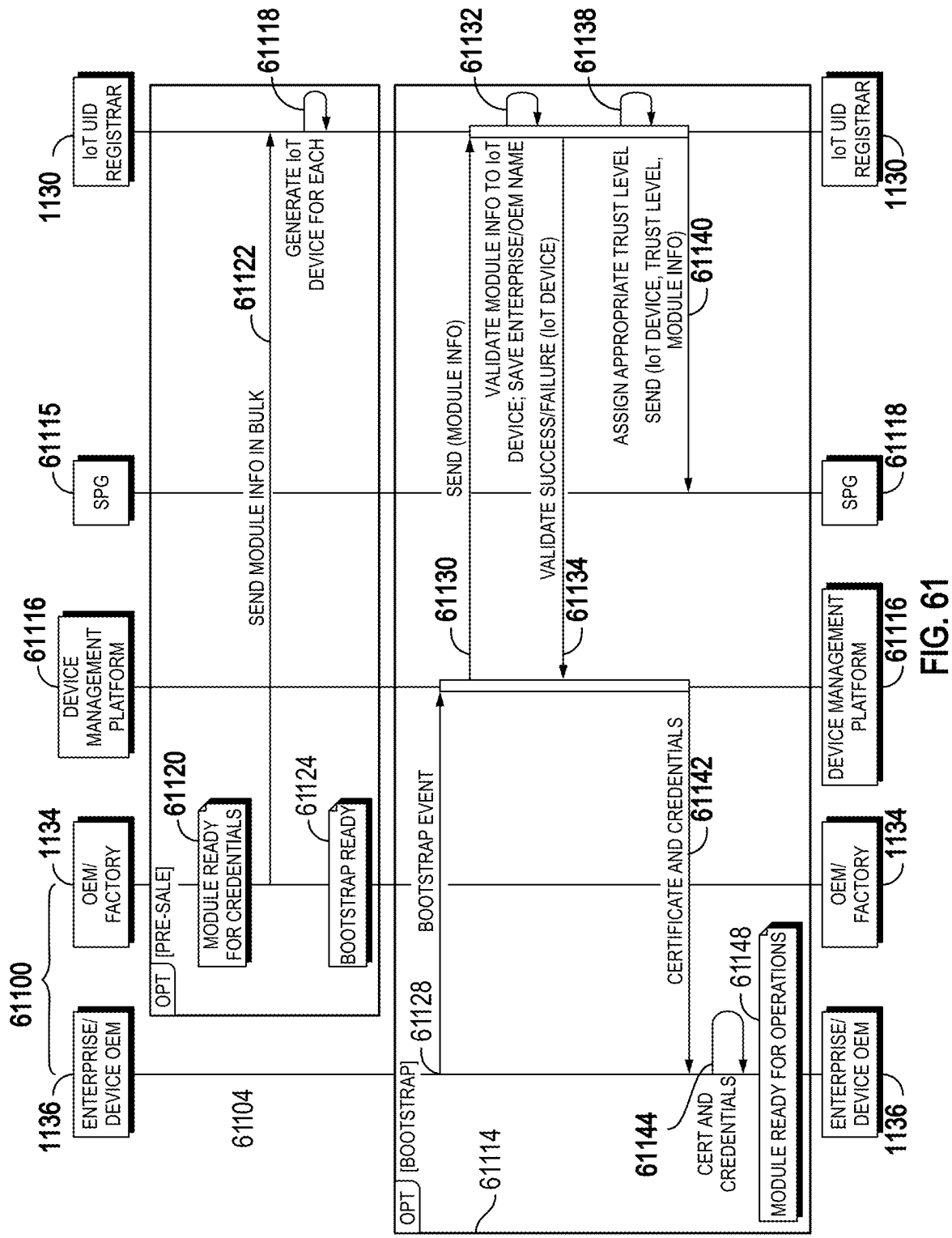
FIG. 61 is a process flow diagram depicting a process for registering one or more Greenfield devices via a virtual Internet of Things Universal Identifier (IoT UID), in accordance with an embodiment of the current disclosure.

Illustrated in FIG. 61 is a process flow diagram depicting two process flows 61104 and 61114 for associating IoT UIDs with Greenfield devices involving the exchange of data between: a registering party 61100 wishing to register Greenfield devices, a device management platform 61116, a single pane of glass (SPG) 61115, an IoT device registrar 1130.

Flow 61104 concerns a scenario in which the registering party 61100, e.g. a factory/original equipment manufacturer (OEM) 1134, wants to register one or more pre-sale Greenfield devices with virtual IoT UIDs. Starting with a Greenfield device ready for credentials 61120, at 61122 device property data 6124 (FIG. 6) for multiple modules may be sent in bulk to the IoT device registrar 1130. At 61118 the IoT device registrar 1130 generates IoT UIDs for each of the multiple modules. The module is now bootstrap ready 61124.

Flow 61114 concerns a scenario in which the registering party 61100, possibly an enterprise 1136, initiates the bootstrap event 61128 on a Greenfield device which transmits the device property data 6124 to the device management platform 61116. The device management platform 61116 may then relay 61130 the device property data 6124 to the IoT device registrar 1130. At 61132, the IoT device registrar 1130 may validate the module information/device property data 6120 and associate the device property data 6124 and an enterprise name with a virtual IoT UID. At 61134, the IoT device registrar 1130 provides validation of success or failure to the device management platform 61116. At 61138, assigns an appropriate trust level to the module. At 61140, the IoT device registrar 1130 provide the IoT UID, assigned trust level and device property data 6124 to the SPG 61115. At 61142, to the device management platform 61116 may transmit the certificates, other credentials, and/or the IoT UIDs to the registering party 61100. At 61144, the registering party 61100 may load/store/embed the IoT UIDs into the one or more Greenfield devices, resulting in a Greenfield device/module ready for operations 61148.

Figure 62:
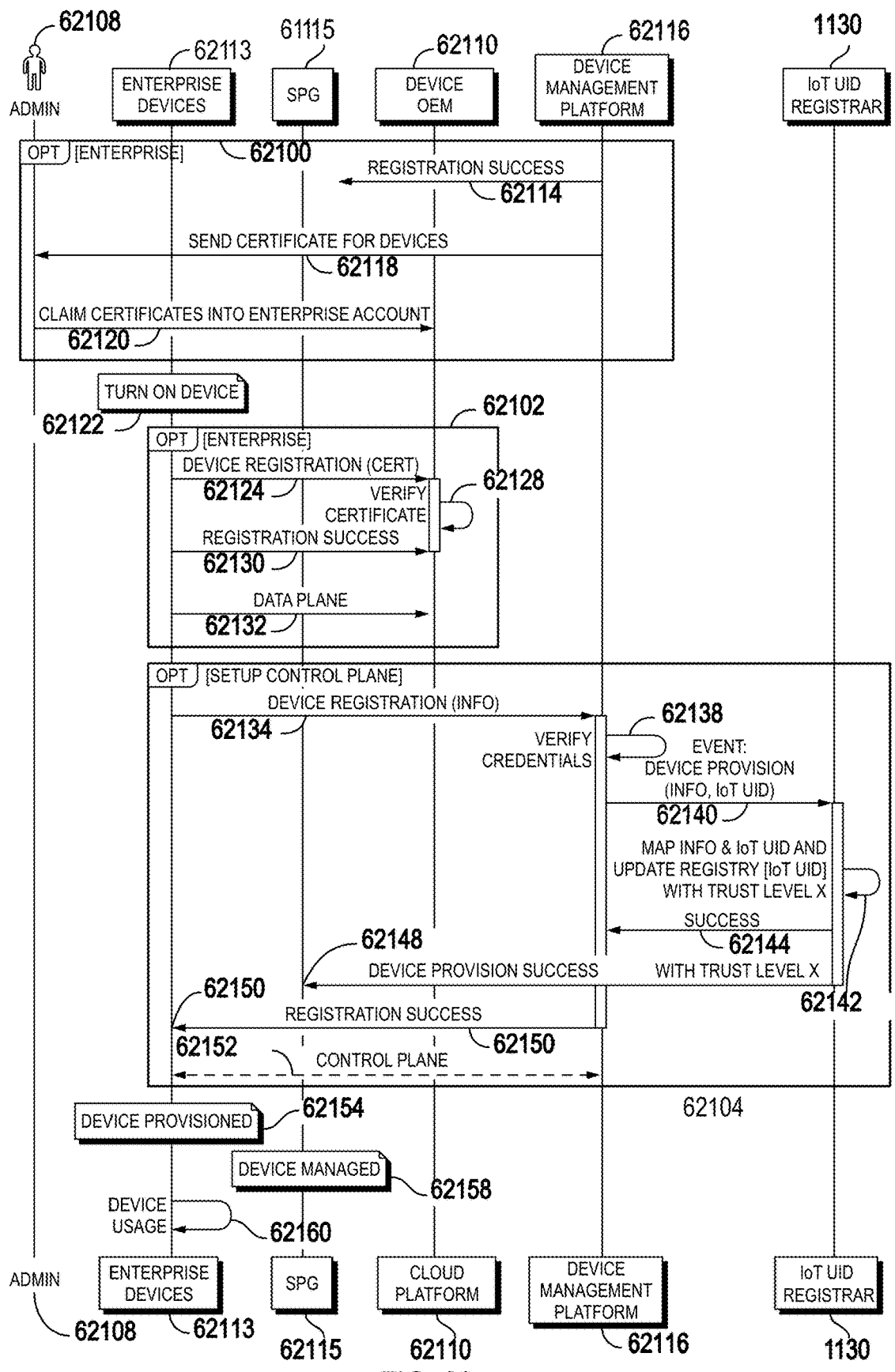
FIG. 62 is another process flow diagram depicting a process for registering one or more Greenfield devices via a virtual IoT UID, in accordance with an embodiment of the current disclosure.

Illustrated in FIG. 62, are three flows 62100, 62102, and 62104 for provisioning one or more Greenfield devices associated with a cloud platform 62110, as described herein, for use by an end user. In embodiments, the one or more Greenfield devices may have previously been assigned virtual IoT UIDs, as disclosed herein.

At flow 62100, an enterprise administrator 62108 claims ownership of an enterprise Greenfield device 62113. At 62114, the device management partner platform 62116 sends certificates for the enterprise devices 62113 acquired by the enterprise to the cloud platform 62110. At 62118, the device management partner platform 62116 sends certificates for the enterprise devices 62113 to the enterprise administrator 62108. At 62120, the administrator 62108 then claims the certificates on the cloud platform 62110 into an enterprise account. At 62122, an enterprise device 62113 is turned on.

At flow 62102, a data plane between the enterprise Greenfield device 62113 and the cloud platform 62110 is established. At 62124, the enterprise Greenfield device 62113 sends a device registration to the cloud platform 62110. At 62128, the cloud platform 62110 verifies the certificate provided by the enterprise Greenfield device 62113. At 62130, the cloud platform 62110 sends a confirmation of registration success to the enterprise Greenfield device 62113 which, in embodiments, may establish, the data plane 62132 between the enterprise Greenfield device 62113 and the cloud platform 62110.

At flow 62104, a control plane between the enterprise Greenfield device and the device management partner platform 62116 is setup. At 62134, the enterprise Greenfield device sends device registration information to the device management partner platform 62116. At 62138, the device management partner platform 62116 verifies the credentials. At 62140, the device management partner platform 62116 relays the event device provisioning information to the IoT device registrar 1130. At 62142, the IoT device registrar 1130 maps the provided provisioning information onto an IoT UID, updates the registry and provides a trust level. At 62144, the IoT device registrar 1130 relays confirmation of success to the device management partner platform 62116. At 62148, the IOT device registrar 1130 relays confirmation of success and the device trust level to the SPG. At 62150, the device management partner platform 62116 relays confirmation of registration success to the enterprise Greenfield device which mat signal that control plane 62152 between the enterprise Greenfield device and the device management partner platform 62116 is enabled/active. The device may then be provisioned 62154 and managed 62158 and ready to be used 62160.

Figure 63:
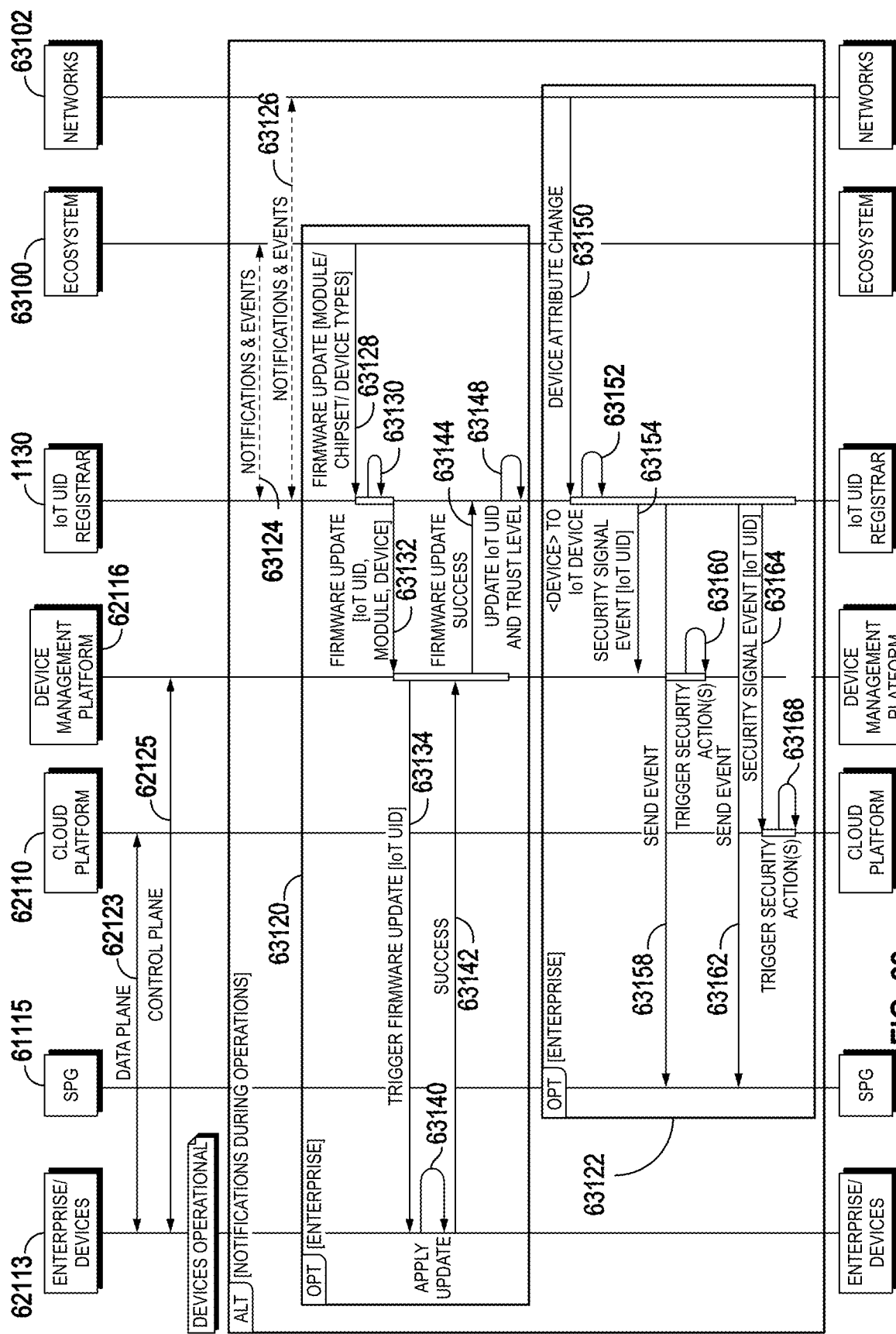
FIG. 63 is a process flow diagram depicting a process for registering one or more Greenfield devices via a virtual Internet of Things Universal Identifier (IoT UID), in accordance with an embodiment of the current disclosure.

Illustrated in FIG. 63, are two flows 63120, 63122 for handling notifications during operations on operational enterprise Greenfield devices 62113. At 63124, notifications and events are exchanged between the ecosystem 63100 and the IoT device registrar 1130, as disclosed herein. At 63128, notifications and events are exchanged between the networks 63102 and the IoT device registrar 1130.

At flow 63120, firmware on an enterprise Greenfield device 62113 is updated. At 63124, the ecosystem 63100 exchanges notifications and events with the IoT device registrar 1130. At 63126, the networks 63102 exchange notifications and events with the IoT device registrar 1130. At 63128 the ecosystem 63100 provides the firmware update data, e.g., the module, chipset, device types, and the like, to the IoT device registrar 1130. At 63130, the IoT device registrar 1130 links the firmware update data to a specific IoT UID. At 63132, the IoT device registrar 1130 provides the firmware update, e.g., IoT UID, module, device and the like, to the device management partner platform 62116. At 63134, the device management partner platform 62116 may send a trigger signal to the enterprise device 62113 causing the enterprise device 62113 to update the firmware. At 63140, the enterprise device 62113 may then update the firmware. At 63142, the enterprise device 62113 may relay a status value, reflective of the success of firmware update, to the device management partner platform 62116. At 63144, the device management partner platform 62116 may relay a status value, reflective of the success of the firmware update, to the IoT device registrar 1130. At 63148 the IoT device registrar 1130 may update the device's IoT UID, trust level or the like.

At flow 63122, information regarding a security event is propagated through the system. At 63150, a device attribute change is communicated from the ecosystem 63100 to the IoT device registrar 1130. At 63152, the IoT device registrar 1130 links the device attribute change with the device's virtual IoT UID. At 63154, the IoT device registrar 1130 may provide a security signal, data on the event, information on IoT device, and the like, to the device management partner platform 62116. At 63158, the device management partner platform 62116 may send information regarding the event and IoT UID to the SPG. At 63160, the device management partner platform 62116 may trigger a security action, e.g., patching. At 63162, the IoT device registrar 1130 may send event data to the SPG 61115. In embodiments, at 63164, the IoT device registrar 1130 may provide a security signal event, e.g., the IoT UID, event details, and the like, to the cloud platform 62110. At 63168, the cloud platform 62110 may trigger a security action.

Figure 64:
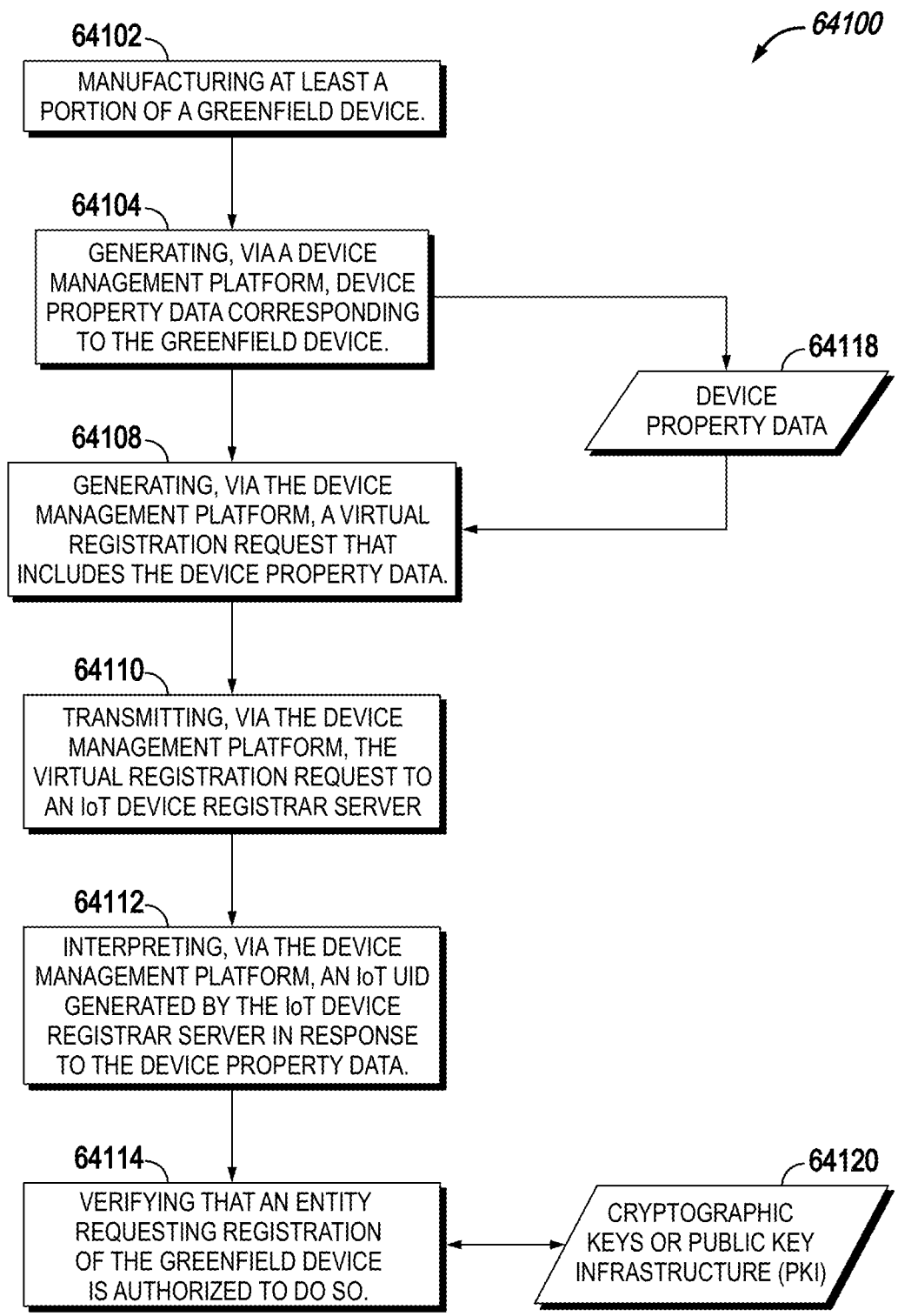
FIG. 64 is schematic flow chart of a method for registering one or more Greenfield devices via a virtual Internet of Things Universal Identifier (IoT UID)

Illustrated in FIG. 64 is a method 64100 for registering one or more Greenfield devices via a virtual Internet of Things Universal Identifier (IoT UID), in accordance with an embodiment of the current disclosure. The method 64100 may include manufacturing at least a portion of a Greenfield device (step 64102). The method 64100 further includes, via a device management platform, generating device property data 64118 corresponding to the Greenfield device (step 64104) and generating a virtual registration request that includes the device property data 64118 (step 64108). The method 64100 further includes, via the device management platform, transmitting the virtual registration request to an IoT device registrar server (step 64110) and interpreting an IoT UID generated by the IoT Device registrar server in response to the device property data 64118 (step 64112). In embodiments, the method may further include verifying that an entity requesting registration of the Greenfield device is authorized to do so (step 64114) using cryptographic keys or a Public Key Infrastructure (PKI) 64120.

Figure 65:
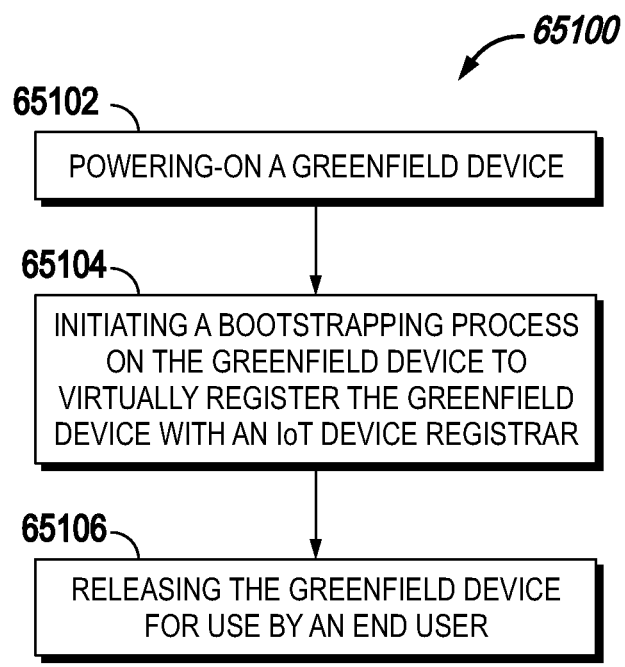
FIG. 65 is schematic flow chart of a method for registering one or more Greenfield devices via a virtual Internet of Things Universal Identifier (IoT UID)

Illustrated in FIG. 65 is a method 65100 for registering one or more Greenfield devices via a virtual Internet of Things Universal Identifier (IoT UID), in accordance with an embodiment of the current disclosure. The method 65100 may include powering-on a Greenfield device (step 65102) and initiating a bootstrapping process on the Greenfield device to virtually register the device with an IoT device registrar 1130 (step 65104). The method 65100 may further include releasing the Greenfield device for use by an end user (step 65106). The process start 65100 may occur prior to sale, e.g. where the registering party 61100 is a factory/original equipment manufacturer (OEM) 1134. The process start 65100 may occur after the Greenfield device has been sold, e.g. where the registering party 61100 is an enterprise 1136.

Figure 66:
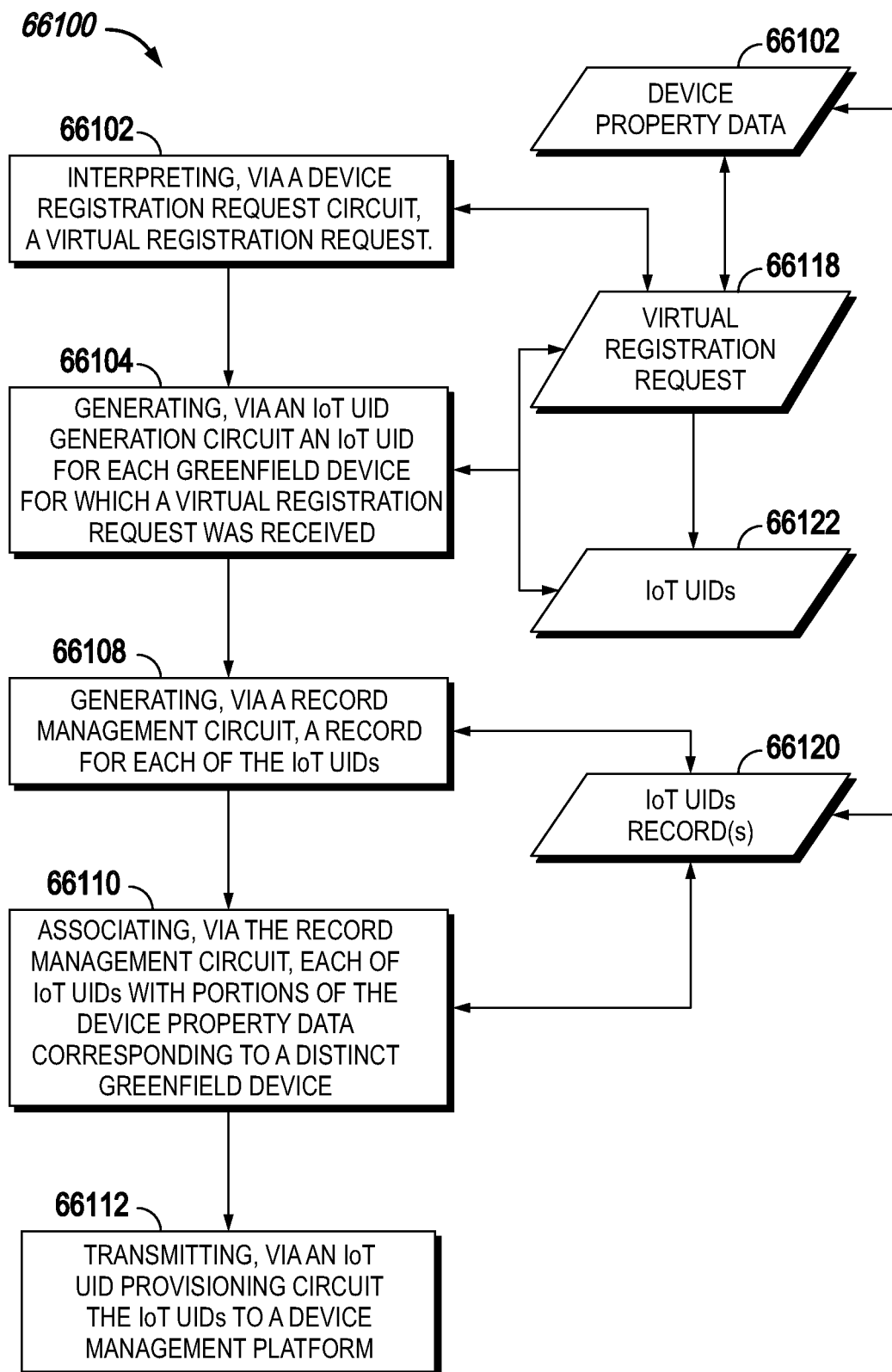
FIG. 66 is schematic flow chart of a method for registering one or more Greenfield devices via a virtual Internet of Things Universal Identifier (IoT UID)

Illustrated in FIG. 66, is a method 66100 for registering one or more Greenfield devices via a virtual Internet of Things Universal Identifier (IoT UID), in accordance with an embodiment of the current disclosure. The method 66100 may include interpreting, via a device registration request circuit, a virtual registration request (step 66102) for one or more Greenfield devices. The virtual registration request 66118 may include device property data 66102. The method 66100 may include generating, via an IoT UID generation circuit, an IoT UID for each of the Greenfield devices for which a virtual registration request was received (step 66104). The method 66100 further includes, via a record management circuit, generating an IoT UID record(s) 66120 for each of the IoT UIDs (step 66108) and associating each of the IoT UIDS with portions of the device property data 66102 corresponding to a distinct Greenfield device (step 66110). The method 66100 may further include transmitting, via an IoT UID provisioning circuit, the IoT UIDs to a device management platform (step 66112).

Figure 67:
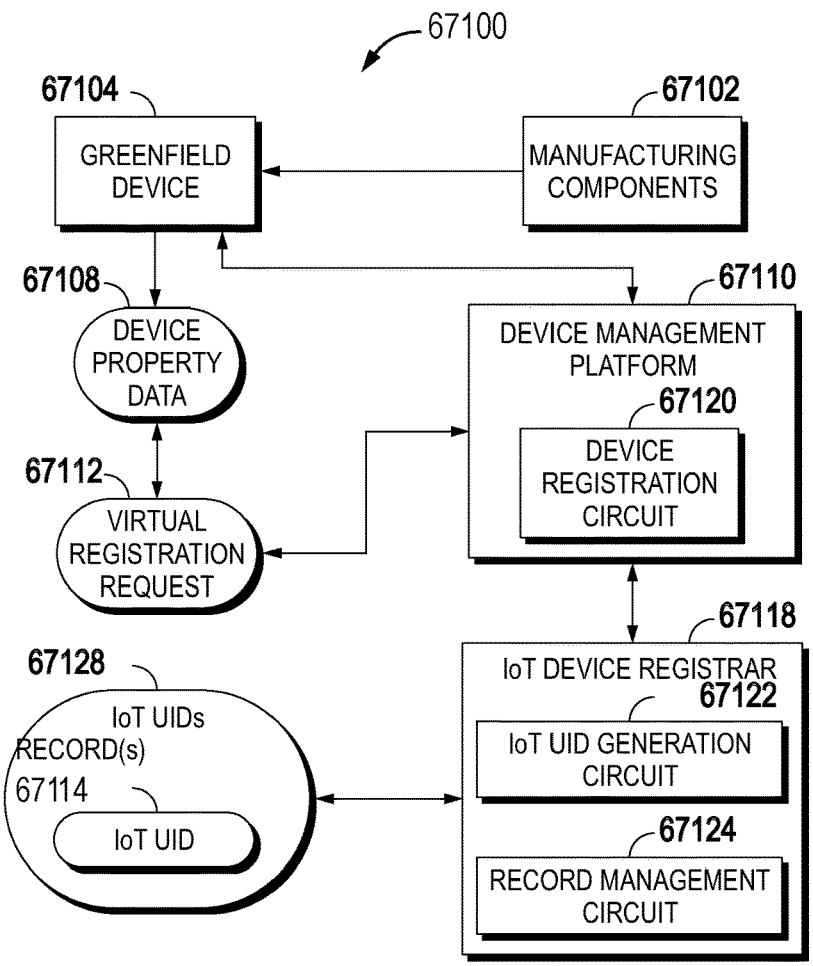
FIG. 67 is schematic depiction of a system for registering one or more Greenfield devices via a virtual Internet of Things Universal Identifier (IoT UID)

Illustrated in FIG. 67, a system 67100, may include manufacturing components 67102 that generate at least a portion of a Greenfield device 67104. The system 67100 may further include a device management platform 67110. The device management platform 67110 may include a device registration request circuit 67120 which interprets a virtual registration request 67124, which may include property device data 67108. The system 67100 may further include an IoT device registrar 67118. The IoT device registrar 67118 may include a IoT UID generation circuit 67122 for generating an IoT UID 67114 and a record management circuit 67122 for generating IoT UID(s) 67128 including an IoT UID 67114.

Figure 68:
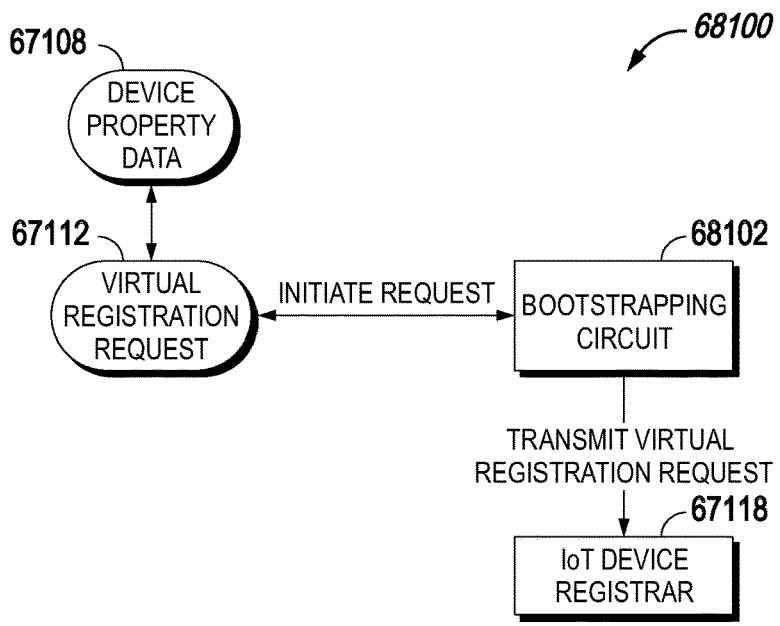
FIG. 68 is schematic depiction of an apparatus for registering one or more Greenfield devices via a virtual Internet of Things Universal Identifier (IoT UID)

Illustrated in FIG. 68, an apparatus 68100 for registering one or more Greenfield device via a virtual Internet of Things Universal Identifier (IoT UID). The apparatus 68100 may include device property data 67108 and a bootstrapping circuit 68102 structured to initiate a virtual registration request 67112 that includes the device property data 67108.

In a non-limiting example of the bootstrap registration process, a manufacturer, e.g., pre-sale, or an end user, e.g., post-sale, boots up a newly-minted Greenfield device which then proceeds to contact the device management platform, which may then request (of the IoT device registrar) to register the Greenfield device via a virtual IoT UID. Embodiments may provide for batch registration of newly-minted Greenfield devices. Embodiment may provide for a device to be "claimed" upon activation by an end user before registration can proceed, which may include updating ownership information stored in the registry, updating a chain of title stored in the registry, etc. Embodiments may provide for verifying that the entity requesting registration of the Greenfield device authorized to do so. Verification authorization of the entity requesting registration may include the use of cryptographic keys, a Public Key Infrastructure (PKI), or the like.

Referring again to FIG. 1, embodiments of the current disclosure may provide for the lifecycle management for Internet of Things (IoT) devices, e.g., devices 1112, 1114, 1116, 1118, 1120, 1122, and 1124, managed by the registrar 1130, e.g., in the registry 1129.

Non-limiting examples of user types include one or more end users 1136, e.g., enterprise, manufacturer 1134, e.g., an original equipment manufacturer (OEM) and/or factory employees, the IoT device registrar 1130, and/or a third party 1138. Information may be provided, e.g., displayed, by a Single Pane of Glass (SPG), which may provide a graphical user interface (GUI), e.g., any of GUIs 22108 (FIG. 22), 23108 (FIG. 23), 28102 (FIG. 28), 28104 (FIG. 28), or 28106 (FIG. 28), for the user to interact with, such as to input data, commands, and queries, as well as to display the IoT registry data. The GUI may provide access to any of the embodiments of the system 1100 (FIG. 2, for example, the lifecycle management component 2110, the analytics component 2112, the monitoring and security component 2114, and/or the registration and configuration component 2116.

Figure 69:
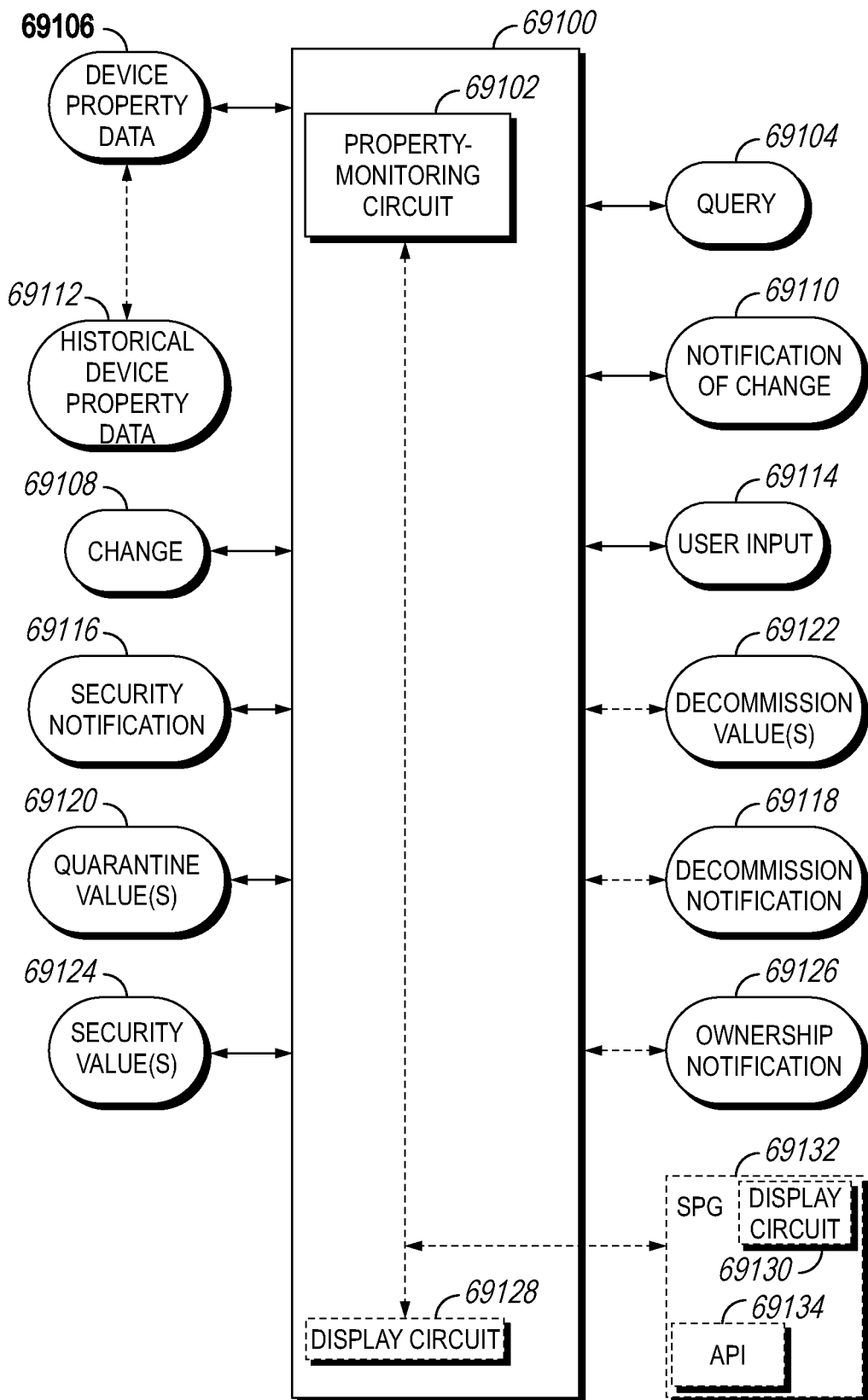
FIG. 69 is a schematic diagram of an apparatus for an Internet of Things (IoT) device registry, in accordance with an embodiment of the current disclosure.

FIG. 69 depicts a schematic diagram of an example apparatus 69100 for an IoT device registry, e.g., for network connected devices 1112, 1114, 1116, 1118, 1120, 1122, 1124 (FIG. 1), in accordance with an embodiment of the current disclosure. The apparatus 69100 may form part of the server 1126 (FIG. 1), e.g., the at least one processor, and/or any other electronic computing device described herein.

With reference to FIG. 69, the apparatus 69100 is for an IoT device registry. The apparatus 69100 may include a property-monitoring circuit 69102. The property-monitoring circuit 69102 may be structured to generate a query 69104 for device property data 69106 for an Internet of Things (IoT) device to an IoT device registrar server, interpret the device property data 69106 received from the IoT device registrar server to determine whether there is a change 69108 in the device property data, if the property-monitoring circuit determines that there is a change 69108 in the device property data 69106, generate a notification of the change 69110, and transmit the notification of the change 69110 to the IoT device registrar server.

Certain further aspects of the example apparatus are described herein, any one or more of which may be present in certain embodiments. With further reference to FIG. 69, in the apparatus 69100, the query 69104 may be initiated by at least one of: the device, a user of the device, a seller of the device, a purchaser of the device, a manufacturer of the device, or the IoT device registrar server. In the apparatus 69100, the change may be determined by analyzing historical device property data 69112 in the device property data 69106. In the apparatus 69100, the change 69108 may be determined by monitoring a device property change flag. In the apparatus 69100, the change 69108 may include a change in device hardware. In the apparatus 69100, the change 69108 may include a change in a network. In the apparatus 69100, the change 69108 may include a change in ownership of the device. In the apparatus 69100, the change 69108 may include a security event. In the apparatus 69100, the determining that the device has reached end-of-life may include receiving a user input 69114 indicating that the device has reached end-of-life. In the apparatus 69100, the determining that the device has reached end-of-life may include receiving a security notification 69116 indicating a device decommissioning. In the apparatus 69100, the determining that the device has reached end-of-life may include receiving a decommission notification 69118 indicating a device decommissioning. In the apparatus 69100, the property-monitoring circuit 69102 may be further structured to generate a quarantine value 69120 indicating that a device should be quarantined. In the apparatus 69100, the property-monitoring circuit 69102 may be further structured to generate a decommission value 69122 indicating that a device should be decommissioned. In the apparatus 69100, the property-monitoring circuit 69102 may be further structured to generate a security value 69124 indicating that a device may be subject to a security event. In the apparatus 69100, the property-monitoring circuit 69102 may be further structured to generate an ownership notification 69126 indicating that an ownership value corresponding to the device has changed. The apparatus 69100 may further include a display circuit 69128 structured to display the notification of the change. In the apparatus 69100, the display circuit may be an SPG display circuit 69130 included in a Single Pane of Glass (SPG) system 69132. In the apparatus 69100, the SPG system may include a graphical user interface. In the apparatus 69100, the graphical user interface may be hosted by an IoT device registrar that includes the IoT device registrar server. In the apparatus 69100, the SPG system 69132 may be included in a device management platform. In the apparatus 69100, the SPG system 69132 may include an Application Programing Interface (API) 69134. In the apparatus 69100, the API 69134 may be hosted by the IoT device registrar. In the apparatus 69100, the API 69134 may be included in a device management platform.

Figure 70:
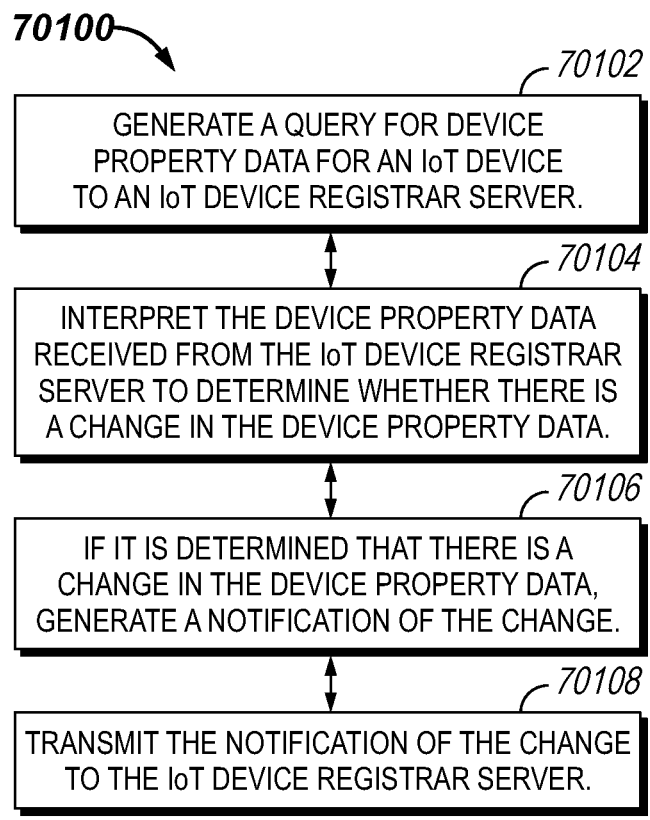
FIG. 70 is a flowchart depicting a method for an IoT device registry, in accordance with an embodiment of the current disclosure.

FIG. 70 illustrates a flowchart of an example method 70100 for displaying IoT device registry data, e.g., for network connected devices 1112, 1114, 1116, 1118, 1120, 1122, 1124 (FIG. 1), in accordance with an embodiment of the current disclosure. The method 70100 may be performed by the apparatus 69100 and/or any other computing device described herein. The method 70100 may include generating a query for device property data for an Internet of Things (IoT) device to an IoT device registrar server 70102. The method 70100 may further include interpreting the device property data received from the IoT device registrar server to determine whether there is a change in the device property data 70104. The method 70100 may further include, if it is determined that there is a change in the device property data, generating a notification of the change 70106. The method 70100 may further include transmitting the notification of the change to the IoT device registrar server 70108.

Figure 71:
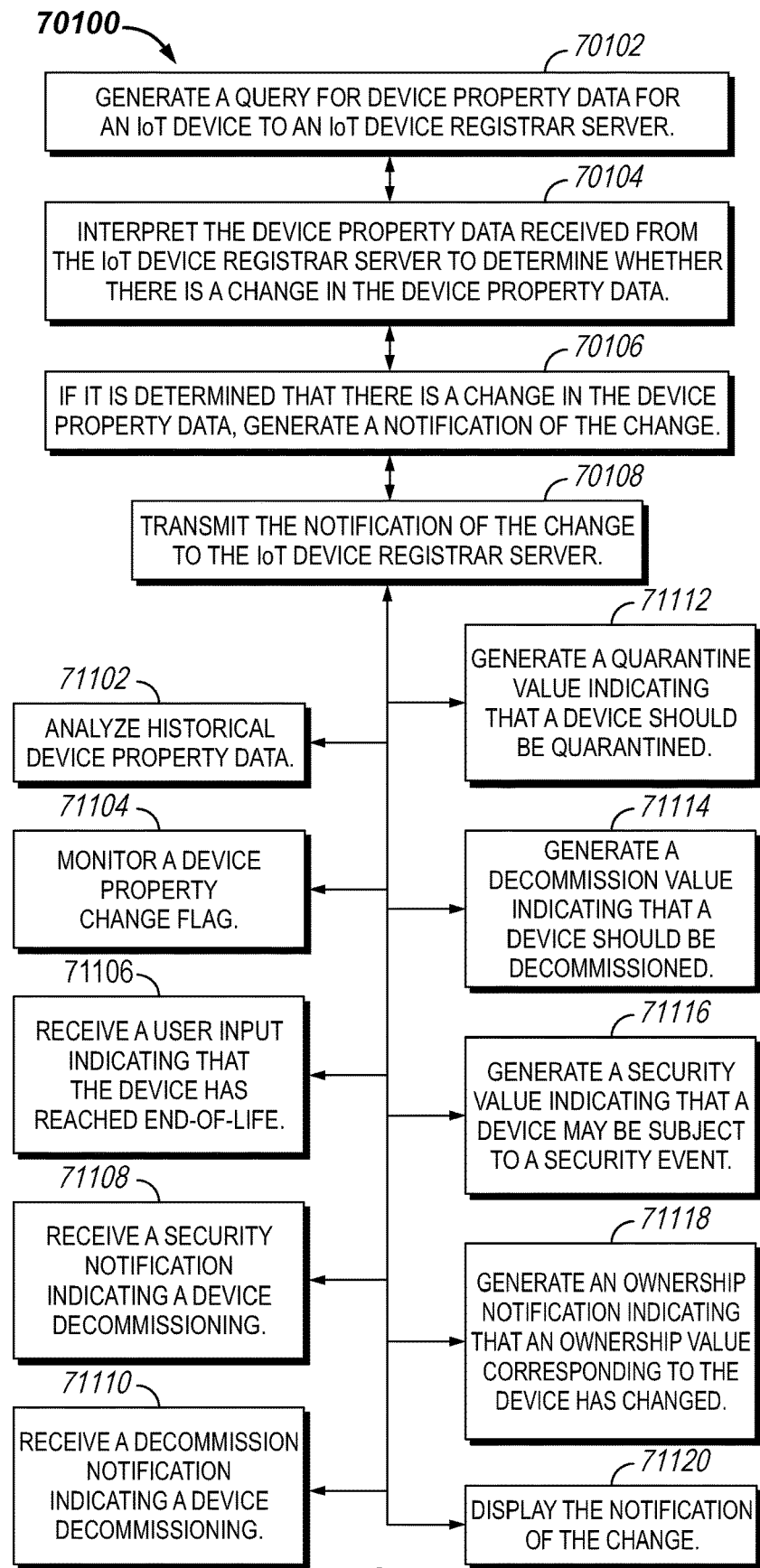
FIG. 71 is another flowchart depicting a method for an IoT device registry, in accordance with an embodiment of the current disclosure.

FIG. 71 is another flowchart depicting a method for an IoT device registry display, in accordance with an embodiment of the current disclosure. Certain further aspects of the example method are described herein, any one or more of which may be present in certain embodiments. The features shown in FIGS. 70 and 71 are combinable and interchangeable in any configuration in embodiments. With reference to FIG. 71, in the method 70100, the query may be initiated by at least one of: the device, a user of the device, a seller of the device, a purchaser of the device, a manufacturer of the device, or the IoT device registrar server. In the method 70100, the change may be determined by analyzing historical device property data 71102. In the method 70100, the change may be determined by monitoring a device property change flag 71104. In the method 70100, the change may include a change in device hardware. In the method 70100, the change may include a change in a network. In the method 70100, the change may include a change in ownership of the device. In the method 70100, the change may include a security event. In the method 70100, the determining that the device has reached end-of-life may include receiving a user input indicating that the device has reached end-of-life 71106. In the method 70100, the determining that the device has reached end-of-life may include receiving a security notification indicating a device decommissioning 71108. In the method 70100, the determining that the device has reached end-of-life may include receiving a decommission notification indicating a device decommissioning 71110. The method 70100 may further include generating a quarantine value indicating that a device should be quarantined 71112. The method 70100 may further include generating a decommission value indicating that a device should be decommissioned 71114. The method 70100 may further include generating a security value indicating that a device may be subject to a security event 71116. The method 70100 may further include generating an ownership notification indicating that an ownership value corresponding to the device has changed 71118. The method 70100 may further include displaying the notification of the change via a display circuit 71120. In the method 70100, the notification of the change may be displayed via a Single Pane of Glass (SPG) system. In the method 70100, the SPG system may include a graphical user interface. In the method 70100, the graphical user interface may be hosted by an IoT device registrar that includes the IoT device registrar server. In the method 70100, the SPG system may be included in a device management platform. In the method 70100, the SPG system may include an Application Programing Interface (API). In the method 70100, the API may be hosted by the IoT device registrar. In the method 70100, the API may be included in a device management platform.

Figure 72:
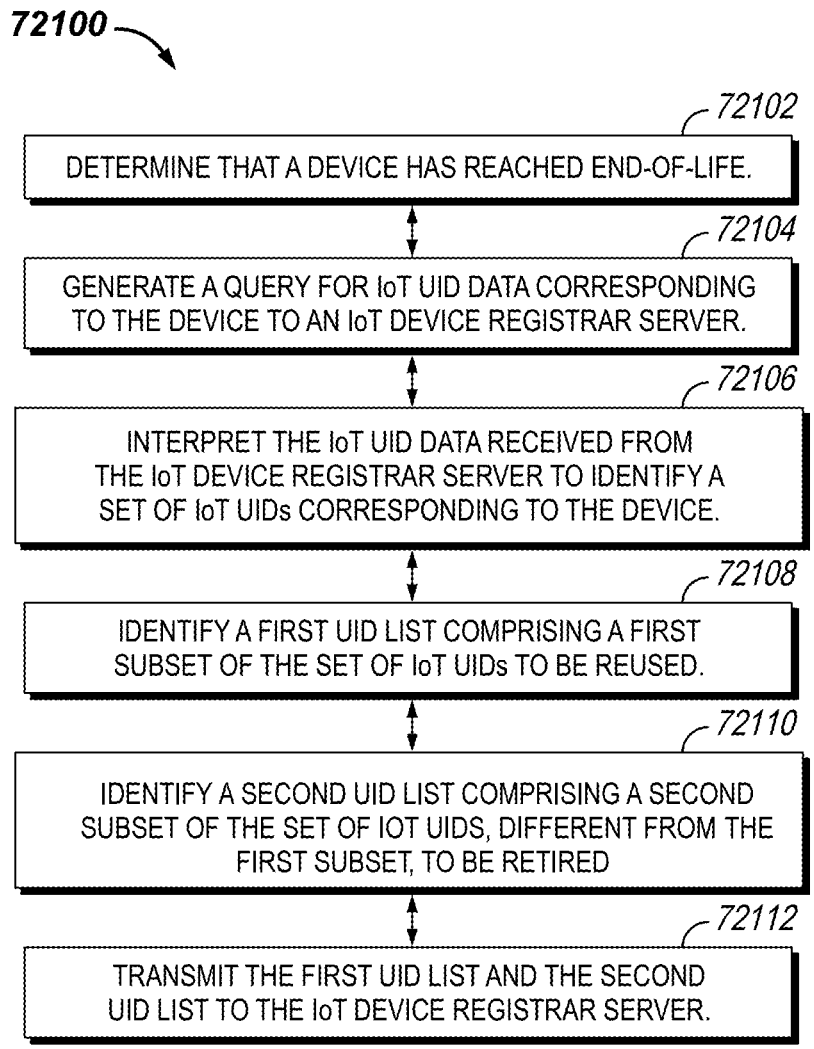
FIG. 72 is a flowchart depicting a method for an IoT device registry, in accordance with an embodiment of the current disclosure.

FIG. 72 illustrates a flowchart of an example method 72100 for displaying IoT device registry data, e.g., for network connected devices 1112, 1114, 1116, 1118, 1120, 1122, 1124 (FIG. 1), in accordance with an embodiment of the current disclosure. The method 72100 may be performed by the apparatus 69100 and/or any other computing device described herein. The method 72100 may include determining that a device has reached end-of-life 72102. The method 72100 may further include generating a query for IoT UID data corresponding to the device to an IoT device registrar server 72104. The method 72100 may further include interpreting IoT UID data received from the IoT device registrar server to identify a set of IoT UIDs corresponding to the device 72106. The method 72100 may further include identifying a first UID list comprising a first subset of the set of IoT UIDs to be reused 72108. The method 72100 may further include identifying a second UID list comprising a second subset of the set of IoT UIDs, different from the first subset, to be retired 72110. The method 72100 may further include transmitting the first UID list and the second UID list to the IoT device registrar server 72112.

Figure 73:
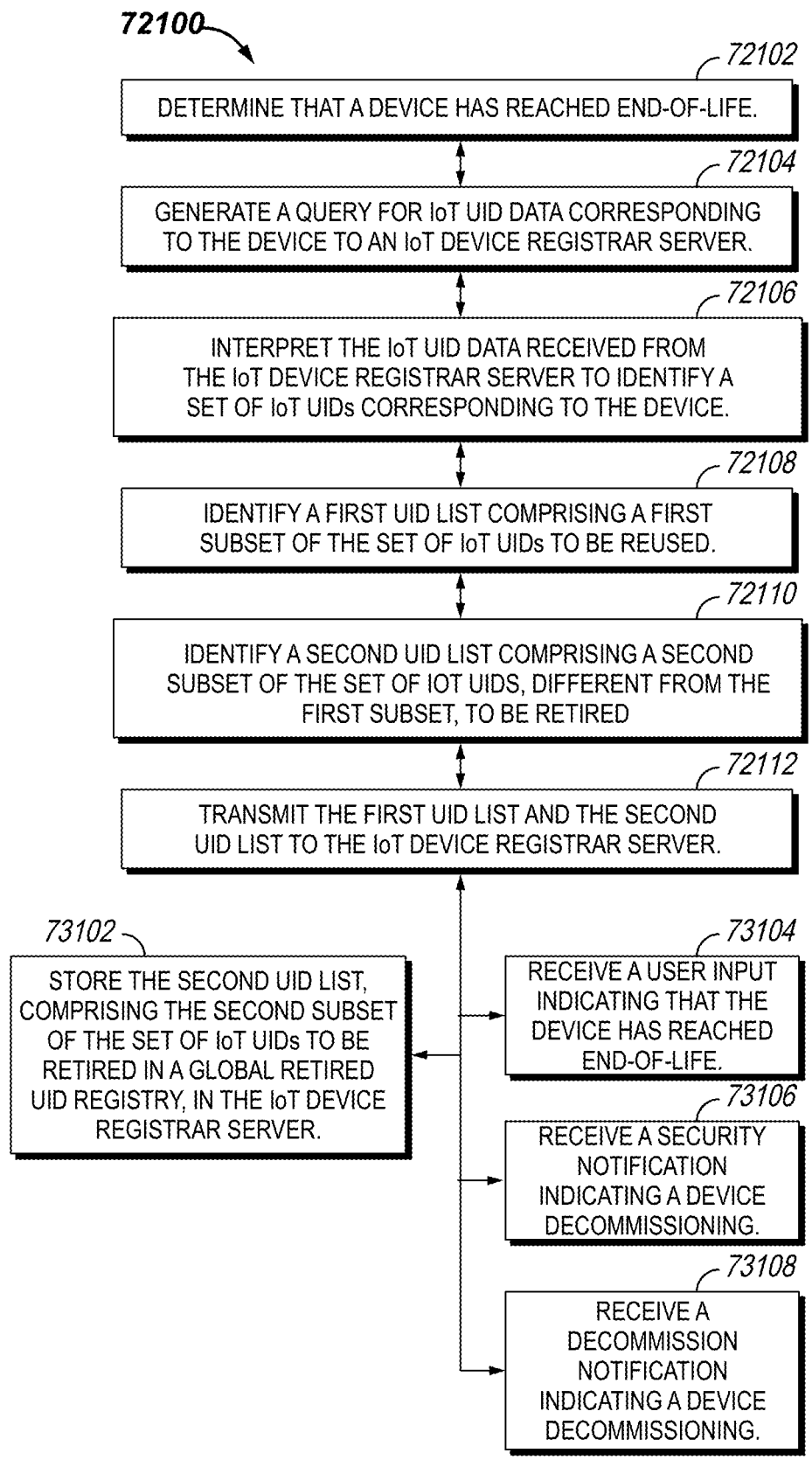
FIG. 73 is another flowchart depicting a method for an IoT device registry, in accordance with an embodiment of the current disclosure.

FIG. 73 is another flowchart depicting a method for an IoT device registry display, in accordance with an embodiment of the current disclosure. Certain further aspects of the example method are described herein, any one or more of which may be present in certain embodiments. The features shown in FIGS. 72 and 73 are combinable and interchangeable in any configuration in embodiments. With reference to FIG. 73, in the method 72100, either of the first subset or the second subset of the set of IoT UIDs may be an empty subset. The method 72100 may further include storing the second UID list, comprising the second subset of the set of IoT UIDs to be retired in a global retired UID registry, in the IoT device registrar server 73102. In the method 72100, the determining that the device has reached end-of-life may include receiving a user input indicating that the device has reached end-of-life 73104. In the method 72100, the determining that the device has reached end-of-life may include receiving a security notification indicating a device decommissioning 73106. In the method 72100, the determining that the device has reached end-of-life may include receiving a decommission notification indicating a device decommissioning 73108.

Figure 74:
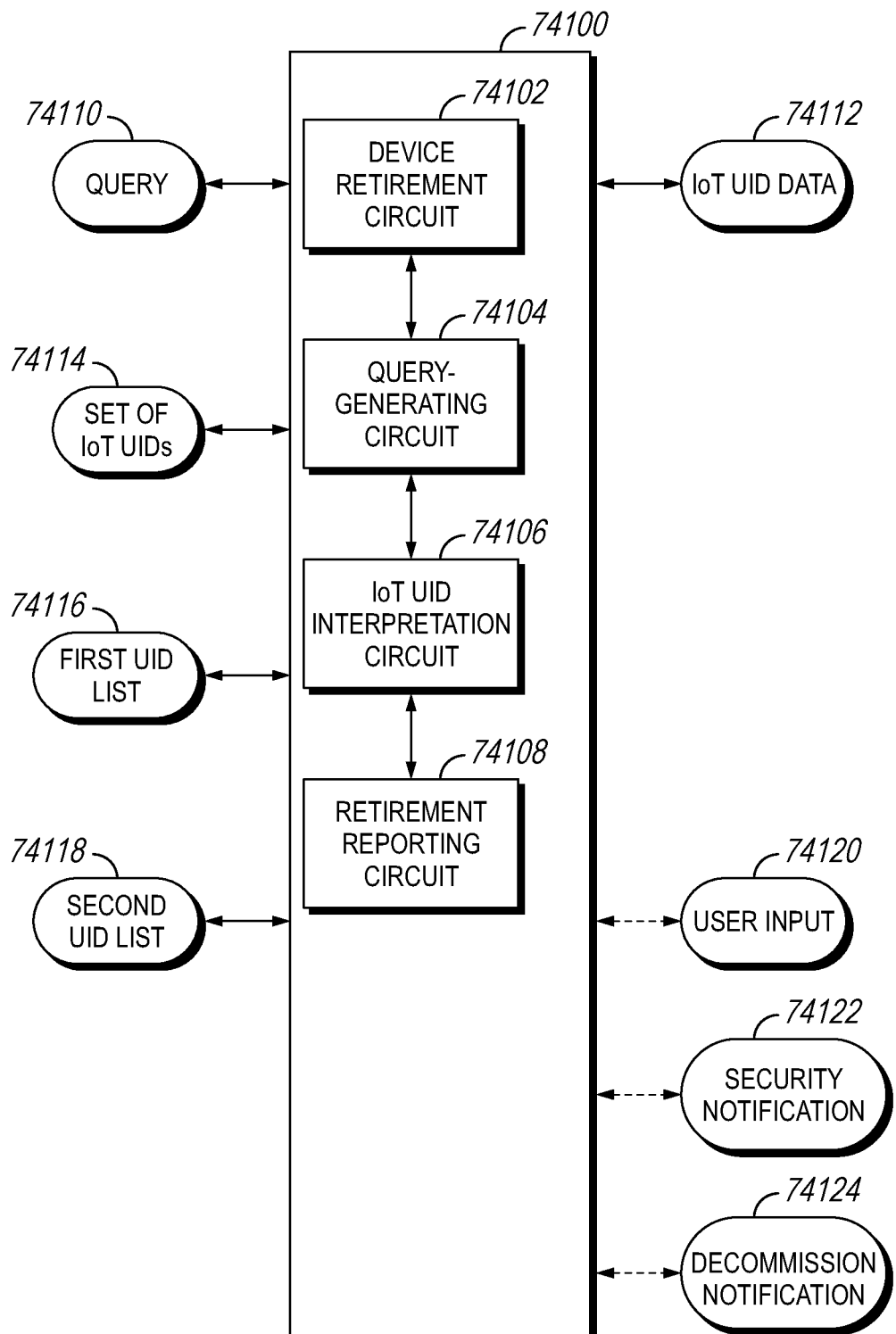
FIG. 74 is a schematic diagram of an apparatus for an IoT device registry, in accordance with an embodiment of the current disclosure.

FIG. 74 depicts a schematic diagram of an example apparatus 74100 for an IoT device registry, e.g., for network connected devices 1112, 1114, 1116, 1118, 1120, 1122, 1124 (FIG. 1), in accordance with an embodiment of the current disclosure. The apparatus 74100 may form part of the server 1126 (FIG. 1), e.g., the at least one processor, and/or any other electronic computing device described herein.

With reference to FIG. 74, the apparatus 74100 is for an IoT device registry. The apparatus 74100 may include a device retirement circuit 74102, a query-generating circuit 74104, an IoT UID interpretation circuit 74106, and a retirement reporting circuit 74108. The device retirement circuit 74102 may be structured to determine that a device has reached end-of-life. The query-generating circuit 74104 may be structured to generate a query 74110 for IoT UID data 74112 corresponding to the device to an IoT device registrar server, e.g., the server 1126 in the registrar 1130 (FIG. 1). The IoT UID interpretation circuit 74106 may be structured to interpret the IoT UID data 74112 received from the IoT device registrar server to identify a set of IoT UIDs 74114 corresponding to the device, identify a first UID list 74116 comprising a first subset of the set of IoT UIDs 74114 to be reused, and identify a second UID list 74118 comprising a second subset of the set of IoT UIDs 74114, different from the first subset, to be retired. The retirement reporting circuit 74108 may be structured to transmit the first UID list 74116 and the second UID list 74118 to the IoT device registrar server. In embodiments, an IoT UID may not be recycled, e.g., an IoT UID may be permanently retired. In embodiments, an IoT UID may be recycled, e.g., a first device corresponding to an IoT UID may be decommissioned and a second device may be assigned the IoT UID.

Certain further aspects of the example apparatus are described herein, any one or more of which may be present in certain embodiments. With further reference to FIG. 74, in the apparatus 74100, either of the first subset or the second subset of the set of IoT UIDs may be an empty subset. In the apparatus 74100, the second UID list, including the second subset of the set of IoT UIDs to be retired in a global retired UID registry, may be stored in the IoT device registrar server. In the apparatus 74100, the determining that the device has reached end-of-life may include receiving a user input 74120 indicating that the device has reached end-of-life. In the apparatus 74100, the determining that the device has reached end-of-life may include receiving a security notification 74122 indicating a device decommissioning. In the apparatus 74100, the determining that the device has reached end-of-life may include receiving a decommission notification 74124 indicating a device decommissioning.

Figure 75:
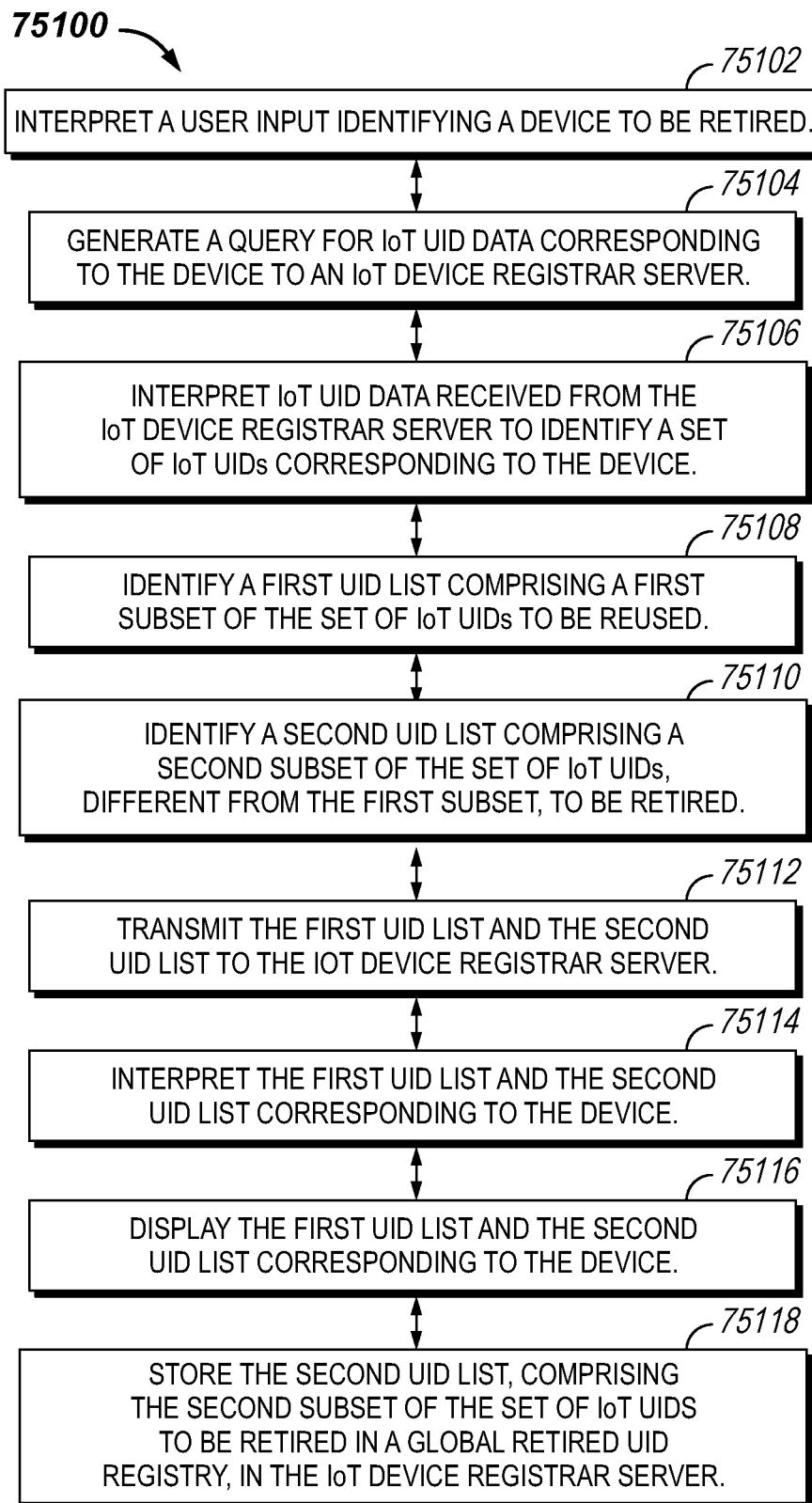
FIG. 75 is a flowchart depicting a method for an IoT device registry, in accordance with an embodiment of the current disclosure.

FIG. 75 illustrates a flowchart of an example method 75100 for displaying IoT device registry data, e.g., for network connected devices 1112, 1114, 1116, 1118, 1120, 1122, 1124 (FIG. 1), in accordance with an embodiment of the current disclosure. The method 75100 may be performed by the apparatus 69100 and/or any other computing device described herein. The method 75100 may include interpreting, via a user input processing circuit, a user input identifying a device to be retired 75102. The method 75100 may further include generating a query for Internet of Things Universal Identification (IoT UID) data corresponding to the device to an IoT device registrar server 75104. The method 75100 may further include interpreting IoT UID data received from the IoT device registrar server to identify a set of IoT UIDs corresponding to the device 75106. The method 75100 may further include identifying a first UID list comprising a first subset of the set of IoT UIDs to be reused 75108. The method 75100 may further include identifying a second UID list comprising a second subset of the set of IoT UIDs, different from the first subset, to be retired 75110. The method 75100 may further include transmitting the first UID list and the second UID list to the IoT device registrar server 75112. The method 75100 may further include interpreting, via the IoT device registrar server, the first UID list and the second UID list corresponding to the device 75114. The method 75100 may further include displaying, via a display circuit, the first UID list and the second UID list corresponding to the device 75116.

Certain further aspects of the example method are described herein, any one or more of which may be present in certain embodiments. With further reference to FIG. 75, in the method 75100, either of the first subset or the second subset of the set of IoT UIDs is an empty subset. The method 75100 may further include storing the second UID list, comprising the second subset of the set of IoT UIDs to be retired in a global retired UID registry, in the IoT device registrar server 75118.

Figure 76:
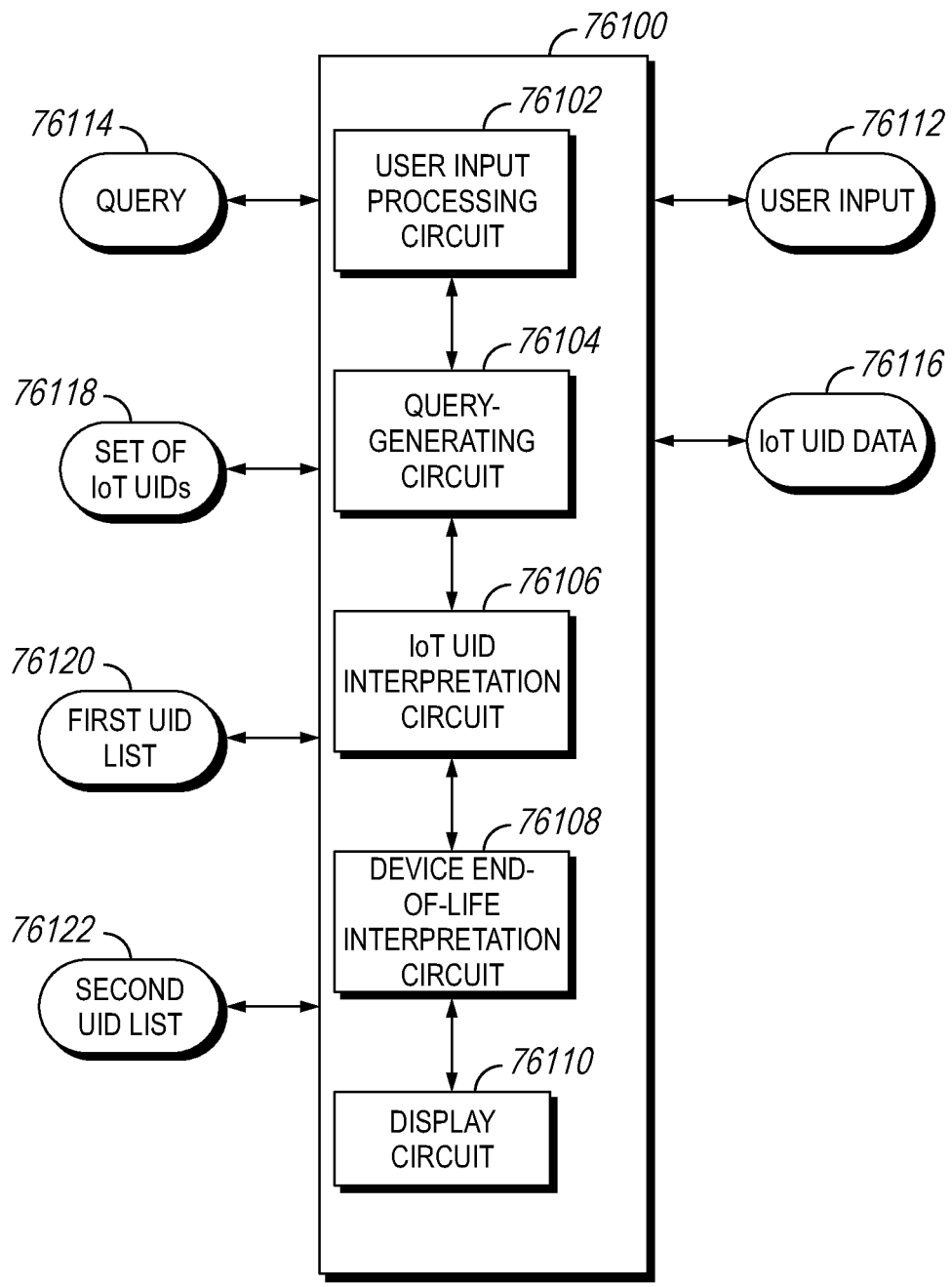
FIG. 76 is a schematic diagram of an apparatus for an IoT device registry, in accordance with an embodiment of the current disclosure.

FIG. 76 depicts a schematic diagram of an example apparatus 76100 for an IoT device registry, e.g., for network connected devices 1112, 1114, 1116, 1118, 1120, 1122, 1124 (FIG. 1), in accordance with an embodiment of the current disclosure. The apparatus 76100 may form part of the server 1126 (FIG. 1), e.g., the at least one processor, and/or any other electronic computing device described herein.

With reference to FIG. 76, the apparatus 76100 is for an IoT device registry. The apparatus 76100 may include a user input processing circuit 76102, a query-generating circuit 76104, an IoT UID interpretation circuit 76106, a device end-of-life interpretation circuit 76108, and a display circuit 76110. The user input processing circuit 76102 may be structured to interpret a user input 76112 identifying a device to be retired. The query-generating circuit 76104 may be structured to generate a query 76114 for IoT UID data 76116 corresponding to the device to an IoT device registrar server, e.g., the server 1126 in the registrar 1130 (FIG. 1). The IoT UID interpretation circuit 76106 may be structured to interpret the IoT UID data 76116 received from the IoT device registrar server to identify a set of IoT UIDs 76118 corresponding to the device, identify a first UID list 76120 comprising a first subset of the set of IoT UIDs to be reused, and identify a second UID list 76122 comprising a second subset of the set of IoT UIDs, different from the first subset, to be retired. The device end-of-life interpretation circuit 76108 may be at the IoT device registrar server, and may be structured to interpret the first UID list 76120 and the second UID list 76122 corresponding to the device. The display circuit 76110 may be structured to display the first UID list 76120 and the second UID list 76122 corresponding to the device.

Certain further aspects of the example method are described herein, any one or more of which may be present in certain embodiments. With further reference to FIG. 76, in the apparatus 76100, either of the first subset or the second subset of the set of IoT UIDs is an empty subset. In the apparatus 76100, the second UID list, comprising the second subset of the set of IoT UIDs to be retired in a global retired UID registry, is stored in the IoT device registrar server.

Figure 77:
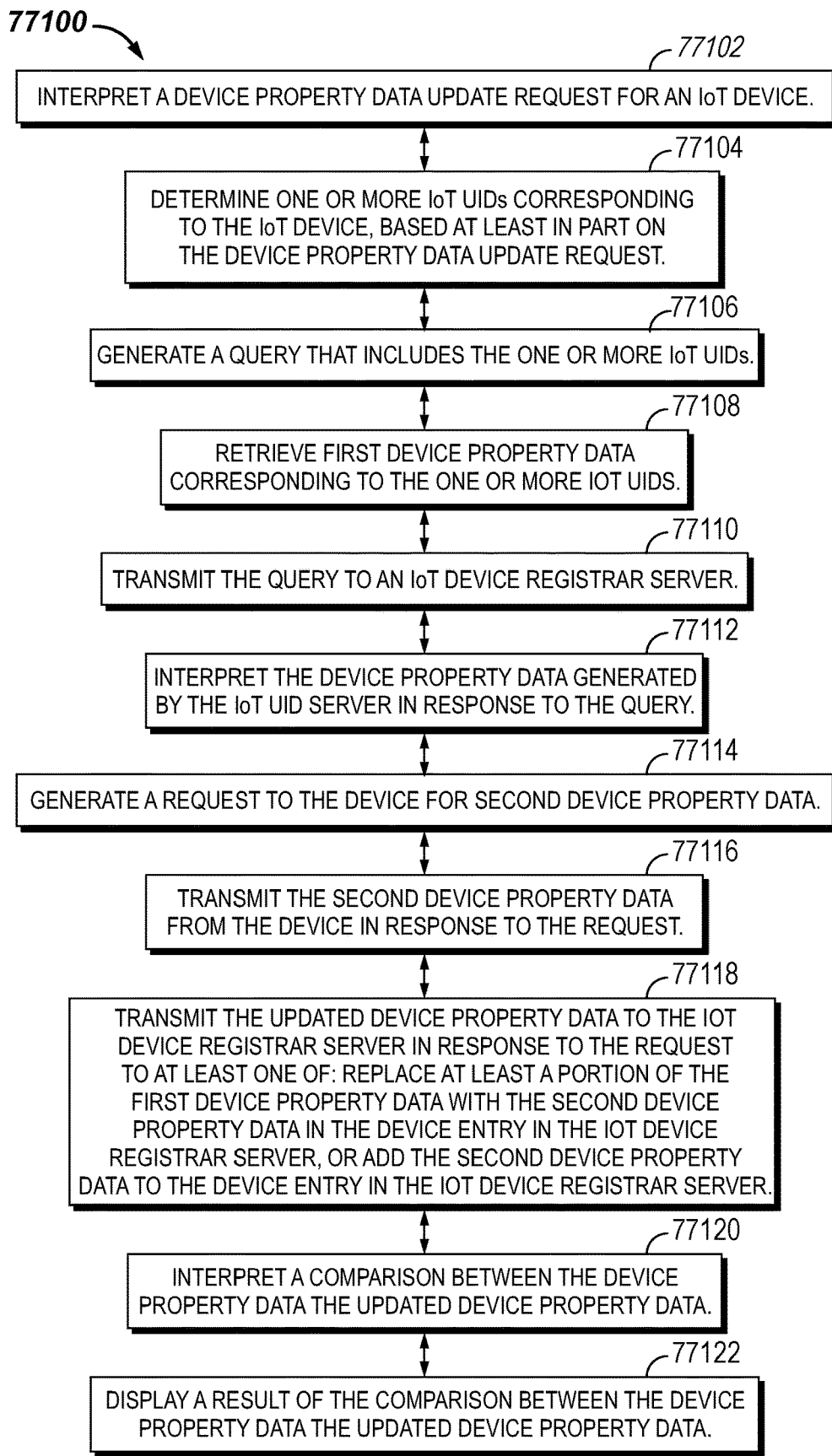
FIG. 77 is a flowchart depicting a method for an IoT device registry, in accordance with an embodiment of the current disclosure.

FIG. 77 illustrates a flowchart of an example method 77100 for displaying IoT device registry data, e.g., for network connected devices 1112, 1114, 1116, 1118, 1120, 1122, 1124 (FIG. 1), in accordance with an embodiment of the current disclosure. The method 77100 may be performed by the apparatus 69100 and/or any other computing device described herein. The method 77100 may include interpreting, via an input processing circuit, a device property data update request for an IoT device 77102. The method 77100 may further include determining, via an IoT UID identification circuit, one or more IoT UIDs corresponding to the IoT device, based at least in part on the device property data update request 77104. The method 77100 may further include generating, via a device lookup circuit, a query that includes the one or more IoT UIDs 77106. The method 77100 may further include retrieving, via the device lookup circuit, first device property data corresponding to the one or more IoT UIDs 77108. The method 77100 may further include transmitting, via a query provisioning circuit, the query to an IoT device registrar server 77110. The method 77100 may further include interpreting, via a device property processing circuit, the device property data generated by the IoT UID server in response to the query, the device property data being included in a device entry in the IoT UID server corresponding to the IoT device 77112. The method 77100 may further include generating, via the query provisioning circuit, a request to the device for second device property data 77114. The method 77100 may further include receiving, via the query provisioning circuit, the second device property data from the device in response to the request 77116. The method 77100 may further include transmitting, via the query provisioning circuit, the updated device property data to the IoT device registrar server in response to the request to at least one of: replace at least a portion of the first device property data with the second device property data in the device entry in the IoT device registrar server, or add the second device property data to the device entry in the IoT device registrar server 77118. The method 77100 may further include interpreting, via the device property processing circuit, a comparison between the device property data the updated device property data 77120. The method 77100 may further include displaying, via a display circuit, a result of the comparison between the device property data the updated device property data 77122.

Figure 78:
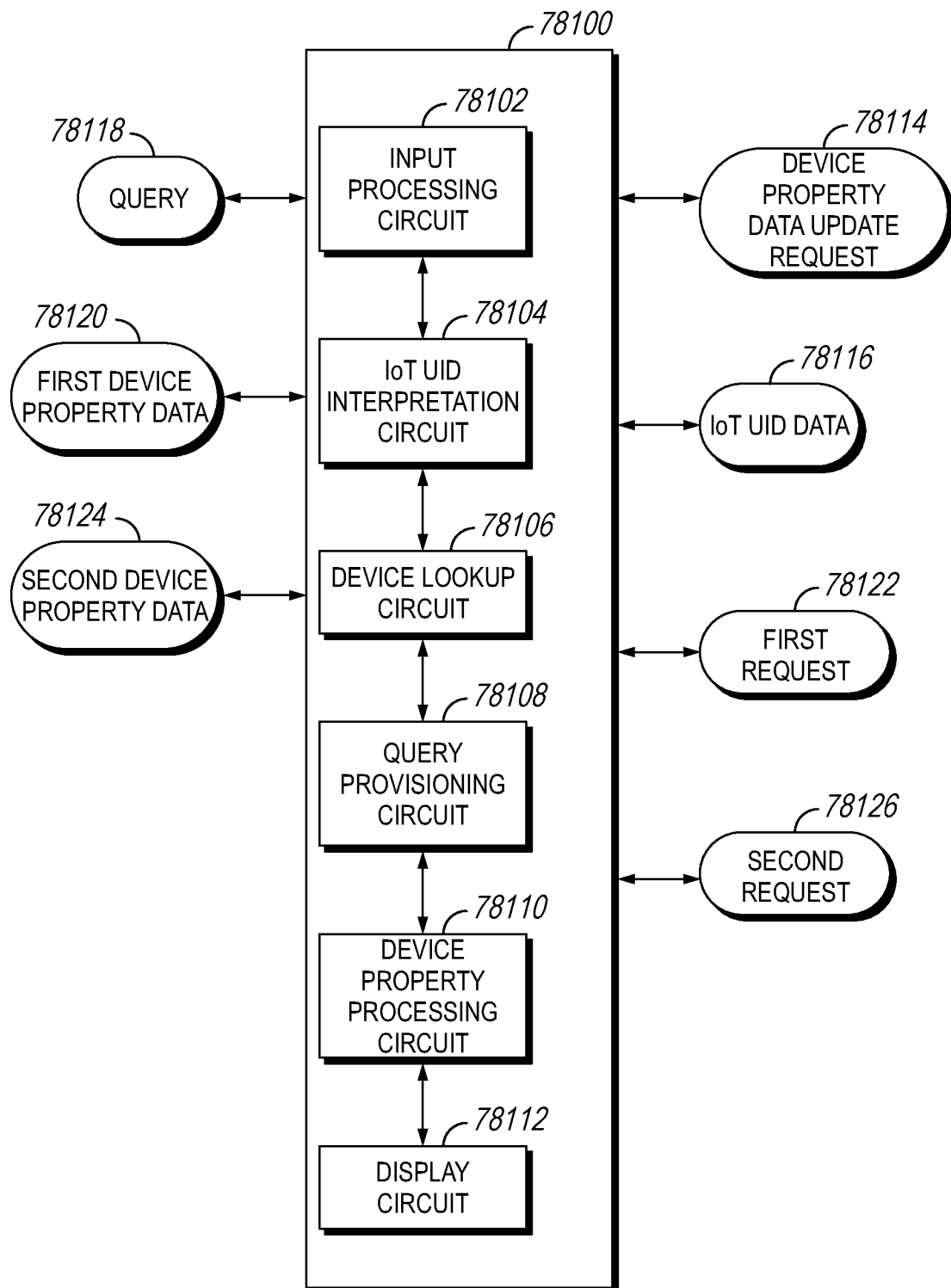
FIG. 78 is a schematic diagram of an apparatus for an IoT device registry, in accordance with an embodiment of the current disclosure.

FIG. 78 depicts a schematic diagram of an example apparatus 78100 for an IoT device registry, e.g., for network connected devices 1112, 1114, 1116, 1118, 1120, 1122, 1124 (FIG. 1), in accordance with an embodiment of the current disclosure. The apparatus 78100 may form part of the server 1126 (FIG. 1), e.g., the at least one processor, and/or any other electronic computing device described herein.

With reference to FIG. 78, the apparatus 78100 is for an IoT device registry. The apparatus 78100 may include an input processing circuit 78102, an IoT UID identification circuit 78104, a device lookup circuit 78106, a query provisioning circuit 78108, a device property processing circuit 78110, and a display circuit 78112.

The input processing circuit 78102 may be structured to interpret a device property data update request 78114 for an IoT device. The IoT UID identification circuit 78104 may be structured to determine one or more IoT UIDs 78116 corresponding to the IoT device, based at least in part on the device property data update request 78114. The device lookup circuit 78106 may be structured to generate a query 78118 that includes the one or more IoT UIDs 78116, and retrieve first device property data 78120 corresponding to the one or more IoT UIDs 78116. The query provisioning circuit 78108 structured to transmit the query 78118 to an IoT device registrar server, e.g., the server 1126 in the registrar 1130 (FIG. 1). The device property processing circuit 78110 may be structured to interpret the first device property data 78120 generated by the IoT UID server in response to the query 78118, the first device property data 78120 being included in a device entry in the IoT UID server corresponding to the IoT device. The query provisioning circuit 78108 may be further structured to generate a first request 78122 to the device for second device property data 78124, receive the second device property data 78124 from the device in response to the first request 78122, and transmit the second device property data 78124 to the IoT device registrar server in response to a second request 78126 to at least one of: replace at least a portion of the first device property data 78120 with the second device property data 78124 in the device entry in the IoT device registrar server, or add the second device property data 78124 to the device entry in the IoT device registrar server. The device property processing circuit 78110 may be further structured to interpret a comparison between the first device property data 78120 and the second device property data 78124. The display circuit 78112 may be structured to display a result of the comparison between the first device property data 78120 and the second device property data 78124.

Figure 79:
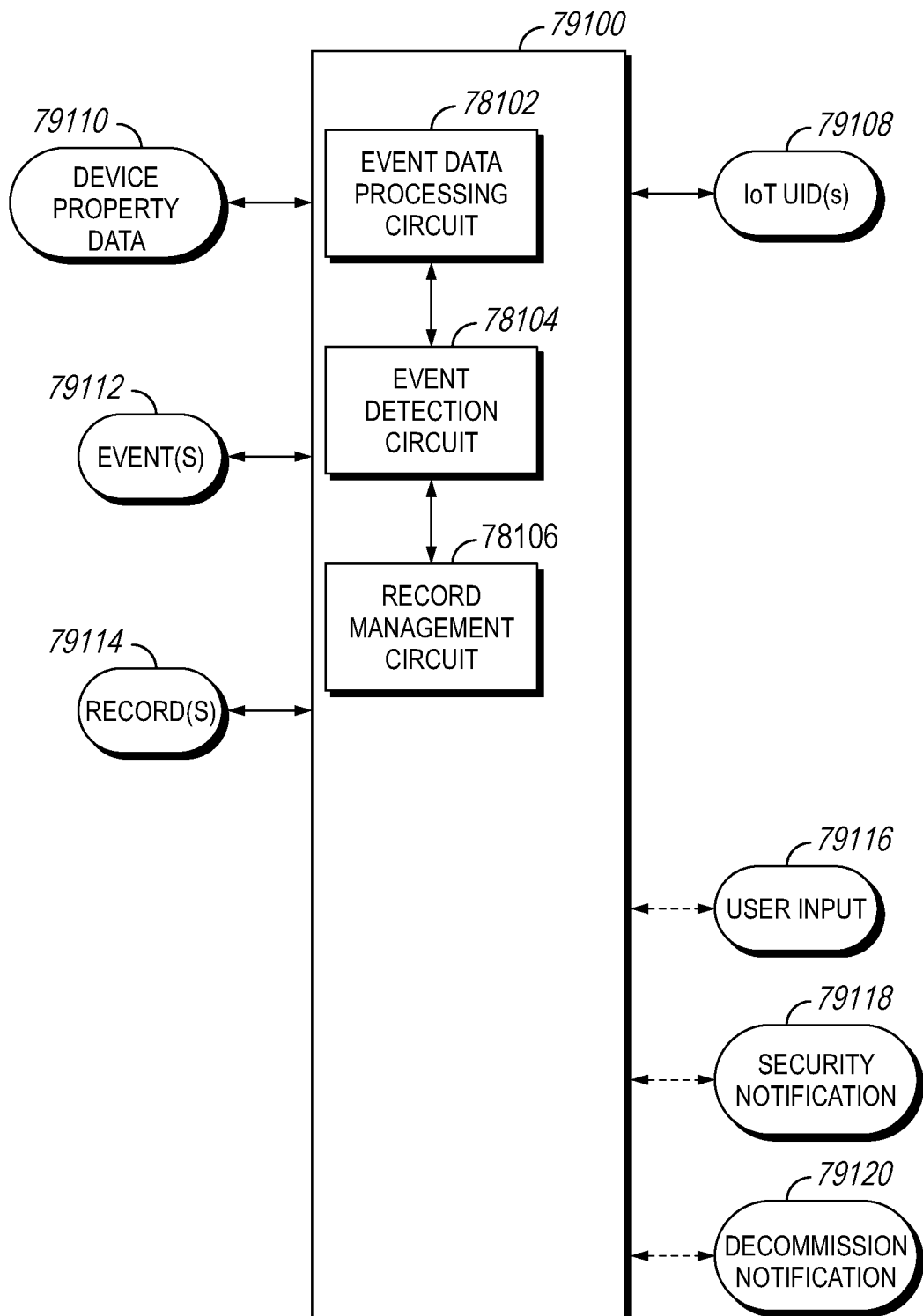
FIG. 79 is a schematic diagram of an apparatus for an IoT device registry, in accordance with an embodiment of the current disclosure.

FIG. 79 depicts a schematic diagram of an example apparatus 79100 for an IoT device registry, e.g., for network connected devices 1112, 1114, 1116, 1118, 1120, 1122, 1124 (FIG. 1), in accordance with an embodiment of the current disclosure. The apparatus 79100 may form part of the server 1126 (FIG. 1), e.g., the at least one processor, and/or any other electronic computing device described herein.

With reference to FIG. 79, the apparatus 79100 is for an IoT device registry. The apparatus 79100 may include an event data processing circuit 79102, an event detection circuit 79104, and a record management circuit 79106. The event data processing circuit 79102 may be structured to interpret an IoT UID 79108 and corresponding device property data 79110. The event detection circuit 79104 may be structured to determine, based at least in part on the device property data 79110, an event 79112 corresponding to a device corresponding to the IoT UID 79108. The record management circuit 79106 may be structured to update a record 79114 corresponding to the IoT UID 79108, based at least in part on the event 79112.

Certain further aspects of the example apparatus are described herein, any one or more of which may be present in certain embodiments. With further reference to FIG. 79, in the apparatus 79100, the event 79112 may include determining that the device has reached end-of-life. In the apparatus 79100, the determining that the device has reached end-of-life may include receiving a user input 79116 indicating that the device has reached end-of-life. In the apparatus 79100, the determining that the device has reached end-of-life may include receiving a security notification 79118 indicating a device decommissioning. In the apparatus 79100, the determining that the device has reached end-of-life may include receiving a decommission notification 79120 indicating a device decommissioning.

Figure 80:
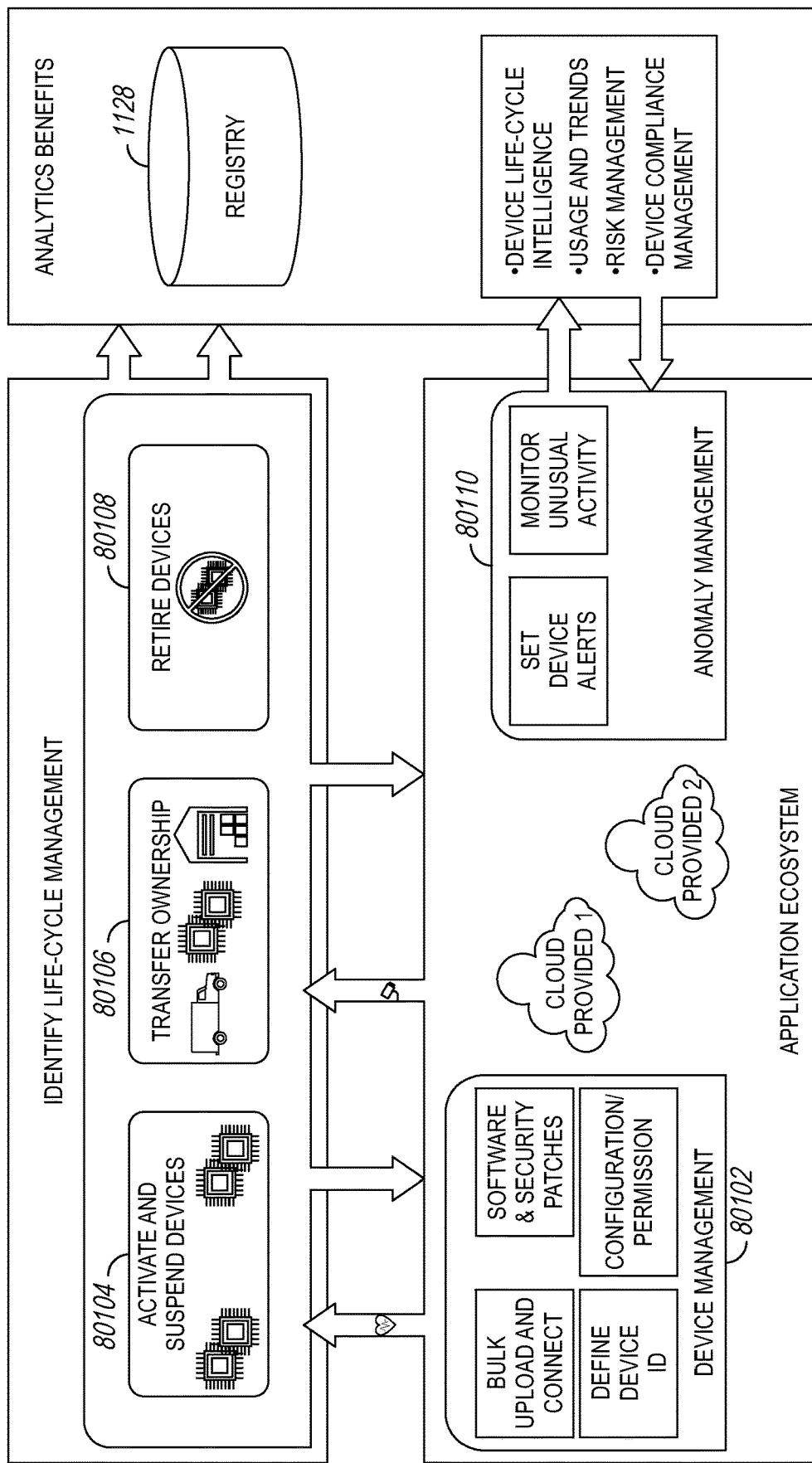
FIG. 80 is a schematic diagram depicting a lifecycle of network connected devices, in accordance with an embodiment of the current disclosure.

Embodiments of the current disclosure may provide for continuous IoT identity lifecycle management. FIG. 80 is a schematic diagram depicting a lifecycle of network connected devices, in accordance with an embodiment of the current disclosure. For example, multiple network connected devices, e.g., ten, one-hundred, one-thousand, ten-thousand, etc., owned and/or operated by an entity, e.g., 1134 (FIG. 1), may each be assigned 80102 network connected device property data 6124 (FIG. 6), e.g., a device ID, and then be registered in bulk with the registration server 1126 (FIG. 1), as described herein. As shown in FIG. 80, embodiments of the system 1100 (FIG. 1) may provide for patching of the network connected devices, e.g., the pushing of software and/or security updates to the devices. Embodiments of the current disclosure may also track the patched status of the devices via one or more fields 6122 (FIG. 6) within records 6110 (FIG. 6) corresponding to the network connected devices. Embodiments of the current disclosure may further provide for configuration and/or permission changes to be applied to the connected network devices, and/or provide for tracking of the configuration and/or permission settings of the network connected device via one or more fields 6122 (FIG. 6) in records 6110 (FIG. 6) corresponding to the network connected devices. Embodiments of the current disclosure may also provide for network connected devices to be activated and/or suspended 80104, transferred 80106 between owners and/or operators of the network connected devices, and/or retired 80108 from service. In certain aspects, transfers of a network connected device may occur between owners, workgroups within the same organization, and/or other entities.

Embodiments of the current disclosure may also provide for alert management 80110, e.g., the setting and triggering of alerts based on conditional logic. For example, the owner and/or operators of a network connected device may set alerts configured to notify the owner and/or operator of unusual activity associated with one or more network connected devices. Embodiments of the current disclosure may also provide for analytical analysis of data corresponding to the network connected devices, e.g., usage and/or trend data, risk management data, data compliance management, etc. Such analysis may be performed by the registration server 1126 (FIG. 1) on data retrieved from the plurality of records 1131 (FIG. 1). Risk analysis may be based at least in part on the attributes of one or more network connected devices, e.g., lifecycle events reflected by changes of a network connected device's attributes as recorded in its corresponding record 6110 (FIG. 6). The determination of when to send an alert may be made automatically by the server 1126 (FIG. 1) or by any apparatus described herein, or may be triggered by a user input.

Figure 81:
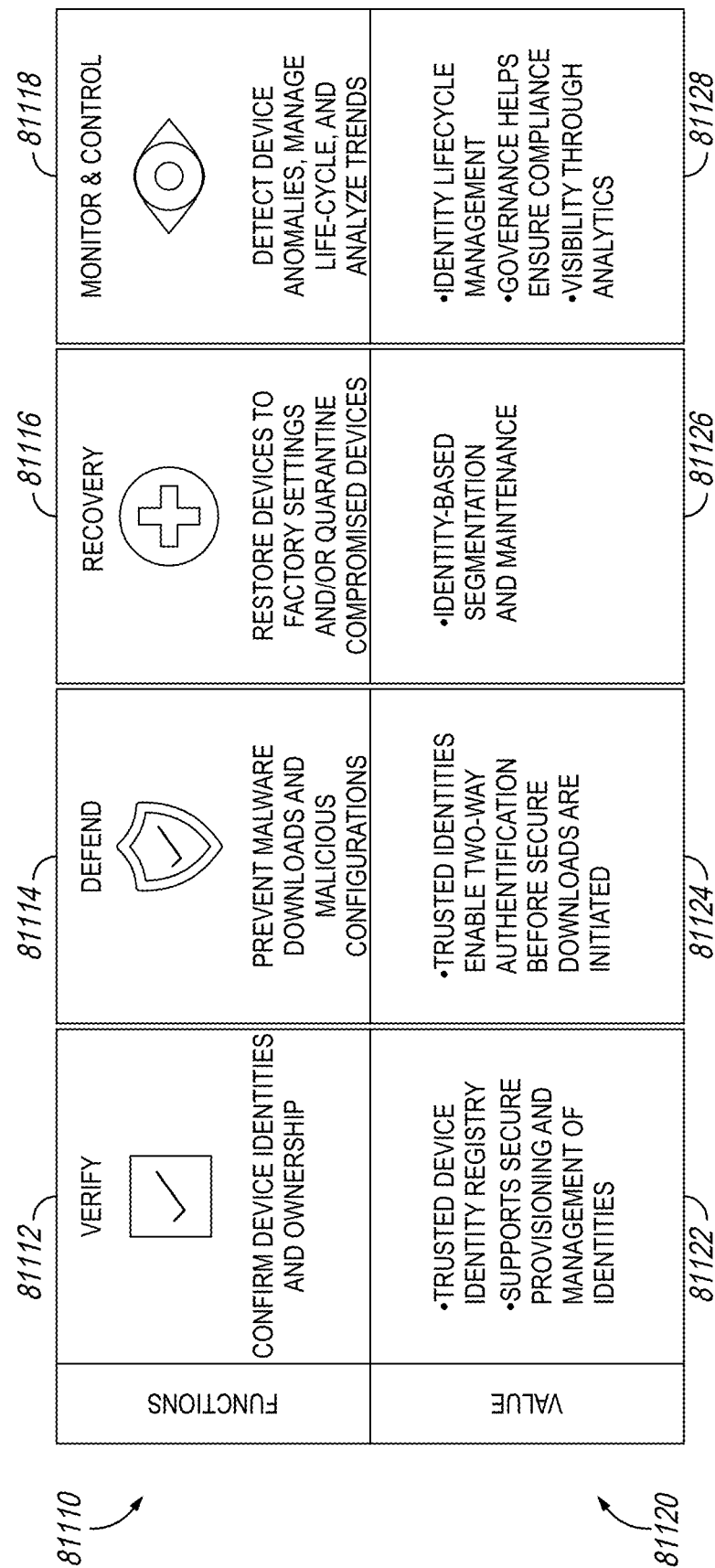
FIG. 81 is a diagram mapping features to benefits of the system of FIG. 1, in accordance with an embodiment of the current disclosure.

FIG. 81 is a diagram mapping features to benefits of the system of FIG. 1, in accordance with an embodiment of the current disclosure. With reference to FIG. 81, as explained in greater detail herein, embodiments of the current disclosure may provide various functions 81110, with respect to network connected devices, such as verification 81112, defense 81114, recovery 81116, monitoring and/or control 81118, etc. Verification 81112 may include the confirmation of a network connected device's identity and/or ownership. Defense 81114 may include the prevention of malware downloads (and or other network infiltration methods) and/ or the malicious configuration of a network connected device. Recovery 81116 may include restoration of a network connected device to factory settings and/or another saved/known state. Recovery 81116 may also include quarantining compromised devices and/or devices suspected of being compromised. Monitoring and/or control 81118 may include detection of anomalies regarding one or more network connected devices, management of a network connected device's lifecycle, and/or analysis of trends involving one or more network connected devices. Non-limiting examples of anomalies include: out-of-range values for an attribute, e.g., temperatures, pressures, etc., monitored and/ or experienced by a network connected device and/or an asset being monitored by the network connected device; attempts to register a network connected device with the registry 1129 (FIG. 1) without having approval to do so; attempts by a network connected device to access another device and/or to exercise unauthorized network and/or device access permission; and/or other suspicious activities.

The functions 81110 may provide corresponding value, e.g., benefits 81120, such as a trusted device identity registry 81122 that supports secure provisioning and management of network connected device identities, trusted two-way authentication 81124 before initiating secure downloads, identity-based segmentation and maintenance 81126, and/or identity lifecycle management and governance 81128 (which may help an entity, e.g., 1134 (FIG. 1), operating a large number of network connected devices to ensure compliance with applicable regulations, e.g., data privacy laws with respect to data generated by a network connected device).

As will be understood, security in traditional IoT networks is often lacking and/or non-existent due to lack of expertise and/or education regarding IoT security within an enterprise, e.g., a corporate network. When security is considered by an enterprise, it is often an afterthought or considered non-critical when compared to the incentives of launching a new IoT solution early in the marketplace. Lack of experience by an enterprise and/or a failure to understand and/or appreciate IoT security may cause an enterprise to hire a third party to conduct a security assessment/inspection. Such assessments, however, do not provide continuous security. Further, the resources required to manage IoT device lifecycles and security generally scale exponentially. As will be understood, lifecycle management of network connected devices, and the corresponding infrastructure disclosed herein, may ease and/or otherwise improve security and/or risk management of network connected devices, to include easing and/or improving the ability of an entity that owns or operates network connected devices to comply with government and/or industry standards. For example, in certain aspects, the registry 1129 (FIG. 1) may provide for verification of an owner and/or operator of a registered network connected device before modifying the corresponding record. Such verification may mitigate and/or prevent the likelihood of a spoofing attack on the network connected device. Thus, some embodiments of the current disclosure may mitigate the threat of a network intruder/masquerader and/or provide for the ability to detect such an intruder in the event one gains access to network connected device and/or corresponding network. The registry 1129 may also provide for the ability to detect tampering of a network connected device, e.g., buy looking for unusual activities within the corresponding records 1131. Some embodiments of the registry 1129 may provide for the correction of a tampered device.

Figure 82:
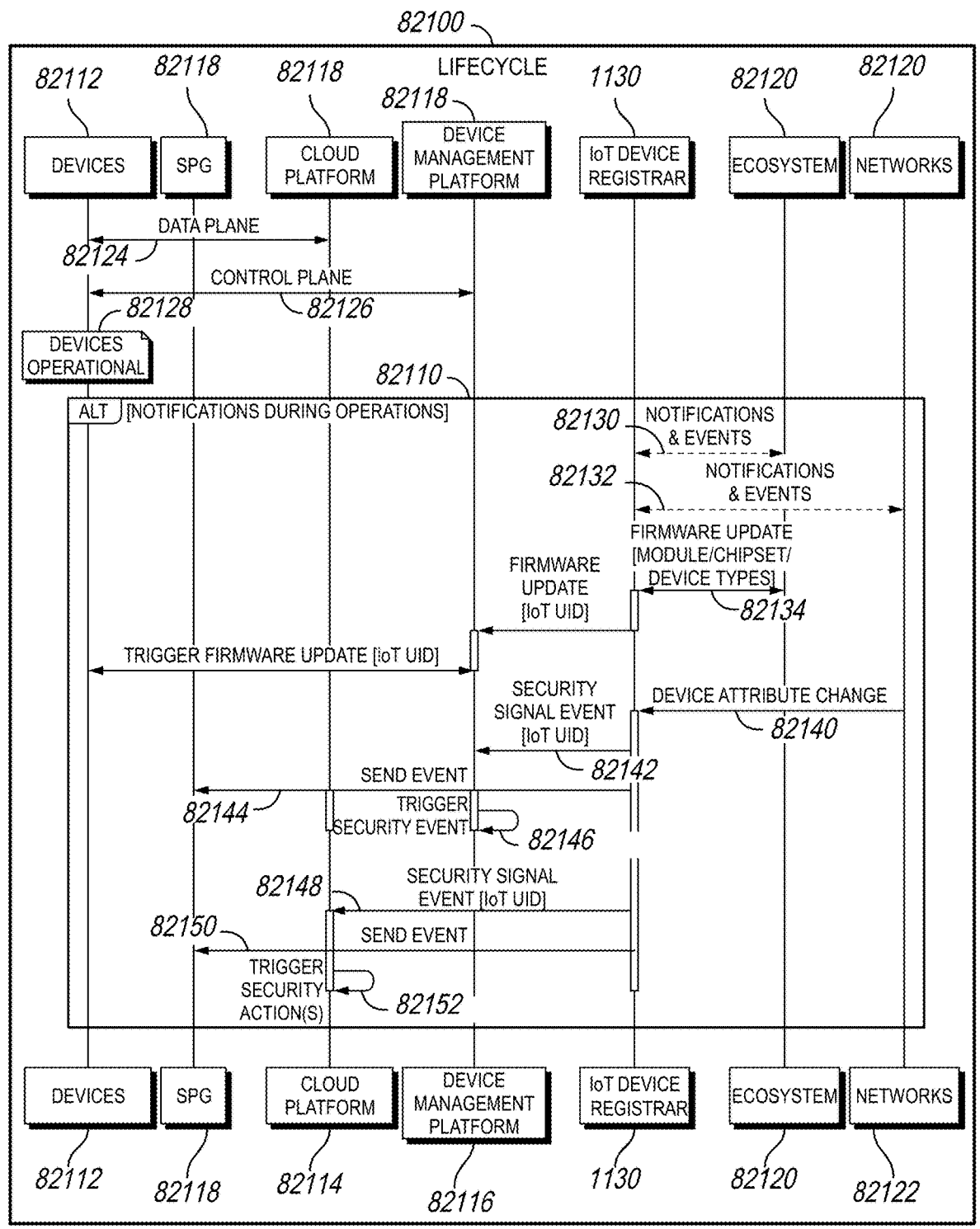
FIG. 82 is a process flow diagram depicting process flows for lifecycle management of IoT devices, in accordance with embodiments of the current disclosure.

FIG. 82 is a process flow diagram depicting process flows for lifecycle management of IoT devices, in accordance with embodiments of the current disclosure. Illustrated in FIG. 82 is a process flow diagram depicting a process flow 82100 for lifecycle management of registered IoT devices involving the exchange of data between: a device 82112, e.g., an enterprise end user 1136 (FIG. 1), a could platform 82114, a device management partner platform 82116; a single pane of glass (SPG) 82118; an ecosystem 82120, one or more networks 82122, and an IoT device registrar, e.g., the IoT device registrar 1130 of FIG. 1. The flow 82100 may apply, for example, to a Greenfield device having an embedded IoT UID, as described herein, e.g., FIGS. 40 and 41 and related disclosure. The ecosystem 82120 may include the ecosystems 1134 in which the one or more devices 1112, 1114, 1116, 1118, 1120, 1122, and 1124 exist/operate (FIG. 1), ecosystems 5126 that may relate to risk management 5128, compliance management 5130, and/or security 5132 (FIG. SO5), and may further include one or more databases that may store information regarding known vulnerabilities of IoT devices registered in the registry 1129 (FIG. 1). Information on risk events may be pulled from the databases in the ecosystem.

With further reference to FIG. 82, in embodiments, in flow 82100 the cloud platform 82114 may adjust and/or manipulate the data plane functionality of the device 82112, as depicted by line 82124. The device management partner platform 82116 may adjust and/or manipulate the control plane functionality of the device 82112, as depicted by line 82126. When the communication at 82124 and 82126 are established, it can be confirmed at 82128 that the device 82112 is operational.

The flow 82100 may then include flow 82110. In flow 82110, as depicted by dashed line 82130, notifications and information on events, as described herein, may be transmitted to/from the IoT device registrar 1130 and devices and databases in the ecosystem 82120. In addition, in flow 82110, as depicted by dashed line 82132, notifications and information on events, as described herein, may be transmitted to/from the IoT device registrar 1130 and the one or more networks 82122. In flow 82110, as depicted by line 82134, a notification of a firmware update, e.g., module/chipset/device types, may be transmitted from the ecosystem 82120 to the IoT device registrar 1130.

Next, in flow 82110, as depicted by line 82136, IoT device registrar 1130 may identify an IoT UID associated with the device 82112, and may transmit the firmware update and the IoT UID to the device management partner platform 82116, for example, by piggybacking the IoT UID onto a message containing the firmware update, as described herein, e.g., FIGS. 30 and 31 and related disclosure. Then, in flow 82110, as depicted by line 82138, the device management partner platform 82116 may trigger the device 82112 to implement the firmware update transmitted with the associated IoT UID.

With further reference to FIG. 82, in flow 82110, as depicted by line 82140, the one or more networks 82122 may transmit a device attribute change to the IoT device registrar 1130. The device attribute change may be indicative of a security event, as described herein. The device attribute change may also be a defensive notification from the ecosystem 82120 and/or the one or more networks 82122 to be sent to the IoT device registrar 1130 indicating that a security event has been identified. Next, in flow 82110, as depicted by line 82142, the IoT device registrar 1130 may generate a security signal event notification indicating the security event, and may identify an IoT UID associated with the device 82112, and then may transmit the security signal event notification and the IoT UID to the device management partner platform 82116, for example, by piggybacking the IoT UID onto a message containing a security signal event notification, as described herein. Then, in flow 82110, as depicted by line 82144, the IoT device registrar 1130 may send the security signal event notification to the SPG 82118, e.g., to be displayed. Also, in flow 82110, as depicted by line 82146, when the device management partner platform 82116 receives the security signal event notification and the IoT UID, it may trigger one or more security actions, such as quarantining the device 82112, disabling the device 82112, notifying the device 82112 of the security event, or other actions as described herein. In flow 82110, as depicted by line 82148, the IoT device registrar 1130 may transmit the security signal event notification and the IoT UID to the cloud platform 82114; then, as depicted by line 82150, the IoT device registrar 1130 may transmit the security signal event notification to the SPG 82118, e.g., to be displayed. In flow 82110, as depicted by line 82152, when the cloud platform 82114 receives the security signal event notification, it may trigger one or more security actions, such as quarantining the device 82112, disabling the device 82112, notifying the device 82112 of the security event, or other actions as described herein.

Figure 83:
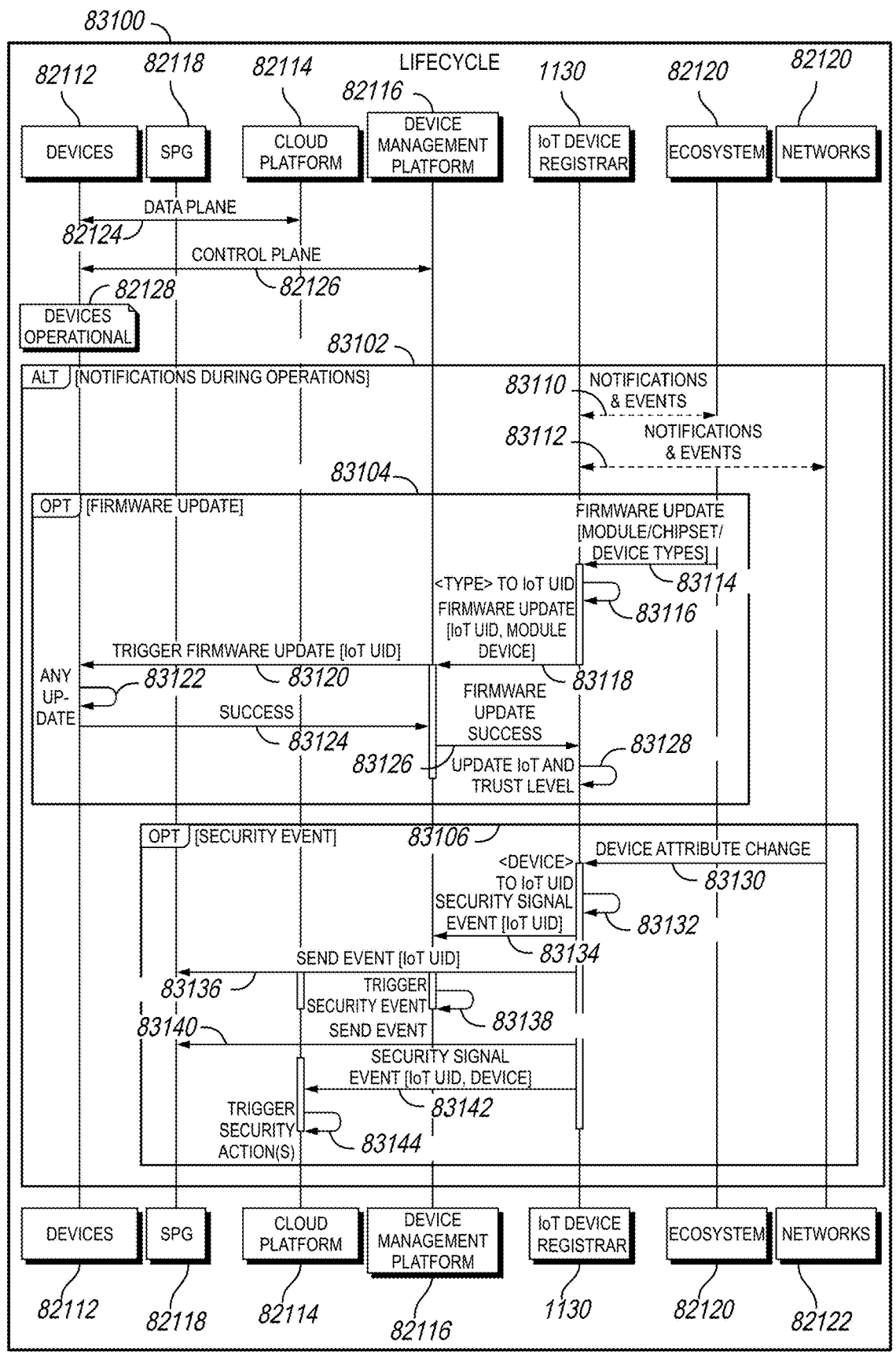
FIG. 83 is another process flow diagram depicting process flows for lifecycle management of IoT devices, in accordance with embodiments of the current disclosure.

FIG. 83 is another process flow diagram depicting process flows for lifecycle management of IoT devices, in accordance with embodiments of the current disclosure. Illustrated in FIG. 83 is a process flow diagram depicting a process flow 83100 for lifecycle management of registered IoT devices involving the exchange of data between: a device 82112, e.g., an enterprise end user 1136 (FIG. 1), a cloud platform 82114, a device management partner platform 82116; a single pane of glass (SPG) 82118; an ecosystem 82120, one or more networks 82122, and an IoT device registrar, e.g., the IoT device registrar 1130 of FIG. 1. The flow 82100 may apply, for example, to a Greenfield device having a virtual IoT UID and/or to a Brownfield device having an embedded IoT UID, as described herein. The ecosystem 82120 may include the ecosystems 1134 in which the one or more devices 1112, 1114, 1116, 1118, 1120, 1122, and 1124 exist/operate (FIG. 1), ecosystems 5126 that may relate to risk management 5128, compliance management 5130, and/or security 5132 (FIG. 5), and may further include one or more databases that may store information regarding known vulnerabilities of IoT devices registered in the registry 1129 (FIG. 1). Information on risk events may be pulled from the databases in the ecosystem.

With further reference to FIG. 83, in embodiments, in flow 83100 the cloud platform 82114 may adjust and/or manipulate the data plane functionality of the device 82112, as depicted by line 82124, which may be the same as shown in FIG. 82. The device management partner platform 82116 may adjust and/or manipulate the control plane functionality of the device 82112, as depicted by line 82126, which may be the same as shown in FIG. 82. When the communication at 82124 and 82126 are established, it can be confirmed at 82128 that the device 82112 is operational, which may be the same as shown in FIG. 82.

The flow 83100 may then include flow 83102, which may include flow 83104 and flow 83106. In flow 83102, as depicted by dashed line 83110, notifications and information on events, as described herein, may be transmitted to/from the IoT device registrar 1130 and devices and databases in the ecosystem 82120. In addition, in flow 83102, as depicted by dashed line 83112, notifications and information on events, as described herein, may be transmitted to/from the IoT device registrar 1130 and the one or more networks 82122.

With further reference to FIG. 83, in flow 83104, as depicted by line 83114, a notification of a firmware update, e.g., module/chipset/device types, may be transmitted from the ecosystem 82120 to the IoT device registrar 1130.

Next, in flow 83104, as depicted by line 83116, IoT device registrar 1130 may associate the module/chipset/device type of the notification with one or more IoT UIDs.

Subsequently, in flow 83104, as depicted by line 83118, IoT device registrar 1130 may associate the IoT UIDs with the device type of the device 82112 and/or modules in the device 82112 that should receive the firmware update, and may transmit the firmware update and the IoT UIDs and/or the device and/or module type to the device management partner platform 82116, for example, by piggybacking the IoT UID onto a message containing the firmware update, as described herein. Then, in flow 83104, as depicted by line 83120, the device management partner platform 82116 may trigger the device 82112 to implement the firmware update transmitted with the associated IoT UID. Next, in flow 83104, as depicted by line 83122, the device 82112 may apply the firmware update. Subsequently, in flow 83104, as depicted by line 83124, device 82112 may send a notification to the device management partner platform 82116 that the firmware update was successfully applied. Then, in flow 83104, as depicted by line 83126, the device management partner platform 82116 may send a notification to the IoT device registrar 1130 that the firmware update was successfully applied. Next, in flow 83104, as depicted by line 83128, the IoT device registrar 1130 may update a trust level/rating/score associated with the IoT UID, based on the successful firmware update.

With further reference to FIG. 83, in flow 83106, as depicted by line 83130, the one or more networks 82122 may transmit a device attribute change to the IoT device registrar 1130. The device attribute change may be indicative of a security event, as described herein. The device attribute change may also be a defensive notification from the ecosystem 82120 and/or the one or more networks 82122 to be sent to the IoT device registrar 1130 indicating that a security event has been identified. Then, in flow 83106, as depicted by line 83132, the IoT device registrar 1130 may associate a device type with one or more IoT UIDs, and may associate one or more IoT UIDs with the security event.

Next, in flow 83106, as depicted by line 83134, the IoT device registrar 1130 may generate a security signal event notification indicating the security event, and may notify the device management partner platform 82116 of device types that are associated with the security event. Also, in flow 83106, as depicted by line 83136, the IoT device registrar 1130 may send a notification to the SPG 82118 regarding the security event and a list of IoT UIDs associated with the security event, which may be displayed by the SPG 82118. Also, in flow 83106, as depicted by line 83138, when the device management partner platform 82116 receives the security signal event notification, it may trigger one or more security actions on the devices of the type associated with the security event, including the device 82112, such as quarantining the devices, disabling the device, notifying the device of the security event, or other actions as described herein.

In flow 83106, as depicted by line 83140, the IoT device registrar 1130 may transmit the security signal event notification to the SPG 82118, e.g., to be displayed. In flow 83106, as depicted by line 83142, the IoT device registrar 1130 may transmit the security signal event notification, the device type associated with the security event, and the IoT UID to the cloud platform 82114. In flow 83106, as depicted by line 83144, when the cloud platform 82114 receives the security signal event notification, it may trigger one or more security actions on the devices of the type associated with the security event, including the device 82112, such as quarantining the devices, disabling the device, notifying the device of the security event, or other actions as described herein.

Figure 84:
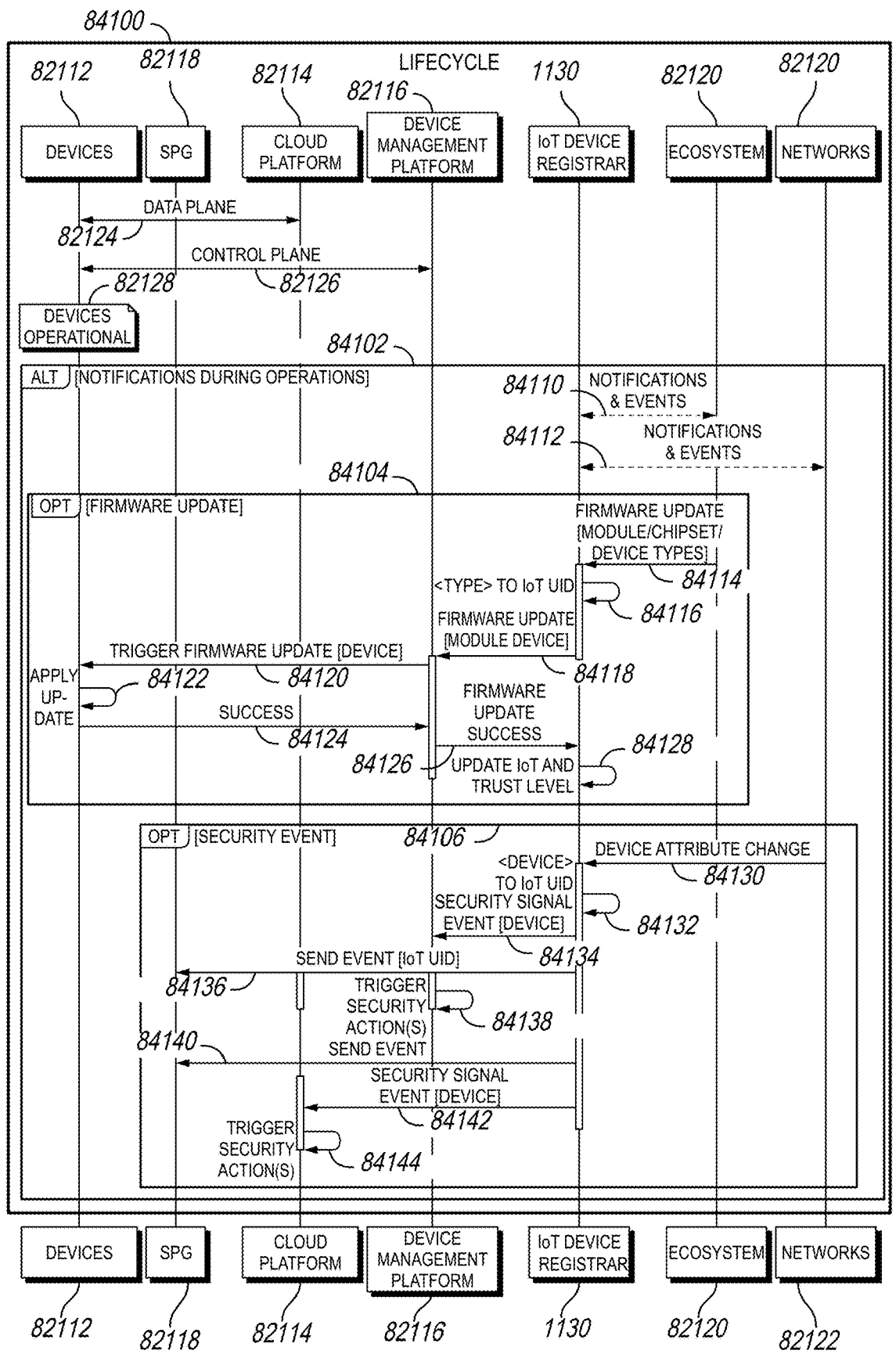
FIG. 84 is another process flow diagram depicting process flows for lifecycle management of IoT devices, in accordance with embodiments of the current disclosure.

FIG. 84 is another process flow diagram depicting process flows for lifecycle management of IoT devices, in accordance with embodiments of the current disclosure. Illustrated in FIG. 84 is a process flow diagram depicting a process flow 84100 for lifecycle management of registered IoT devices involving the exchange of data between: a device 82112, e.g., an enterprise end user 1136 (FIG. 1), a cloud platform 82114, a device management partner platform 82116; a single pane of glass (SPG) 82118; an ecosystem 82120, one or more networks 82122, and an IoT device registrar, e.g., the IoT device registrar 1130 of FIG. 1. The flow 82100 may apply, for example, to a Brownfield device having a virtual IoT UID, as described herein. The ecosystem 82120 may include the ecosystems 1134 in which the one or more devices 1112, 1114, 1116, 1118, 1120, 1122, and 1124 exist/operate (FIG. 1), ecosystems 5126 that may relate to risk management 5128, compliance management 5130, and/or security 5132 (FIG. 5), and may further include one or more databases that may store information regarding known vulnerabilities of IoT devices registered in the registry 1129 (FIG. 1). Information on risk events may be pulled from the databases in the ecosystem.

With further reference to FIG. 84, in embodiments, in flow 84100 the cloud platform 82114 may adjust and/or manipulate the data plane functionality of the device 82112, as depicted by line 82124, which may be the same as shown in FIG. 82. The device management partner platform 82116 may adjust and/or manipulate the control plane functionality of the device 82112, as depicted by line 82126, which may be the same as shown in FIG. 82. When the communication at 82124 and 82126 are established, it can be confirmed at 82128 that the device 82112 is operational, which may be the same as shown in FIG. 82.

The flow 84100 may then include flow 84102, which may include flow 84104 and flow 84106. In flow 84102, as depicted by dashed line 84110, notifications and information on events, as described herein, may be transmitted to/from the IoT device registrar 1130 and devices and databases in the ecosystem 82120. In addition, in flow 84102, as depicted by dashed line 84112, notifications and information on events, as described herein, may be transmitted to/from the IoT device registrar 1130 and the one or more networks 82122.

With further reference to FIG. 84, in flow 84104, as depicted by line 84114, a notification of a firmware update, e.g., module/chipset/device types, may be transmitted from the ecosystem 82120 to the IoT device registrar 1130.

Next, in flow 84104, as depicted by line 84116, IoT device registrar 1130 may associate the module/chipset/device type of the notification with one or more IoT UIDs.

Subsequently, in flow 84104, as depicted by line 84118, IoT device registrar 1130 may associate the IoT UIDs with the device type of the device 82112 and/or modules in the device 82112 that should receive the firmware update, and may transmit the firmware update and device and/or module type and/or the IoT UIDs to the device management partner platform 82116, for example, by piggybacking the information onto a message containing the firmware update, as described herein. Then, in flow 84104, as depicted by line 84120, the device management partner platform 82116 may trigger the device 82112 to implement the firmware update transmitted with the associated IoT UID. Next, in flow 84104, as depicted by line 84122, the device 82112 may apply the firmware update. Subsequently, in flow 84104, as depicted by line 84124, device 82112 may send a notification to the device management partner platform 82116 that the firmware update was successfully applied. Then, in flow 84104, as depicted by line 84126, the device management partner platform 82116 may send a notification to the IoT device registrar 1130 that the firmware update was successfully applied. Next, in flow 84104, as depicted by line 84128, the IoT device registrar 1130 may update a trust level/rating/score associated with the IoT UID, based on the successful firmware update.

With further reference to FIG. 84, in flow 84106, as depicted by line 84130, the one or more networks 82122 may transmit a device attribute change to the IoT device registrar 1130. The device attribute change may be indicative of a security event, as described herein. The device attribute change may also be a defensive notification from the ecosystem 82120 and/or the one or more networks 82122 to be sent to the IoT device registrar 1130 indicating that a security event has been identified. Then, in flow 84106, as depicted by line 84132, the IoT device registrar 1130 may associate a device type with one or more IoT UIDs, and may associate one or more IoT UIDs with the security event.

Next, in flow 84106, as depicted by line 84134, the IoT device registrar 1130 may generate a security signal event notification indicating the security event, and may notify the device management partner platform 82116 of device types that are associated with the security event. Also, in flow 84106, as depicted by line 84136, the IoT device registrar 1130 may send a notification to the SPG 82118 regarding the security event and a list of IoT UIDs associated with the security event, which may be displayed by the SPG 82118. Also, in flow 84106, as depicted by line 84138, when the device management partner platform 82116 receives the security signal event notification, it may trigger one or more security actions on the devices of the type associated with the security event, including the device 82112, such as quarantining the devices, disabling the device, notifying the device of the security event, or other actions as described herein.

In flow 84106, as depicted by line 84140, the IoT device registrar 1130 may transmit the security signal event notification to the SPG 82118, e.g., to be displayed. In flow 84106, as depicted by line 84142, the IoT device registrar 1130 may transmit the security signal event notification and the device type associated with the security event, and/or the IoT UID, to the cloud platform 82114. In flow 84106, as depicted by line 84144, when the cloud platform 82114 receives the security signal event notification, it may trigger one or more security actions on the devices of the type associated with the security event, including the device 82112, such as quarantining the devices, disabling the device, notifying the device of the security event, or other actions as described herein.

Figure 85:
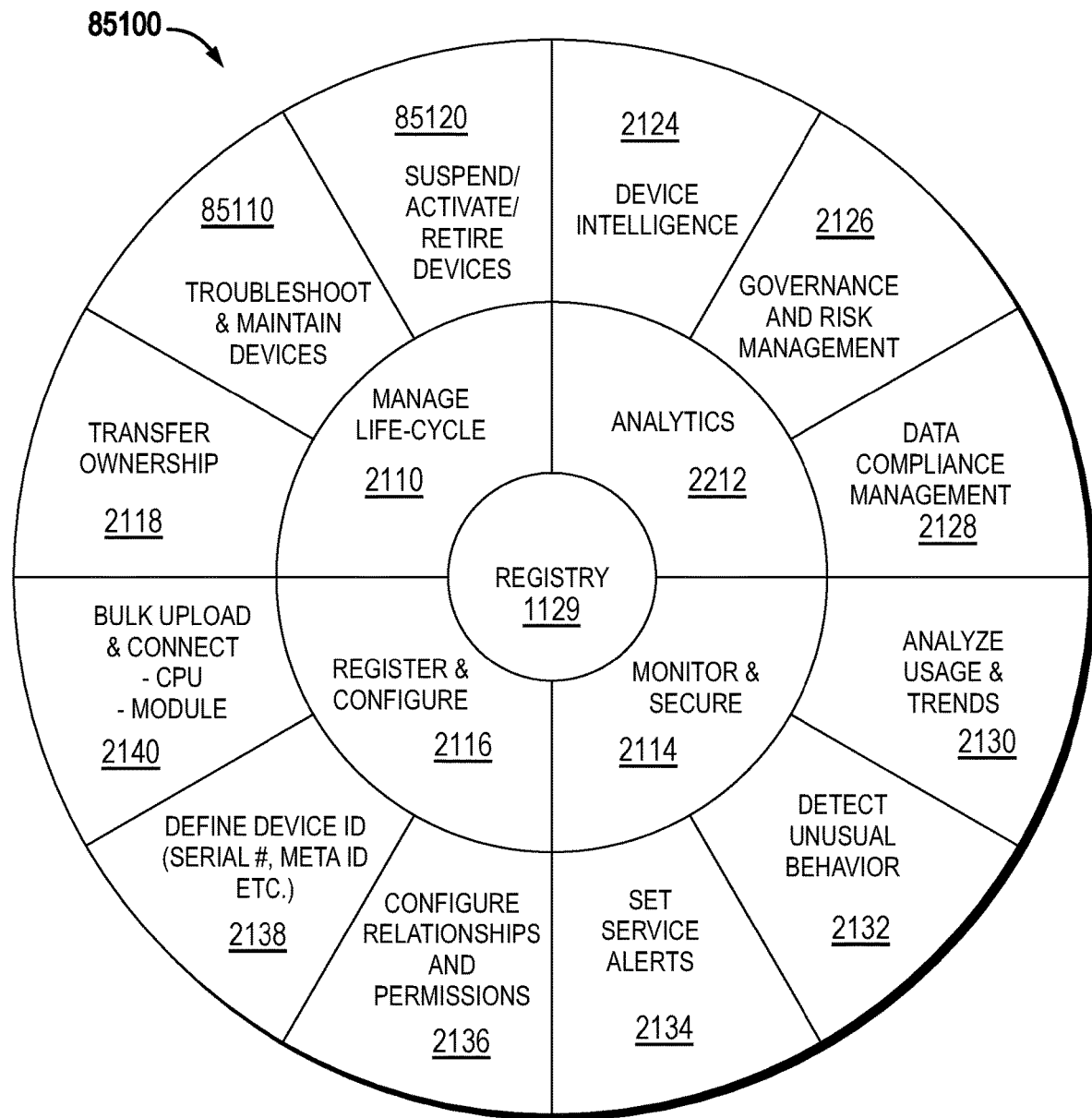
FIG. 85 is a component diagram of a system for managing one or more devices, in accordance with an embodiment of the current disclosure.

FIG. 85 is a component diagram of a system for managing one or more devices, in accordance with an embodiment of the current disclosure. With reference to FIG. 85 and FIG. 2, embodiments of a system 85100 managed by the registry 1129 (FIG. 1) may include the lifecycle management component 2110, the analytics component 2112, the monitoring and security component 2114, and the registration and configuration component 2116. The lifecycle management component 2120 may include a transfer and ownership subcomponent 2118, a troubleshoot and maintain devices subcomponent 85110, and a suspend/activate/retire subcomponent 85120, which may include the suspend and activate device subcomponent 2110, and/or the retire device subcomponent 2122 of FIG. 2. The analytics component 2112 may include the device intelligence subcomponent 2124, the government and risk management subcomponent 2126, and/or the data compliance management subcomponent 2128. The monitor and secure component 2114 may include the usage and trend analysis subcomponent 2130, the detect unusual behavior subcomponent 2132, and/or the set service alerts subcomponent 2134. The register and configure component 2116 may include the relationships and permission subcomponent 2136, the device ID definition subcomponent 2138, and/or the bulk upload and connect subcomponent 2140. The bulk upload and connect subcomponent 2140 may facilitate communication with network connected devices across multiple cloud environments. The lifecycle management component 2110 may include the apparatus 69100 or any other apparatus described herein, and may perform the method 70100 or any other method described herein to manage the lifecycle of an IoT device, for example, associated with an IoT UID.

In embodiments, lifecycle management may include performing status checks of devices and their current configuration states, e.g., installed patches, installed hardware, number of active network cards, etc. Lifecycle management may include detecting changes in the properties of a device, e.g., detecting and/or recording events. Events may come, for example, from a device manager, a connection management platform (CMP), a Remote Authentication Dial-In User Service (RADIUS) feed (e.g., event stream), and/or a Home Location Register (HLR). Lifecycle management may include detecting security events. Lifecycle management may include tracking of ownership changes in the IoT device registry. Embodiments may provide for retirement of Greenfield and/or Brownfield devices, which may be real-world devices, virtual devices, or meta-devices. Embodiments may monitor for instances in which a permanently retired immutable device property, e.g., an International Mobile Equipment Identity (IMEI), appears in another device. Embodiments may provide for reincarnation/reuse/recycling of old IoT UIDs and/or for their permanent retirement. Embodiments may provide for data "sanity" checks. For example, determining whether data from a device at 30% battery or less should be collected and/or considered trustworthy. Detection of a device's being down, e.g., unreachable, offline, inoperable, or otherwise unavailable, as disclosed herein, may be provided by certain embodiments. Embodiments may facilitate the pushing of updates and/or patches to devices. Lifecycle management may include modifying a trust indicator/level/score/rating of a device based on events. Embodiments may decrease a device's trust indicator/level/score/rating value if the corresponding information in the IoT device registry starts to get stale, e.g., has not been updated and/or queried for at least a predetermined time. Embodiments may provide for polling of devices to provide updates to their stored property data.

Referring again to FIG. 1, embodiments of the current disclosure may provide for the maintaining/recording of chain of title for devices, e.g., devices 1112, 1114, 1116, 1118, 1120, 1122, and 1124, managed by the registrar 1130, e.g., in the registry 1129. Embodiments may include maintaining and/or recording the chain of title via a distributed ledger, e.g., a blockchain. The chain of title may include ownership data for the device and/or for any modules in the device. Embodiments may allow a user to claim ownership of device and/or any modules in the device, as disclosed herein, e.g., via submitting a registration request with security credentials to the registry that identify a device and authentication for the registering entity. Non-limiting examples of user types include one or more end users 1136, e.g., enterprise, manufacturer 1134, e.g., an original equipment manufacturer (OEM) and/or factory employees, the IoT device registrar 1130, and/or a third party 1138. The chain of title may be provided, e.g., displayed, by a Single Pane of Glass (SPG), which may provide a graphical user interface (GUI), e.g., any of GUIs 22108 (FIG. 22), 23108 (FIG. 23), 28102 (FIG. 28), 28104 (FIG. 28), or 28106 (FIG. 28), for the user to interact with, such as to input data, commands, and queries, as well as to display the IoT registry data. The GUI may provide access to any of the embodiments of the system 1100 (FIG. 2), for example, the lifecycle management component 2110, the analytics component 2112, the monitoring and security component 2114, and/or the registration and configuration component 2116.

Figure 86:
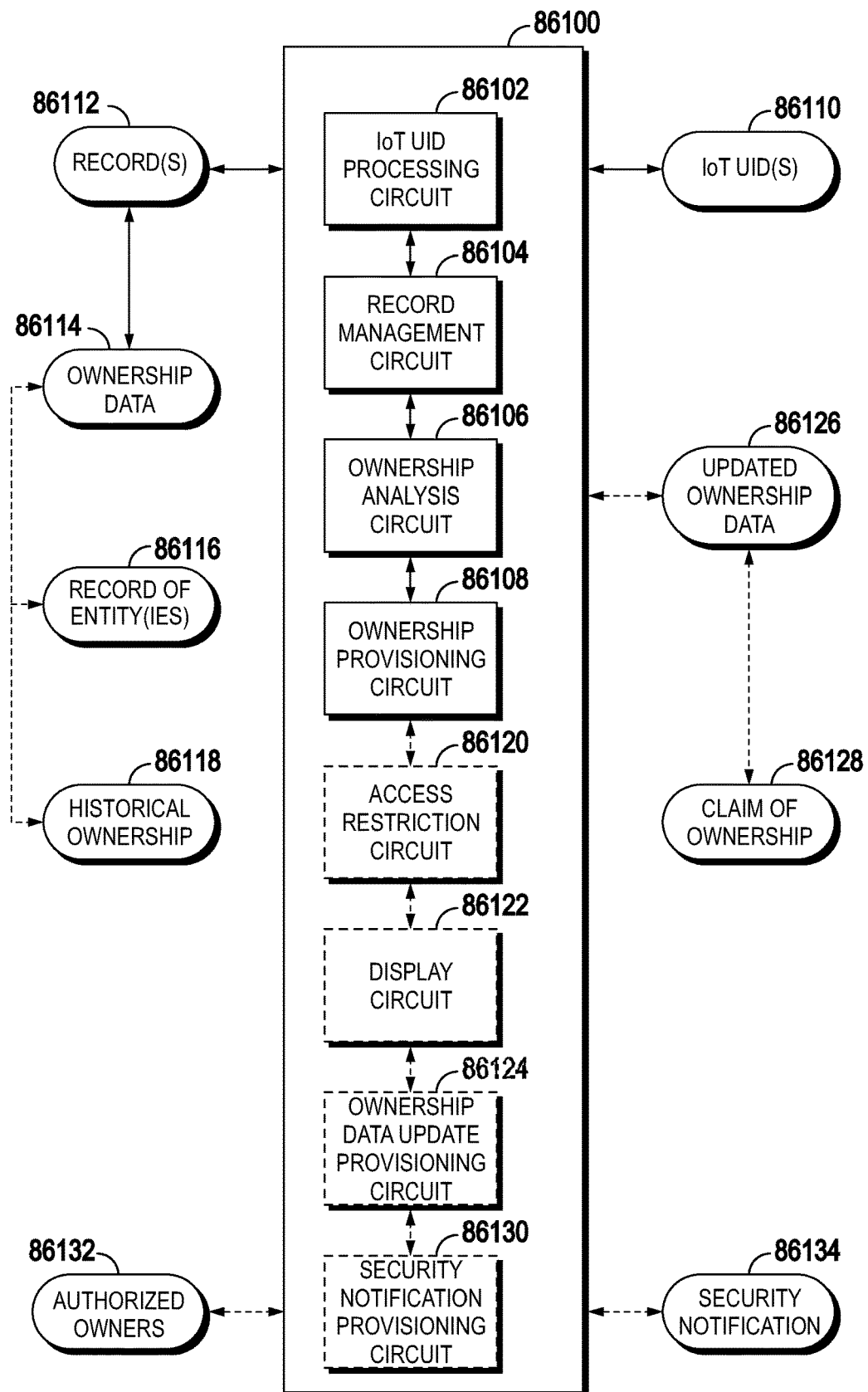
FIG. 86 is a schematic diagram of an apparatus for an Internet of Things (IoT) device registry, in accordance with an embodiment of the current disclosure.
Figure 87:
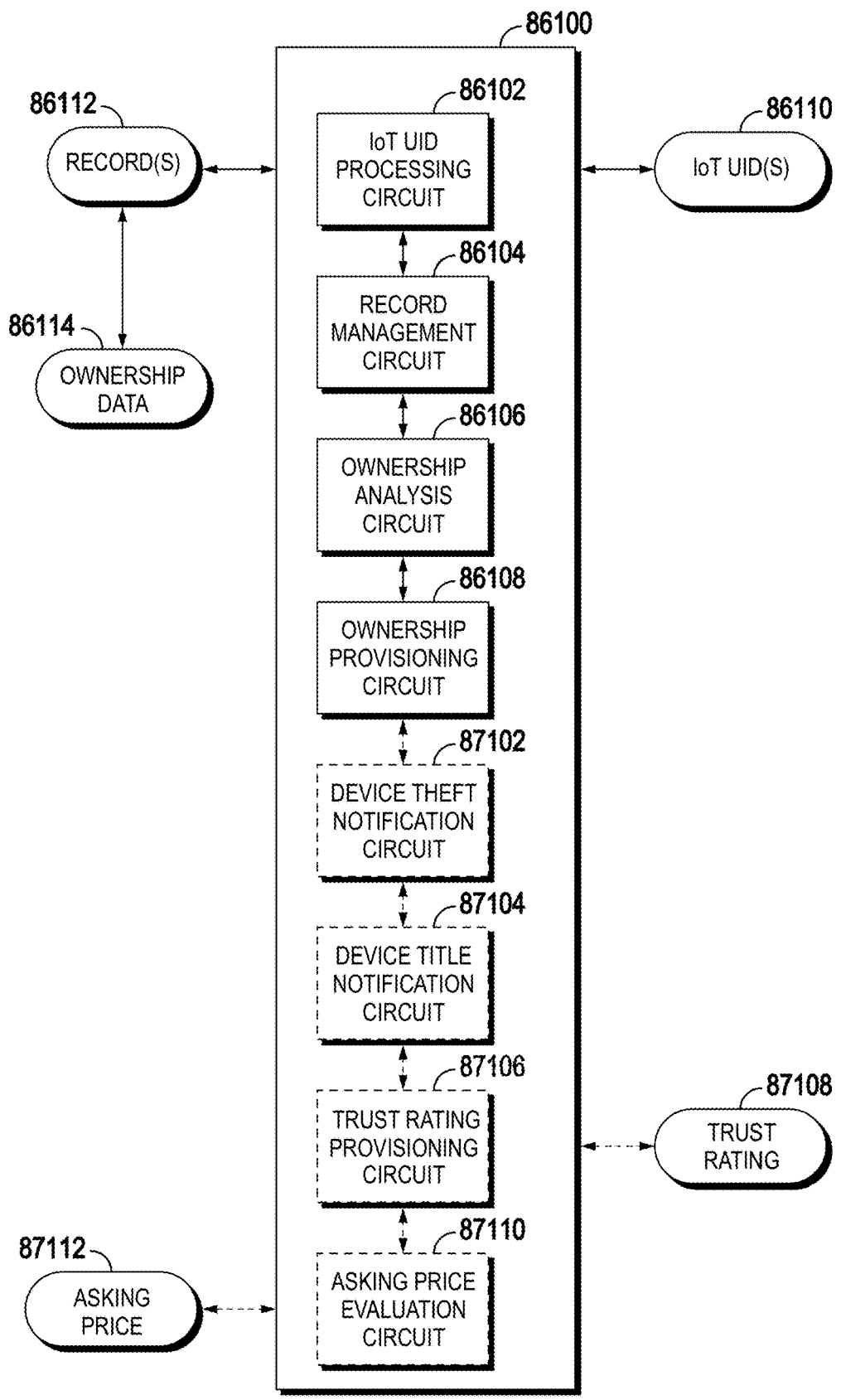
FIG. 87 is a schematic diagram of an apparatus for an IoT device registry, in accordance with an embodiment of the current disclosure.
Figure 88:
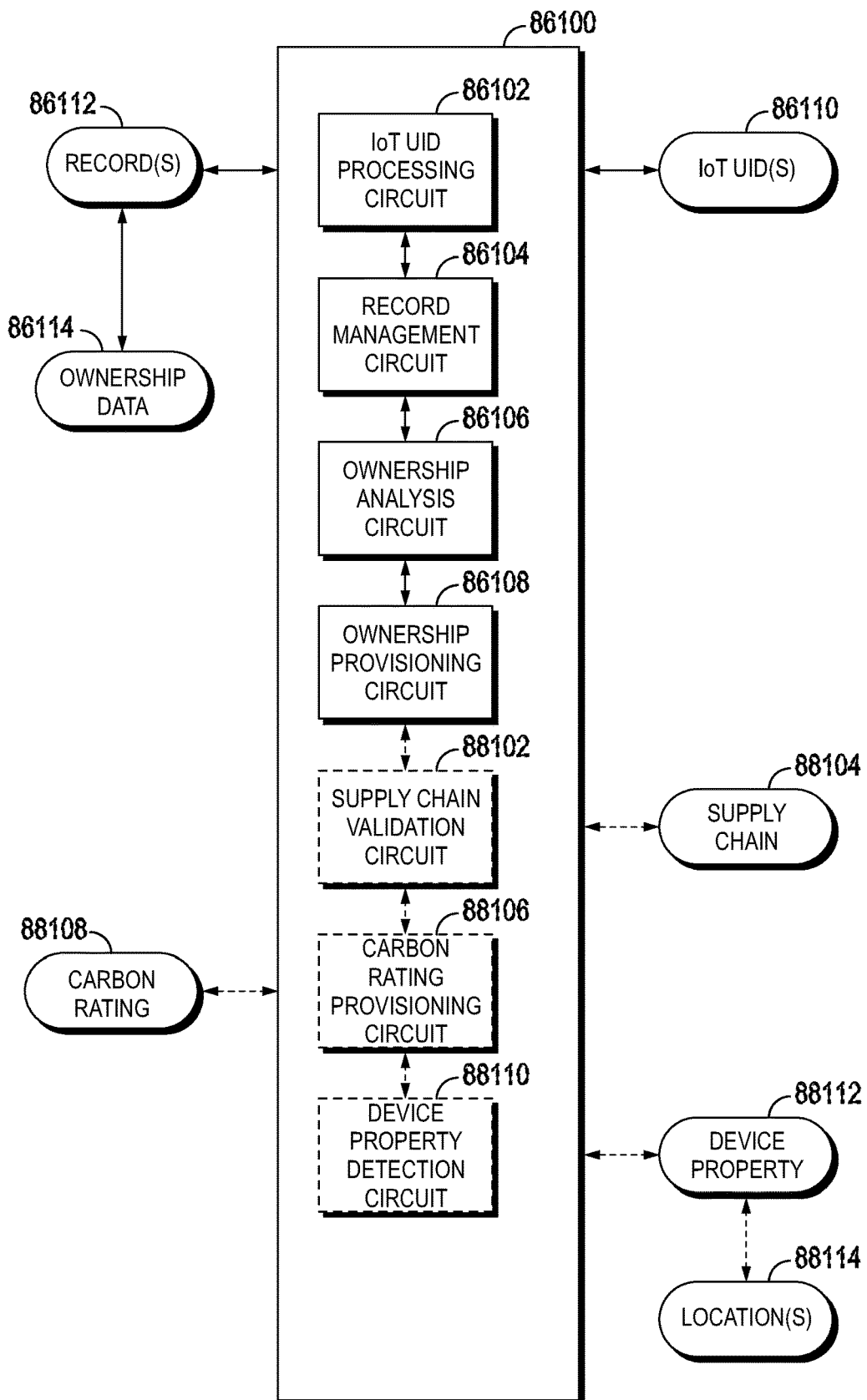
FIG. 88 is a schematic diagram of an apparatus for an IoT device registry, in accordance with an embodiment of the current disclosure.

FIGS. 86, 87, and 88 depict schematic diagrams of an example apparatus 86100 for an Internet of Things (IoT) device registry, e.g., for network connected devices 1112, 1114, 1116, 1118, 1120, 1122, 1124 (FIG. 1), in accordance with an embodiment of the current disclosure. The apparatus 86100 may form part of the server 1126 (FIG. 1), e.g., the at least one processor, and/or any other electronic computing device described herein.

With reference to FIG. 86, the apparatus 86100 is for an Internet of Things (IoT) device registry. The apparatus 86100 may include an Internet of Things Universal Identification (IoT UID) processing circuit 86102, a record management circuit 86104, an ownership analysis circuit 86106, and an ownership provisioning circuit 86108. The IoT UID processing circuit may be structured to interpret an IoT UID 86110 corresponding to a device, e.g., any of devices 1112, 1114, 1116, 1118, 1120, 1122, 1124 (FIG. 1). The record management circuit 86104 may be structured to identify, based at least in part on the IoT UID 86110, a record 86112 in a database, e.g., database 1128 (FIG. 1), the record 86112 including device ownership data 86114 associated with the device. The ownership analysis circuit 86106 may be structured to interpret, based at least in part on the record, the device ownership data 86114 associated with the device. The ownership provisioning circuit 86108 may be structured to transmit the device ownership data 86114.

Certain further aspects of the example apparatus are described herein, any one or more of which may be present in certain embodiments. The features shown in FIGS. 86, 87, and 88 are combinable and interchangeable in any configuration in embodiments. With further reference to FIG. 86, in the apparatus 86100, the device ownership data may include a record of one or more entities 86116. In the apparatus 86100, the record of one or more entities may include an historic record of one or more entities that have owned the device. In the apparatus 86100, the device ownership data may include a record of historical ownership 86118. The record of historical ownership 86118 may include a list of records each corresponding to a distinct owner of the device. In embodiments, the record of historical ownership 86118 may be facilitated by a blockchain. Embodiments of the historical ownership blockchain may be a centralized blockchain, a decentralized blockchain, and/or a combination thereof. Embodiments of the current disclosure may use public and/or private blockchains. In embodiments, a record in the IoT device registry may include a pointer to a blockchain. In the apparatus 86100, the device may include a plurality of modules, each module having corresponding ownership data, for example, an employee may have a laptop that includes a corporate provided/owned encryption module, while the employee owns the other modules in the laptop; an employee has their personal mobile device, while their employer provides a SIM card for that device to connect to a network; a home is owned by a private person, while the solar panels on the home are leased from an energy provider; and/or a mining company may own devices forming part of a dump truck while leasing the radio communication equipment in the dump truck. The apparatus 86100 may further include an access restriction circuit 86120 structured to restrict access to information about the device from an owner of the device. In the apparatus 86100, the access restriction circuit 86120 may be further structured to restrict access to information about a first owner of the device from a second owner of the device. In embodiments, such restrictions may be based at least in part on user type and/or credentials. For example, an employee of a registered corporate cell phone may be prohibited from viewing the prior ownership history of the cell phone, while the corporate employer may have access to the prior ownership history. The apparatus 86100 may further include a display circuit 86122 structured to display the device ownership data for the device. In embodiments, the display may form part of an SPG, as disclosed herein. The apparatus 86100 may further include an ownership data update provisioning circuit 86124 structured to provide updated ownership data 86126 to replace the device ownership data 86114 associated with the device. In the apparatus 86100, the device ownership data update provisioning circuit may be further structured to provide updated ownership data 86126 for one or more modules of the device. Such updates may be provided via device event messages 6116 (FIG. 6). In the apparatus 86100, the updated ownership data may include a claim of ownership 86128 of the device. For example, a device may have been transferred via a legal assignment from a first entity to a second entity, wherein the first entity provides an event message to the IoT device registry informing the registry of the ownership transfer. For example, a smart contract that assigns one or more devices may send the IoT device registry and/or the device management platform an event message when a portion of the smart contract transfers title of the one or more devices to a party. In such a scenario, the IoT device registry may update a record corresponding to the device such that the record reflects that ownership has changed, but that the device needs to be claimed by the second entity. The second entity may then perform an action, e.g., turning on the device and/or making a registration request via an SPG, that triggers transmission of a registration request to the IoT device registry requesting registration of the device in the name of the second entity. Upon receipt of the registration request, and upon completion of any verification processes that may be performed by the IoT device registry to verify the second entity, the IoT device registry may update the record to reflect that the second entity is the current owner and that the device has been claimed. In the apparatus 86100, events resulting in the updated ownership data may include at least one of: creation of the device, sale of the device, decommissioning of the device, transfer of ownership of the device, or licensing of the device. The apparatus 86100 may further include a security notification provisioning circuit 86130 structured to compare the device ownership data to a record of authorized owners 86132, and generate a security notification 86134 if the device ownership data is not included in the record of authorized owners. In the apparatus 86100, the database may include a blockchain. Non-limiting examples of device transfers include scenarios where: an old owner transfers ownership of a device to a stockpile and/or spare collection; a new owner picks up ownership of a device from a stockpile and/or spare collection; an old owner transfers a device directly to a new owner (where the old owner may have a meta-id of the new owner, as disclosed herein); a new owner transfers ownership form an old owner (where the new owner has a meta-id of the old owner); an owner of a device remains the same but sub-owners of the device change.

With reference to FIG. 87, the apparatus 86100 may further include a device theft notification circuit 87102 structured to certify that the device is not a stolen device. In embodiments, the notification circuit 87102 may provide for a notification to appear on the device, e.g., a green (not stolen) or red (appears to be stolen) check mark in a corner of a screen, and/or on an SPG. The apparatus 86100 may further include a device title certification circuit 87104 structured to certify that the device has a fully accountable chain of title. In embodiments, the title certification circuit 87104 may provide for a notification to appear on the device, e.g., a green (verified good title) or red (apparent title discrepancies) check mark in a corner of a screen, and/or on an SPG. The certifying may be based on the record and/or the device ownership data. The apparatus 86100 may further include a trust indicator provisioning circuit 87106 structured to provide a trust indicator 87108 for the device. The trust indicator may include, for example, at least one of a score, a rating, or a level value. In the apparatus 86100, the trust indicator 87108 may include a numeric value. In the apparatus 86200, the trust indicator 87108 may include an enumerated value. In the apparatus 86100, the trust indicator 87108 may be displayed as a color-coded value. In the apparatus 86100, a value of the trust indicator 87108 may be based at least in part on a location of the device. In the apparatus 86100, a value of the trust indicator 87108 may be based at least in part on a time period. In the apparatus 86100, a value of the trust indicator 87108 may be based at least in part on one or more of a software version or a firmware version of the device. In the apparatus 86100, determining the trust indicator 87108 may be based at least in part on artificial intelligence. In the apparatus 86100, the trust indicator 87108 may be reflective of the device being a Greenfield device. In the apparatus 86100, the trust indicator 87108 may be reflective of the device being a Brownfield device. In the apparatus 86100 and/or 120100 (FIG. 120), the trust indicator may be reflective of the device being a virtual device, as disclosed herein. In the apparatus 86100 and/or 120100 (FIG. 120), the trust indicator may be reflective of the device being a meta-device, as disclosed herein.

For example, devices may be virtual devices, e.g., objects in a metaverse having real-world counterparts (real-world devices), where the virtual device is a digital-twin of the real-world counterpart. A digital virtual device may have properties corresponding to its real-world counterpart that may be updated in real-time and/or on a periodic basis. Devices in the metaverse may be real-world devices, e.g., objects in the real-world having metaverse counterparts (digital twin virtual devices) and/or supporting metaverse activities. As another example, devices may be meta-devices, e.g., objects in the metaverse lacking real-world counterparts. In embodiments, a device may have modules that are virtual devices and modules that are meta-devices. In embodiments, an IoT device registry may provide for registration of virtual devices, real-world devices, and/or meta-devices, as disclosed herein, and/or the services and/or functions associated with registration for registered virtual devices, real-world devices, and/or meta-devices, as also disclosed herein. Any of virtual devices, real-world devices, and/or meta-devices may be Greenfield devices and/or Brownfield devices, and/or may have a combination of Greenfield modules and/or Brownfield modules.

In the apparatus 86100, the trust indicator 87108 may be displayed as at least one of: numeric based, color based, symbol based, alphanumeric based, letter based, or any combination thereof. The apparatus 86100 may further include an asking price evaluation circuit 87110 structured to evaluate an asking price 87112 for the device based on at least one of: the device ownership data 86114, a certification that the device is not a stolen device, or a certification that the device has a fully accountable chain of title. The certification that the device is not a stolen device and/or the certification that the device has a fully accountable chain of title may be included in the record 86112 or in the device ownership data 86114, or may be provided from elsewhere, e.g., from the IoT device registrar 1130 (FIG. 1). In the apparatus 86100, the asking price evaluation circuit 87110 may be further structured to evaluate an asking price 87112 for a group of devices based on ownership data for each device.

With reference to FIG. 88, the apparatus 86100 may further include a supply chain validation circuit 88102 structured to validate a supply chain 88104. In the apparatus 86100, the validating the supply chain may include determining whether modules of the device were sourced from authorized vendors. Such determining may include walking or tracing the chain of title via the IoT device registry for one or more modules that passed through the supply chain to verify the original ownership through the most recent receiving entity and to verify that the verified owners are compliant with one or more regulations and/or requirements, e.g., government and/or Department of Defense/military regulations 2126 (FIG. 2), medical regulations, and/or fair-trade rules. For example, embodiments of the current disclosure may provide for verification that a medical/surgical robot has been sourced and/or handled by trusted parties, thereby reducing the likelihood that the robot has defective components, can be compromised, and/or suffer a malfunction. As such, in the apparatus 86100, validating the supply chain may include determining whether modules of the device were sourced from fair trade certified sources. The validation may be based on the device ownership data 86114, or may be based on data provided from elsewhere, e.g., from the IoT device registrar 1130 (FIG. 1), a device management platform, etc. The apparatus 86100 may further include a carbon rating provisioning circuit 88106 structured to provide a carbon rating 88108 of the device based on known ratings of sources of modules of the device, determined based on the device ownership data. For example, a carbon rating of a device may be based at least in part on cumulative ratings of the manufacturers of the modules and/or the transportation systems that bring the modules to the manufacturer for assembly into the device and/or the transportation systems that bring the device to market. The apparatus 86100 may further include a device property detection circuit 88110 structured to detect a device property 88112 that indicates a change in ownership data. In embodiments, the device property detection circuit 88110 may be structured to periodically inspect records in the IoT device registry and compare their corresponding device property data to corresponding historical data. In embodiments, a record in the registry may have a modified field that may be set, e.g., "true", when a field in the record has been modified, as described herein, where the device property detection circuit 88110 may query the registry for records having a set modified field. In such embodiments, the device property detection circuit 88110 may release/reset the modified field back to an unmodified state, e.g., "false" after interpreting the corresponding device property data. In the apparatus 86100, the device property 88112 may include a location 88114 of the device.

Figure 89:
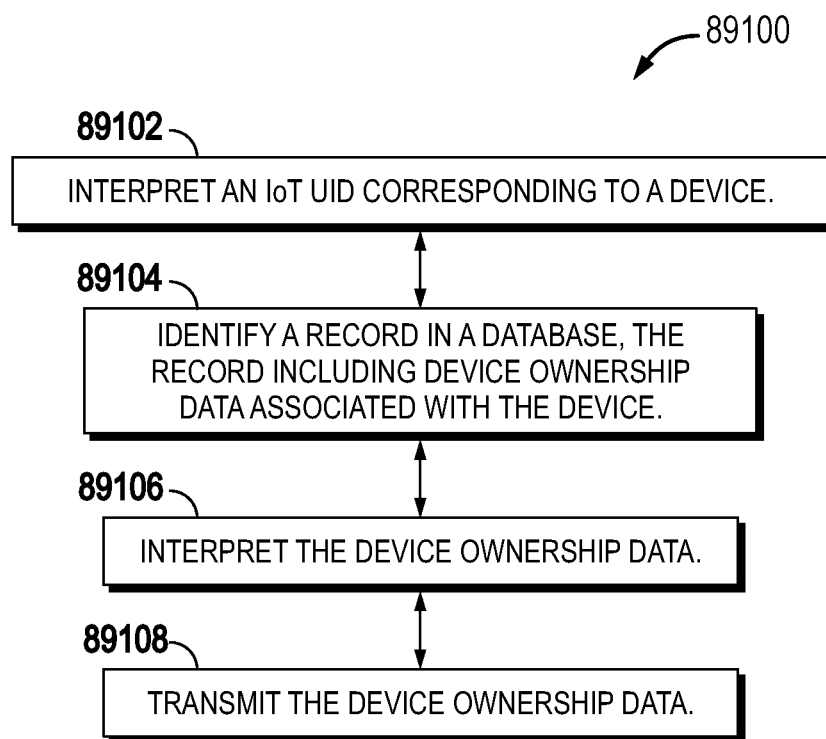
FIG. 89 is a flowchart depicting a method for an IoT device registry, in accordance with an embodiment of the current disclosure.

FIG. 89 illustrates a flowchart of an example method 89100 for displaying IoT device registry data, e.g., for network connected devices 1112, 1114, 1116, 1118, 1120, 1122, 1124 (FIG. 1), in accordance with an embodiment of the current disclosure. The method 89100 may be performed by the apparatus 86100 and/or any other computing device described herein.

The method 89100 may include interpreting, via an IoT UID processing circuit, an IoT UID corresponding to a device 89102. The method may further include identifying, via a record management circuit and based at least in part on the IoT UID, a record in a database, the record including device ownership data associated with the device 89104. The method may further include interpreting, via an ownership analysis circuit and based at least in part on the record, the device ownership data 89106. The method may further include transmitting, via an ownership provisioning circuit, the device ownership data 89108.

Figure 90:
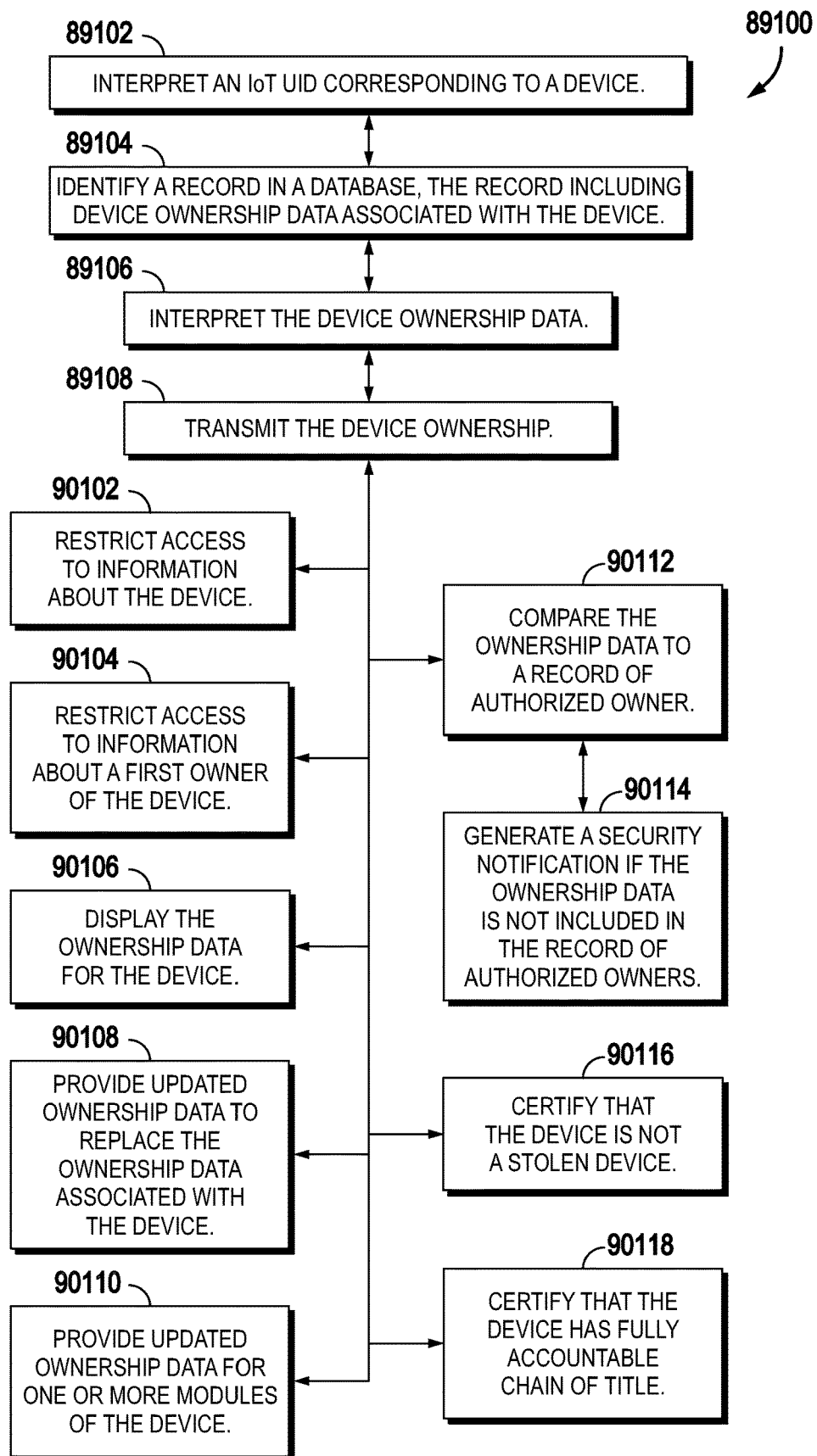
FIG. 90 is a flowchart depicting a method for an IoT device registry, in accordance with an embodiment of the current disclosure.
Figure 91:
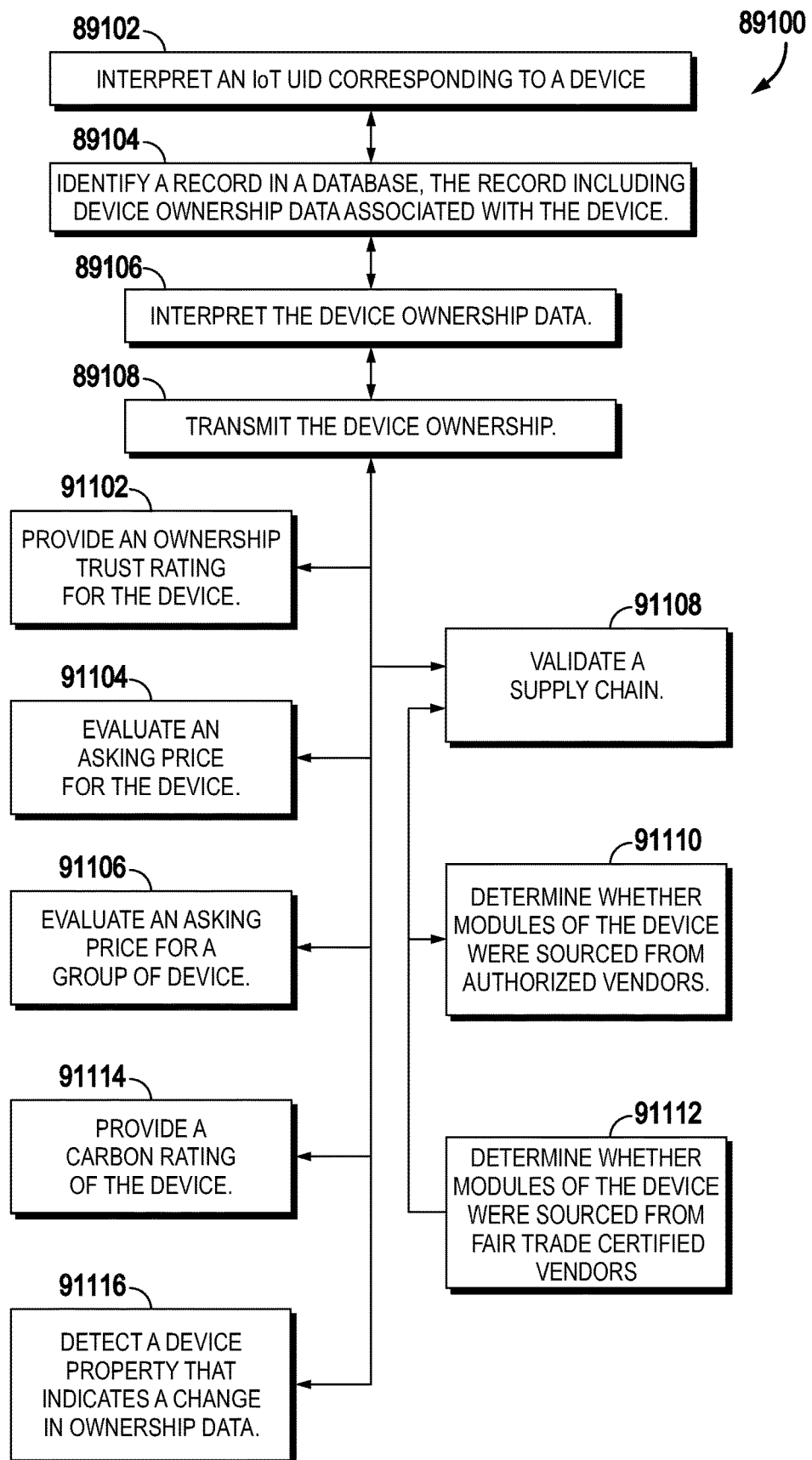
FIG. 91 is a flowchart depicting a method for an IoT device registry, in accordance with an embodiment of the current disclosure.

FIG. 90 is another flowchart depicting a method for an IoT device registry display, in accordance with an embodiment of the current disclosure. FIG. 91 is another flowchart depicting a method for an IoT device registry display, in accordance with an embodiment of the current disclosure. Certain further aspects of the example method are described herein, any one or more of which may be present in certain embodiments. The features shown in FIGS. 89, 90, and 91 are combinable and interchangeable in any configuration in embodiments. In the method 89100, the device ownership data may include a record of one or more entities. In the method 89100, the record of one or more entities may include an historic record of one or more entities that have owned the device. In the method 89100, the device ownership data may include a record of historical ownership. In the method 89100, wherein the device may include a plurality of modules, each module having corresponding ownership data.

With reference to FIG. 90, the method 89100 may further include restricting access to information about the device from an owner of the device 90102. The method 89100 may further include restricting access to information about a first owner of the device from a second owner of the device 90104. The method 89100 may further include displaying the device ownership data for the device 90106. The method 89100 may further include providing updated ownership data to replace the device ownership data associated with the device 90108. The method 89100 may further include providing updated ownership data for one or more modules of the device 90110. In the method 89100, the updated ownership data may include a claim of ownership of the device. In the method 89100, events resulting in the updated ownership data may include at least one of: creation of the device, sale of the device, decommissioning of the device, transfer of ownership of the device, or licensing of the device. The method 89100 may further include comparing the device ownership data to a record of authorized owners 90112, and generating a security notification if the device ownership data is not included in the record of authorized owners 90114. In the method 89100, the database may include a blockchain. The method 89100 may further include certifying that the device is not a stolen device 90116. The method 89100 may further include certifying that the device has a fully accountable chain of title 90118. The certification that the device is not a stolen device and/or the certification that the device has a fully accountable chain of title may be included in the record or in the device ownership data, or may be provided from elsewhere, e.g., from the IoT device registrar 1130 (FIG. 1).

Figure 120:
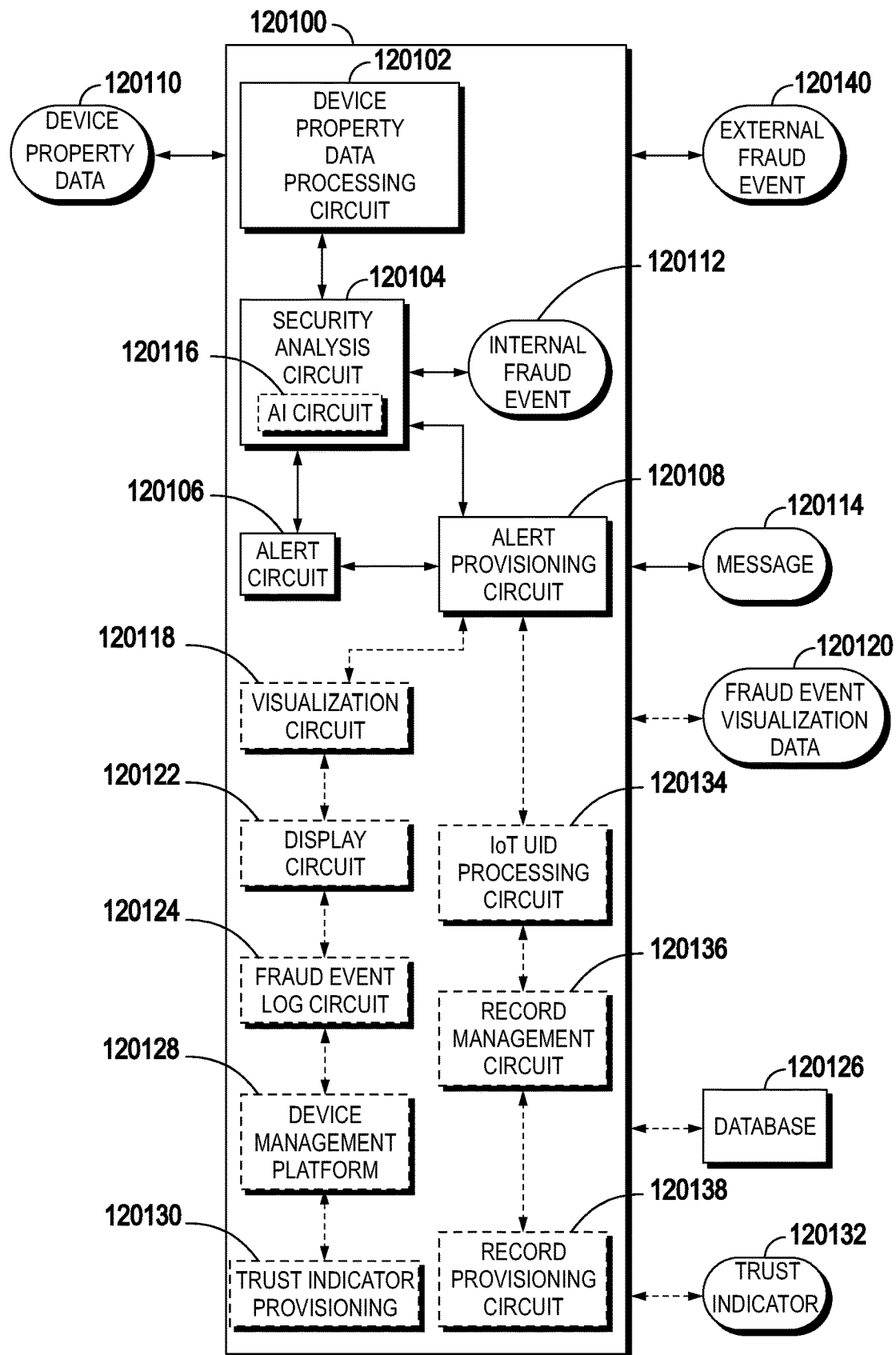

With reference to FIG. 91, the method 89100 may further include providing a trust indicator for the device 91102, as disclosed herein. In the method 89100, the trust indicator may include a numeric value. In the method 89100, the trust indicator may include an enumerated value. In the method 89100, the trust indicator may be displayed as a color-coded value. In the method 89100, a value of the trust indicator may be based at least in part on a location of the device. In the method 89100, a value of the trust indicator may be based at least in part on a time period. In the method 89100, a value of the trust indicator may be based at least in part on one or more of a software version or a firmware version of the device. In the method 89100, determining the trust indicator may be based at least in part on artificial intelligence. In the method 89100, the trust indicator may be reflective of the device being a Greenfield device. In the method 89100, the trust indicator may be reflective of the device being a Brownfield device. In the apparatus 120100 (FIG. 120), the trust indicator may be reflective of the device being a virtual device, as disclosed herein. In embodiments, the trust indicator may be reflective of the device being a meta-device, as disclosed herein, e.g., apparatus 120100 (FIG. 120).

In the method 89100, the trust indicator may be displayed as at least one of: numeric based, color based, symbol based, alphanumeric based, letter based, or any combination thereof. The method 89100 may further include evaluating an asking price for the device 91104. The evaluating the asking price for the device may be based on at least one of: the device ownership data, a certification that the device is not a stolen device, or a certification that the device has a fully accountable chain of title. The method 89100 may further include evaluating an asking price for a group of devices 91106, which may be based on ownership data for each device. The method 89100 may further include validating a supply chain 91108. The validating the supply chain may further include determining whether modules of the device were sourced from authorized vendors 91110. The validating the supply chain may further include determining whether modules of the device were sourced from fair trade certified sources 91112. The validation may be based on the device ownership data, or may be based on data provided from elsewhere, e.g., from the IoT device registrar 1130 (FIG. 1). The method 89100 may further include providing a carbon rating of the device based on known ratings of sources of modules of the device, which may be determined based on the device ownership data 91114. The method 89100 may further include detecting a device property that indicates a change in ownership data 91116. In the method 89100, the device property may include a location of the device.

Figure 92:
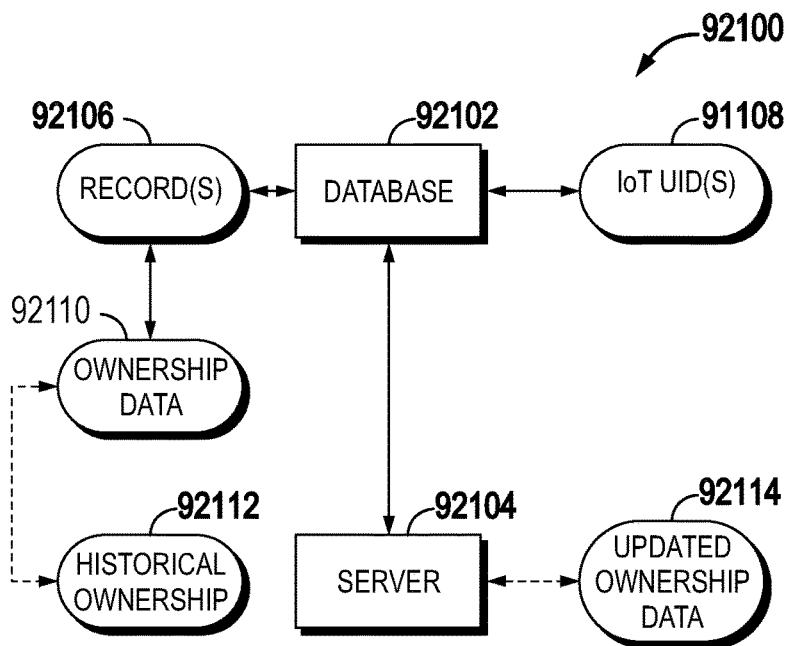
FIG. 92 is a schematic diagram of a system for an IoT device registry, in accordance with an embodiment of the current disclosure.

FIG. 92 depicts a schematic diagram of an example system 92100 for an IoT device registry, e.g., for network connected devices 1112, 1114, 1116, 1118, 1120, 1122, 1124 (FIG. 1), in accordance with an embodiment of the current disclosure. The system 92100 may form part of the server 1126 (FIG. 1), e.g., the at least one processor, and/or any other electronic computing device described herein.

With reference to FIG. 92, the system 92100 is for an IoT device registry. The system 92100 may include a database 92102, e.g., database 1128 (FIG. 1), and a server 92104, e.g., server 1126 (FIG. 1). The database 92102 may be structured to store records 92106 associating IoT UIDs 92108 with device ownership data 92110. The server 92104 may be structured to communicate with the database 92102, interpret an IoT UID 92108 corresponding to a device, identify, based at least in part on the IoT UID 92108 corresponding to the device, a record 92106 in the database 92102, the record 92106 including device the device ownership data 92110 associated with the device, interpret, based at least in part on the record 92106, the device ownership data 92110, and transmit the device ownership data 92110.

Certain further aspects of the example system are described herein, any one or more of which may be present in certain embodiments. In the system 92100, the device ownership data 92110 may include a record of historical ownership 92112. In the system 92100, the device may include a plurality of modules, each module having corresponding ownership data. In the system 92100, the server 92104 may be further structured to restrict access to information about the device from an owner of the device. In the system 92100, the server 92104 may be further structured to provide updated ownership data 92114 to replace the device ownership data 92110 associated with the device.

Figure 93:
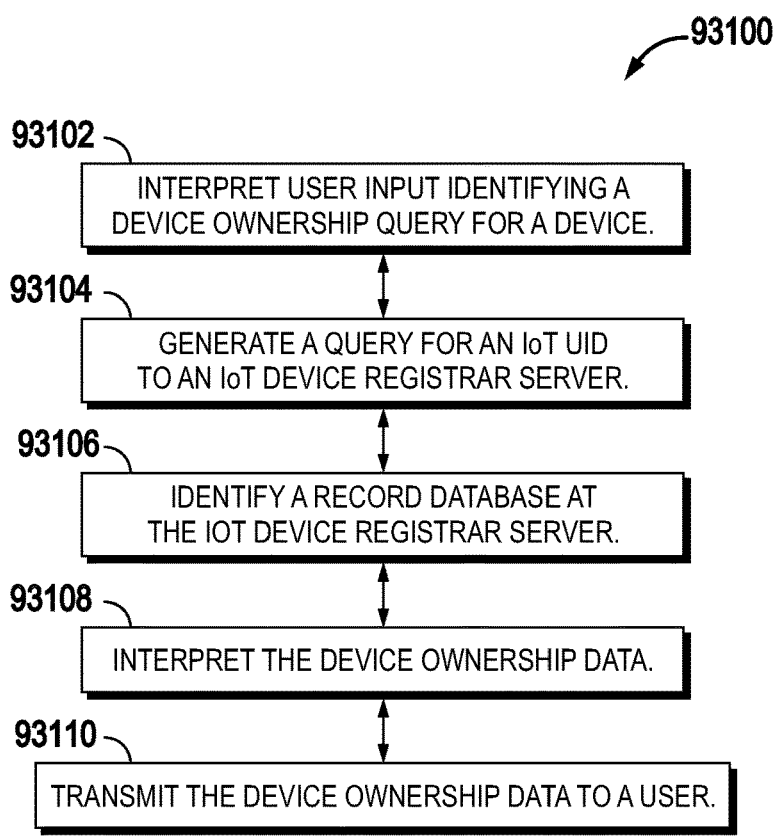
FIG. 93 is a flowchart depicting a method for an IoT device registry, in accordance with an embodiment of the current disclosure.

FIG. 93 illustrates a flowchart of an example method 93100 for displaying IoT device registry data, e.g., for network connected devices 1112, 1114, 1116, 1118, 1120, 1122, 1124 (FIG. 1), in accordance with an embodiment of the current disclosure. The method 93100 may be performed by the apparatus 9600 and/or any other computing device described herein.

The method 93100 may include interpreting, via an input processing circuit, user input identifying a device ownership query for a device 93102. The method further includes generating, via a query provisioning circuit, a query for an IoT UID, corresponding to the device, to an IoT device registrar server 93104. The method further includes identifying, via a record management circuit and based at least in part on the IoT UID, a record in a database at the IoT device registrar server, the record including device ownership data associated with the device 93106. The method further includes interpreting, via an ownership analysis circuit and based at least in part on the record, the device ownership data 93108. The method further includes transmitting, via an ownership provisioning circuit, the device ownership data to a user 93110.

Figure 94:
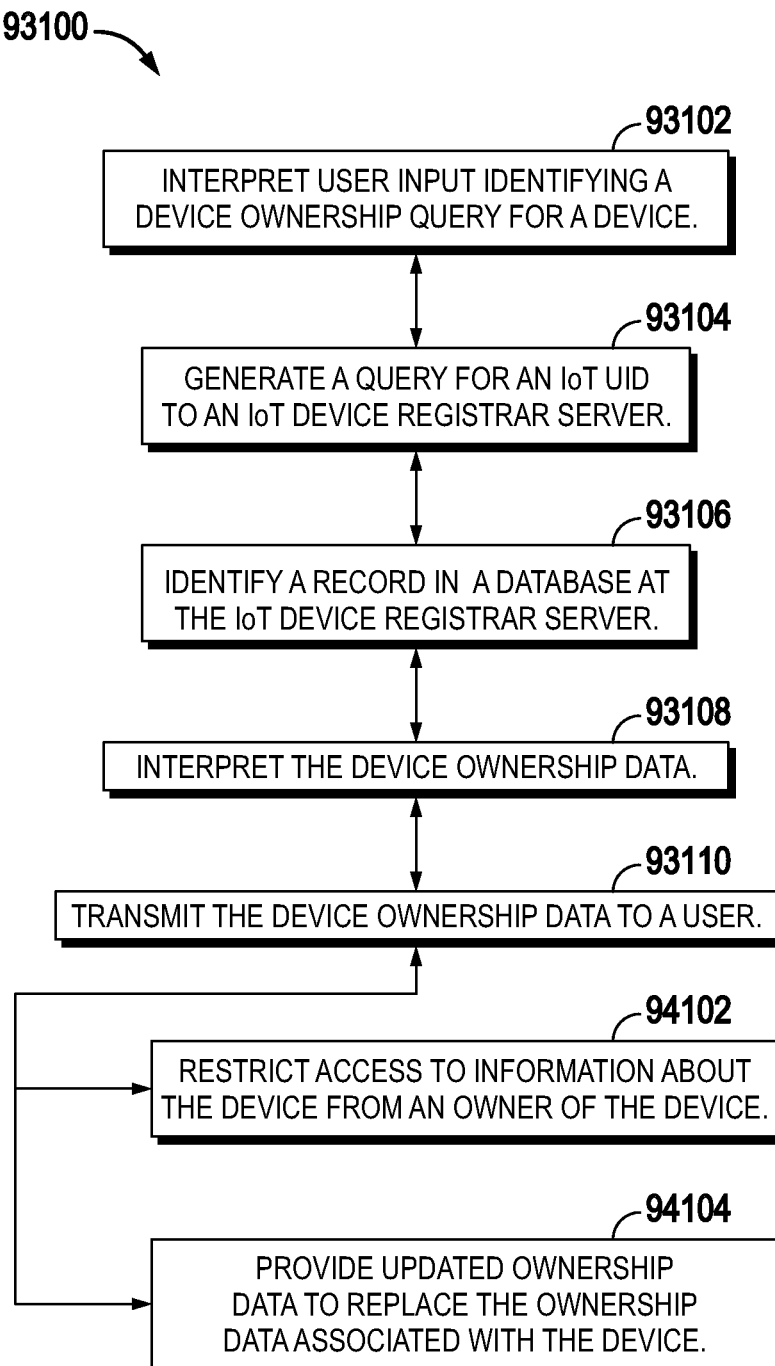
FIG. 94 is a flowchart depicting a method for an IoT device registry, in accordance with an embodiment of the current disclosure.

FIG. 94 is another flowchart depicting a method for an IoT device registry display, in accordance with an embodiment of the current disclosure. Certain further aspects of the example method are described herein, any one or more of which may be present in certain embodiments. The features shown in FIGS. 93 and 94 are combinable and interchangeable in any configuration in embodiments. In the method 93100, In the method 93100, the device ownership data may include a record of historical ownership. In the method 93100, the device may include a plurality of modules, each module having corresponding ownership data. The method 93100 may further include restricting access to information about the device from an owner of the device. The method 93100 may further include providing updated ownership data to replace the device ownership data associated with the device.

Figure 95:
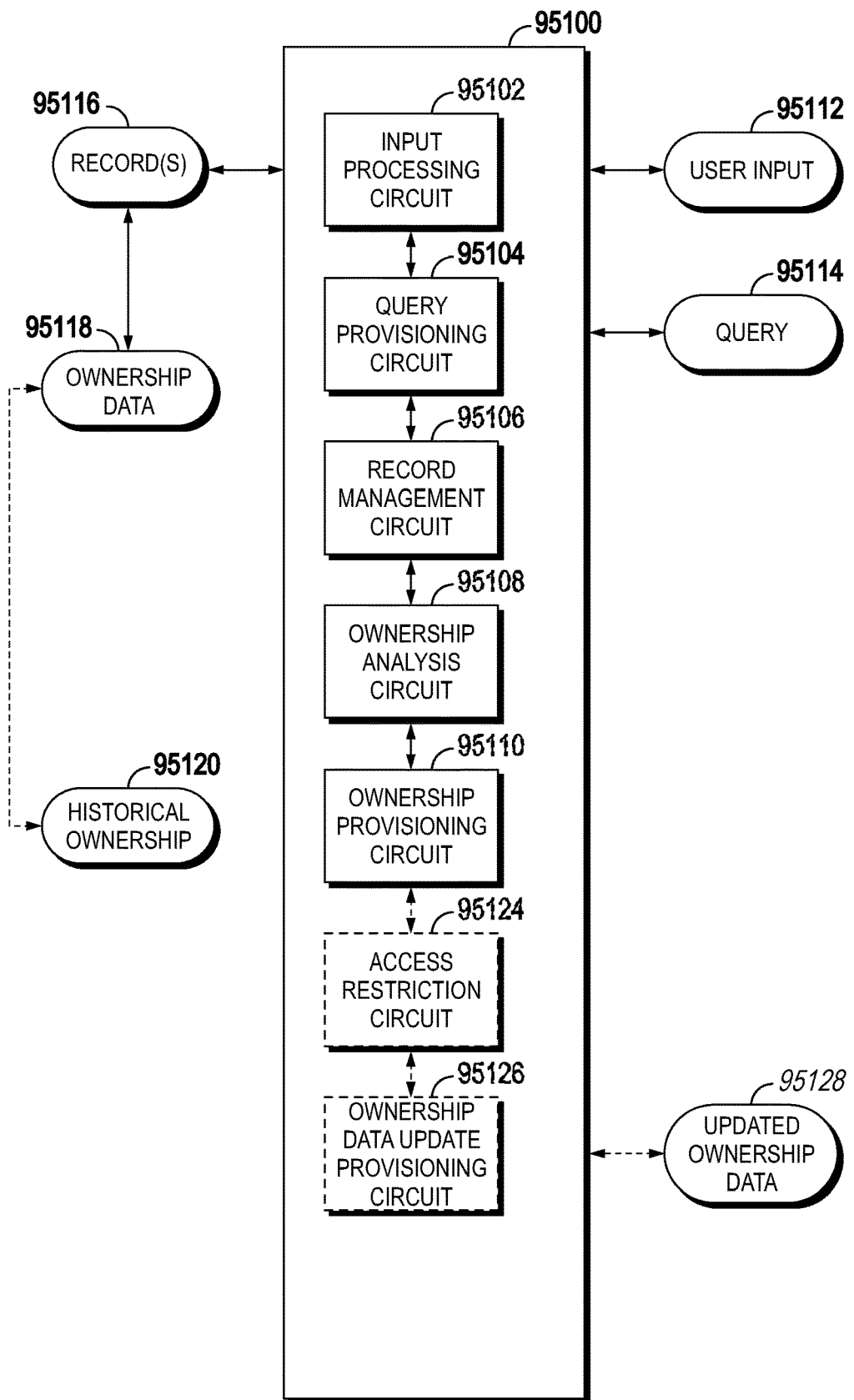
FIG. 95 is a schematic diagram of an apparatus for an IoT device registry, in accordance with an embodiment of the current disclosure.

FIG. 95 depicts a schematic diagram of an example apparatus 95100 for an Internet of Things (IoT) device registry, e.g., for network connected devices 1112, 1114, 1116, 1118, 1120, 1122, 1124 (FIG. 1), in accordance with an embodiment of the current disclosure. The apparatus 95100 may form part of the server 1126 (FIG. 1), e.g., the at least one processor, and/or any other electronic computing device described herein.

With reference to FIG. 95, the apparatus 95100 is for an IoT device registry. The apparatus 95100 may include an input processing circuit 95102, a query provisioning circuit 95104, a record management circuit 95106, an ownership analysis circuit 95108, and an ownership provisioning circuit 95110. The input processing circuit 95102 may be structured to interpret user input 95112 identifying a device ownership query for a device. The query provisioning circuit 95104 may be structured to generate a query 95114 for an IoT UID corresponding to the device to an IoT device registrar server, e.g., server 1126 (FIG. 1). The record management circuit 95106 may be structured to identify, based at least in part on the IoT UID, a record 95116 in a database, e.g., database 1128 (FIG. 1), at the IoT device registrar server, the record 95116 including device ownership data 95118 associated with the device. The ownership analysis circuit 95108 may be structured to interpret, based at least in part on the record 95116, the device ownership data 95118. The ownership provisioning circuit 95110 may be structured to transmit the device ownership data 95118 to a user. In the apparatus 95100, the device ownership data 95118 may include a record of historical ownership 95120. In the apparatus 95100, the device may include a plurality of modules, each module having corresponding device ownership data 95118. The apparatus 95100 may further include an access restriction circuit 95124 structured to restrict access to information about the device from an owner of the device. The apparatus 95100 may further include an ownership data update provisioning circuit 95126 structured to provide updated ownership data 95128 to replace the device ownership data 95118 associated with the device.

Figure 96:
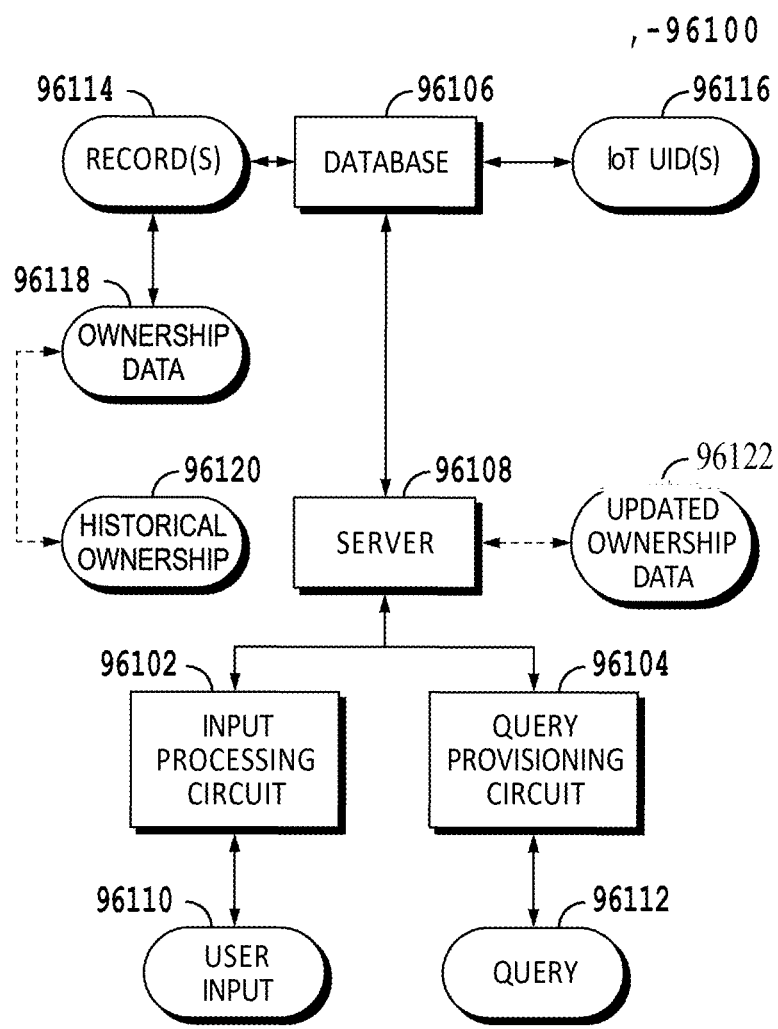
FIG. 96 is a schematic diagram of a system for an IoT device registry, in accordance with an embodiment of the current disclosure.

FIG. 96 depicts a schematic diagram of an example system 96100 for an IoT device registry, e.g., for network connected devices 1112, 1114, 1116, 1118, 1120, 1122, 1124 (FIG. 1), in accordance with an embodiment of the current disclosure. The system 96100 may form part of the server 1126 (FIG. 1), e.g., the at least one processor, and/or any other electronic computing device described herein.

With reference to FIG. 96, the system 96100 is for an IoT device registry. The system 96100 may include an input processing circuit 96102, a query provisioning circuit 96104, a database 96106, and a server 96108. The input processing circuit 96102 may be structured to interpret user input 96110 identifying a device ownership query for a device. The query provisioning circuit may be structured to generate a query 96112 for an IoT UID corresponding to the device. The database may be structured to store records 96114 associating IoT UIDs 96116 with device ownership data 96118. The server 96108 may be structured to communicate with the database 96106, interpret the query 96112 corresponding to the device, identify an IoT UID 96116 associated with the device, identify, based at least in part on the IoT UID 96116 associated with the device, a record 96114 in the database, the record 96114 including the device ownership data 96118 associated with the device, interpret, based at least in part on the record 96114, the device ownership data 96118, and transmit the device ownership data 96118.

Certain further aspects of the example system are described herein, any one or more of which may be present in certain embodiments. In the system 96100, the device ownership data 96118 may include a record of historical ownership 96120. In the system 96100, the device may include a plurality of modules, each module having corresponding ownership data 96118. In the system 96100, the server 96108 may be further structured to restrict access to information about the device from an owner of the device. In the system 96100, the server 96108 may be further structured to provide updated ownership data 96122 to the database to replace the device ownership data 96118 associated with the device.

In certain embodiments, the tracking of a chain of title may include identification of a trust level, score, and/or rating, which may be dynamic. Certification may be used to evaluate an asking price for a device, or a group of devices. Embodiments provide for an entity to claim ownership of a device, which may also relate to device setup and/or provisioning, as disclosed herein. Embodiments may provide for the detection of device properties, e.g., location, usage profile, network, interface language, device settings, associated telephone number, which may be indicative of a change in ownership.

Accordingly, embodiments of the IoT device registry, as disclosed herein, may provide for a trusted source of ownership data relating to device and/or their modules. Such embodiments may provide for improved sales and/or marketplaces processes, e.g., by providing for fast and reliable verification of a chain of title for a device and/or indications that a chain of title for a given device may have one or more discrepancies. Embodiments of the IoT device registry, as disclosed herein, may provide for improved detection of fraud and/or possible security vulnerabilities by tracking chains of title for devices so that such chains of title can quickly be verified using a trusted source. Embodiments of the IoT device registry, as disclosed herein, may provide for improved billing processes by tracking leased and/or licensed devices. For example, embodiments of the current disclosure may provide for accurate tracking of an amount of time a device is in the possession of a party renting and/or leasing the device. Embodiments of the current disclosure may also provide for improved shipment tracking as events for a device, e.g., a white good, such as a refrigerator, may be reported to the IoT device registry, e.g., as event messages, when transfers of possession occur and/or when a device is scanned as a checkpoint in a distribution network. Embodiments of the current disclosure may also provide for improved quality of a supply chain by identifying which entities in the supply chain, who may show up in a chain of title, have low trust and/or high-risk indicators, as disclosed herein, where they can be removed and/or replaced with entities having higher trust and/or lower risk indicators. A non-limiting use case of the current disclosure includes using an IoT device registry, as disclosed herein, to track shipping containers at a port facility and/or between port facilities. Another non-limiting use case of the current disclosure includes using an IoT device registry to track ownership of city assets, e.g., water system devices, such as pumps, in the event of boundary changes, e.g., congressional and/or other legislative district boundaries change, part of a county becomes absorbed by a city or vice-versa, and/or portions of one city are moved to another city.

Embodiments of the current disclosure provide for a method of rating of Internet of Things (IoT) devices. The rating may be an indicator, e.g., a score, that relates to a trust indicator (also referred to as a trustworthiness score or trust indicator herein) and/or a risk indicator (also referred to herein as a risk score), associated with a device. As will be understood, risk and/or trust indicators may be reciprocals of each other, e.g., a device with a low trust score may have a high-risk score and vice-versa. A risk indicator may reflect a confidence measure associated with a device. The confidence measure may relate to a confidence that the device has not been tampered with and/or may reflect the security of a device. A risk indicator may reflect the potential risk that a device may deliberately or inadvertently fail to execute the desired operation, leak sensitive data when operated, meet contractual obligations, and/or comprise the security of other devices.

In embodiments, the risk indicator may be based on the known history of the device, location, predictability of location, predictability of behavior, age of the device, and the like. In some case, a risk indicator may reflect the number of operational anomalies in the lifespan of the device. Operational anomalies may reflect operations outside of expected operating parameters for a device. Operational anomalies may include software crashes, physical locations, movement, power consumption, data gaps, error rates, usage statistics, temperatures, and the like.

In embodiments, a risk indicator may include an objective score over all devices. In some cases, the risk indicator may be normalized or be relative with respect to a class of devices, locations, functions of the devices, and the like. In one example, more complex devices with more hardware, software components, and connectivity may have a higher objective risk indicator than simple sensors with one hardware component and simple wired connectivity. Higher complexity devices may include a relative risk indicator that reflects the relative risk indicator for only a specific type of high complexity devices. The normalized risk indicator may be a score that ranges between (0) and (100), for example with the lowest score assigned to devices with the lowest risk for the particular class of devices and the highest score assigned to devices with the highest risk.

A risk indicator may be dynamic and may change over time as a device ages, changes locations, is updated with different software and hardware, and the like. A risk indicator may change based on an operation of a device. A risk indicator may change for different operations of a device. For example, a device may be operable to receive data and provide data to a user. In one example, the operation of receiving data by the device may have a higher risk indicator than the operation of providing data to a user since there may be a risk that the data that is received by the device may be exposed or leaked.

A risk indicator may be assigned to a new device that is being deployed as well as devices that have already been deployed. Prior to deployment, a Greenfield device may be evaluated and assigned an initial risk indicator. The risk indicator may reflect the complexity of the device, installed software, connectivity, configuration, capabilities of operations, and the like. After the device is deployed the risk indicator may be updated based on the location of deployment, operator of the device, history of operation, predictability of operation, and other metrics described herein. The operation of the device may be monitored and the operation history may be stored at a registrar server and used to compute a risk indicator. A deployed device, such as a Brownfield device, may be assigned an initial risk indicator. An initial risk indicator may be assigned based on an audit of the device hardware, software, location, capabilities, and the like. In many cases, a Brownfield device may be assigned a higher initial risk indicator than an equivalent Greenfield device since the complete history of the Brownfield device may not be known. The operation of the Brownfield device may be monitored and the risk indicator adapted in the same manner as for the Greenfield device.

In embodiments, operations such as updating or patching software of a device may decrease the risk indicator of a device. In embodiments, gaps within the operational record histories of a device may increase the risk indicator of a device. In some embodiments, operators of devices may be provided with reports that include data as to what factors contributed to a particular risk indicator and in some cases operators may be provided with a list of actions for improving (i.e. decreasing) the risk indicator. In some cases, updates and/or modifications to devices to improve the risk indicator may be implemented automatically. Operators of devices may be incentivized to improve the risk indicator of devices by providing timely and complete histories of devices, updating devices, and the like.

In some embodiments, a risk indicator may be computed as a weighted sum of different scores that reflect aspects of the hardware, software, operation history, location, and the like. The weights and/or functions for generating a score may be defined by a user. In some embodiments, weights and functions for computing the risk indicator may be determined by a trained neural network, artificial intelligence system, and the like. In some embodiments, a risk indicator may include a plurality of scores and components that reflect the risk for different functions, components, elements, locations, and the like. The plurality of scores comprising a risk indicator may be processed according to the preferences of a user, organization, and the like to determine a personalized risk indicator.

A risk indicator may be stored in an IoT device registrar server. The registrar server may be queried for a risk indicator for a device. In some cases, a query for a risk indicator may include identifying data for the device and/or contextual data. Contextual data may include location data, time data, type of operation to be executed by the device, and the like. When contextual data is provided with the query the registrar server may return a risk indicator that reflects the contextual data. When contextual data is provided with a query the weights and functions used to compute the risk indicator may be selected to reflect the contextual data.

Indicators and/or scores may be converted from one paradigm/entity to another, in which the IoT device registry may serve as a baseline score to which the others can be compared. For example, a first entity, 1136 (FIG. 1), e.g., an end user, may have its own scale (a first scale) and/or system for indicating trust and/or risk associated with a device, as disclosed herein, and a second entity 1138 (FIG. 1), e.g., a third-party monitoring service, may use a different scale (a second scale) and/or system for indicating trust and/or risk associated with a deice. In embodiments, the registrar 1130 (FIG. 1) may have a third scale that serves as a baseline to convert values on the first scale to values on the second scale or vice-versa. As a non-limiting example, the registrar 1130 may have a risk scale that rages from zero to one hundred (0-100), the first entity 1136 may have a risk scale that uses enumerated values, e.g., colors such as Green, Blue, Yellow, Orange, Red, and the third-party may have a risk scale that ranges from negative 100 to positive 100 ($^-$100-$^+$100). In embodiments, the first entity 1136 and/or the registrar 1130 may store a first mapping from the first scale to the second scale, e.g., green may equate to (0-19), blue may equate to (20-39), yellow may equate to (40-59), orange may equate to (60-79), and red may equate to (80-100). The second entity 1138 and/or the registrar 1130 may store a second mapping that maps the second scale to the third scale, e.g., ($^-$100-0) may equate to (0-30), ($^+$1-$^+$80) may equate to (31-60), and ($^+$81-$^+$100) may equate to (61-100). Thus, a risk score of (85) reported by the second entity 1138, e.g., a third-party monitor, may be translated using the registrar's 1130 scale to the first entity's 1136 scale where it is displayed to the first entity 1136 as an orange value, e.g., moderate to high risk. As will be understood, such conversion between different trust and/or risk scales may be incorporated into the embodiments disclosed herein with respect to the metaverse and augmented reality applications as disclosed herein. For example, a child profile metaverse account may have a different risk and/or trust scale as compared to an adult profile, e.g., the child's scale may be weighted to favor caution higher than the adult profile. In embodiments, an entity 1136 may use different risk and/or trust scale for different external entities, e.g., 1138 and/or 1134, that it may interact with and/or receive devices from. For example, a corporate user 1136 may have a first scale weighted towards trusting a device, where the first scale may be for use with a trusted party, and a second scale weighted towards not trusting a device, where the second scale may be for use with unknown and/or untrusted parties.

In embodiments, risk indicators and other trust indicators may be provided for online servers to include game/metaverse servers. Embodiments may provide for augmented reality (AR) trust indicators and risk indicators to be shown in relation to devices. For example, automatic teller machines (ATM) and/or card readers may be identified and the risk indicator for the devices may be queried from the registrars. Augmented reality interfaces may provide a display such as an overlay that identifies the risk indicator and/or the trust indicator for the ATM. The augmented reality may include color codes to show the relative risk or trust associated with the ATM. In some embodiments, a query may include contextual data. For example, continuing with the ATM example, contextual data may include the location (such as GPS location data) of the ATM, the transaction type that the user wishes to use the ATM for, and a picture or a video of the ATM. The contextual data may be used to further customize or personalize the risk indicator and trust indicators. For example, the pictures and video of the ATM may be compared to stored pictures and video of the ATM and the risk indicator may be adjusted if the new pictures or video show differences to a historical image of the ATM.

Referring again to FIGS. 1 and 2, embodiments of the current disclosure may provide for the generation of a risk indicator by a registration server 1126, and/or a computing device operated by a manufacturer 1134, end user 1136, third party 1138, and/or other entities. Generation of a risk and/or trust indicator, as disclosed herein, may form part of the monitor and secure component 2114 (FIG. 2), including the set service alerts subcomponent 2134 (FIG. 2). In embodiments, the process of generating risk and/or trust indicators may be presale or post-sale with respect to a device. Presale determination of a risk indicator may occur prior to the release of the Greenfield device from a manufacturer, for example, an original equipment manufacturer (OEM), for use by end users. Post-sale determination of a risk indicator may occur when an end user identifies a Brownfield device for risk assessment and/or encounters a Greenfield device that has been and/or is in service after having been initially purchased. In embodiments, a device's risk and/or trust indicator may change over time, e.g., a device's risk and/or trust score may improve over time as more of its history becomes tracked in the registry 1129 (FIG. 1), via event messages 6116 (FIG. 6). Certain events, e.g., taking a patch, may also improve a device's trust and/or risk score, whereas other events, e.g., missing a patch and/or being reported as stolen and/or compromised, may decreases a device's trust and/or risk score.

Figure 97:
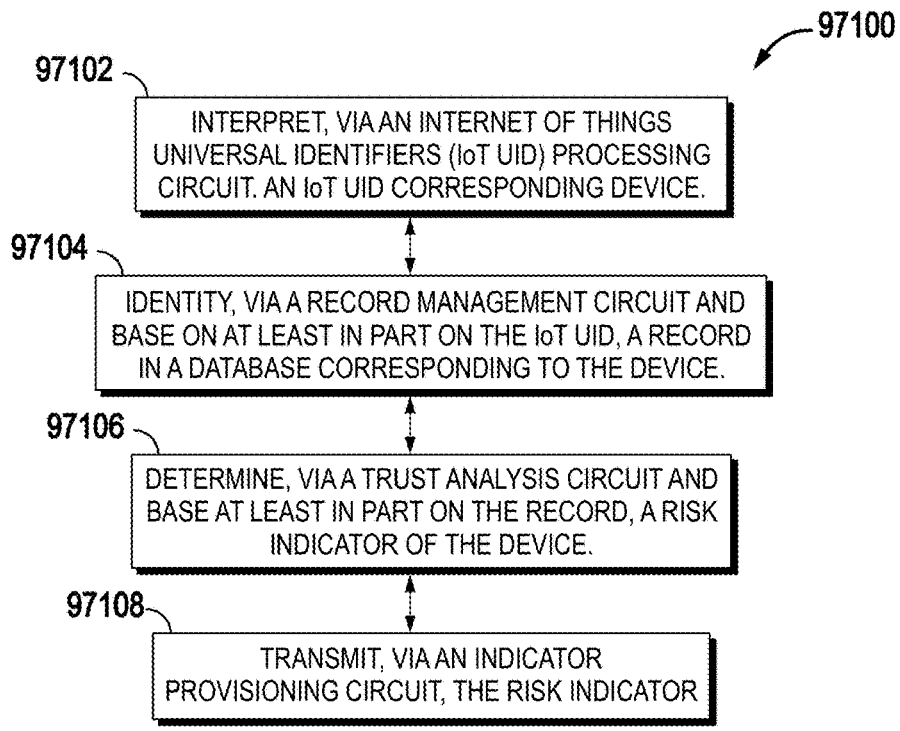
FIG. 97 is a flowchart depicting a method for transmitting a risk indicator, in accordance with an embodiment of the current disclosure.

Turning to FIG. 97, a method 97100 for transmitting a risk indicator is shown. The method 97100 may be performed by a manufacturer 1134 (FIG. 1), e.g., a module manufacturer and/or a manufacturer of a device that includes one or more modules. The method 97100, in embodiments, may also be performed by a user 1136 and/or third party 1138 (FIG. 1). The method 97100 includes interpreting, via an Internet of Things Universal Identifier (IoT UID) processing circuit, an IoT UID corresponding to a device 97102. The method 97100 may include identifying, via a record management circuit and based at least in part on the IoT UID, a record in a database corresponding to the device 97104 and determining, via a trust analysis circuit and based at least in part on the record, a risk indicator of the device 97106. The method may further include transmitting, via an indicator provisioning circuit, the risk indicator 97108.

Figure 98:
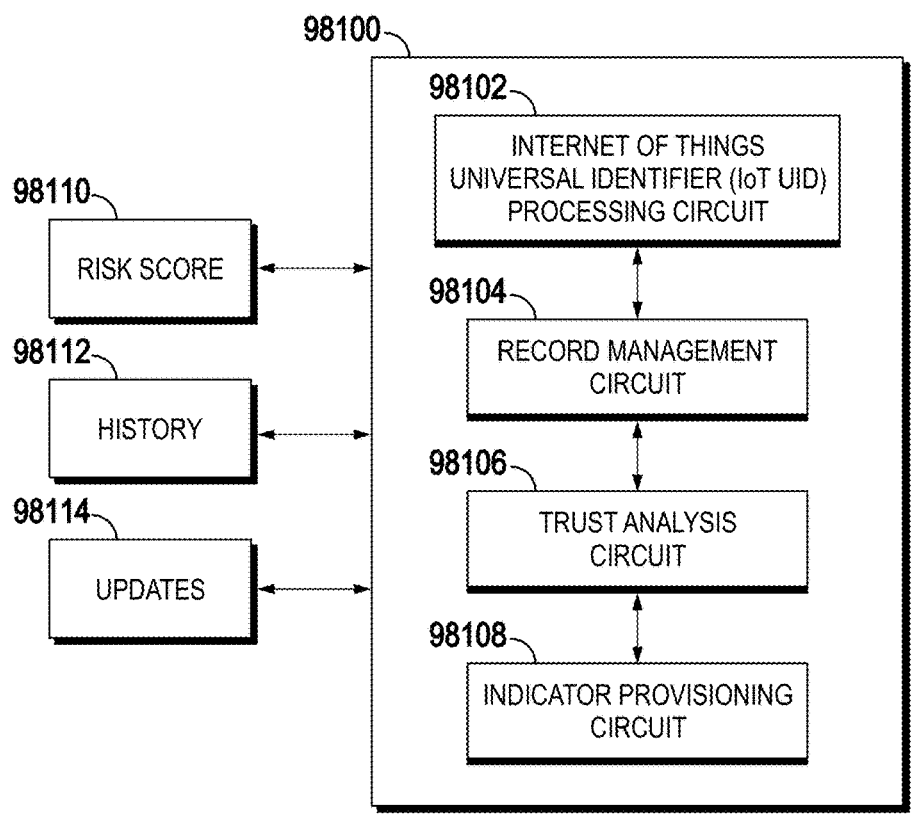
FIG. 98 is a schematic diagram of an apparatus for transmitting a risk indicator, in accordance with an embodiment of the current disclosure.

Referring to FIG. 98, an apparatus 98100 that may be configured to transmit a risk indicator may include an Internet of Things Universal Identifier (IoT UID) processing circuit 98102 that is structured to interpret an IoT UID 6118 corresponding to a device. The apparatus 98100 may further include a record management circuit 98104 structured to identify, based at least in part on the IoT UID 6118, a record 1152 (FIG. 1) in a database 1128 (FIG. 1) corresponding to the device and a trust analysis circuit 98106 structured to determine, based at least in part on the record 1152, a risk indicator of the device. The apparatus 98100 may further include an indicator provisioning circuit 98108 structured to transmit the risk indicator.

Figure 99:
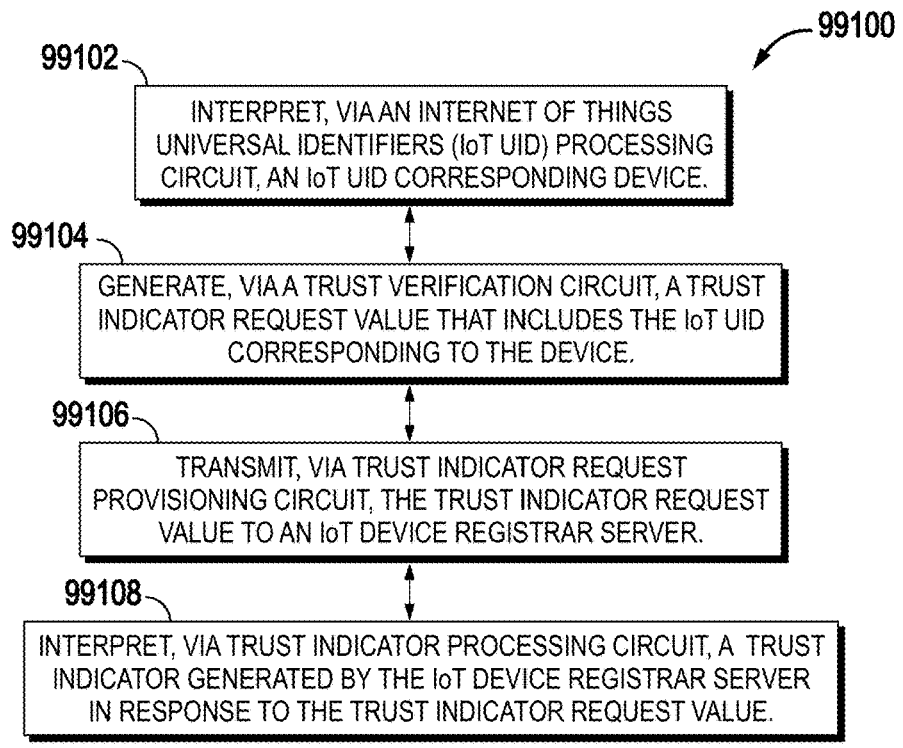
FIG. 99 is another flowchart depicting a method of interpreting a trust indicator, in accordance with an embodiment of the current disclosure.

Turning to FIG. 99, a method 99100 for interpreting a trust indicator is shown. The method 99100 includes interpreting, via an Internet of Things Universal Identifier (IoT UID) processing circuit, an IoT UID corresponding to a device 99102. The method 99100 may include generating, via a trust verification circuit, a trust indicator request value that includes the IoT UID corresponding to the device 99104 and transmitting, via a trust indicator request provisioning circuit, the trust indicator request value to an IoT device registrar server 99106. The method 99100 may further include interpreting, via a trust indicator processing circuit, a trust indicator generated by the IoT device registrar server in response to the trust indicator request value 99108.

Figure 100:
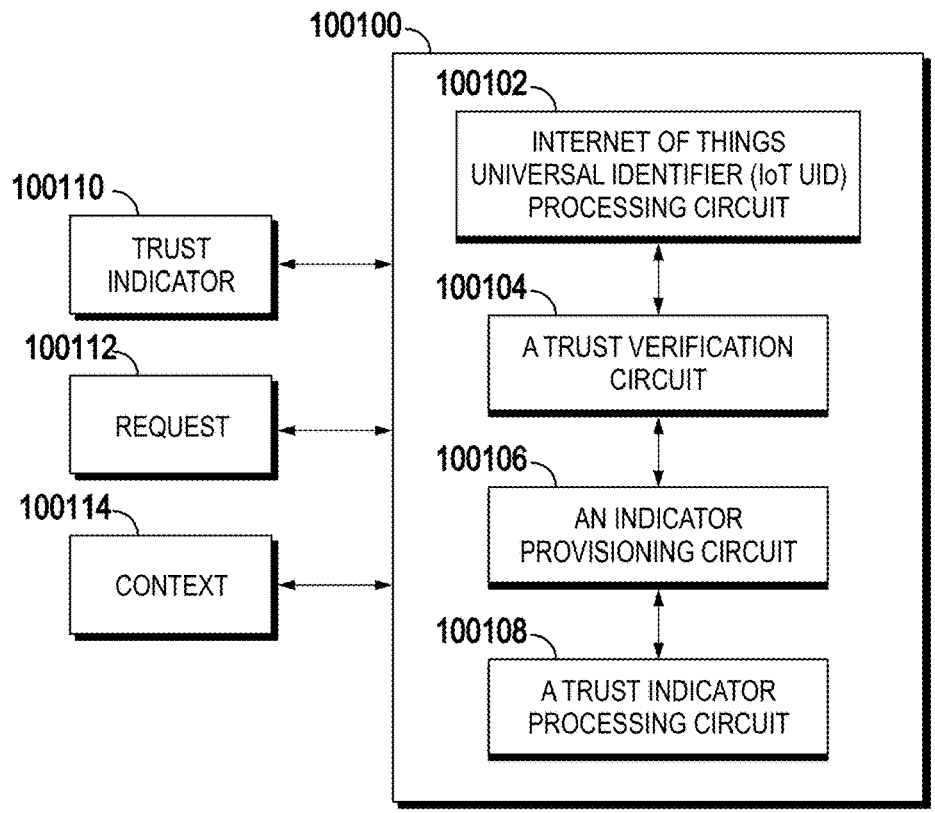
FIG. 100 is a schematic diagram of an apparatus for interpreting a trust indicator, in accordance with an embodiment of the current disclosure.

Referring to FIG. 100, an apparatus 100100 that may be configured to transmit a risk indicator may include an Internet of Things Universal Identifier (IoT UID) processing circuit 100102 that is structured to interpret an IoT UID corresponding to a device. The apparatus 100100 may further include a trust verification circuit 100104 structured to generate a trust indicator request value that includes the IoT UID corresponding to the device and a trust indicator request provisioning circuit 100106 structured to transmit the trust indicator request value to an IoT device registrar server. The apparatus 100100 may further include a trust indicator processing circuit 100108 structured to interpret a trust indicator generated by the IoT device registrar server in response to the trust indicator request value.

Embodiments may provide for risk and/or trust scores/indicators and/or certification of devices, e.g., servers and/or other physical assets, supporting metaverse activities, and/or devices appearing and/or existing within the metaverse. Devices in the metaverse may be virtual devices, e.g., objects in the metaverse having real-world counterparts (real-world devices), where the virtual device is a digital-twin of the real-world counterpart. Non-limiting examples of virtual devices include: vehicles; rooms; buildings; controllers (thermostats, security system key pads, process logic controllers, and the like); sensors (temperature, pressure, voltage, amperage, magnetic fields, weather conditions, and the like); and/or other types of devices where having both real-world and metaverse versions of the devices provides a benefit. A digital virtual device may have properties corresponding to its real-world counterpart that may be updated in real-time and/or on a periodic basis. In embodiments, a digital twin may be updated with predicted properties for its real-world counterpart in the event the real-world counterpart is unable to communicate with an IoT device registry to which the real-world counterpart and/or its digital twin may be registered with, as described herein. Devices in the metaverse may be real-world devices, e.g., objects in the real-world having metaverse counterparts (digital twin virtual devices) and/or supporting metaverse activities. Non-limiting examples of real-world devices include servers hosting metaverse rooms, servers hosting webstores from which an avatar can purchase goods or services; user devices used to access a metaverse; and/or counterparts to virtual devices, as described herein. Devices in the metaverse may be meta-devices, e.g., objects in the metaverse lacking real-world counterparts. In embodiments, a device may have modules that are virtual devices and modules that are meta-devices. In embodiments, an IoT device registry may provide for registration of virtual devices, real-world devices, and/or meta-devices, as disclosed herein, and/or the services and/or functions associated with registration for registered virtual devices, real-world devices, and/or meta-devices, as also disclosed herein.

A risk score/indicator may be a measure of the risk of taking a particular action (or set of actions) and/or interacting with a device and/or a set of devices. A trust score/indicator may be a measure of trust of a device as disclosed herein. A risk score may equate to a trust score, e.g., high risk equals a low trust score and vice-versa. In embodiments, a scale for a risk score may be user adjustable in relation to a base risk score scale maintained by an IoT device registrar. For example, a user with a low risk tolerance may see objects with red risk warnings that other users with higher risk tolerances may see with green checkmarks. Conversely, a user with a high risk tolerance may see objects with green checkmarks that other users with lower risk tolerances may see with red risk warnings. In embodiments, a user's risk score scale may be defined by the user, another use, and/or inferred/predicted via artificial intelligence based at least in part on one or more characteristics of the user, e.g., age, sex, location, medical condition, etc., and/or by analyzing their actions within the metaverse. In such embodiments, the artificial intelligence may adjust the user's risk score scale as the user spends an increasing amount of time in the metaverse and gains "metaverse street smarts".

As a non-limiting example, a user in the metaverse may be provided with a risk and/or trust score/indicator of a server (retrieved/queried from an IoT device registrar using the server's IoT UID) before entering an area, e.g., a room, in the metaverse hosted by that server. Embodiments may provide for risk and/or trust scores/indicators of users, a plurality of users, and the like, within the metaverse (that have IoT UIDs registered with an IoT device registrar), such as in an area that a user is about to enter or interact with. Such risk and/or trust scores may be based on the risk and/or trust score of devices associated with the user that are also registered with the IoT device registrar. For example, embodiments may assign a risk score of red (high risk) to an avatar having an IoT UID corresponding to a user associated with fraudulent activities and/or devices registered in an IoT device registry 1129 (FIG. 1), as disclosed herein. Embodiments may depict/express the risk scores within the metaverse based on one or more of color, numerical value, sound, and/or any combination thereof. Embodiments of the disclosure may provide for an end user application that restricts a user from accessing or interacting with devices in the metaverse having IoT UIDs associated with a high risk and/or low trust level, for example, a server, an area, an object, an avatar, or another user, that does not meet a minimum risk and/or trust threshold and/or does not present a certification from an IoT device registrar. Embodiments of the application may be a parental control software agent. The risk and/or trust scores/indicators may be determined, stored, and/or maintained by an IoT UID device registrar, e.g., in an IoT device registrar server 1126 and/or database 1128 (FIG. 1), in association with IoT UIDs.

The device in the metaverse may be an area of the metaverse, such as a room, a building, an outside environment, and the like. As the user moves through the metaverse a trust indicator may be determined for the device in the metaverse, where for instance, a trust indicator is transmitted to a user before the user enters an area of the metaverse associated with the device, e.g., a room, an object within a room, an avatar, etc. The trust indicator of the device in the metaverse may be based at least in part on a combination of trust indicators of a plurality of devices associated with the device, e.g., an avatar associated with five (5) devices where four (4) devices have high trust scores and one (1) device has a medium trust score may be assigned a high trust level, whereas the same avatar associated with five (5) devices where four (4) have medium trust scores and one (1) has a high trust score may receive a medium trust score. The trust indicator of the device may be based at least in part on a combination of trust indicators of a plurality of modules associated with the device. The trust indicator may be updated based on interactions with the device, e.g., an device unfamiliar to the IoT UID registry and/or a user using the IoT UID registry may initially receive a low trust/high risk score, where additional interactions with the device (without incident) may raise the trust score/lower the risk score of the device. In embodiments, trust and/or risk scores may be tailored to a particular user/entity using the IoT UID device. For example, a device may be unfamiliar to a first user and receive a low trust/high risk score with respect to the first user. The same device, however, may be familiar to a second user and receive a high trust/low risk score with respect to the second user.

The trust and/or risk indicator may be a numeric value, an enumerated value, and the like. The trust and/or risk indicator may be displayed, such as a value, a color-coded value, a graphic display of a value, and the like. The trust and/or risk indicator may include a trust/risk level, a trust/risk score, a trust/risk rating, and the like. The trust and/or risk indicator may be based at least in part on a location of the device, a time period, a software and/or firmware version of the device, a trust and/or risk indicator of other devices associated with the device, a trust and/or risk indicator of a user associated with the device, and the like. For example, an avatar representing a kids' cartoon character may have a lower trust rating in a metaverse room when a local time is between midnight and 4:00 am than the avatar would have in the same room between 9:00 am to 5:00 pm. As another example, an object appearing in the metaverse outside of a known schedule for the object may receive a lower score than the object has during its scheduled times. The determining of the trust and/or risk indicator may be based at least in part on artificial intelligence. The trust and/or risk indicator may be reflective of the device being a Greenfield device or a Brownfield device, as disclosed herein.

In certain aspects, an interaction may be authorized or prohibited with a device based at least in part on the trust and/or risk indicator, such as where the interaction is an exchange of data with the device, establishing a network connection with the device, and the like. In embodiments, the trust and/or risk indicator may be based on an event of the device, such as a transfer of ownership, a patching of the device, an updating of software or firmware of the device, and the like.

Figure 101:
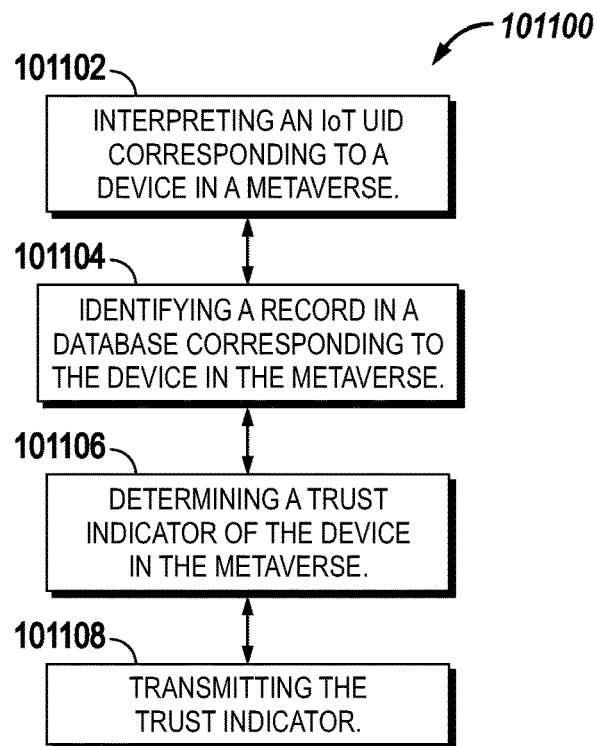
FIG. 101 is a flowchart depicting a method for managing interactions with devices in a metaverse, in accordance with an embodiment of the current disclosure.

Referring to FIG. 101, a method 101100 may be provided. The method 101100 may include interpreting 101102, via an Internet of Things (IoT) Universal Identification (UID) processing circuit, an IoT UID corresponding to a device in a metaverse; identifying 101104, via a record management circuit and based at least in part on the IoT UID, a record in a database corresponding to the device in the metaverse; determining 101106, via a trust analysis circuit and based at least in part on the record, a trust indicator of the device in the metaverse; and transmitting 101108, via a trust indicator provisioning circuit, the trust indicator.

Figure 102:
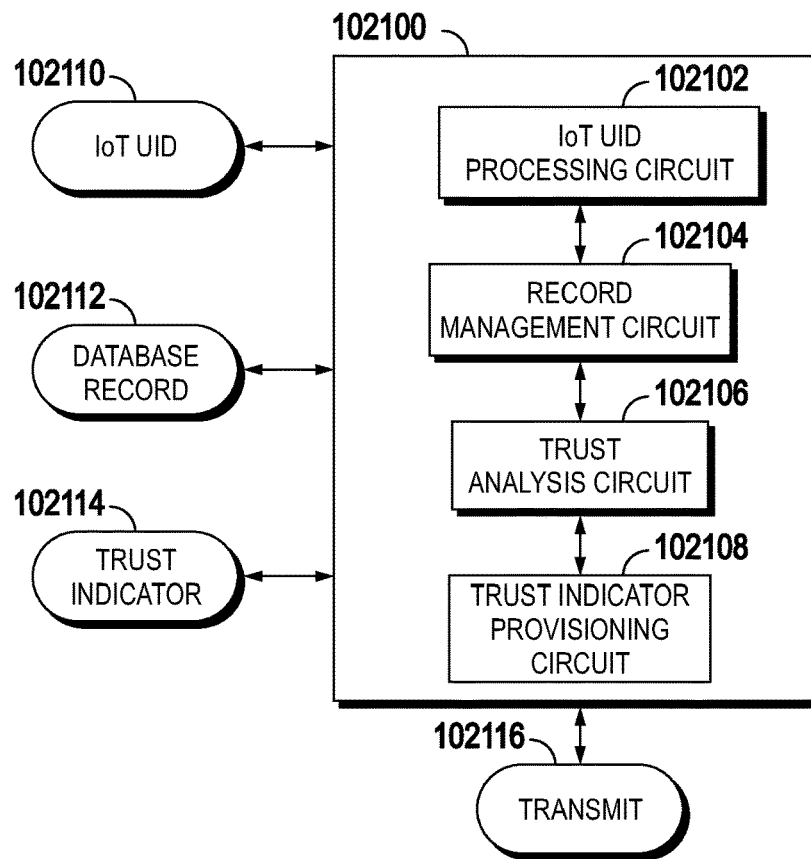
FIG. 102 is a block diagram depicting an apparatus for managing interactions with devices in a metaverse, in accordance with an embodiment of the current disclosure.

Referring to FIG. 102, an apparatus 102100 for an IoT UID 102110 may be provided. The apparatus 102100 may include a IoT UID processing circuit 102102, a record management circuit 102104, a trust analysis circuit 102106, a trust indicator provisioning circuit 102108, and the like. The IoT UID processing circuit 102102 may be structured to interpret an IoT UID 102110 corresponding to a device in a metaverse. The record management circuit 102104 may be structured to identify, based at least in part on the IoT UID 102110, a record 102112 in a database corresponding to the device in the metaverse. The trust analysis circuit 102106 may be structured to determine, based at least in part on the record 102112, a trust indicator 102114 of the device in the metaverse. The trust indicator provisioning circuit 102108 may be structured to transmit 102116 the trust indicator.

Figure 103:
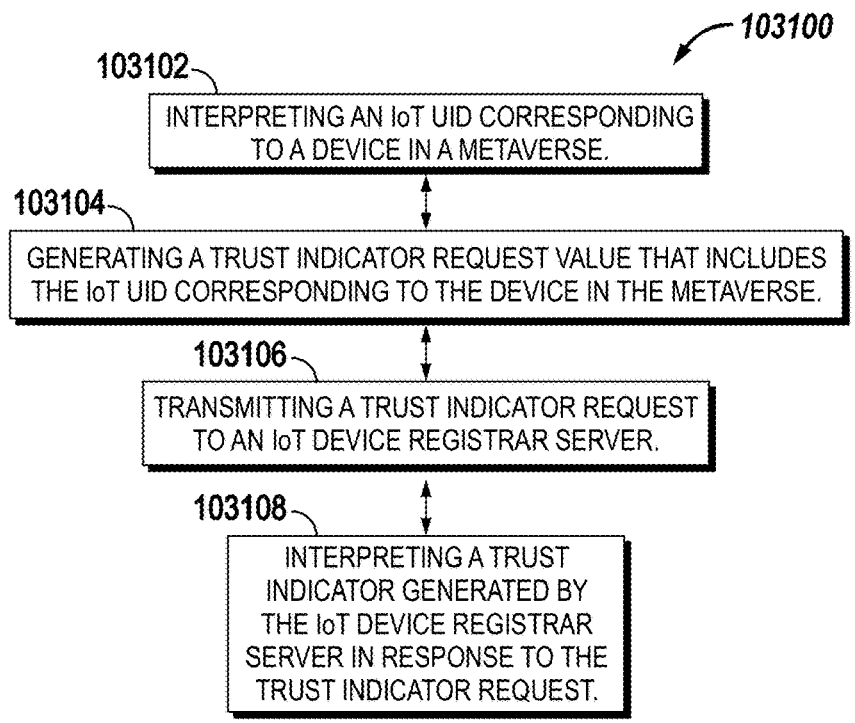
FIG. 103 is a flowchart depicting a method for managing interactions with devices in a metaverse, in accordance with an embodiment of the current disclosure.

Referring to FIG. 103, a method 103100 may be provided. The method 103100 may include interpreting 103102, via an IoT UID processing circuit, an IoT UID corresponding to a device in a metaverse; generating 103104, via a trust verification circuit, a trust indicator request value that includes the IoT UID corresponding to the device in the metaverse; transmitting 103106, via a trust indicator request provisioning circuit, a trust indicator request to an IoT device registrar server 1126; and interpreting 103108, via a trust indicator processing circuit, a trust indicator generated by the IoT device registrar server 1126 in response to the trust indicator request.

Figure 104:
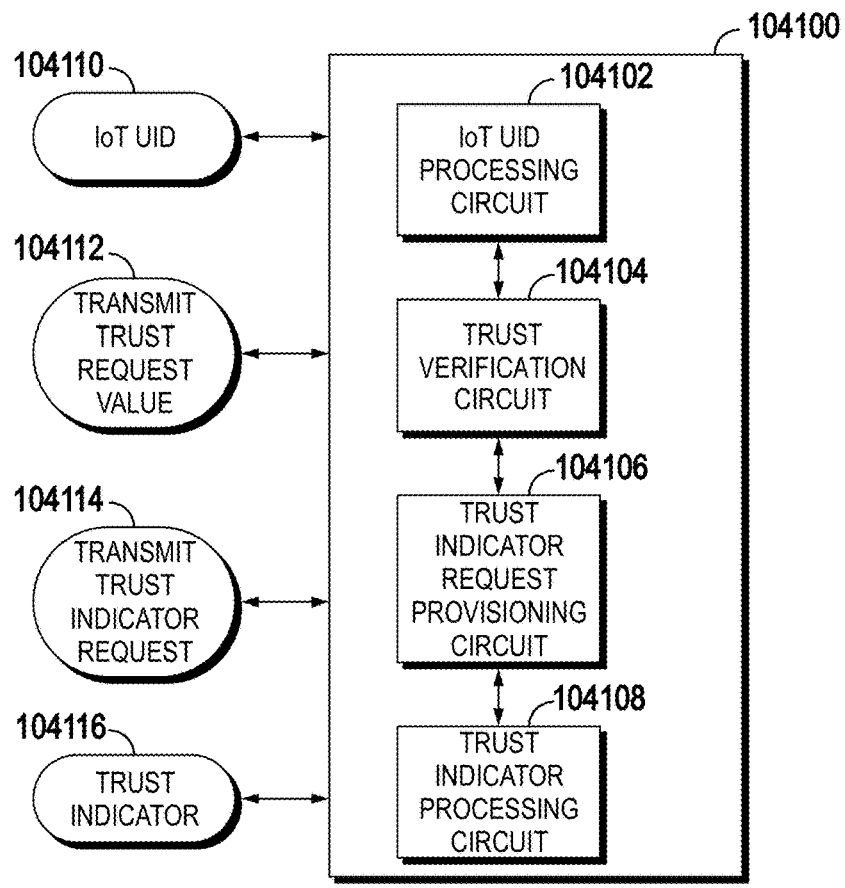
FIG. 104 is a block diagram depicting an apparatus for managing interactions with devices in a metaverse, in accordance with an embodiment of the current disclosure.

Referring to FIG. 104, an apparatus 104100 for an IoT UID 104110 may be provided. The apparatus 104100 may include an IoT UID processing circuit 104102, a record management circuit 104104, a record indicator request provisioning circuit 104106, a trust indicator processing circuit 104108, and the like. The IoT UID processing circuit 104102 may be structured to interpret an IoT UID 104110 corresponding to a device in a metaverse. The record management circuit 104104 may be structured to generate a trust indicator request value 104112 that includes the IoT UID 104110 corresponding to the device in the metaverse. The trust indicator request provisioning circuit 104106 may be structured to transmit a trust indicator request 104114 to an IoT device registrar server 1126. The trust indicator processing circuit 104108 may be structured to interpret a trust indicator 104116 generated by the IoT device registrar server 1126 in response to the trust indicator request.

In a non-limiting example, a user in the metaverse may approach a room operated by a server. The server may be registered with an IoT device registry, as disclosed herein, such that the user can query the server for its IoT UID and then query the IoT device registry to retrieve the security and/or risk indicator of the server. In another non-limiting example, the server may present the user with a trust and/or risk indicator with an encryption-based certificate from the IoT device registrar. In another non-limiting example, a user may encounter a meta-device, e.g., a jet fighter plane, where a risk score may be depicted above the jet fighter plane such that the user can see and accept the risk, e.g., a cyber security risk, of interacting with the jet, i.e., flying it in the metaverse. The risk score may be based at least in part on the manufacturer/software company who programmed the jet fighter for the metaverse. In another non-limiting example, a user may interact with a virtual home security keypad in the metaverse, where the user may be accessing the metaverse from a location other than their home, where the virtual security keypad is a digital twin of a security keypad in the user's house and can control a corresponding security system for the user's home. If the virtual security keypad and its real-word counterpart are registered with an IoT device registry, as described herein, the user can verify that the virtual security keypad is authenticate and not a spoofed object made by a malicious actor.

Embodiments may provide for the depiction and use of risk and/or risk scores/indicators, as disclosed herein, and/or certification via augmented reality (AR). Embodiments may depict risk scores of objects encountered by a user. As a non-limiting example, a user wearing an AR device, such as an AR headset, AR contact lenses, AR glasses, or AR goggles, may see an automated teller machine (ATM) (in the real-world) associated with a green indicator, e.g., an AR object overlaid on the ATM, if the device has a sufficiently high trust indicator, e.g., trust score/rating/level value, or red if the device has a sufficiently low trust indicator. Embodiments may depict trust indicators for individuals based on the trust indicators of devices associated with the scored individuals.

In embodiments, the device in the AR may be an IoT device, a server, a user, an avatar, and the like. A device in the AR may correspond to an area of a metaverse, such as where the area in the metaverse is a room, a structure, an outside environment, and the like, in the metaverse. The device in the AR may be a virtual device, a real-world device, or a meta-device, as disclosed herein.

In certain aspects, a trust and/or risk indicator of the device in the AR may be determined, such as where the trust indicator has a numeric value, an enumerated value, and the like. In embodiments, the trust and/or risk indicator may be displayed via an AR device, such as in association with a real-world device, overlaid on a real-world device, and the like. The AR device may be an AR headset, AR contact lenses, AR glasses, AR goggles, and the like. In embodiments, the trust and/or risk indicator may be displayed as a color-coded value. The trust and/or risk indicator may be based at least in part on a location of the device, a time period, a software and/or firmware version of the device, a trust and/or risk indicator of a device associated with the device, a trust and/or risk indicator of a user associated with the device, and the like, as disclosed herein. The trust and/or risk indicator may be reflective of the device being a Greenfield device or Brownfield device. In embodiments, the trust and/or risk indicator may be reflective of the device being a virtual device, a real-world device, and/or a meta-device, as disclosed herein. Determining the trust and/or risk indicator may be based at least in part on artificial intelligence, as disclosed herein.

In embodiments, a trust and/or risk indicator may be provided to a user as they interact (or attempt to interact) with a device. An interaction with a device may be authorized, prohibited, cautioned, and the like, based at least in part on the trust and/or risk indicator, such as, for instance, the interaction is an exchange of data with a device, establishing a network connection with the device, and the like. A trust and/or risk indicator of a device in the AR may be based at least in part on a combination of trust and/or risk indicators of a plurality of entities in the AR. A trust and/or risk indicator of the device may be provided to a user before the user enters an area of a metaverse and/or the real world containing the device. A trust and/or risk indicator of the device may be based at least in part on a combination of trust and/or risk indicators of a plurality of modules associated with the device. The trust and/or risk indicator may be updated based on an interaction with the device, as disclosed herein.

In certain aspects, the trust and/or risk indicator may be adjusted based on an event of the device, such as where the event is a transfer of ownership, a patching of the device, and the like. The event may be an updating at least one of software or firmware of the device. Methods and systems may include a parental control software agent.

Figure 105:
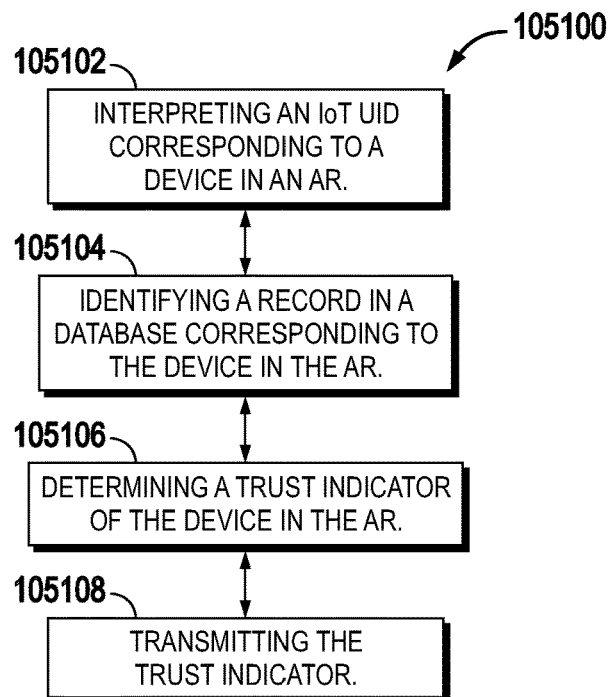
FIG. 105 is a flowchart depicting a method for managing interactions with devices via Augmented Reality Applications, in accordance with an embodiment of the current disclosure.

Referring to FIG. 105, a method 105100 may be provided. The method 105100 may include interpreting 105102, via an Internet of Things (IoT) Universal Identification (UID) processing circuit, an IoT UID corresponding to a device in an augmented reality (AR); identifying 105104, via a record management circuit and based at least in part on the IoT UID, a record in a database corresponding to the device in the AR; determining 105106, via a trust analysis circuit and based at least in part on the record, a trust indicator of the device in the AR; and transmitting 105108, via a trust indicator provisioning circuit, the trust indicator.

Figure 106:
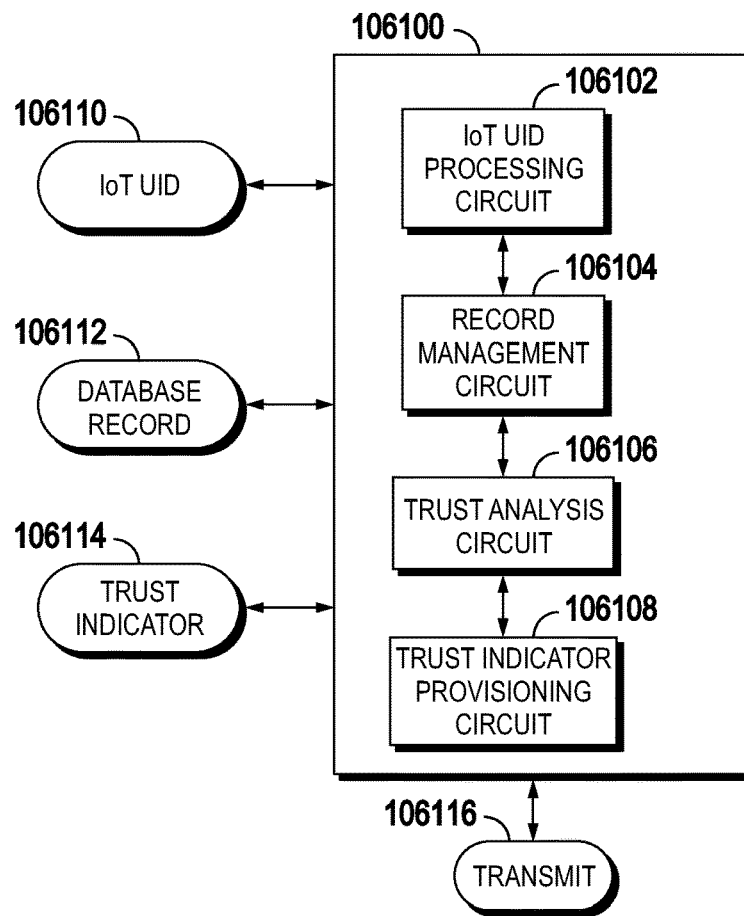
FIG. 106 is a block diagram depicting an apparatus for managing interactions with devices via Augmented Reality Applications, in accordance with an embodiment of the current disclosure.

Referring to FIG. 106, an apparatus 106100 for an IoT UID is provided. The apparatus 106100 may include an IoT UID processing circuit 106102, a record management circuit 106104, a trust analysis circuit 106106, a trust indicator provisioning circuit 106108, and the like. The IoT UID processing circuit 106102 may be structured to interpret an IoT UID 106110 corresponding to a device in an augmented reality (AR). The record management circuit 106104 may be structured to identify, based at least in part on the IoT UID, a record 106112 in a database corresponding to the device in the AR. The trust analysis circuit 106106 may be structured to determine, based at least in part on the record, a trust indicator 106114 of the device in the AR. The trust indicator provisioning circuit 106108 may be structured to transmit 106116 the trust indicator.

Figure 107:
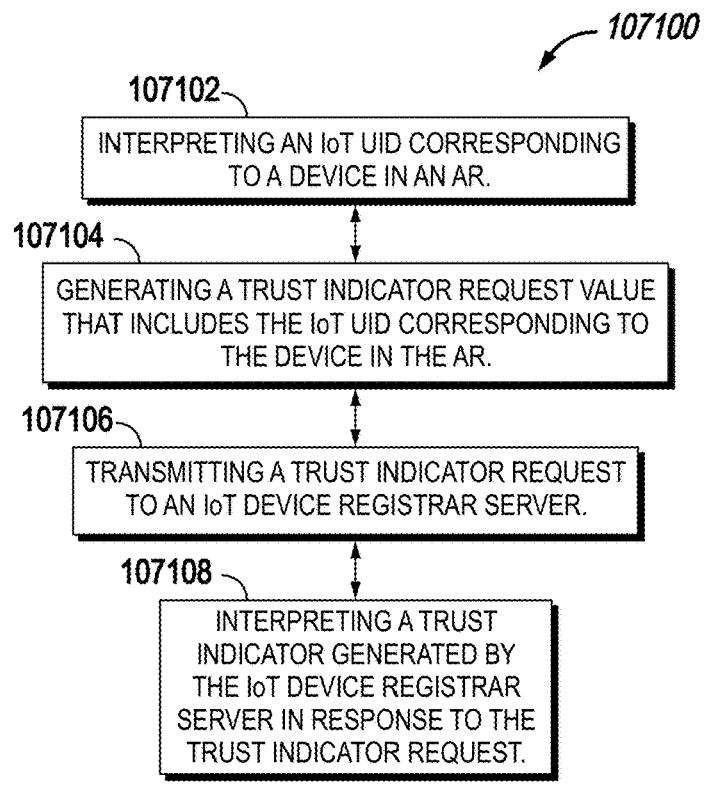
FIG. 107 is a flowchart depicting a method for managing interactions with devices via Augmented Reality Applications, in accordance with an embodiment of the current disclosure.

Referring to FIG. 107, a method 107100 may be provided. The method 107100 may include interpreting 107102, via an Internet of Things (IoT) Universal Identification (UID) processing circuit, an IoT UID corresponding to a device in an augmented reality (AR); generating 107104, via a trust verification circuit, a trust indicator request value that includes the IoT UID corresponding to the device in the AR; transmitting 107106, via a trust indicator request provisioning circuit, a trust indicator request to an IoT device registrar server; and interpreting 107108, via a trust indicator processing circuit, a trust indicator generated by the IoT device registrar server 1126 (FIG. 1) in response to the trust indicator request.

Figure 108:
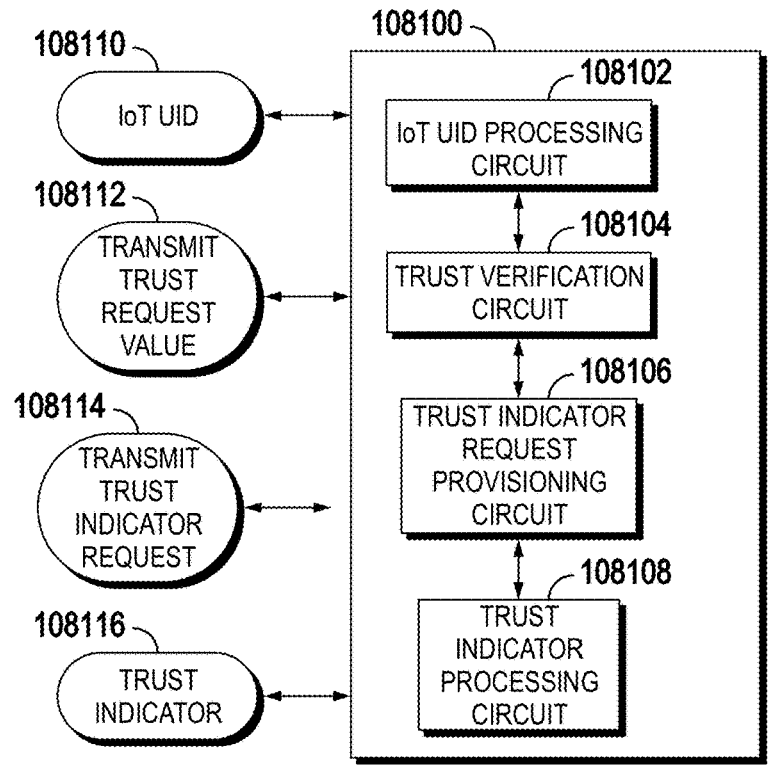
FIG. 108 is a block diagram depicting an apparatus for managing interactions with devices via Augmented Reality Applications, in accordance with an embodiment of the current disclosure.

Referring to FIG. 108, an apparatus 108100 for an IoT UID is provided. The apparatus 108100 may include an IoT UID processing circuit 108102, trust verification circuit 108104, trust indicator request provisioning circuit 108106, a trust indicator processing circuit 108108, and the like. The IoT UID processing circuit 108102 may be structured to interpret an IoT UID 108110 corresponding to a device in an augmented reality (AR). The trust verification circuit 108104 may be structured to generate a trust indicator request value 108112 that includes the IoT UID corresponding to the device in the AR. The trust indicator request provisioning circuit 108106 may be structured to transmit a trust indicator request 108114 to an IoT device registrar server 1126 (FIG. 1). The trust indicator processing circuit 108108 may be structured to interpret a trust indicator 108116 generated by the IoT device registrar server in response to the trust indicator request.

A non-limiting use case may be scenario where a user wearing an AR headset enters a convenience store to purchase a bottle of water. The user may proceed to the checkout counter with the bottle such that a payment device, e.g., debit card reader, is visible within the field of view of the AR headset. If the payment device is registered with an IoT device registry, as disclosed herein, the AR headset may query the IoT device registry for a trust and/or risk identifier for the payment device and depict a visualization of the trust and/or risk identifier in relation to the payment device, e.g., on, above, below, etc., the payment device. For example, if the payment device is registered and has had no known instances of fraudulent transactions, the AR headset may show a green checkmark above the payment device. In the event the payment device is not registered with the IoT device registry or has been associated with one or more fraudulent transactions, the AR headset may depict a red 'X' above the payment device. In embodiments, visualization of the trust and/or risk score indicator in AR may be a colorization and/or shading of a real-world object, e.g., shading the payment device green if safe to use or red is potentially unsafe to use. Embodiments may also use such visualizations for stores that are within the metaverse, e.g., a virtual convenience store selling metaverse objects and/or services, such as in-game app purchases.

Embodiments may include an agent that monitors devices having IoT UIDs 6118 (FIG. 6) registered with an IoT device registry 1129 (FIG. 1), as disclosed herein, for known vulnerabilities and/or unusual activities and provides alerts and/or access to remedial measures, e.g., patches. The agents/sentries and/or corresponding apparatuses and/or methods disclosed herein may provide for alert management, e.g., the setting and triggering of alerts based on conditional logic. For example, the owner and/or operators of a device may set alerts configured to notify the owner and/or operator of unusual activity associated with one or more network connected devices. Non-limiting examples of such unusual activity may be an unanticipated hardware, software, and/or firmware change, e.g., an unexpected addition of a new network access point in a device; and/or unexpected ownership changes and/or attempted ownership changes. Embodiments of the current disclosure may also provide for analytical analysis of data corresponding to the network connected devices, e.g., usage and/or trend data, risk management data, data compliance management, etc. Non-limiting examples of trends may include detecting that a particular type of device across multiple users and/or organizations has recurring battery issues and/or other types of hardware malfunctions; detecting that devices associated with a particular organization are being replaced and/or retired at a higher than expected rate; detecting that devices associated with a particular organization are, on average, behind in scheduled patching as compared to other organizations; and/or the like.

Such analysis may be performed by the registration server, and/or an agent/sentry executing on one or more of the computing devices disclosed herein, on data, e.g., device property data, retrieved from the plurality of records within the IoT device registry. Risk analysis may be based at least in part on the attributes of one or more devices, e.g., lifecycle events reflected by changes of a device's attributes, e.g., device property data, as recorded in its corresponding record 6110 (FIG. 6) in the IoT device registry 1129 (FIG. 1).

Embodiments of the agent/sentry and/or corresponding apparatuses and/or method, disclosed herein, may form part of the monitor and secure component 2114 (FIG. 2), including subcomponents 2132, and/or 2134; the manage lifecycle component 2110 (FIG. 2), including subcomponent 2120; and/or the analytics component 2112, including subcomponents 2126 and/or 2128. The agent/sentry may execute on the same system as the IoT device registry and/or on a system owned and/or operated by an end user 1136 (FIG. 1), manufacturer 1134 (FIG. 1), e.g., an original equipment manufacturer (OEM), third party monitor 1138 (FIG. 1), and/or a device management platform. Embodiments may provide for the collection of remedial measures from a device manufacturer and/or other source, e.g., the National Security Agency (NSA), Linux Distros, Microsoft, Apple, Google, etc., and may provide the generation of campaigns to manage and/or track implementing the remedial action of a plurality of affected devices, e.g., devices affected by a "software Bill of Materials (SBoM)" and/or "Cybersecurity Bill of materials (CBoM)". For example, where an embodiment of the agent/sentry detects a change in a device's property data, e.g., a configuration change, in a record 6110 in an IoT device registry 1129, as disclosed herein, the agent/sentry may poll an external database to retrieve a patch, a link to the patch, and/or written instructions for implementing the patch. The agent/sentry may then transmit the same to an SPG, as disclosed herein, for execution/implementation by an administrator of the affected device. Embodiments may provide for the aggregation of hardware and/or software version data which the agent may use to detect vulnerabilities. Embodiments may access a vulnerability database. Embodiments may generate a vulnerability database. The sentry may send an alert when it detects a configuration change of a module, e.g., a new network interface controller (NIC) has been installed.

In embodiments, a SPG may depict one or more metrics related to a campaign, e.g., a patching campaign, such as devices patches vs devices yet to be patched. In embodiments, an entity having a high number and/or percentage, e.g., greater-than 80%, of patched devices may have a higher trust/lower risk score/indicator as compared to an entity which has a low number and/or percentage, e.g., less-than 20%, of patched devices. The SPG may also depict the locations and/or scheduled patch time(s) for one or more devices included within a campaign. In embodiments, the SPG may be structured to manage a campaign on behalf of a manufacturer 1134, end user 1136, and/or a third-party service provider 1138. In embodiments, the SPG may provide a link to a patch, and/or written instructions for the patch, for a corresponding campaign. Thus, as will be appreciated, embodiments of the current disclosure may provide for a succinct graphical user interface (GUI) from which an entity can manage a campaign for a plurality of devices having IoT UIDs 6118 registered with an IoT device registry 1129, as compared to traditional systems. Further, registration of devices with an IoT device registry 1129, as disclosed herein, provides for a manufacturer 1134 of the devices, and/or third-party monitoring service 1138 charged with managing the devices, to manage patching and/or campaigns involving the devices even though the devices may be owned by different end users 1136 and/or change ownership, which could occur during a campaign.

Figure 109:
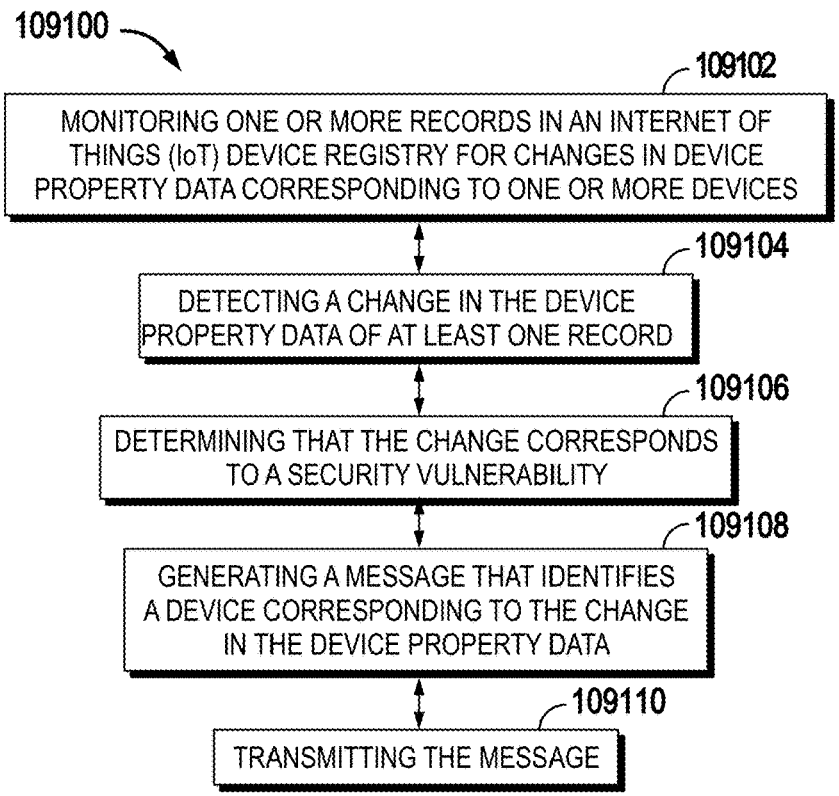
FIG. 109 is a flowchart depicting a method for monitoring records in an internet of things (IoT) device registry for changes in device property data, in accordance with an embodiment of the current disclosure.

Referring to FIG. 109, a method 109100 may be provided. The method may include monitoring 109102, via at least one processor, one or more records 1131 (FIG. 1), 6110 (FIG. 6) in an internet of things (IoT) device registry 1129 (FIG. 1) for changes in device property data 6120 (FIG. 6) corresponding to one or more devices, e.g., 1112, 1114, 1116, and/or 1118 (FIG. 1), each corresponding to one of the one or more records. The method 109100 may further include detecting 109104, via the at least one processor, a change in the device property data of at least one record; determining 109106, via the at least one processor, that the change corresponds to a security vulnerability, an event, and/or other type of change in device property data, as disclosed herein; and generating 109108, via at least one processor and responsive to the determined security vulnerability, a message that identifies a device corresponding to the change in the device property data. The method 109100 may further include transmitting 109110, via the at least one processor, the message. Non-limiting examples of detected changes may include software and/or firmware version updates, location changes, ownership changes, connectivity changes, and/or any change between a value of the device property data 6120 (FIG. 6) currently in a record 1131 and a historical value for the same device property data. Embodiments may use a change field/flag in a record 1131 to reduce the number of records that need to be retrieved/returned in a query as part of the monitoring 109102. For example, a record 1131 may include a change field/flag that may be set when a record 1131 is updated, e.g., by an event message 6116, and reset after the record 1131 is retrieved and/or read as part of the monitoring 109102. Embodiments of the current disclosure may also keep a copy of the previous value of a field in the record after being updated in response to an event message 6116, as disclosed herein. As such, determining 109106 the change may include comparing the previous value of a field in a record 1131 to the current value.

In embodiments, the message may be displayed, e.g., on a SPG, and/or on a device corresponding to the IoT UID in the record 1131. Changes in the device property data may be logged in a database and/or another system for tracking a device's history, e.g., a block chain, as disclosed herein. In embodiments, the message may be received at a device management platform, which in turn, may trigger quarantining and/or patching the device, such as where the message is an alert. A trust indicator, as disclosed herein, may be adjusted based at least in part on the change, such as where the trust indicator is a trust score, a rating, a level value, and the like. The adjusting may increase when the change corresponds to a patching and/or an updating of software and/or firmware of the device. The adjusting may decrease when the change corresponds to a vulnerability, and the like. For example, where ownership of the device has passed to an entity associated with one or more IoT UIDs of devices registered in an IoT device registry 1129 having low trust and/or high-risk scores. The change may correspond to an addition of a new module into the device. For example, installing an additional network card into a device may increase a risk score of the device as the additional network card increases the number of access points of the device. Conversely, removing a network card from a device may lower the risk score of the device as doing so removes an access point of the device. The new module may be an input/output device, where the input/output device is a network interface device, a media device, and the like. The change may correspond to a change in ownership of the device, a location of the device, and the like. The security vulnerability may be based on a software and/or firmware of the device, on a hardware version of the device, and the like. A security vulnerabilities database may be accessed to pull security vulnerability signatures to determine if a registered device is affected.

In embodiments, the agent may raise an alert when the age of a module and/or device, as determined by analyzing the records 1131 in the IoT UID registry 1129, increases, e.g., an embedded computer on a vehicle having an operating system that has gone more than two (2) years without an update may pose a security risk.

Figure 110:
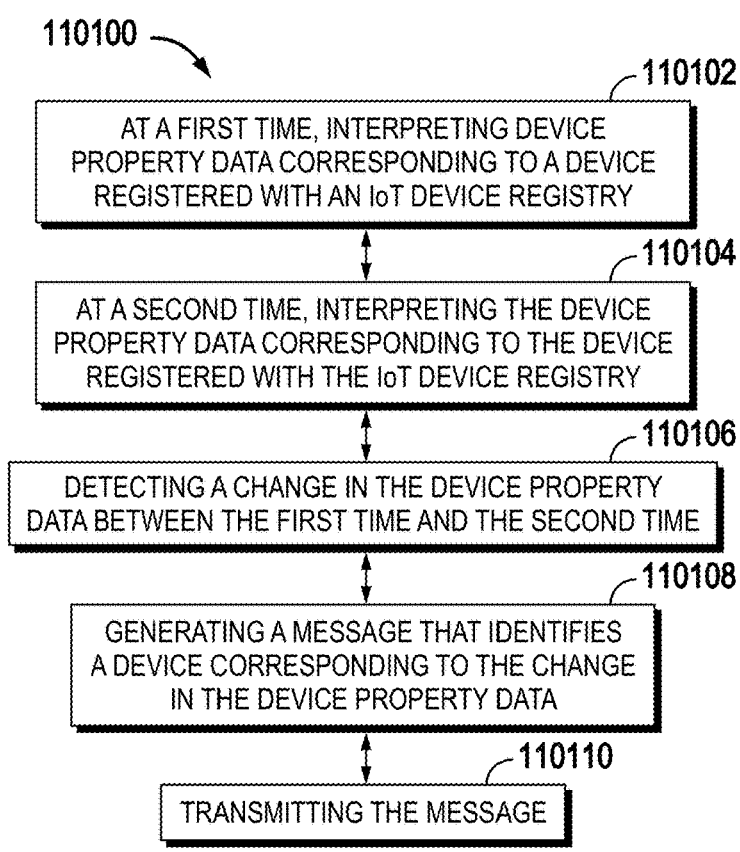
FIG. 110 is a flowchart depicting a method for monitoring records in an IoT device registry for changes in device property data, in accordance with an embodiment of the current disclosure.

Referring to FIG. 110, a method 110100 is provided. The method may include interpreting at a first time 110102, via a device property data processing circuit, device property data corresponding to a device registered with an IoT device registry. The method 110100 may further include interpreting at a second time 110104, via the device property data processing circuit, the device property data corresponding to the device registered with the IoT device registry, and detecting 110106, via a change detection circuit, a change in the device property data between the first time and the second time. The method 110100 may further include generating 110108, via an alert circuit and responsive to detecting the change, a message that identifies the device corresponding to the device property data; and transmitting 110110, via an alert provisioning circuit, the message. In embodiments, the message may include the IoT UID of the affected device.

Figure 111:
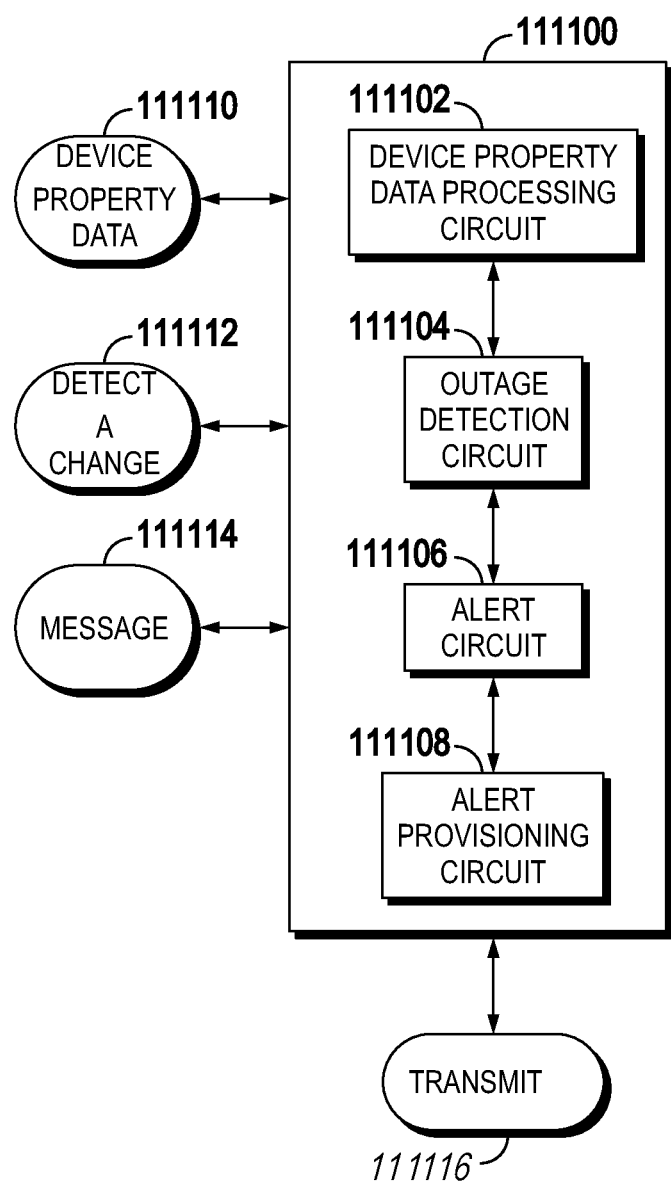
FIG. 111 is a block diagram depicting an apparatus for monitoring records in an IoT device registry for changes in device property data, in accordance with an embodiment of the current disclosure.

Referring to FIG. 111, an apparatus 111100 is provided. The apparatus 111100 may include a device property data processing circuit 111102, a outage detection circuit 111104, an alert circuit 111106, and an alert provisioning circuit 111108. The device property data processing circuit is structured to at a first time, interpret, device property data 111110 corresponding to a device registered with an IoT device registry, and at a second time, interpret, the device property data 111110 corresponding to the device registered with the IoT device registry. The change detection circuit is structured to detect a change 111112 in the device property data between the first time and the second time. The alert circuit is structured to generate, responsive to the detected change, a message 111114 that identifies the device corresponding to the device property data. The alert provisioning circuit is structured to transmit 111116 the message.

Figure 112:
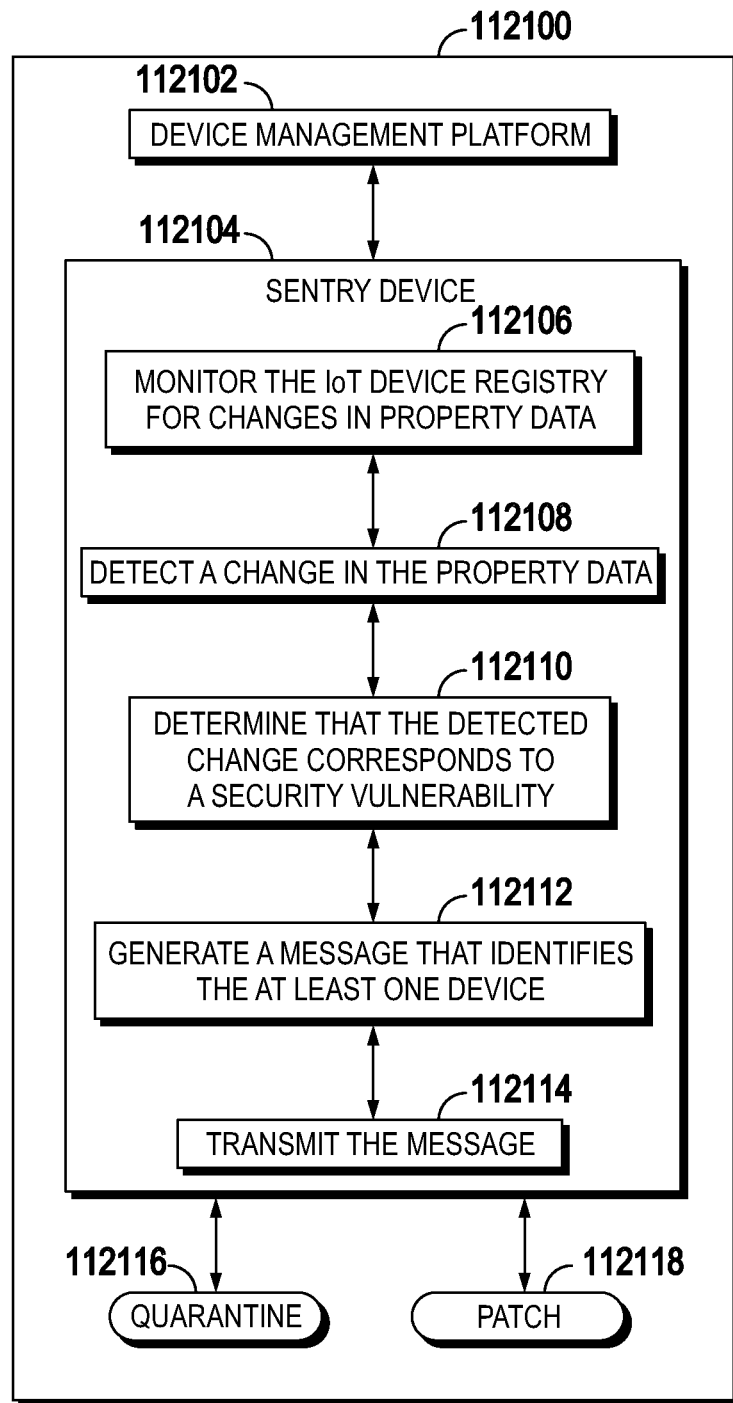
FIG. 112 is a block diagram depicting a system for monitoring records in an IoT device registry for changes in device property data, in accordance with an embodiment of the current disclosure.

Referring to FIG. 112, a system 112100 is provided. The system may include a device management platform 112102 and a sentry device 112104. The device management platform 112102 may be structured to manage one or more devices registered with an IoT device registry, and the sentry device 112104 may be structured to monitor 112106 the IoT device registry for changes in property data corresponding to the registered one or more devices. The sentry device 112104 may be further structured to detect 112108 a change in the property data for at least one of the one or more devices, and to determine 112110 that the detected change corresponds to a security vulnerability. The sentry device 112104 may be further structured to generate 112112, responsive to the determined security vulnerability, a message that identifies the at least one device of the one or more devices; and transmit 112114 the message to the device management platform. The device management platform may be further structured to interpret the message transmitted by the sentry device, and quarantine 112116 the at least one device, patch 112118 the at least one device, and the like.

Figure 113:
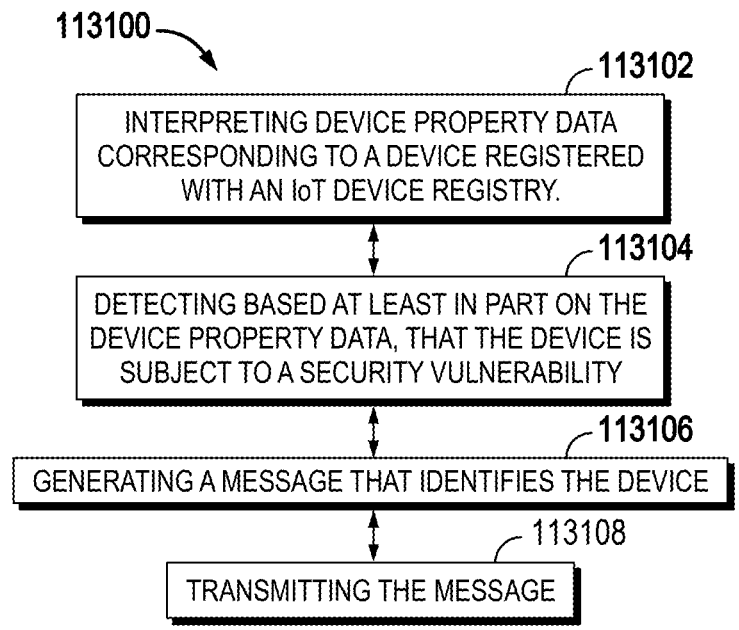
FIG. 113 is a flowchart depicting a method for monitoring records in an IoT device registry for changes in device property data, in accordance with an embodiment of the current disclosure.

Referring to FIG. 113, a method 113100 is provided. The method may include interpreting 113102, via a device property data processing circuit, device property data corresponding to a device registered with an IoT device registry; detecting 113104, via a security analysis circuit, based at least in part on the device property data, that the device is subject to a security vulnerability; and generating 113106, responsive to the detected security vulnerability, via an alert circuit, a message that identifies the device. The method 113100 may further include transmitting 113108, via an alert provisioning circuit, the message.

Figure 114:
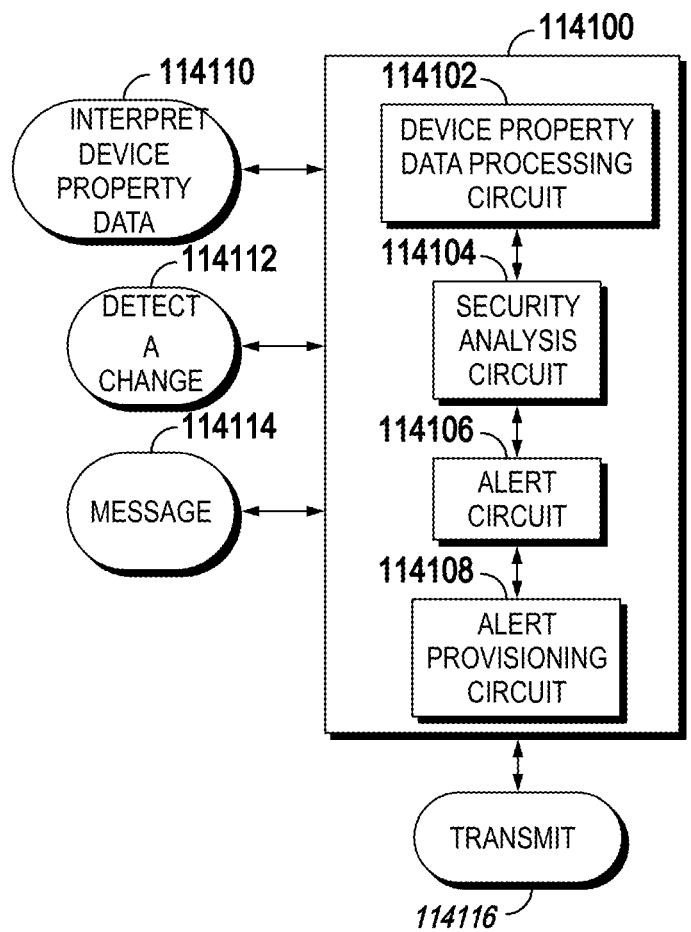
FIG. 114 is a block diagram depicting an apparatus for monitoring records in an IoT device registry for changes in device property data, in accordance with an embodiment of the current disclosure.

Referring to FIG. 114, an apparatus 114100 is provided. The apparatus may include a device property data processing circuit 114102, a security analysis circuit 114104, an alert circuit 114106, and an alert provisioning circuit 114108. The device property data processing circuit 114102 may be structured to interpret 114110 device property data corresponding to a device registered with an IoT device registry. The security analysis circuit 114104 may be structured to determine 114112, based at least in part on the device property data, that the device is subject to a security vulnerability. The alert circuit 114106 may be structured to generate, responsive to the determined security vulnerability, a message 114106 that identifies the device. The alert provisioning circuit 114108 may be structured to transmit 114116 the message.

Referring again to FIGS. 1 and 2, embodiments of the current disclosure may provide for detection of down devices via detecting outage patterns in device property data 6120 data of records 6110 (FIG. 6) for registered devices corresponding to IoT UIDs 6118, as disclosed herein. A down device, also referred to herein as a downed device, missing device, disconnected device, off device, malfunctioning device, broken device, and/or the like, may be a device, e.g., 1112, 1114, 1116, 1118, 1120, 1122, and/or 1124 (FIG. 1), that is experiencing, has experienced, and/or is likely to experience an outage. Non-limiting examples of outages may be related to and/or the result of: communication issues, e.g., rain, solar flares, weather events, etc., poor reception and/or transmission due to structures, e.g., buildings, tree leaves, etc., cyber-attacks, malfunctioning network components, e.g., routers, towers, relays, fiber and/or coaxial lines, DNS servers, etc.; power issues, e.g., low battery power, no battery power, excessive battery power; sensor issues, e.g., temperature, pressure, voltage, conductivity, amperage, etc.; user input device malfunctions, e.g., broken touch screens, broken keyboards, broken mice; and/or other types of abnormalities. In embodiments, apparatus and/or processes that provide for the detection of down devices, as disclosed herein, may form part of the registry 1129, e.g., the usage and trend analysis subcomponent 2130, the detect unusual behavior subcomponent 2132, and/or a set service alerts subcomponent 2134. In embodiments, the devices and/or processes that provide for the detection of down devices, as disclosed herein, may form part of a device management platform operated by a manufacturer 1134, an end user 1136, and/or a third party 1138. Embodiments of the current disclosure may provide for an agent that executes on one or more processors, as disclosed herein, that monitors registered devices for outages, e.g., loss of network connections and/or power. In embodiments, the agent may monitor the registered devices for outages by querying the registry 1129 (FIG. 1) using IoT UIDs 6118 for the registered devices and analyzing returned device property data 6128 (FIG. 6). Monitoring by the agent may be for a single device and/or for a fleet of devices, or may be for one or more modules within a device and/or fleet of devices. As will be appreciated, in embodiments, the IoT device registrar 1130 may be positioned to view a large number of devices simultaneously, where the devices may be spread across multiple entities, e.g., distinct/different corporations, and/or geographic locations, which may provide for improved insight into the existence of an outage, as compared to traditional systems.

In embodiments, the IoT device registrar may source network and ecosystem information sources and/or correlate relevant data to visually show, e.g., in a SPG, affected devices that may be unreachable due to weather, Mobile Network Operator outage, utility outage (power, water, gas, etc.) or other communications outage in a localized area affecting multiple devices or customers (of the affected devices and/or services relating to the affected devices). In embodiments, an agent/sentry residing within the IoT device registry monitors relevant data feeds to create automated alerts, visual displays, and notifications among other actions.

Figure 115:
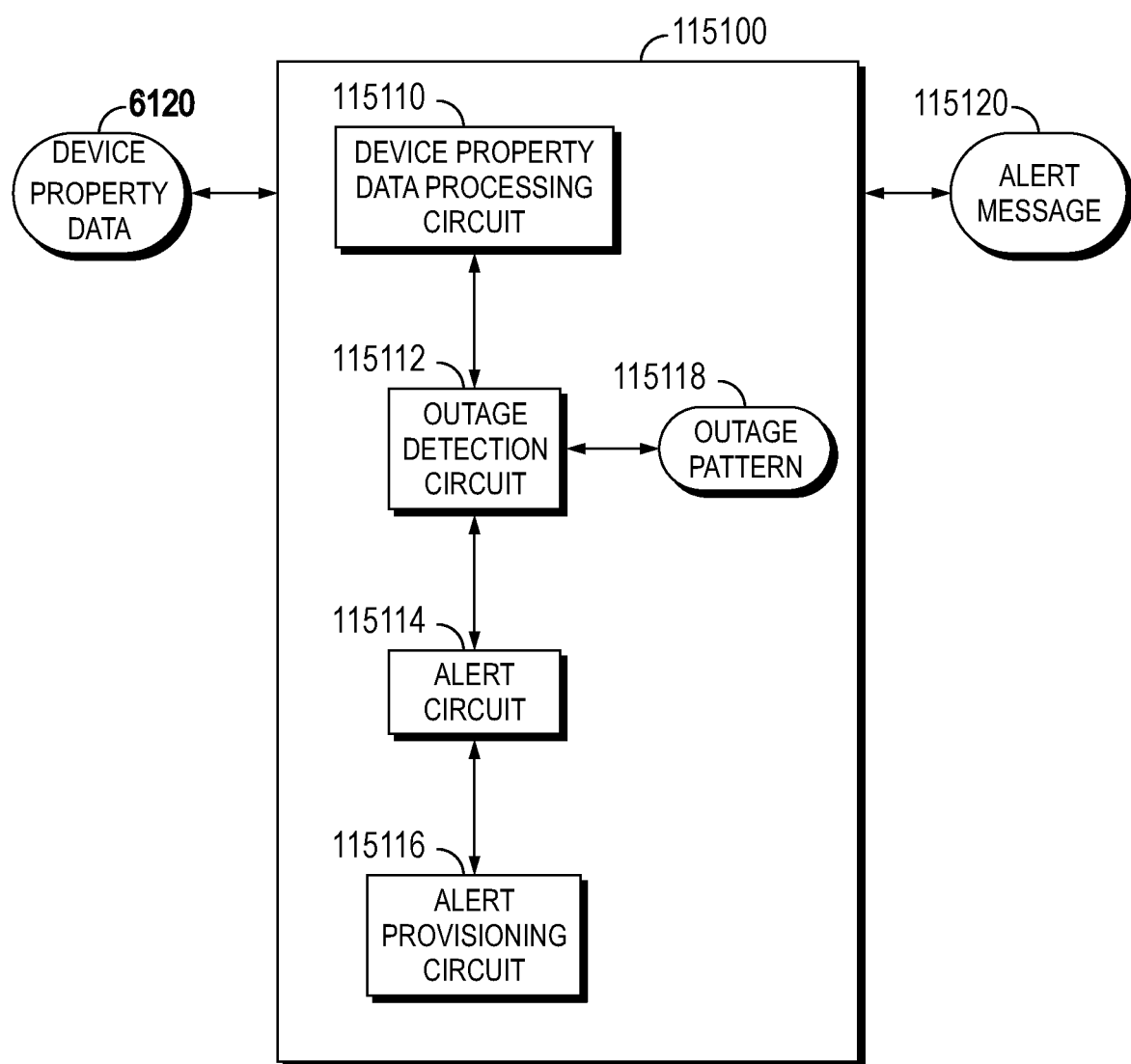
FIG. 115 is a schematic diagram of an apparatus for detecting down devices, in accordance with an embodiment of the current disclosure.

Accordingly, illustrated in FIG. 115 is an apparatus 115100 for detecting down devices, e.g., 1112, 1114, 1116, 1118, 1120, 1122, and/or 1124 (FIG. 1). The apparatus 115100 includes a device property data processing circuit 115110, an outage detection circuit 115112, an alert circuit 115114, and/or an alert provisioning circuit 115116. The apparatus 115100 may form part of the server 1126 (FIG. 1), database 1128 (FIG. 1), a computing device, e.g., a device management platform, operated by a manufacturer 1134 (FIG. 1), an end user 1136 (FIG. 1), a third party 1138 (FIG. 1), and/or any other computing device described herein. The device property data processing circuit 115110 may be structured to interpret device property data 6120 corresponding to one or more devices 1112, 1114, 1116, 1118, 1120, 1122, and/or 1124 registered with an IoT device registry 1129 (FIG. 1) via IoT UIDs 6118. The outage detection circuit 115112 is structured to detect an outage pattern 115118 in/from the device property data 6120. The outage pattern 115118 may correspond to an outage of the one or more devices 1112, 1114, 1116, 1118, 1120, 1122, and/or 1124. Outage patterns 115118 may be based on correlations between events 6134 (FIG. 6), time values, ownership, manufacturers, device properties, and/or other type of data. The alert circuit 115114 is structured to, in response to the outage pattern 115118, generate an alert message 115120 that identifies the one or more devices 1112, 1114, 1116, 1118, 1120, 1122, and/or 1124 affected by and/or otherwise corresponding to the outage. The alert provisioning circuit 115116 may be structured to transmit the alert message 115120 which, in embodiments, may be to a device management platform corresponding to an end user 1136, a manufacturer 1134, a third party 1138, and/or other entity. In embodiments, the alert provisioning circuit 115116 may be structured to transmit the alert message 115120 to any of the computing devices disclosed herein. The alert message 115120 may include one or more IoT Universal Identifications (UIDs) 6118 (FIG. 6) that correspond to one or more devices, e.g., 1112, 1114, that may be associated with a detected outage. The alert message 115120 may include a code and/or short description that identifies the nature of the detected outage, e.g., "a weather event is affecting devices located in Hampden county". The alert message 115120 may include one or more time values associated with the detected outage, e.g., a start time, a stop time, and a predicted stop time, a duration, etc.

Figure 116:
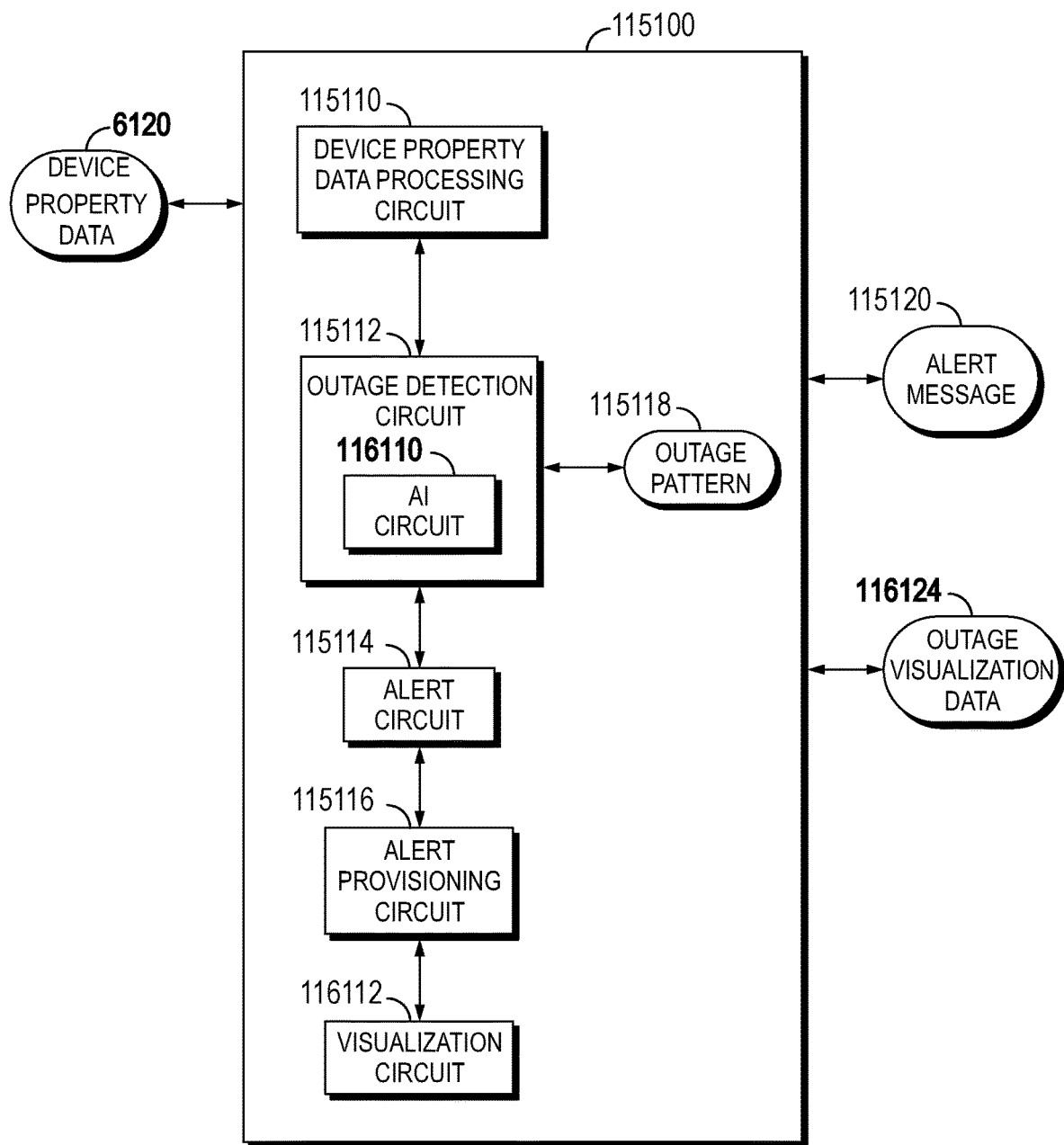
FIG. 116 is another schematic diagram of an apparatus for detecting down devices, in accordance with an embodiment of the current disclosure.

As shown in FIG. 116, the outage detection circuit 115112 may include an artificial (AI) intelligence circuit 116110 structured to detect the outage pattern 115118 based at least in part on analyzing the device property data 6120 using an artificial intelligence process. Non-limiting examples of such artificial intelligence processes include neural networks, deep-learning techniques, convolutional networks (including convolutional neural networks), and the like. In embodiments, the artificial intelligence process may include a neural network trained to detect correlations between outage patterns 115118 and weather events, cyber-attacks, device failure events, device ownership, device manufacturer, location, network outages, and/or other data relating to possible properties and/or causes of an outage pattern. In embodiments, the artificial intelligence process may predict the occurrence of future outages. For example, the AI circuit 116110 may have access to weather data and predict outages for geographic regions that may be in a predicted path of a weather system, e.g., a hurricane. In embodiments, weather data may include solar data, e.g., solar storms. Accordingly, some embodiments of the AI circuit 116110 may predict outages involving satellites (or other devices affected by solar storms).

In embodiments, the apparatus 115100 may further include a visualization circuit 116112 structured to generate and/or transmit outage visualization data 116124 structured/configured to depict a visualization of the outage and/or outage pattern 115118 on an electronic display, such as on a SPG, e.g., 28102, 28104, and/or 28106 (FIG. 28). Non-limiting examples of visualizations include maps, charts, listings, and the like. For example, embodiments of the outage visualization data 116124 may generate a map that depicts the location(s) of one or more devices 1112, 1114, 1116, 1118, 1120, 1122, and/or 1124 experiencing an outage. In embodiments, the visualization data 116124 may generate a chart that shows statistical data relating to one or more devices 1112, 1114, 1116, 1118, 1120, 1122, and/or 1124 affected by an outage, e.g., an amount, e.g., total, percentage, average, etc., of affected devices.

Figure 117:
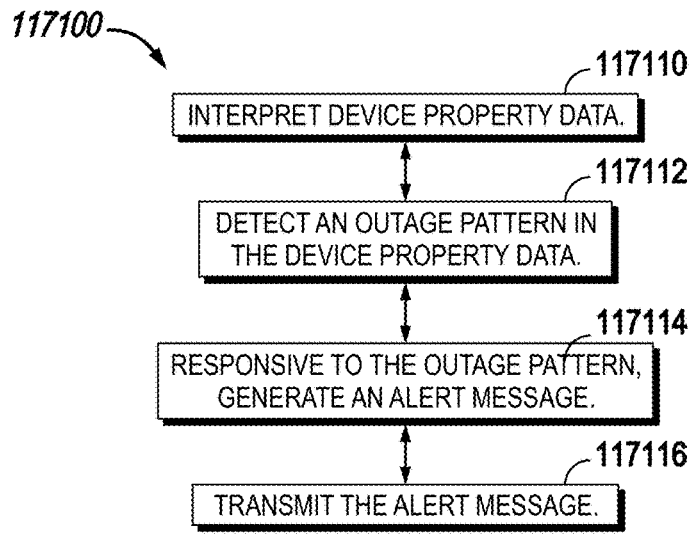
FIG. 117 is a flowchart depicting a method for detecting down devices, in accordance with an embodiment of the current disclosure.

Illustrated in FIG. 117 is a method 117100 for detecting down devices. The method may be performed by the apparatus 115100 (FIG. 115) and/or any other computing device described herein. The method 117100 may include interpreting, via a device property data processing circuit, device property data corresponding to one or more devices registered with an IoT device registry 117110. The method 117100 may further include detecting, via an outage detection circuit, an outage pattern in the device property data 117112. The outage pattern may correspond to an outage of the one or more devices, as disclosed herein. The method 117110 may further include, responsive to the outage pattern, generating, via an alert circuit, an alert message that identifies the one or more devices 117114; and/or transmitting, via an alert provisioning circuit, the alert message 117116.

Figure 118:
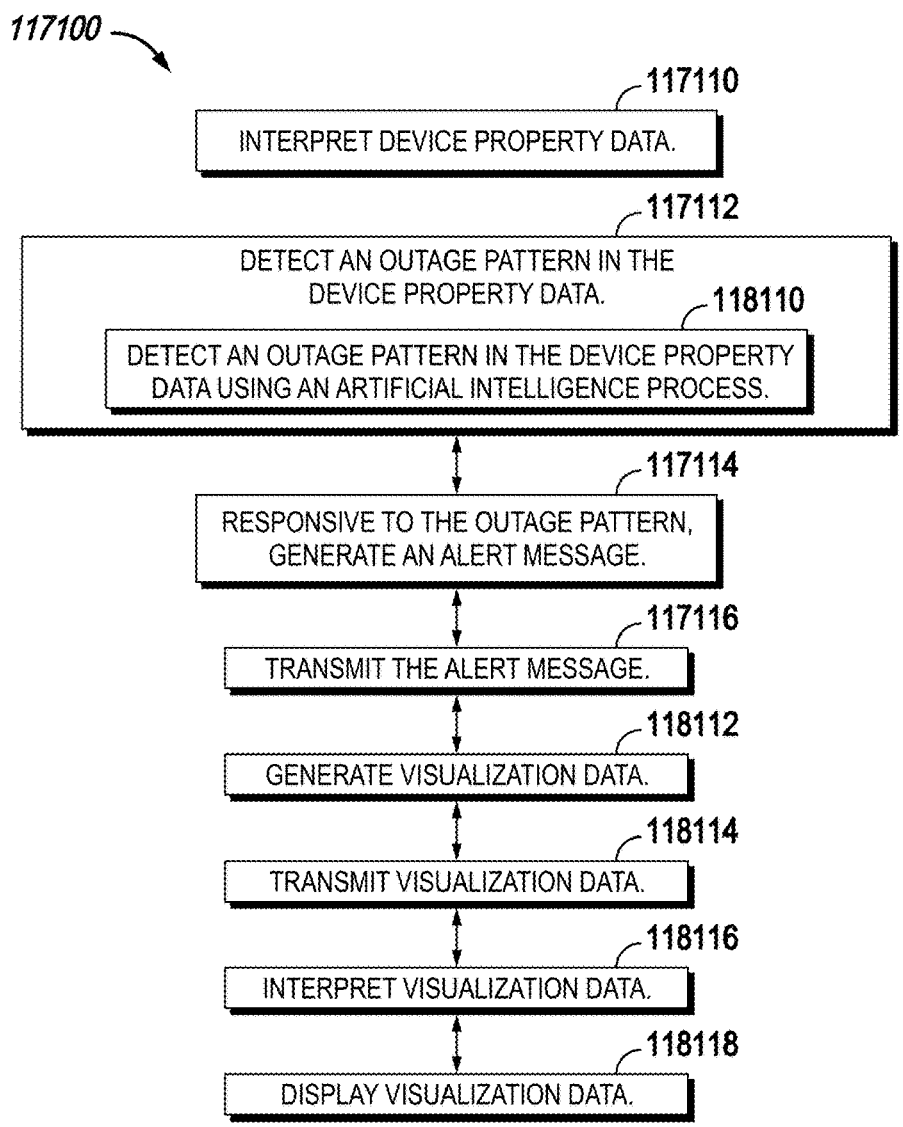
FIG. 118 is another flowchart depicting a method for detecting down devices, in accordance with an embodiment of the current disclosure.

As shown in FIG. 118, in embodiments of the method 117100, detecting an outage pattern in the device property data 117112 may include detecting the outage pattern via analyzing the device property data with an artificial intelligence circuit that uses an artificial intelligence process, as disclosed herein, 118110. In embodiments, the method 117100 may further include generating, via a visualization circuit, visualization data configured to depict a visualization of the outage on an electronic display 118112; and/or transmitting, via the visualization circuit, the visualization data 118114. In embodiments, the method 117100 may further include interpreting the visualization data 118116, and/or displaying the visualization data 118118. In embodiment, interpreting the visualization data 118116 and/or the displaying the visualization data 118118 may be performed by a device management platform and/or a corresponding SPG, as disclosed herein.

Figure 119:
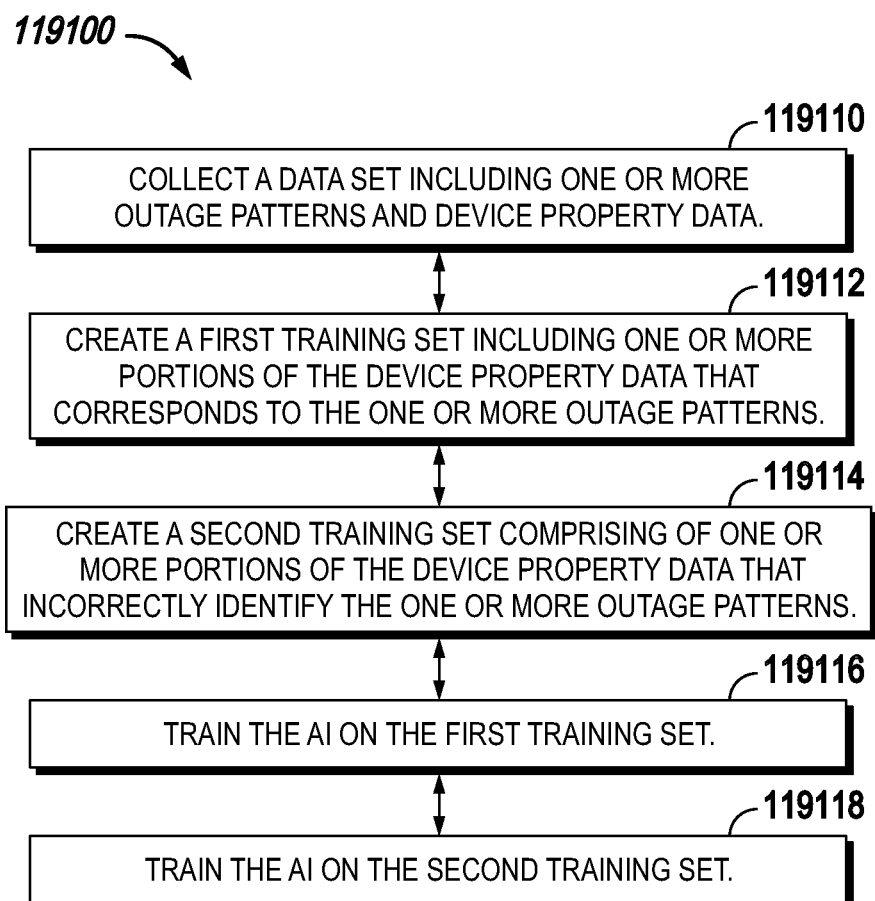

Referring to FIG. 119, a method 119100 of training an artificial intelligence (AI), e.g., the AI circuit 116110 (FIG. 116), to detect device outages and/or outage patterns is provided. The method 119100 may be performed by the apparatus 115100 and/or any other computing device disclosed herein. The method 119100 includes collecting a data set including one or more outage patterns and device property data 119110; and creating a first training set including one or more portions of the device property data that correspond to the one or more outage patterns 119112. The method 119100 further includes creating a second training set comprising one or more portions of the device property data that incorrectly identify the one or more outage patterns 119114. The method 119100 further includes training the AI on the first training set 119116, and training the AI on the second training set 119118.

As a non-limiting example, a plurality of devices 1112, 1114, 1116, 1118 registered with the registry 1129 (FIG. 1) may be in the possession of users all within a same region, e.g., Massachusetts. A subset of the users and their corresponding devices 1114 and 1118 may be located in Boston, MA with other users/devices 1112 and 1116 respectively located in Springfield, M A and Worcester, MA A device management platform operated by a third-party monitoring service, e.g., 1138 (FIG. 1), may periodically check the connectivity status of the devices 1112, 1114, 1116, 1118, and may send device event messages 6116 and/or status values 6114 (FIG. 6) to the registry 1129 to update the applicable corresponding records 6110, e.g., "device 'A' had good connectivity as of 5:25 pm ET." As an example scenario, a car crash may occur and disable and/or impact one or more 5G towers located in the Greater Boston metropolitan area, resulting in the device management platform no longer being able to contact the devices 1114 and 1118. Embodiments of an agent executing on the apparatus 115100 (FIGS. 115 and 116) and/or performing the method 117100 (FIGS. 117 and/or 134) may be periodically checking the records 1131 in the registry 1129 and detect that the device property data 6120 (FIGS. 115, and 116) for devices 1114 and 1118 indicates that they are unreachable, while devices 1112 and 1116 are reachable. The agent may then determine that this difference in device property data corresponds to an outage, and in particular, an outage localized to the Greater Boston metropolitan area. The agent may then generate and transmit an alert message to the third-party monitoring service 1138 indicating that devices 1114 and 1118 are unreachable and appear to be impacted by a network outage affecting only the Greater Boston metropolitan area. The agent may then continue to monitor the registry 1129, and may generate and send another alert message to the third-party monitoring service 1138 when the records for the affected devices 1114 and 1118 indicate that the devices are reachable again.

Embodiments of the current disclosure may also provide for the detection of manufacturing defects affecting devices made by a manufacturer, e.g., 1134 (FIG. 1). For example, embodiments of an agent executing on the apparatus 115100 (FIGS. 115 and 116) and/or performing the method 117100 (FIGS. 117 and/or 134) may be periodically checking the records 1131 in the registry 1129 and detect that the device property data 6120 (FIGS. 6, 115, and 116) for one or more devices manufactured by a manufacturer 1134, which may be in the possession of different end users, indicates that such devices experience common malfunctions. For example, the useful lives of the batteries of the one or more devices may appear to be shorter than industry norms, regardless of the operating conditions experienced by the devices.

Embodiments of the current disclosure may also provide for the detection of cyber-attacks affecting particular types of devices. For example, embodiments of an agent executing on the apparatus 115100 (FIGS. 115 and 116) and/or performing the method 117100 (FIGS. 117 and/or 118) may be periodically checking the records 1131 in the registry 1129 and detect that the device property data 6120 (FIGS. 6, 115, and 116) for one or more devices of a same type, and/or having similar software and/or firmware components, have been experiencing system compromises, while other devices not of the same type have not been experiences the same type of system compromises at the same rate.

In a non-limiting example, an agent executing on the apparatus 115100 (FIGS. 115 and 116) and/or performing the method 117100 (FIGS. 117 and/or 134) may be periodically checking the records 1131 in the registry 1129 and detect that the device property data 6120 (FIGS. 6, 115, and 116) for devices associated with a mobile virtual network operator (MVNO) and in the possession of end user subscribers of the MVNO. The MVNO may use a device management platform and/or SPG, as disclosed herein, to monitor for device outages and provide notifications to the end users of the existence of an outage and/or expected recovery from the outage.

In a non-limiting example, one or more devices experiencing an outage of a first network connection may generate and transmit event messages (indicating a network outage with the first network connection) over a second network connection. Such event messages may be transmitted to a device management platform and/or to an IoT device registrar, as disclosed herein.

Referring again to FIGS. 1 and 2, embodiments of the current disclosure may provide for detection of fraudulent activity, e.g., regarding Internet of Things (IoT) devices. Fraudulent activity or activities, also referred to herein as fraud, a fraud event, theft, security risk, tampering, unusual behavior, fraudulent behavior, unauthorized access, counterfeiting, and/or the like, may be a device, e.g., 1112, 1114, 1116, 1118, 1120, 1122, and/or 1124 (FIG. 1), that is experiencing, has experienced, and/or is likely to experience a fraud event. Non-limiting examples of fraudulent activity include: cyber-attacks; outdated software and/or firmware; unauthorized software and/or firmware changes; hardware changes; unauthorized access to the device; unauthorized access by the device, e.g., to an IoT registry server; disabled network connections; malfunctioning network components, e.g., routers, towers, relays, fiber and/or coaxial lines, DNS servers, etc.; power issues, e.g., low battery power, no battery power, excessive battery power; sensor issues, e.g., temperature, pressure, voltage, conductivity, amperage, etc.; user input device malfunctions, e.g., broken touch screens, broken keyboards, broken mice; and/or other types of abnormalities. Fraudulent activity may also include spoofing of a retired device and/or spoofing of its components, e.g., a use of cellular network access credentials of a retired device, a use of license credentials of a retired device, providing a deliberately inaccurate and/or manually-entered GPS location of a device, and/or a use of an unauthorized or fake license for a device, by one or more unauthorized devices. In embodiments, apparatus and/or processes that provide for the detection of fraudulent activity, as disclosed herein, may form part of the registry 1129, e.g., the usage and trend analysis subcomponent 2130, the detect unusual behavior subcomponent 2132, and/or a set service alerts subcomponent 2134. Embodiments of the current disclosure may provide for a fraud detection device, which may also be referred to herein as a sentry or an agent, that may include one or more of the apparatuses and/or perform one or more of the methods, disclosed herein, for detection of fraudulent activity or activities. In embodiments, the devices and/or processes that provide for the detection of fraudulent activity, as disclosed herein, may form part of a device management platform operated by a manufacturer 1134, an end user 1136, and/or a third party 1138. Embodiments of the current disclosure may provide for an agent, e.g., the sentry, that executes on one or more processors, as disclosed herein, that monitors registered devices for fraudulent activity, e.g., unauthorized device access, message transmissions, and/or illegal and/or other unauthorized activities. Monitoring by the agent may be for a single device and/or for a fleet of devices, or may be for one or more modules within a device and/or fleet of devices. As will be appreciated, in embodiments, the IoT device registrar 1130 may be positioned to view a large number of devices simultaneously, where the devices may be spread across multiple entities, e.g., distinct/different corporations, and/or geographic locations, which may provide for improved insight into the existence of fraudulent activity, as compared to traditional systems.

In embodiments, machine learning and/or other pattern recognition techniques may be used to generate and/or correlate information on device relationships that are behaving 'normally' to establish a baseline. Such embodiments may also provide for 'alerts' when abnormal behavior patterns are detected, e.g., behavior patterns outside the established baseline. In embodiments, the baseline may be generated by an agent/sentry in the registry 1129 (FIG. 1) and/or any other computing device disclosed herein.

FIG. 120 depicts a schematic diagram of an example apparatus 120100 for detecting fraudulent activity, e.g., for network connected devices 1112, 1114, 1116, 1118, 1120, 1122, 1124 (FIG. 1), in accordance with an embodiment of the current disclosure. The apparatus 120100 may form part of the server 1126 (FIG. 1), e.g., the at least one processor, and/or any other electronic computing device described herein.

With reference to FIG. 120, the apparatus 120100 may include a device property data processing circuit 120102, a security analysis circuit 120104, an alert circuit 120106, and an alert provisioning circuit 120108. The device property data processing circuit 120102 may be structured to interpret device property data 120110 corresponding to a device, e.g., any of devices 1112, 1114, 1116, 1118, 1120, 1122, 1124 (FIG. 1), registered with an Internet of Things (IoT) device registry, e.g., registry 1129 (FIG. 1). The security analysis circuit 120104 may be structured to determine, based at least in part on the device property data 120110, that the device may be subject to a fraud event, which may be an internal fraud event 120112 and/or an external fraud event 120140. The alert circuit 120106 may be structured to generate, responsive to the determined fraud event 120112, 120140, a message 120114 that identifies the device. The alert provisioning circuit 120108 may be structured to transmit the message 120114.

Certain further aspects of the example apparatus are described herein, any one or more of which may be present in certain embodiments. In the apparatus 120100, the security analysis circuit may include an artificial intelligence (AI) circuit 120116 structured to detect the fraud event, based at least in part on analyzing the device property data using an artificial intelligence process. In the apparatus 120100, the artificial intelligence process may include a neural network. In the apparatus 120100, the neural network may be trained on detecting correlations between the fraud event and at least one of: a cyber-attack, a software version, a firmware version, a hardware version, an unauthorized access, a device failure event, device ownership, a device manufacturer, a location, or a network outage, unauthorized device access, use of property data corresponding to a retired/decommissioned device, etc. In the apparatus 120100, the artificial intelligence process may be based at least in part on a deep learning network. The apparatus 120100 may further include a visualization circuit 120118 structured to generate and transmit fraud event visualization data 120120 configured to depict a visualization of the fraud event on an electronic display. In the apparatus 120100, the visualization may be a map. In the apparatus 120100, the visualization may be a chart depicting at least one of the devices affected by the fraud event. In the apparatus 120100, the alert provisioning circuit may be further structured to transmit the message to at least one of: a device management platform corresponding to the device, a user of the device, a manufacturer of the device, or an entity that monitors the device. In the apparatus 120100, the security analysis circuit may form part of a device management platform. In the apparatus 120100, the security analysis circuit may form part of the IoT device registry, e.g., registry 1129 (FIG. 1). The apparatus 120100 may further include a display circuit 120122 structured to display the message. The apparatus 120100 may further include a fraud event log circuit 120124 structured to log the fraud event in a database 120126, e.g., database 1128 (FIG. 1), which may form part of the apparatus 120100 or may be external to the apparatus 120100. The apparatus 120100 may further include a device management platform 120128 structured to interpret the message transmitted by the alert provisioning circuit, and at least one of: quarantine the at least one device, disable the at least one device, disable at least part of the device, disable at least some functionality of the device, send an alert to the device, send an alert to an entity associated with the device, or patch the at least one device.

The apparatus 120100 may further include a trust indicator provisioning circuit 120130 structured to provide a trust indicator 120132 for the device, based at least in part on the determined fraud event. In the apparatus 120100, the trust indicator may include any of a numeric value, an alphabetic value, and/or an alphanumeric value. In the apparatus 120100, the trust indicator may include an enumerated value. In the apparatus 120100, the trust indicator may be displayed as a color-coded value. In the apparatus 120100, a value of the trust indicator may be based at least in part on a location of the device. In the apparatus 120100, a value of the trust indicator may be based at least in part on a time period. In the apparatus 120100, a value of the trust indicator may be based at least in part on one or more of a software version or a firmware version of the device. In the apparatus 120100, determining the trust indicator may be based at least in part on artificial intelligence. In the apparatus 120100, the trust indicator may be reflective of the device being a Greenfield device, as disclosed herein. In the apparatus 120100, the trust indicator may be reflective of the device being a Brownfield device, as disclosed herein. In the apparatus 120100, the trust indicator may be reflective of the device being a virtual device, as disclosed herein. In the apparatus 120100, the trust indicator may be reflective of the device being a meta-device, as disclosed herein.

For example, devices may be virtual devices, e.g., objects in a metaverse having real-world counterparts (real-world devices), where the virtual device is a digital-twin of the real-world counterpart. A digital virtual device may have properties corresponding to its real-world counterpart that may be updated in real-time and/or on a periodic basis. Devices in the metaverse may be real-world devices, e.g., objects in the real-world having metaverse counterparts (digital twin virtual devices) and/or supporting metaverse activities. As another example, devices may be meta-devices, e.g., objects in the metaverse lacking real-world counterparts. In embodiments, a device may have modules that are virtual devices and modules that are meta-devices. In embodiments, an IoT device registry may provide for registration of virtual devices, real-world devices, and/or meta-devices, as disclosed herein, and/or the services and/or functions associated with registration for registered virtual devices, real-world devices, and/or meta-devices, as also disclosed herein. Any of virtual devices, real-world devices, and/or meta-devices may be Greenfield devices and/or Brownfield devices, and/or may have a combination of Greenfield modules and/or Brownfield modules.

In the apparatus 120100, the trust indicator may be displayed as at least one of: numeric based, color based, symbol based, alphanumeric based, letter based, or any combination thereof. In the apparatus 120100, the trust indicator provisioning circuit may be further structured to adjust a value of the trust indicator based at least in part on the determined fraud event. In the apparatus 120100, the adjustment may be an increase when the determined fraud event corresponds to at least one of a patching or an updating of at least one of software or firmware of the device. In the apparatus 120100, the adjustment may be a decrease when the determined fraud event corresponds to a cyber-attack.

In the apparatus 120100, the determined fraud event may correspond to an addition of a new module into the device. As a non-limiting example, the new module added to the device may be new software/firmware/hardware and/or a change in the existing software/firmware/hardware and/or a change in the external environment that results in the current software/firmware/hardware being exploitable. For example, a new vulnerability may become known. In the apparatus 120100, the new module may be at least one of an input device or an output device. In the apparatus 120100, the at least one of the input device or the output device may be a network interface device. In the apparatus 120100, the at least one of the input device or the output device may be a media device. In the apparatus 120100, the determined fraud event may correspond to a change in ownership of the device. In the apparatus 120100, the determined fraud event may be based on detecting a change in a location of the device. In the apparatus 120100, the determined fraud event may be based on detecting a change in at least one of a software version or a firmware version of the device. In the apparatus 120100, the determined fraud event may be based on detecting a change in a hardware version of the device. The apparatus may further include an IoT Universal Identification (UID) processing circuit 120134 structured to interpret an IoT UID and the device property data, a record management circuit 120136 structured to associate the IoT UID with the device property data via a record, and a record provisioning circuit 120138 structured to transmit the record.

Figure 121:
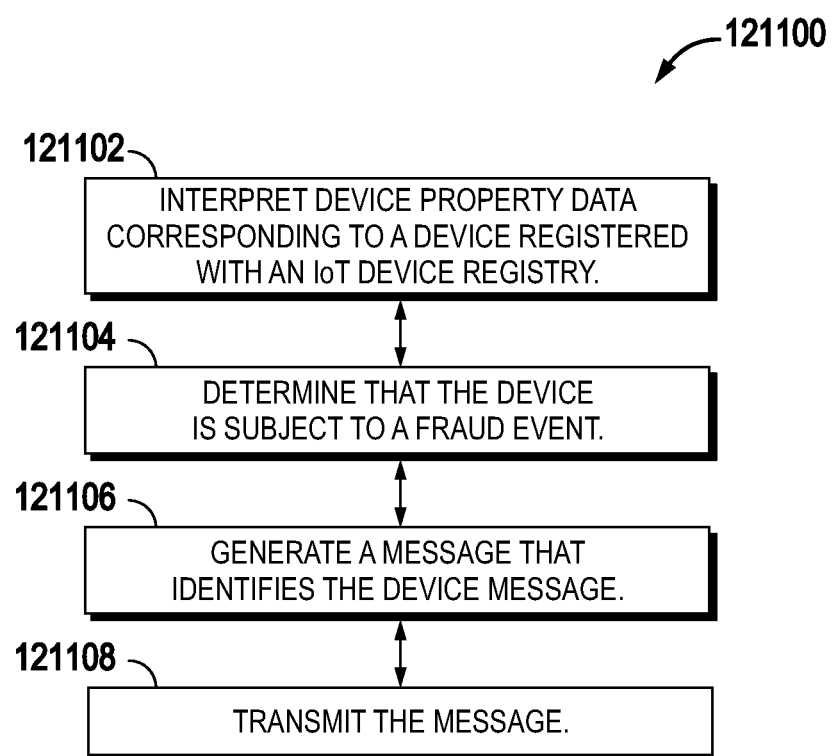

FIG. 121 illustrates a flowchart of an example method 121100 for detecting fraudulent activity, e.g., for network connected devices 1112, 1114, 1116, 1118, 1120, 1122, 1124 (FIG. 1), in accordance with an embodiment of the current disclosure. The method 121100 may be performed by the apparatus 120100 and/or any other computing device described herein.

The method 121100 may include interpreting, via a device property data processing circuit, device property data corresponding to a device, e.g., any of devices 1112, 1114, 1116, 1118, 1120, 1122, 1124 (FIG. 1), registered with an Internet of Things (IoT) device registry 121102, e.g., registry 1129 (FIG. 1). The method 121100 may further include determining, via a security analysis circuit based at least in part on the device property data, that the device is subject to a fraud event 121104. The fraud event may be an internal fraud event and/or an external fraud event. The method 121100 may further include generating, responsive to the determined fraud event, via an alert circuit, a message that identifies the device 121106. The method 121100 may further include transmitting, via an alert provisioning circuit, the message 121108.

Figure 122:
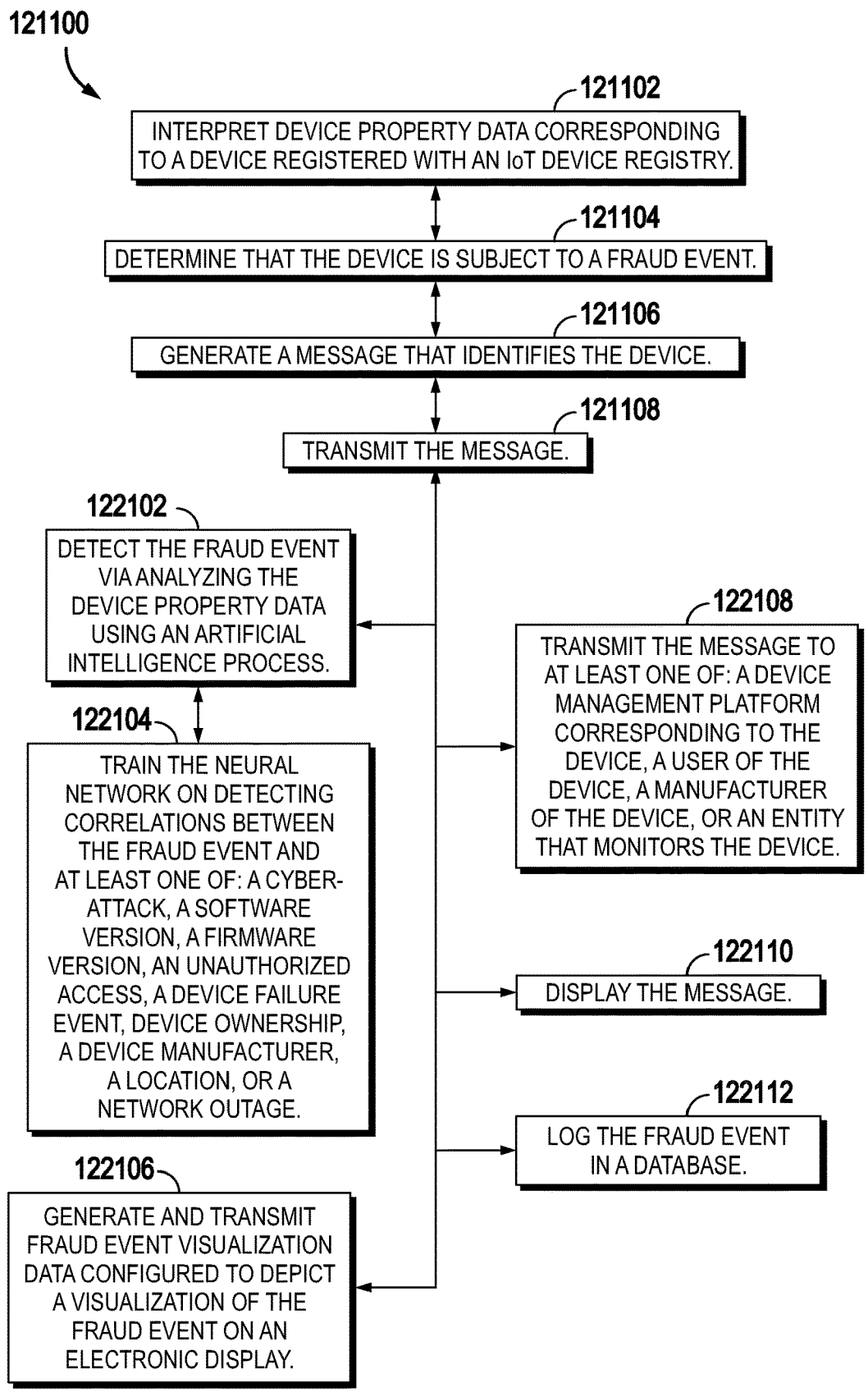
Figure 123:
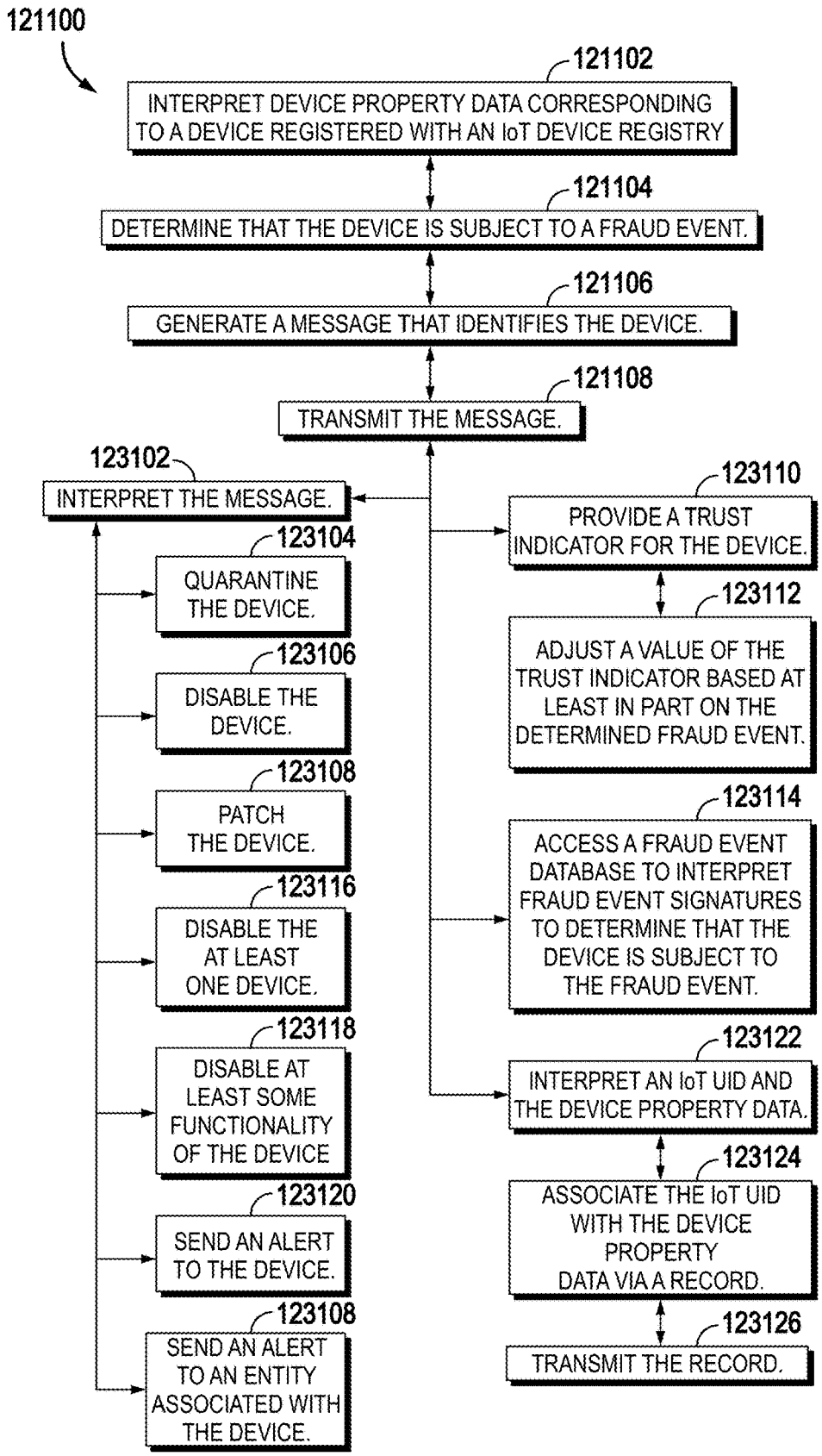

FIG. 122 is another flowchart depicting a method for detecting fraudulent activity, in accordance with an embodiment of the current disclosure. FIG. 123 is another flowchart depicting a method for an IoT device registry display, in accordance with an embodiment of the current disclosure. Certain further aspects of the example method are described herein, any one or more of which may be present in certain embodiments. The features shown in FIGS. 121, 122, and 123 are combinable and interchangeable in any configuration in embodiments. With reference to FIG. 122, in the method 121100, the determining, via the security analysis circuit, that the device is subject to a fraud event may include detecting the fraud event via analyzing the device property data with an artificial intelligence circuit that uses an artificial intelligence process 122102. In the method 121100, the artificial intelligence process may include a neural network. The method 121100 may further include training the neural network on detecting correlations between the fraud event and at least one of: a cyber-attack, a software version, a firmware version, a hardware version, an unauthorized access, a device failure event, device ownership, a device manufacturer, a location, a network outage 122104, property data common between an alleged authorized device and a known retired/decommissioned device, and/or the like. In the method 121100, the artificial intelligence process may be based at least in part on a deep learning network. The method 121100 may further include generating and transmitting, via a visualization circuit, fraud event visualization data configured to depict a visualization of the fraud event on an electronic display 122106. In the method 121100, the visualization may be a map. In the method 121100, the visualization may be a chart depicting at least one of the device affected by the fraud event. The method 121100 may further include transmitting, via the alert provisioning circuit, the message to at least one of: a device management platform corresponding to the device, a user of the device, a manufacturer of the device, or an entity that monitors the device 122108. In the method 121100, the security analysis circuit may form part of a device management platform. In the method 121100, the security analysis circuit may form part of the IoT device registry. The method 121100 may further include displaying the message via a display circuit 122110. The method 121100 may further include logging the fraud event in a database via a fraud event log circuit 122112.

With reference to FIG. 123, the method 121100 may further include interpreting, via a device management platform, the message transmitted by the alert provisioning circuit 123102, and by the device management platform, at least one of: quarantining the device 123104, disabling the device 123106, disable at least part of the device 123116, disable at least some functionality of the device 123118, send an alert to the device 123120, send an alert to an entity associated with the device, or patching the device 123108. The method 121100 may further include providing a trust indicator for the device, based at least in part on the determined fraud event 123110. In the method 121100, the trust indicator may include any of a numeric value, an alphabetic value, and/or an alphanumeric value. In the method 121100, the trust indicator may include an enumerated value. In the method 121100, the trust indicator may be displayed as a color-coded value. In the method 121100, a value of the trust indicator may be based at least in part on a location of the device. In the method 121100, a value of the trust indicator may be based at least in part on a time period. In the method 121100, a value of the trust indicator may be based at least in part on at least one of a software version or a firmware version of the device. In the method 121100, determining the trust indicator may be based at least in part on artificial intelligence. In the method 121100, the trust indicator may be reflective of the device being a Greenfield device. In the method 121100, the trust indicator may be reflective of the device being a Brownfield device. In the apparatus 120100, the trust indicator may be reflective of the device being a virtual device, as disclosed herein. In the apparatus 120100, the trust indicator may be reflective of the device being a meta-device, as disclosed herein.

In the method 121100, the trust indicator may be displayed as at least one of: numeric based, color based, symbol based, alphanumeric based, letter based, or any combination thereof. The method 121100 may further include adjusting a value of the trust indicator based at least in part on the determined fraud event 123112. In the method 121100, the adjusting may be an increase when the determined fraud event corresponds to at least one of a patching or an updating of at least one of software or firmware of the device. In the method 121100, the adjusting may be a decrease when the determined fraud event corresponds to a cyber-attack.

In the method 121100, the determined fraud event may correspond to an addition of a new module into the device. In the method 121100, the new module may be at least one of an input device or an output device. In the method 121100, the at least one of the input device or the output device may be a network interface device. In the method 121100, the at least one of the input device or the output device may be a media device. In the method 121100, the determined fraud event may correspond to a change in ownership of the device. In the method 121100, the determined fraud event may be based on detecting a change in a location of the device. In the method 121100, the determined fraud event may be based on detecting a change in at least one of a software version or a firmware version of the device. In the method 121100, the determined fraud event may be based on detecting a change in a hardware version of the device. The method 121100 may further include accessing, by the security analysis circuit, a fraud event database to interpret fraud event signatures to determine that the device is subject to the fraud event 123114. A fraud event signature may include a set of events and/or data values known to be associated with past fraud events, and/or a set of events and/or data values similar to events and/or data values known to be associated with past fraud events, e.g., recent use of a long-ago retired SIM card and/or MAC address. The method 121100 may further include interpreting, via an IoT UID processing circuit, an IoT UID and the device property data 123122, associating, via a record management circuit, the IoT UID with the device property data via a record 123124, and transmitting, via a record provisioning circuit, the record 123126.

Figure 124:
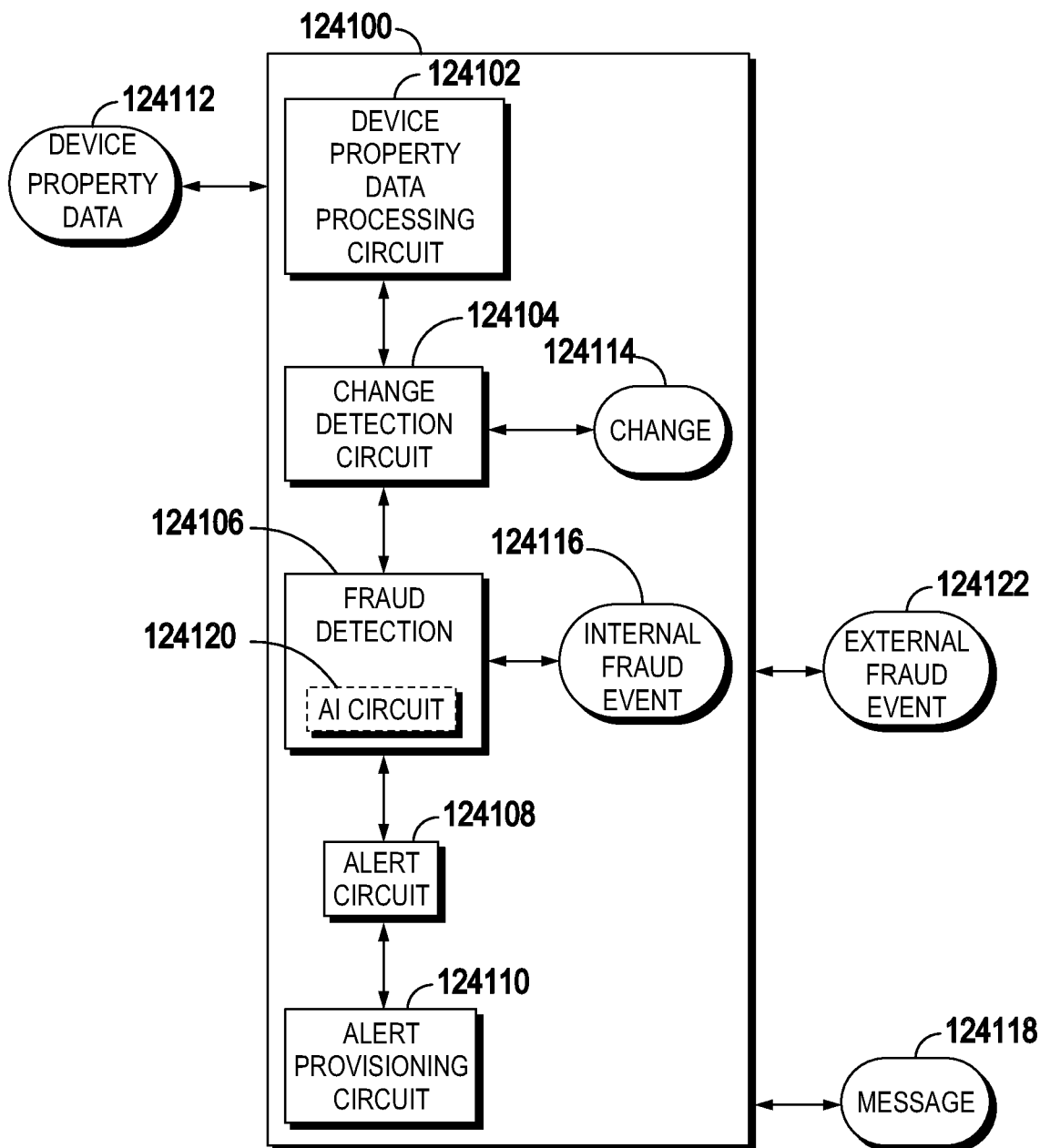

FIG. 124 depicts a schematic diagram of an example apparatus 124100 for detecting fraudulent activity, e.g., for network connected devices 1112, 1114, 1116, 1118, 1120, 1122, 1124 (FIG. 1), in accordance with an embodiment of the current disclosure. The apparatus 124100 may form part of the server 1126 (FIG. 1), e.g., the at least one processor, and/or any other electronic computing device described herein.

With reference to FIG. 124, the apparatus 124100 may include a device property data processing circuit 124102, a change detection circuit 124104, a fraud detection circuit 124106, an alert circuit 124108, and an alert provisioning circuit 124110. The device property data processing circuit 124102 may be structured to, at a first time, interpret device property data 124112 corresponding to a device, e.g., any of devices 1112, 1114, 1116, 1118, 1120, 1122, 1124 (FIG. 1), registered with an IoT device registry, e.g., registry 1129 (FIG. 1); and at a second time, interpret the device property data 124112 corresponding to the device registered with the IoT device registry. The change detection circuit 124104 may be structured to detect a change 124114 in the device property data 124112 between the first time and the second time. The fraud detection circuit 124106 may be structured to determine that the change corresponds to a fraud event, which may be an internal fraud event 124116 and/or an external fraud event 124122. The alert circuit 124108 may be structured to generate, responsive to the determining that the change corresponds to a fraud event 124116, 124122, a message 124118 that identifies the device corresponding to the device property data 124112. The alert provisioning circuit 124110 may be structured to transmit the message 124118.

Certain further aspects of the example apparatus are described herein, any one or more of which may be present in certain embodiments. In the apparatus 124100, the fraud detection circuit 124106 may include an artificial intelligence circuit 124120 structured to detect the 124116, 124122, based at least in part on analyzing the device property data 124112 using an artificial intelligence process. In the apparatus 124100, the artificial intelligence process may include a neural network. In the apparatus 124100, the neural network may be trained on detecting correlations between the fraud event 124116, 124122 and at least one of: a cyber-attack, a software version, a firmware version, a hardware version, an unauthorized access, a device failure event, device ownership, a device manufacturer, a location, or a network outage.

Figure 125:
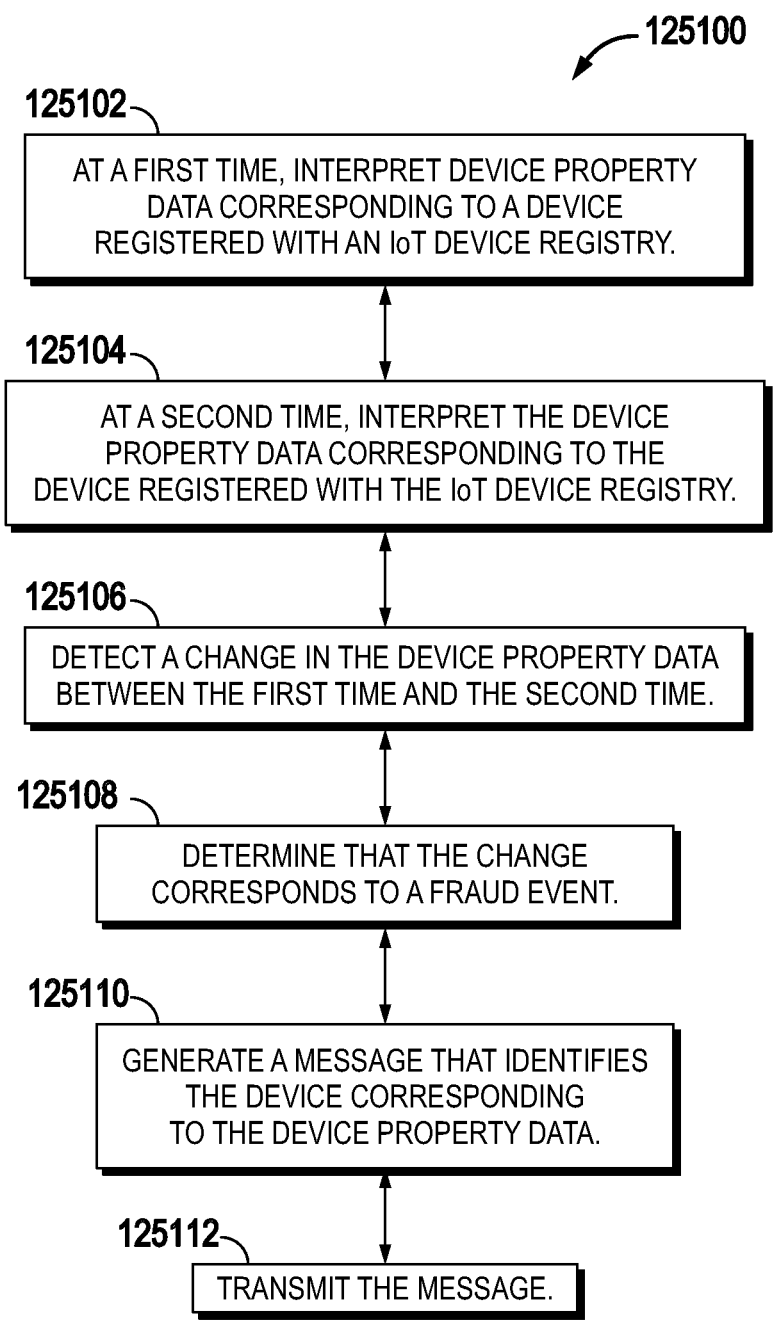

FIG. 125 illustrates a flowchart of an example method 125100 for detecting fraudulent activity, e.g., for network connected devices 1112, 1114, 1116, 1118, 1120, 1122, 1124 (FIG. 1), in accordance with an embodiment of the current disclosure. The method 125100 may be performed by the apparatus 120100 and/or any other computing device described herein. The method 125100 may include at a first time, interpreting, via a device property data processing circuit, device property data corresponding to a device, e.g., any of devices 1112, 1114, 1116, 1118, 1120, 1122, 1124 (FIG. 1), registered with an IoT device registry 125102, e.g., registry 1129 (FIG. 1). The method may further include, at a second time, interpreting, via the device property data processing circuit, the device property data corresponding to the device registered with the IoT device registry 125104. The method may further include detecting, via a change detection circuit, a change in the device property data between the first time and the second time 125106. The method may further include determining, by a fraud detection circuit, that the change corresponds to a fraud event 125108. The method may further include generating, via an alert circuit and responsive to the determining that the change corresponds to a fraud event, a message that identifies the device corresponding to the device property data 125110. The method may further include transmitting, via an alert provisioning circuit, the message 125112.

Figure 126:
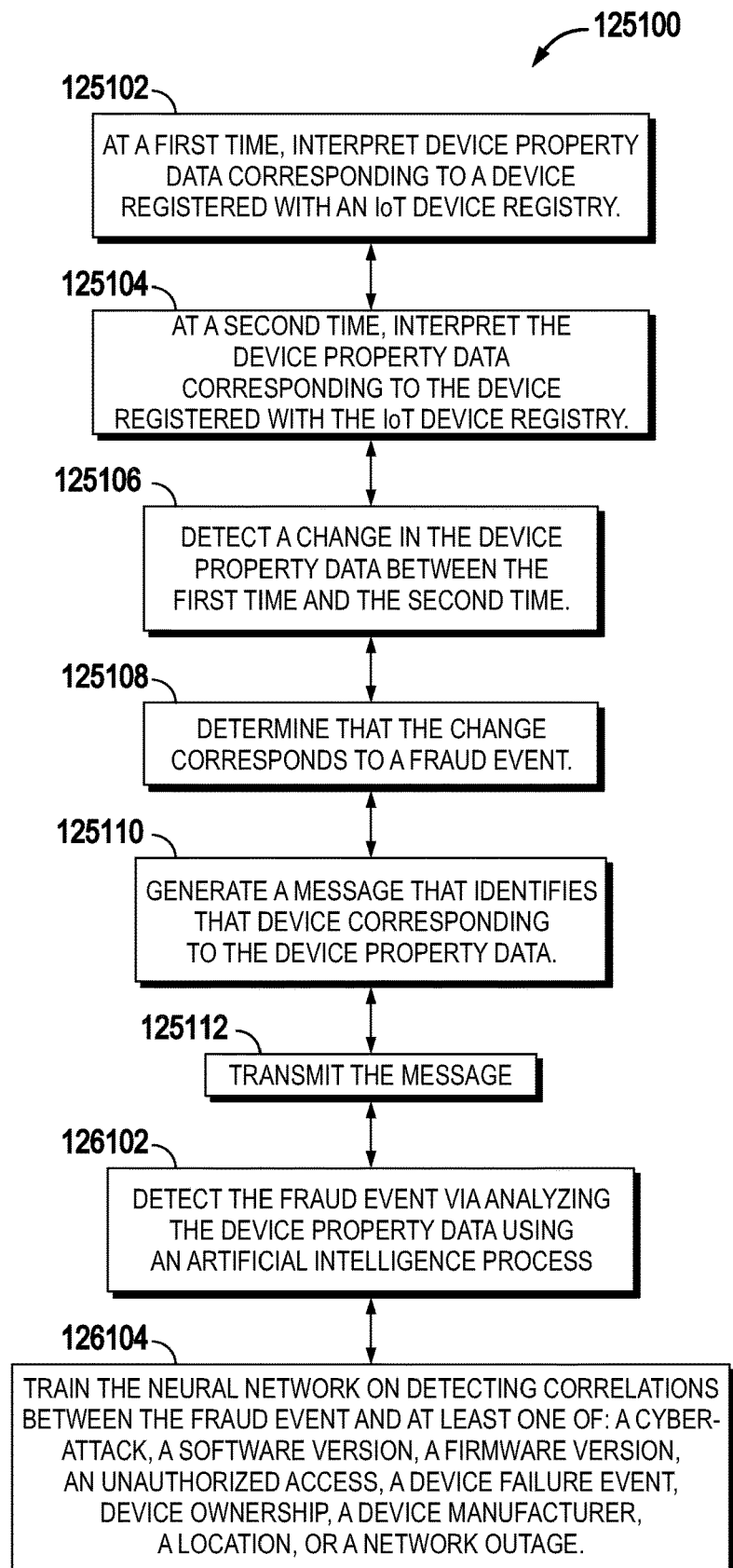

FIG. 126 is another flowchart depicting a method for an IoT device registry display, in accordance with an embodiment of the current disclosure. Certain further aspects of the example method are described as following, any one or more of which may be present in certain embodiments. The features shown in FIGS. 125 and 126 are combinable and interchangeable in any configuration in embodiments. With reference to FIG. 126, in the method 125100, the determining, via the fraud detection circuit, that the change corresponds to a fraud event may include detecting the fraud event via analyzing the device property data with an artificial intelligence circuit that uses an artificial intelligence process 126102. In the method 125100, the artificial intelligence process may include a neural network. The method 125100 may further include training the neural network on detecting correlations between the fraud event and at least one of: a cyber-attack, a software version, a firmware version, a hardware version, an unauthorized access, a device failure event, device ownership, a device manufacturer, a location, or a network outage 126104.

Figure 127:
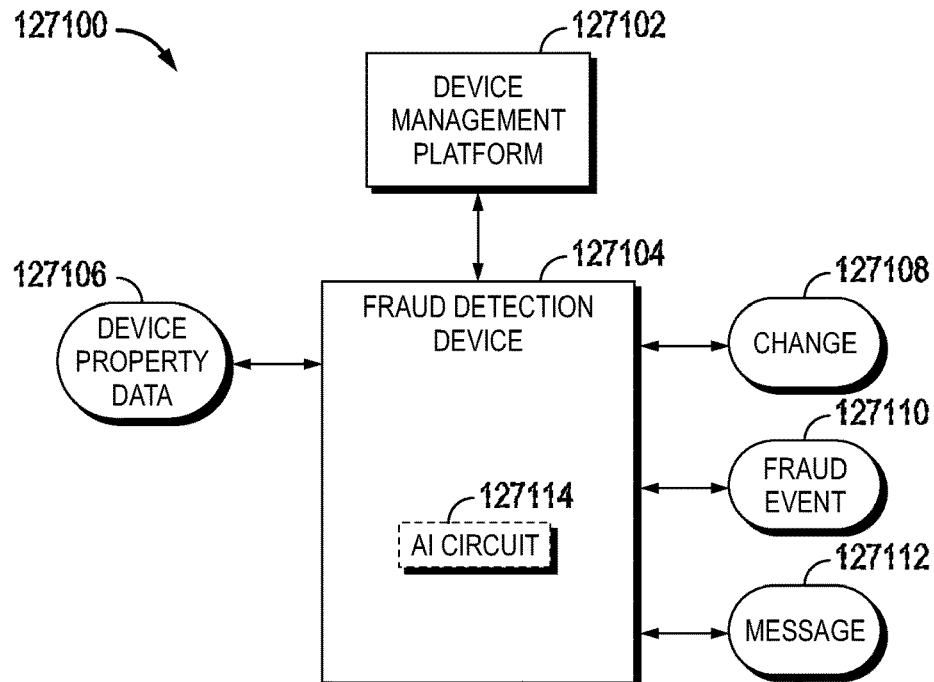

FIG. 127 depicts a schematic diagram of an example system 127100 for detecting fraudulent activity, e.g., for network connected devices 1112, 1114, 1116, 1118, 1120, 1122, 1124 (FIG. 1), in accordance with an embodiment of the current disclosure. The system 127100 may form part of the server 1126 (FIG. 1), e.g., the at least one processor, and/or any other electronic computing device described herein.

With reference to FIG. 127, the system 127100 may include a device management platform 127102 and a fraud detection device 127104. The device management platform 127102 may be structured to manage one or more devices, e.g., any of devices 1112, 1114, 1116, 1118, 1120, 1122, 1124 (FIG. 1), registered with an IoT device registry, e.g., registry 1129 (FIG. 1). The fraud detection device 127104 may be structured to monitor the IoT device registry for changes in device property data 127106 corresponding to the registered one or more devices, detect a change 127108 in the device property data 127106 for at least one device among the one or more devices, determine that the detected change 127108 corresponds to a fraud event 127110, generate, responsive to the determined fraud event 127110, a message 127112 that identifies the at least one device, transmit the message 127112 to the device management platform. The fraud event 127110 may be an internal fraud event and/or an external fraud event. The device management platform 127102 may be further structured to interpret the message 127112 transmitted by the fraud detection device 127104, and at least one of: quarantine the at least one device, disable the at least one device, disable at least part of the device, disable at least some functionality of the device, send an alert to the device, send an alert to an entity associated with the device, or patch the at least one device.

Certain further aspects of the example system are described as following, any one or more of which may be present in certain embodiments. In the system 127100, the fraud detection device 127104 may include an artificial intelligence circuit 127114 structured to detect the fraud event 127110, based at least in part on analyzing the device property data 127106 using an artificial intelligence process. In the system 127100, the artificial intelligence process may include a neural network. In the system 127100, the neural network may be trained on detecting correlations between the fraud event 127110 and at least one of: a cyber-attack, a software version, a firmware version, a hardware version, an unauthorized access, a device failure event, device ownership, a device manufacturer, a location, or a network outage.

Figure 128:
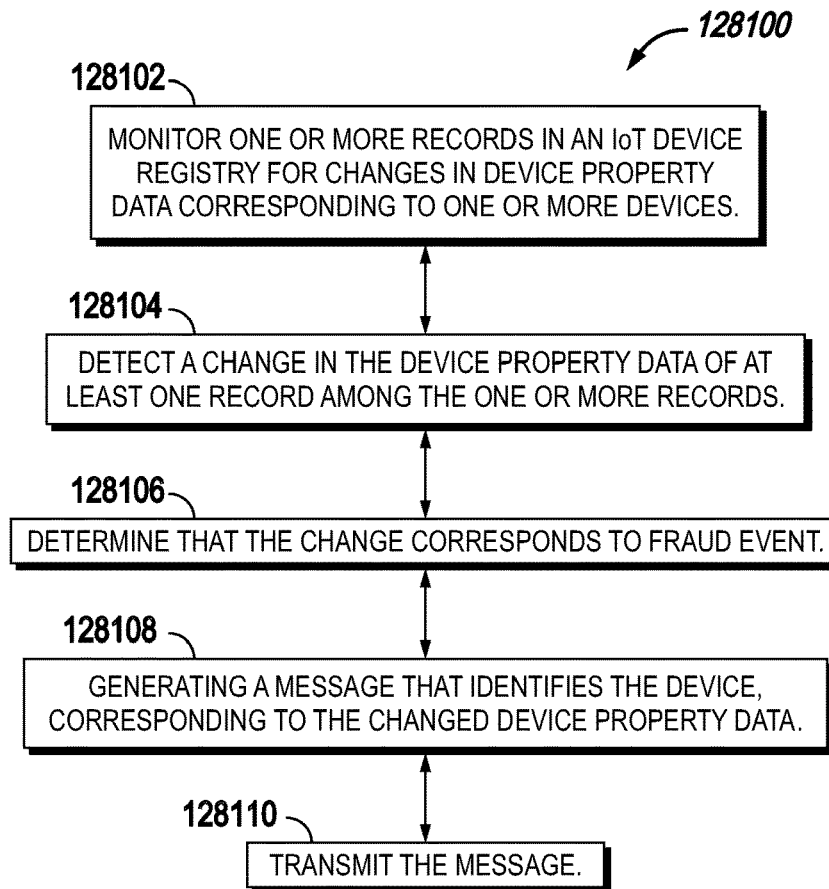

FIG. 128 illustrates a flowchart of an example method 128100 for detecting fraudulent activity, e.g., for network connected devices 1112, 1114, 1116, 1118, 1120, 1122, 1124 (FIG. 1), in accordance with an embodiment of the current disclosure. The method 128100 may be performed by the apparatus 120100 and/or any other computing device described herein.

The method 128100 may include monitoring, via at least one processor, one or more records in an IoT device registry for changes in device property data corresponding to one or more devices, e.g., any of devices 1112, 1114, 1116, 1118, 1120, 1122, 1124 (FIG. 1), each of the one or more devices corresponding to one of the one or more records 128102. The method 128100 may further include detecting, via the at least one processor, a change in the device property data of at least one record among the one or more records 128104. The method 128100 may further include determining, via the at least one processor, that the change corresponds to a fraud event 128106. The method 128100 may further include generating, via the at least one processor and responsive to the detected fraud event, a message that identifies the device, corresponding to the changed device property data 128108. The method 128100 may further include transmitting, via the at least one processor, the message 128110.

Figure 129:
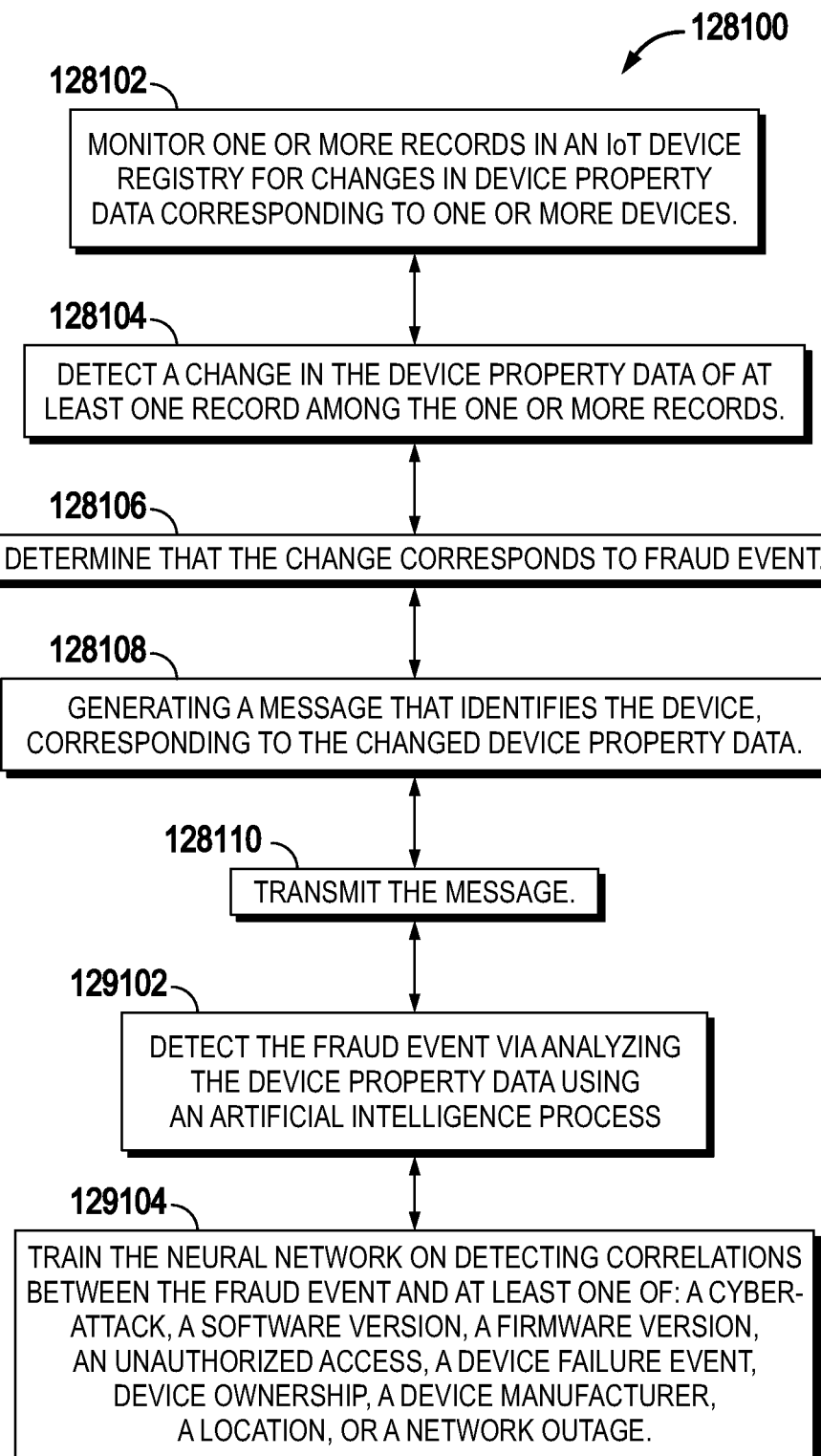

FIG. 129 is another flowchart depicting a method for an IoT device registry display, in accordance with an embodiment of the current disclosure. Certain further aspects of the example method are described as following, any one or more of which may be present in certain embodiments. The features shown in FIGS. 128 and 129 are combinable and interchangeable in any configuration in embodiments. With reference to FIG. 129, in the method 128100, the determining that the change corresponds to a fraud event may include detecting the fraud event via analyzing the device property data with an artificial intelligence circuit that uses an artificial intelligence process 129102. In the method 128100, the artificial intelligence process may include a neural network. The method 128100 may further include training the neural network on detecting correlations between the fraud event and at least one of: a cyber-attack, a software version, a firmware version, a hardware version, an unauthorized access, a device failure event, device ownership, a device manufacturer, a location, or a network outage 129104.

In certain embodiments, the determination or detection of fraudulent activity may include identification of a trust level, score, and/or rating, which may be dynamic. Correlation of device properties across the various spectrums may provide for a unique ability to detect unusual relationships that may indicate fraud and/or warrant further investigation. Embodiments may send messages to various parties, e.g., manufacturers, such as an original equipment manufacturer (OEM), that include restricted views of device property data, which may enable the various parties to detect unusual behavior and/or fraud. Embodiments may provide for the detection of device properties, e.g., location, usage profile, network, interface language, device settings, associated telephone number, which may be indicative of a change in ownership.

Embodiments of the current disclosure may also provide for alert management, for example, the setting and triggering of alerts based on conditional logic, e.g., risk management 5128, compliance management 5130, and/or security 5132 (FIG. 5). For example, the owner and/or operators of a network connected device may set alerts configured to notify the owner and/or operator of unusual activity associated with one or more network connected devices. Embodiments of the current disclosure may also provide for analysis of data corresponding to the network connected devices, e.g., usage and/or trend data, risk management data, data compliance management, etc. Such analysis may be performed by the registration server, e.g., server 1126 (FIG. 1) on data retrieved from the plurality of records 1131 (FIG. 1). Risk analysis may be based at least in part on the attributes of one or more network connected devices, e.g., lifecycle events reflected by changes of a network connected device's attributes as recorded in its corresponding record, e.g., record 1152 (FIG. 1).

Referring to FIG. 130, embodiments of the current disclosure may provide for registering meta-devices with an Internet of Things (IoT) device registry 1129 (FIG. 1). A meta-device, in embodiments, may be a device and/or module that exists in a computer environment, e.g., a metaverse, a virtual environment apart from a metaverse, a software object, etc. A meta-device may have one or more real-world counterparts, or no real-world counterparts. A meta-device with at least one real-world counterpart may be a virtual device, as disclosed herein. A meta-device may have a set of properties forming a unique signature for the meta-device, e.g., device property data, which may include one or more non-fungible tokens (NFTs) and/or other properties as disclosed herein. Non-limiting examples of meta-devices lacking real-world counterparts include: in-game objects, e.g., a sword in an online Role Playing Game (RPG), a building, in-game items for purchase, and the like; programming constructs, e.g., a database object, a programming application interface (API), a software development library, and the like; virtual screens; virtualized computer assets (virtual machines), and the like. Non-limiting examples of meta-devices having real-world counterparts include: virtual shipping assets, e.g., ships, trucks, planes, and the like; sensors, e.g., temperature, pressure, vibrational, and the like. A meta-device may be a Greenfield device or a Brownfield device, as disclosed herein. A non-limiting use case of registering a meta-device includes a programmer registering a newly programmed and instantiated car for use in a multi-player/avatar virtual environment, e.g., a metaverse, with an IoT device registrar as a Greenfield meta-device. The car may then be purchased by a user/customer where event messages, as disclosed herein, are transmitted to the IoT device registrar to track the life cycle events of the car. The car may also have an NFT which is stored by the registry 1129 as part of the device property data. As another non-limiting example, a user in a meta-verse may purchase a used vehicle (existing in the meta-verse) which they may register as a Brownfield device, as disclosed herein. In embodiments, a meta-device may be a point-of-sale device in a virtual convenience store where the meta-device may correspond to multiple real-world devices that are not real-world point-of-sale devices (in the traditional sense), e.g., a server, payment gateway, and/or a firewall. The real-world devices, e.g., server, payment gateway, firewall, etc., may be at different physical locations, e.g., different rooms in a building, different buildings in a city, different cities, different states/provinces, different regions, different countries, etc.

Accordingly, as shown in FIG. 130, a method 130100 for registering one or more meta-devices may include an operation 130102 of interpreting, via an Internet of Things (IoT) Universal Identification (UID) processing circuit, an IoT UID and device property data corresponding to a meta-device, an operation 130104 of associating, via a record management circuit, the IoT UID with the device property data in a record in a database, and an operation 130108 of transmitting, via a record provisioning circuit, the record. For example, a corporation may have a digital T-shirt for display that they may want to give to real-word shareholders. The corporation may hire a programmer to write the software corresponding to the T-shirt, where the programmer registers the T-shirt class object and/or associated software files with the IoT device registry 1129. The programmer may then transfer ownership and/or possession of the T-shirt class object to the corporation who then creates and registers instances of the T-shirt, where each T-shirt may be an NFT.

Referring to FIG. 131, a procedure 131101 may further include an operation 131110 of transmitting at least one of the IoT UID or the record to a user in a virtual environment. For example, continuing with the virtual corporate T-shirt scenario, the corporation may distribute the T-shirts to the shareholders, where the shareholders can query the IoT UID in the IoT device registry 1129 to verify the history and/or other data in a corresponding record for the T-shirt.

Referring to FIG. 132, a procedure 132103 may further include an operation 132112 of displaying at least one of the IoT UID or the record in a virtual environment. Displaying the record in a virtual environment may provide a user of a virtual environment to read the record without having to exit the virtual environment. As will be appreciated, displaying the IoT UID and/or the corresponding record in the virtual environment may improve the likelihood that users in the virtual environment will examine the information of a meta-device, e.g., risk and/or trust score, without having to leave the virtual environment.

As such, referring to FIG. 133, a procedure 133105 may further include an operation 133114 of generating at least one of a trust indicator/score or a risk indicator/score for the meta-device; and storing the trust indicator/score or the risk indicator/score in the record associated with the IoT UID.

Referring to FIG. 134, a procedure 134104 may further include an operation 134118 of transmitting the trust indicator/score or the risk indicator/score to a user in a virtual environment.

Referring to FIG. 135, a procedure 135109 may further include an operation 135120 of displaying the trust indicator/score or the risk indicator/score in a virtual environment in relation to the meta-device.

Referring to FIG. 136, an apparatus 136102 includes an IoT UID processing circuit 136104 structured to interpret an IoT UID 6118 and device property data 136114 corresponding to a meta-device 136118. The apparatus 136102 may also include a record management circuit 136108 structured to associate the IoT UID 6118 with the device property data 136114 via a record 136120. The apparatus 136102 may also include a record provisioning circuit 136110 structured to transmit the record 136120. The apparatus 136102 may further include an authentication circuit 136122 structured to generate at least one of a trust indicator/score 136124 or a risk indicator/score 136128 for the meta-device 136118, and store the trust indicator/score 136124 or the risk indicator/score 136128 in the 136120 record associated with the IoT UID 6118. In some embodiments, the meta-device 136118 may lack a real-world counterpart 136130. In some embodiments, the meta-device lacks a real-world counterpart and a trust and/or risk score/indicator is displayed in the real-world, e.g., a trust score displayed on an SPG for a virtual server. In some embodiments, the meta-device 136118 may have at least one real-world counterpart 136130. In some embodiments, the meta-device 136118 may have at least two real-world counterparts 136130. The at least two real-world counterparts 136130 may be in different locations. For example, the different locations may be different rooms, buildings, states, countries, vehicles, or the like. As a non-limiting example, a store in a meta-verse may have multiple goods/items and/or services that are provided by servers existing in different countries.

With reference to FIG. 137, in some embodiments, the device property data 136114 may be at least one of an NFT 137102, an owner identifier value 137104, a manufacturer identifier value 137108, a Trusted Platform Module (TPM) Key 137110, a Media Access Control (MAC) address 137112, a serial number 137114, a software version 137118, or a firmware version 137120. The meta-device 136118 may be at least one of a Greenfield device 136132 or a Brownfield device 136134.

Referring to FIG. 138, an apparatus 138102 includes an IoT UID processing circuit 138104 structured to interpret an IoT UID 6118 associated with a meta-device 138118. The apparatus 138102 may further include a device lookup circuit 138108 structured to generate a query 138120 that includes the IoT UID 6118 and is structured to retrieve device property data 138114 corresponding to the IoT UID 6118. The apparatus 138102 may further include a query provisioning circuit 138110 structured to transmit the query 138120 to an IoT device registrar server 1126. In an embodiment, the meta-device 138118 may lack a real-world counterpart. In some embodiments, the meta-device lacks a real-world counterpart, and a trust and/or risk score/indicator is displayed in the real-world. In an embodiment, the meta-device 138118 may have at least one real-world counterpart. In an embodiment, the meta-device 138118 may have at least two real-world counterparts. The at least two real-world counterparts may be in different locations. For example, the different locations may be different rooms, buildings, states, countries, vehicles, or the like. The device property data 138114 may be at least one of an NFT, an owner identifier value, a manufacturer identifier value, a Trusted Platform Module (TPM) Key, a Media Access Control (MAC) address, a serial number, a software version, or a firmware version, as in FIG. 137.

Illustrated in FIG. 139 is a supply chain for vaccine distribution where one or more manufacturers 139132 produce a vaccine administered 139110 by a medical professional to an individual. The present vaccine distribution supply chain is one or many non-limiting examples involving registered tracking devices and, as such, embodiments of the present disclosure may be applicable to tracking devices for other types of goods and/or services.

As shown in FIG. 139, packages/units of the vaccine may follow multiple paths, collectively represented by line 139112. As will be understood, packages of the vaccine may change ownership and/or move through different zones of liability, e.g., administrative regions having boundaries where liability for the vaccines changes from one entity to another. For example, a shipping company may have liability for units of the vaccine while in transport via an airplane 139114 wherein liability transfers to the owner of a distribution center 139116 upon delivery of the vaccine to the distribution center 139116. Units of the vaccine may then change ownership and/or have a change in liability upon being shipped, e.g., via trucks 139118, to a hospital 139120 for administration 139110 to a patient. Ownership of and/or liability for the units of vaccine may change again upon delivery to the hospital 139120. As will be understood, devices, as disclosed herein, may be used to track the temperature and/or seal of the units of vaccine as they travel though the supply chain. Such tracking may be required by government regulations, e.g., the Center for Disease Control (CDC) may require that tracking results 139122 be generated and sent to the CDC. Additionally, medical professionals and consumer/patients may require such tracking in order to maintain confidence in the safety and/or effectiveness of units of the vaccine. In embodiments, devices used to track units of the vaccine through the supply chain may be decommissioned 139124 and/or recycled once the vaccine has been administered. Government and/or industry regulations may control when a device may be recycled though a supply chain and/or must be retired from service. As will be appreciated, embodiments of the current disclosure may generate notifications and/or other types of messages indicating whether a device may be recycled through the supply chain and/or should be decommissioned. Embodiments of the current disclosure may detect failure to decommission a device, when decommission is called for by a government and/or industry standard, as an unusual event. Thus, entities operating within the supply chain can verify with the registry 1129 (FIG. 1) that devices are operating in accordance with government and/or industry standard prior to accepting custody and/or liability of the devices.

Accordingly, in embodiments, devices may be registered by the manufacturers 139132 with the registry 1129 prior to shipping of the units of vaccine. Once the devices are registered, the registry 1129 may catalogue/record the identification values and make the devices visible to entities within the supply chain, e.g., approved entities may check the status of the devices via one or more interfaces as described herein. A shipping company, prior to taking custody and/or accepting liability of the units of vaccine, may query the registry 1129 to verify that the one or more devices tracking the units of vaccine are registered and/or were registered by the manufacturers 139132. The shipping company may also verify one or more attributes of the devices, e.g., GPS location, temperature, pressure, etc. Upon verifying the devices as being properly registered and owned/assigned to the manufacturer, the shipping company, e.g., airplane 139114, may then accept custody and/or liability of the received units. The manufacturers 139132 and/or the shipping company 139114 may then update the corresponding records 1131 (FIG. 1) via sending one or more device status values 6114 (FIG. 6), registration requests 6112, device event messages 6116, and/or other types of messages, as described herein. In embodiments, the registry 1129 may check to ensure that the receiving entity is authorized to accept the units of the vaccine. The distribution center 139116 may then verify, via the registry 1129, that each of the devices is owned and/or otherwise assigned to the shipping company before taking custody of the units of vaccine. Upon acceptance of the units of vaccine, the distribution center 139116 may then update the corresponding records 1152 via sending one or more device status values 6114, registration requests 6112, device event message 6116, and/or other types of messages as described herein. Such verification and transfers of ownership may be completed at each exchange point in the supply line.

In embodiments, the registry 1129 may detect a discrepancy indicative of an unusual event within the supply chain, e.g., via a sentry, as described herein. For example, the number of units of vaccine known to be released from the distribution center 139116 may be different than the number of units of vaccine received by the hospital 139120. The registry 1129 may send an alert message to one or more of the manufacturer 139132, distribution center 139116, and/or shipping companies, e.g., airplane 139114 and/or truck 139118, used to transport the units of vaccine from the manufacturer 139132 to the hospital 139120. Such an unusual event may be the result of a truck 139126 getting lost and/or not completing delivery of the vaccine to the hospital 139120. In certain aspects, the registry 1129 may detect unusual events based on discrepancies within a device's lifecycle and/or attributes.

While the foregoing examples concerned embodiments of the registry 1129 in the context of a vaccine supply chain, it is to be understood that embodiments of the registry 1129 may be used in other types of supply chains, e.g., food, gas, consumer goods, etc., and/or any other type of manufacturing process or environment where devices are utilized. For example, embodiments of the current disclosure may involve a smart thermostat installed in a living room. As will be understood, the smart thermostat may have a serial number (physical ID), a WiFi MAC address (network ID) used to connect to a WiFi network, and/or a human understandable ID such as "Living Room Stat" (meta-ID or service ID, as disclosed herein). In certain aspects, embodiments of the current disclosure provide for an enterprise and/or service provider to manage the identities and/or life cycles of thousands of such devices.

Embodiments of the current disclosure may integrate with a telecommunications number registry, such a Toll-Free Management Platform (TFMP).

Embodiments of the registry 1129, as disclosed herein, may provide for a comprehensive IoT machine identity lifecycle management, e.g., "cradle to grave", using identities sourced from trusted partners/manufacturers of devices, as disclosed herein.

Embodiments of the registry 1129 and/or the SPGs, as disclosed herein, may improve the problems associated with security fragmentation caused by multiple device IDs, data management, and governance. For example, some embodiments of the current disclosure may provide for a centralized and scalable machine identity, e.g., IoT UID 6118, registry coupled with a SPG-based management, that may be agnostic to use case, platform, network and industry vertical.

The seed of trust, provided by embodiments of the current disclosure, may provide for more granular identity and context information, which may enable incremental services and facilitate device troubleshooting and management.

As disclosed herein, some embodiments of the current disclosure may enable a computer system and/or mobile device manager to quickly identify devices that may be compromised, at risk of being compromised, and/or associated with fraud for purposes of quarantining such devices.

Embodiments of the current disclosure may provide for a chipset/module manufacturer and/or manufacturers further down a device assembly process to: trace components across one or more owners which may provide for premium positioning, improve product support, and/or confirm device activation. Embodiments of the current disclosure may provide for a chipset/module manufacturer to: receive traceable notifications, receive update confirmations, recycle IoT UIDs and/or other types of device identifiers, and/or the like. As will be appreciated, an IoT device registrar, as disclosed herein, may collect device events from multiple sources and/or environments and present them in a manageable and easily understandable interface, e.g., a SPG. Embodiments of the IoT device registrar, as disclosed herein, may provide for easy retrieval of a devices current owner, location, jurisdiction, and the like. Embodiments of the IoT device registrar, as disclosed herein, may provide for user and/or manufacturers of devices to retire devices and be relatively confident that such devices will not be used to produce rouge devices capable of infiltrating a system. Accordingly, some embodiments of the current disclosure may mitigate the risk of a registered device being counterfeited. Embodiments of the current disclosure may provide for secure provisioning of devices into a corporate enterprise environment and subsequent managing of their identities. Embodiments of the IoT device registry, as disclosed herein, may provide for trusted identification between devices, via the IoT UIDs, which, in turn, may mitigate and/or prevent malware downloads.

Embodiments of the current disclosure may also provide for a neutral steward, e.g., the registry 1129, for managing and verifying devices. In certain aspects, the registry 1129 may provide for attestation of a registered device, thereby providing for trusted interactions between entities and registered devices. In certain aspects, a first device may verify and/or authenticate itself to a second device based at least in part on the registry 1129, e.g., some embodiments of the current disclosure provide for one-way authentication. In certain aspects, two devices may verify/authenticate themselves to each other via the registry 1129, e.g., two-way authentication. In certain aspects, the registry may provide for distributed authentication of devices. In certain aspects, the registry 1129 may serve as a centralized authentication authority and/or trusted third party that manages authentication certificates. In embodiments, the registry 1129 may implement and/or facilitate implementation of one or more protocols based, as least in part, on the National Institute of Standards and Technology (NIST) Interagency or Internal Reports (NISTR) "NISTIR 8259". For example, the registry 1129 may enable the device to signal to networks (that the device wishes to join) information such as the type of device, what type of access is being requested, required network functionality, provisioned credentials, etc. In certain aspects, the registry 1129 may implement one or more protocols based at least in part on the DNS-based Authentication of Named Entities (DANE) standard. Non-limiting examples include defining bindings between a domain name providing a particular service and a key that can be used to establish encrypted connections to that service. In certain aspects, the registry 1129 may implement one or more protocols based at least in part on the Manufacturer Usage Description (MUD) standard, e.g., methods for a device to signal to a network its type, approved access, required functionality, etc. In certain embodiments, the registry 1129 may implement one or more protocols based at least in part on the Type Allocation Code (TAC) standard. In embodiments, the registry 1129 may integrate and/or support a Network of Things based infrastructure.

Embodiments of the current disclosure may provide for a method for managing network connected devices. The method includes interpreting, at a server, a device registration value that includes a device identification value and an owner identification value. The device identification value corresponds to at least one of the network connected devices. The owner identification value corresponds to an owner of the at least one network connected device. The method further includes storing, in a database via the server, the device identification value in a record corresponding to the owner identification value. The method further includes interpreting, at the server, a device status value that includes the device identification value and a device attribute value. The device attribute value corresponds to an attribute of the at least one network connected device. The method further includes identifying, via the server, the record storing the device identification value. The method further includes modifying, via the server, a field of the record based at least in part on the device attribute value. In certain aspects, the attribute value corresponds to a status of the at least one network connected device. In certain aspects, the status is at least one of: provisioned; active; malfunctioning; suspended; decommissioned; missing; compromised; or unknown. In certain aspects, the attribute value corresponds to at least one of: a location; a temperature; a pressure; a force; or a seal. In certain aspects, the attribute value corresponds to the location and the location corresponds to a product supply chain. In certain aspects, the method further includes verifying, via the server, that at least one of the device registration value or the device status value was generated by an authorized entity. In certain aspects, the authorized entity is the owner of the at least one network connected device. In certain aspects, the authorized entity is a manufacturer of the at least one network connected device. In certain aspects, the method further includes establishing a seed of trust between the server and an entity that generated at least one of the device registration value or the device status value. In certain aspects, establishing the seed of trust occurs prior to interpreting the device registration value. In certain aspects, the device registration value corresponds to a change in ownership of the at least one network connected device. In certain aspects, the method further includes: detecting, via the server and based at least in part on at least one of the device registration value or the device status value, an unusual event corresponding to the at least one network connected device; and transmitting an alert message corresponding to the unusual event.

Embodiments of the current disclosure may provide for a system for managing network connected devices. The system includes a server having at least one processor; and a memory device. The memory device is structured to store a plurality of records, each record of the plurality corresponding to an owner of at least one of the network connected devices. The at least one processor is structured to: interpret a device registration value that includes a device identification value and an owner identification value, the device identification value corresponding to at least one of the network connected devices and the owner identification value corresponding to an owner of the at least one network connected device. The at least one processor is structured to store, in the memory device, the device identification value in a record of the plurality of records, the record corresponding to the owner identification value. The at least one processor is structured to interpret a device status value that includes the device identification value and a device attribute value, the device attribute value corresponding to an attribute of the at least one network connected device. The at least one processor is structured to identify, based at least in part on the device identification value, the record. The at least one processor is structured to modify a field of the record based at least in part on the device attribute value.

Embodiments of the current disclosure may provide for an apparatus for managing network connected devices. The apparatus includes a device registration circuit structured to:

interpret a device registration value that includes a device identification value and an owner identification value, the device identification value corresponding to at least one of the network connected devices and the owner identification value corresponding to an owner of the at least one network connected device; and store, in a database, the device identification value in a record corresponding to the owner identification value. The apparatus further includes a device status modification circuit structured to: interpret a device status value that includes the device identification value and a device attribute value, the device attribute value corresponding to an attribute of the at least one network connected device; identify, based at least in part on the device identification value, the record storing the device identification value; and modify a field of the record based at least in part on the device attribute.

Embodiments of the current disclosure may provide for a non-transitory computer readable medium storing instructions. The stored instructions adapt at least one processor to interpret a device registration value that includes a device identification value and an owner identification value, the device identification value corresponding to at least one of a plurality of network connected devices and the owner identification value corresponding to an owner of the at least one network connected device. The stored instructions further adapt the at least one processor to store, in a database, the device identification value in a record corresponding to the owner identification value. The stored instructions further adapt the at least one processor to interpret a device status value that includes the device identification value and a device attribute value. The device attribute value corresponds to an attribute of the at least one network connected device. The stored instructions further adapt the at least one processor to identify the record storing the device identification value; and modify a field of the record based at least in part on the device attribute value.

An example method includes interpreting, via an IoT UID processing circuit, an IoT UID and device property data; associating, via a record management circuit, the IoT UID with the device property data via a record; and transmitting, via a record provisioning circuit, the record.

Certain further aspects of the example method are described following, any one or more of which may be present in certain embodiments. The method further including storing the record in a database. The device property data includes an owner identifier value. The device property data includes a manufacturer identifier value. The device property data includes at least one of: a trusted platform module key; a media access control address; a software version identifier; or a firmware identifier. The wherein associating the IoT UID with the device property data via a record comprises: including at least one of the IoT UID and the device property data in the record. The method further including identifying the record in a database, based at least in part on the IoT UID. The method further including: polling, via an update management circuit, an external data source to identify changes to a device corresponding to the device property data; and updating, via the record management circuit, the record to reflect the changes. The device property data indicates that a corresponding device is a Greenfield device; and associating, the IoT UID with the device property data via the record comprises including an identifier in the record that indicates the device is a Greenfield device. The device property data indicates that a corresponding device is a Brownfield device; and associating, the IoT UID with the device property data via the record comprises including an identifier in the record that indicates the device is a Brownfield device. The record includes a trust indicator for a device associated with the IoT UID. The trust indicator is a numeric value. The trust indicator is an enumerated type. The method further including interpreting a device event message and updating a record in an IoT device registry based at least in part on the device event message.

An example apparatus includes an IoT UID processing circuit structured to interpret an IoT UID and device property data; a record management circuit structured to associate the IoT UID with the device property data via a record; and a record provisioning circuit structured to transmit the record.

Certain further aspects of the example apparatus are described following, any one or more of which may be present in certain embodiments. The device property data includes an owner identifier value. The device property data includes a manufacturer identifier value. The device property data includes at least one of: a trusted platform module key; a media access control address; a software version identifier; or a firmware identifier. The record management circuit is further structured to include at least one of the IoT UID and the device data in the record. The record management circuit is further structured to identify the record in a database, based at least in part on the IoT UID. The apparatus further including an update management circuit structured to: poll an external data source to identify changes to a device corresponding to the device property data; and update the record to reflect the changes. The device property data indicates that a corresponding device is a Greenfield device; and the record management circuit is further structured to include an identifier in the record that indicates the IoT device is a Greenfield device. The device property data indicates that a corresponding device is a Brownfield device; and the record management circuit is further structured to include an identifier in the record that indicates the IoT device is a Brownfield device. The record includes a trust indicator for a device associated with the IoT UID. The trust indicator is a numeric value. The trust indicator is an enumerated type.

An example method includes interpreting, via an IoT UID processing circuit, an IoT UID; generating, via a device lookup circuit, a query that includes the IoT UID and is structured to retrieve device property data corresponding to the IoT UID; and transmitting, via a query provisioning circuit, the query to an IoT device registrar server.

Certain further aspects of the example method are described following, any one or more of which may be present in certain embodiments. The method further including interpreting, via a device property data processing circuit, the device property data retrieved by the query. The device property data includes an owner identifier value. The device property data includes a manufacturer identifier value. The device property data includes at least one of a trusted platform module key; a media access control address; a software version identifier; or a firmware identifier. The device property data includes a trust indicator for a device associated with the IoT UID. The method further including displaying, an electronic device, the trust indicator. The trust indicator is a numeric value. The trust indicator is an enumerated type. The method further including denying the device associated with the IoT UID access to another device, based at least in part on the trust indicator. The method further including granting the device associated with the IoT UID access to another device, based at least in part on the trust indicator.

An example apparatus includes an IoT UID processing circuit structured to interpret an IoT UID; a device lookup circuit structured to: generate a query that includes the IoT UID; and retrieve device property data corresponding to the IoT UID; and a query provisioning circuit structured to transmit the query to an IoT device registrar server.

Certain further aspects of the example apparatus are described following, any one or more of which may be present in certain embodiments. The apparatus further including a device property data processing circuit structured to interpret the device property data retrieved by the query. The device property data includes an owner identifier value. The device property data includes a manufacturer identifier value. The device property data includes at least one of a trusted platform module key; a media access control address; a software version identifier; or a firmware identifier. The device property data includes a trust indicator for a device associated with the IoT UID. The trust indicator is a numeric value. The trust indicator is an enumerated type. The apparatus further including a gatekeeping circuit structured to deny the device associated with the IoT UID access to another device, based at least in part on the trust indicator. The apparatus further including a gate keeping circuit structured to grant the device associated with the IoT UID access to another device, based at least in part on the trust indicator.

An example method includes interpreting, via a user input processing circuit, one or more user input command values; determining, via an Internet of Things Universal Identification (IoT UID) identification circuit, one or more IoT UIDs, based at least in part on the one or more user input command values; generating, via a device lookup circuit, a query that includes the one or more IoT UIDs; retrieving, via the device lookup circuit, device property data corresponding to the one or more IoT UIDs; transmitting, via a query provisioning circuit, the query to an IoT device registrar server; interpreting, via a device property processing circuit, the device property data generated by the IoT UID registrar server in response to the query; and displaying, via a display circuit, the device property data with the corresponding one or more IoT UIDs.

Certain further aspects of the example method are described following, any one or more of which may be present in certain embodiments. The one or more user input command values include the one or more IoT UIDs. The one or more user input command values include credentials. The determining the one or more IoT UIDs is based at least in part on the credentials. The method further including filtering data in the device property data, based at least in part on the one or more user input command values. The filtered data relates to historical ownership of a device corresponding to one of the IoT UIDs. The device property data includes a patch status for a device of the corresponding IoT UID. The device property data includes a security risk analysis value for a device of the corresponding IoT UID. The method further including generating a security alert, based at least in part on the security risk analysis value. The device property data includes a trust level value for a device of the corresponding IoT UID. The method further including generating a security alert, based at least in part on the trust level value. The method further including generating and tracking a patching campaign for devices corresponding to one or more IoT UIDs. The method further including interpreting a device event message and updating a record in an IoT device registry based at least in part on the device event message.

An example apparatus includes a user input processing circuit structured to interpret one or more user input command values; an Internet of Things Universal Identification (IoT UID) identification circuit structured to determine one or more IoT UIDs, based at least in part on the one or more user input command values; a device lookup circuit structured to: generate a query that includes the one or more IoT UIDs; and retrieve device property data corresponding to the one or more IoT UIDs; a query provisioning circuit structured to transmit the query to an IoT device registrar server; a device property processing circuit structured to interpret the device property data generated by the IoT device registrar server in response to the query; and a display circuit structured to display the device property data with the corresponding one or more IoT UIDs.

Certain further aspects of the example apparatus are described following, any one or more of which may be present in certain embodiments. The user input command values include the one or more IoT UIDs. The user input command values include credentials. The IoT UID identification circuit is further structured to determine the one or more IoT UIDs, based at least in part on the credentials. The apparatus further including a filtering circuit structured to filter data in the device property data, based at least in part on the one or more user input command values. The filtered data relates to historical ownership of a device corresponding to one of the IoT UIDs. The device property data includes a patch status for a device of the corresponding IoT UID. The device property data includes a security risk analysis value for a device of the corresponding IoT UID. The apparatus further including a security alert circuit structured to generate a security alert, based at least in part on the security risk analysis value. The device property data includes a trust level value for a device of the corresponding IoT UID. The apparatus further including a security alert circuit structured to generate a security alert, based at least in part on the trust level value. The apparatus further including a patching campaign circuit structured to generate and track a patching campaign for devices corresponding to one or more IoT UIDs.

An example system includes an Internet of Things (IoT) device registrar server structured to provide access to an IoT device registry; and a device management server structured to: communicate with the IoT device registrar server; and provide a graphical user interface structured to display device property data for one or more devices registered with the IoT device registry, wherein the device property data is retrieved by the graphical user interface from the IoT device registry via querying the IoT device registrar server.

Certain further aspects of the example system are described following, any one or more of which may be present in certain embodiments. Each of the one or more devices has a corresponding IoT Universal Identification (UID) associated with the device. The system further including a filtering circuit, in communication with the device management server, structured to filter data in the device property data. The filtered data relates to historical ownership of a device having an IoT UID associated with the device. The device property data includes a patch status for a device having an IoT UID associated with the device. The device property data includes a security risk analysis value for a device of the corresponding IoT UID. The system further including, in communication with the device management server, a security alert circuit structured to generate a security alert, based at least in part on the security risk analysis value. The device property data includes a trust level value for a device of the corresponding IoT UID. The system further including a security alert circuit, in communication with the device management server, structured to generate a security alert, based at least in part on the trust level value. The system further including a patching campaign circuit, in communication with the device management server, structured to generate and track a patching campaign for devices corresponding to one or more IoT UIDs. The system further including a credential verification circuit, in communication with the device management server, structured to: determine whether a user of the graphical user interface is authorized to access the device property data for the one or more devices; and if it is determined that the user of the graphical user interface is not authorized to access the device property data for the one or more devices, restrict the display of the device property data for one or more devices.

An example apparatus includes at least one processor; and a memory device storing an application structured to adapt the at least one processor to generate a graphical user interface structured to: receive one or more user input command values; determine, based at least in part on the one or more user input command values, one or more devices registered with an IoT device registry via corresponding Internet of Things Universal Identifications (IoT UIDs); and display property data for the one or more devices.

Certain further aspects of the example apparatus are described following, any one or more of which may be present in certain embodiments. The one or more user input command values include the one or more IoT UIDs. The one or more user input command values include credentials. The application stored in the memory device is further structured to adapt the at least one processor to determine the one or more IoT UIDs, based at least in part on the credentials. The application stored in the memory device is further structured to adapt the at least one processor to filter data in the device property data, based at least in part on the one or more user input command values. The filtered data relates to historical ownership of a device corresponding to one of the IoT UIDs. The device property data includes a patch status for a device of the corresponding IoT UID. The device property data includes a security risk analysis value for a device of the corresponding IoT UID. The application stored in the memory device is further structured to adapt the at least one processor to: generate a security alert, based at least in part on the security risk analysis value; and provide the security alert to the graphical user interface to be displayed by the graphical user interface. The device property data includes a trust level value for a device of the corresponding IoT UID. The application stored in the memory device is further structured to adapt the at least one processor to: generate a security alert, based at least in part on the trust level value; and provide the security alert to the graphical user interface to be displayed by the graphical user interface. The application stored in the memory device is further structured to adapt the at least one processor to: generate and track a patching campaign for devices corresponding to one or more IoT UIDs; and provide information about the patching campaign to the graphical user interface to be displayed by the graphical user interface.

An example method includes generating, via at least one processor, a graphical user interface structured to: receive one or more user input command values; and communicate with an Internet of Things (IoT) device registrar server; receiving, via the graphical user interface, the one or more user input command values; determining, via the at least one processor, one or more devices registered with an IoT device registry via querying the IoT device registrar server, based at least in part on the one or more user input command values; and displaying device property data for the one or more devices received in response to querying the IoT device registrar server.

Certain further aspects of the example method are described following, any one or more of which may be present in certain embodiments. Each of the one or more devices has a corresponding IoT Universal Identification (UID) associated with the device. The method further including filtering data in the device property data. The filtered data relates to historical ownership of a device having an IoT UID associated with the device. The device property data includes a patch status for a device having an IoT UID associated with the device. The device property data includes a security risk analysis value for a device of the corresponding IoT UID. The method further including: generating a security alert, based at least in part on the security risk analysis value; and displaying the security alert on a same display as the device property data. The device property data includes a trust level value for a device of the corresponding IoT UID. The method further including: generating a security alert, based at least in part on the trust level value; and displaying the security alert on a same display as the device property data. The method further including: generating and tracking a patching campaign for devices corresponding to one or more IoT UIDs; and displaying information about the patching campaign on a same display as the device property data. The method further including determining whether a user of the graphical user interface is authorized to access the device property data for the one or more devices; and if it is determined that the user of the graphical user interface is not authorized to access the device property data for the one or more devices, restricting the display of the device property data for one or more devices.

An example apparatus includes a single pane of glass (SPG) interface circuit structured to interpret an Internet of Things Universal Identification (IoT UID) received from an SPG; and a record management circuit structured to retrieve device property data corresponding to the IoT UID, wherein the SPG interface circuit is further structured to transmit the device property data to the SPG.

Certain further aspects of the example apparatus are described following, any one or more of which may be present in certain embodiments. The IoT UID and device property data are associated with a device. The apparatus further including a filtering circuit, in communication with the record management circuit, structured to filter data in the device property data. The filtered data relates to historical ownership of the device. The device property data includes a patch status for the device. The device property data includes a security risk analysis value for the device. The apparatus further including, in communication with the record management circuit, a security alert circuit structured to: generate a security alert, based at least in part on the security risk analysis value; and provide the security alert to the SPG interface circuit to be displayed by the SPG. The device property data includes a trust level value for a device of the corresponding IoT UID. The apparatus further including a security alert circuit, in communication with the record management circuit, structured to: generate a security alert, based at least in part on the trust level value; and provide the security alert to the SPG interface circuit to be displayed by the SPG. The apparatus further including a patching campaign circuit, in communication with the record management circuit, structured to generate and track a patching campaign for devices corresponding to one or more IoT UIDs; and provide information about the patching campaign to the SPG interface circuit to be displayed by the SPG. The apparatus further including a credential verification circuit, in communication with the record management circuit, structured to: determine whether a user of the SPG is authorized to access the device property data corresponding to the IoT UID; and if it is determined that the user of the SPG is not authorized to access the device property data, restrict display of the device property data on the SPG.

An example method includes identifying one or more Brownfield devices; generating device property data, based at least in part on the one or more Brownfield devices; transmitting, to an Internet of Things (IoT) device registrar server, a registration request that includes the device property data; interpreting one or more Internet of Things Universal Identifications (IoT UIDs) generated in response to the transmitting of the registration request; and embedding the one or more IoT UIDs in the one or more Brownfield devices.

Certain further aspects of the example method are described following, any one or more of which may be present in certain embodiments. Embedding the one or more IoT UIDs in the one or more Brownfield devices comprises piggybacking the one or more IoT UIDs off one or more base messages transmitted to the one or more Brownfield devices. The one or more base messages are part of at least one of a software update or a firmware update for the one or more Brownfield devices. The one or more base messages are transmitted to the one or more Brownfield devices at one or more scheduled times. The one or more base messages are transmitted in response to the one or more Brownfield devices polling a management device platform. Embedding the one or more IoT UIDs in the one or more Brownfield devices comprises: for each of the one or more Brownfield devices, storing a corresponding one of the IoT UIDs in a memory device of the Brownfield device. Embedding the one or more IoT UIDs in the one or more Brownfield devices comprises: for each of the one or more Brownfield devices, installing a component into the Brownfield device, wherein the component includes the IoT UID. The method further including associating each of one or more portions of the device property data with a distinct IoT UID of the one or more IoT UIDs in an IoT UID device registry, wherein each of the one or more portions of the device property data corresponds to a distinct one of the one or more Brownfield devices. At least one of the following is performed, in part, using a single pane of glass (SPG): identifying the one or more Brownfield devices; generating the device property data; transmitting the registration request; or interpreting the one or more IoT UIDs generated in response to the transmitting of the registration request. The SPG is an application programing interface. The SPG is a graphical user interface. The SPG is hosted by and/or integrated into a device management platform. The SPG is hosted by an IoT device registrar. The method further including transmitting a confirmation message that indicates the one or more IoT UIDs were embedded in the one or more Brownfield devices. The device property data includes one or more owner identifier values, each of the one or more owner identifier values corresponding to an owner of the one or more Brownfield devices. The device property data includes one or more manufacturer identifier values, each of the one or more manufacturer identifier values corresponding to a manufacturer of the one or more Brownfield devices. The device property data includes at least one of a trusted platform module (TPM) key; a media access control (MAC) address; or a manufacturing serial number. The method further including transmitting a set of credentials to the IoT device registrar server, wherein the set of credentials provides authorization to register the one or more Brownfield devices with an IoT device registry associated with the IoT device registrar server. The set of credentials is based at least in part on a public key encryption infrastructure (PKI). The method further including interpreting a device event message and updating a record in an IoT device registry based at least in part on the device event message.

An example apparatus includes a display circuit structured to generate a graphical user interface (GUI) configured to receive one or more user input command values corresponding to device property data for one or more Brownfield devices; a requestor circuit structured to generate a registration request that includes the device property data; a request provisioning circuit structured to transmit the registration request to an Internet of Things (IoT) device registrar server; an Internet of Things Universal Identification (IoT UID) processing circuit structured to interpret one or more IoT UIDs generated by the IoT device registrar server in response to the registration request; and an IoT UID provisioning circuit structured to at least one of: transmit the one or more IoT UIDs; or display the one or more IoT UIDs on an electronic display.

Certain further aspects of the example apparatus are described following, any one or more of which may be present in certain embodiments. The apparatus further including an embedding verification circuit structured to interpret embedding confirmation data indicating that the one or more IoT UIDs were embedded into the one or more Brownfield devices; and transmit one or more confirmation messages indicating that the one or more IoT UIDs were embedded into the one or more Brownfield devices. The transmission of the one or more confirmation messages is to the display circuit; and the display circuit is further structured to display the embedding confirmation data in the GUI. The device property data includes one or more owner identifier values, each of the one or more owner identifier values corresponding to an owner of the one or more Brownfield devices. The device property data includes one or more manufacturer identifier values, each of the one or more manufacturer identifier values corresponding to a manufacturer of the one or more Brownfield devices. The device property data includes at least one of a trusted platform module (TPM) key; a media access control (MAC) address; or a manufacturing serial number. The apparatus further including a credential circuit structured to interpret a set of credentials corresponding to a user of the GUI; and transmit the set of credentials to the IoT device registrar server, wherein the set of credentials provides authorization to register the one or more Brownfield devices with an IoT device registry associated with the IoT device registrar server. The IoT UID provisioning circuit is structured to transmit the one or more IoT UIDs via piggybacking the one or more IoT UIDs off of one or more base messages transmitted to the one or more Brownfield devices. The one or more base messages are part of at least one of a software update or a firmware update for the one or more Brownfield devices. The one or more base messages are transmitted to the one or more Brownfield devices at one or more scheduled times. The one or more base messages are transmitted in response to the one or more Brownfield devices polling a management device platform. At least one of the display circuit, the requestor circuit, the request provisioning circuit, the IoT UID processing circuit, or the IoT UID provisioning circuit form part of a device management platform.

An example method includes interpreting, via a device registration request circuit, a registration request that maps device property data to one or more Brownfield devices; generating, via an Internet of Things Universal Identification (IoT UID) generation circuit, based at least in part on the registration request, an IoT UID for each of the one or more Brownfield devices; and transmitting, via an IoT UID provisioning circuit, the IoT UID for each of the one or more Brownfield devices.

Certain further aspects of the example method are described following, any one or more of which may be present in certain embodiments. The method further including interpreting one or more conformation messages indicating that the one or more IoT UIDs were embedded into the one or more Brownfield devices. The method further including associating, based at least in part on the mapping of device property data to the one or more Brownfield devices, each of one or more portions of the device property data with a distinct IoT UID of the one or more IoT UIDs in an IoT UID device registry. The method further including generating a trust level value for each of the one or more Brownfield devices; and transmitting the trust level values. Each of the trust level values for the one or more Brownfield devices has an initial value indicating that the corresponding Brownfield device is less trustworthy than a comparable Greenfield device.

An example method includes interpreting, via a request processing circuit, a registration request that includes device property data for one or more Brownfield devices; generating, via an Internet of Things Universal Identification (IoT UID) generation circuit, one or more IoT UIDs, based at least in part on the device property data; associating, via a record management circuit, each of the one or more IoT UIDs with at least some of the device property data via a record; transmitting, via an IoT UID provisioning circuit, the one or more IoT UIDs; and interpreting, via a registration confirmation circuit, one or more embedding confirmation messages generated in response to transmitting the IoT UIDs, wherein the one or more embedding confirmation messages indicate embedding of the one or more IoT UIDs into the one or more Brownfield devices.

Certain further aspects of the example method are described following, any one or more of which may be present in certain embodiments. The device property data includes one or more owner identifier values, each of the one or more owner identifier values corresponding to an owner of the one or more Brownfield devices.

An example apparatus includes a request processing circuit structured to interpret a registration request that includes device property data for one or more Brownfield devices; an Internet of Things Universal Identification (IoT UID) generation circuit structured to generate one or more IoT UIDs, based at least in part on the device property data; a record management circuit structured to associate each of the one or more IoT UIDs with at least some of the device property data via a record; an IoT UID provisioning circuit structured to transmit the one or more IoT UIDs; and a registration confirmation circuit structured to interpret one or more embedding confirmation messages generated in response to transmitting the IoT UIDs; wherein the one or more embedding confirmation messages indicate embedding of the one or more IoT UIDs into the one or more Brownfield devices.

Certain further aspects of the example apparatus are described following, any one or more of which may be present in certain embodiments. The device property data includes one or more manufacturer identifier values, each of the one or more manufacturer identifier values corresponding to a manufacturer of the one or more Brownfield devices.

An example method includes manufacturing one or more Greenfield devices; generating device property data based at least in part on the one or more Greenfield devices; transmitting, to an Internet of Things (IoT) device registrar server, a registration request that includes the device property data; interpreting one or more Internet of Things Universal Identifiers (IoT UIDs) generated in response to the transmitting of the registration request; and embedding the one or more IoT UIDs in the one or more Greenfield devices.

Certain further aspects of the example method are described following, any one or more of which may be present in certain embodiments. At least one of generating the device property data and transmitting the device property data forms part of a bootstrapping process. The bootstrapping process is initiated at least in part by the one or more Greenfield devices. The method further including verifying that the one or more Greenfield devices are authorized to transmit the device property data to the IoT device registrar. Verifying the one or more Greenfield devices is based at least in part on a cryptographic key. The cryptographic key is based at least in part on a public key infrastructure (PKI). At least one of generating the device property data or transmitting the device property data is performed via a device management platform. The device management platform comprises a single pane of glass (SPG). The device property data includes at least one of an owner identifier value; a manufacturer identifier value; a Trusted Platform Module (TPM) Key; a Media Access Control (MAC) address; or a manufacturing serial number. Embedding the one or more IoT UIDs into the one or more Greenfield devices comprises: storing the one or more IoT UIDs in one or more memory locations of the one or more Greenfield devices. Embedding the one or more IoT UIDs into the one or more Greenfield devices comprises installing one or more components into the one or more Greenfield device. The one or more components include the one or more IoT UIDs. Embedding the one or more IoT UIDs in the one or more Greenfield devices occurs prior to a sale of the one or more Greenfield devices. Embedding the one or more IoT UIDs in the one or more Greenfield devices occurs after a sale of the one or more Greenfield devices. The method further including interpreting a device event message and updating a record in an IoT device registry based at least in part on the device event message.

An example method includes obtaining a Greenfield device; generating device property data corresponding to the Greenfield device; transmitting the device property data to an Internet of Things (IoT) device registrar server; interpreting an Internet of Things Universal Identifier (IoT UID) generated by the IoT device registrar server in response to the device property data; and embedding the IoT UID into the Greenfield device.

Certain further aspects of the example method are described following, any one or more of which may be present in certain embodiments. At least one of generating the device property data and transmitting the device property data forms part of a bootstrapping process. The bootstrapping process is initiated at least in part by the Greenfield device. The method further including verifying that the Greenfield device is authorized to transmit the device property data to the IoT device registrar. Verifying the Greenfield device is based at least in part on a cryptographic key. The cryptographic key is based at least in part on a public key infrastructure (PKI). At least one of generating the device property data or transmitting the device property data is performed via a device management platform. The device management platform comprises a single pane of glass (SPG). The device property data includes at least one of an owner identifier value; a manufacturer identifier value; a Trusted Platform Module (TPM) Key; a Media Access Control (MAC) address; or a manufacturing serial number. Embedding the IoT UID into the Greenfield device comprises storing the IoT UID in a location of the Greenfield device. Embedding the IoT UID into the Greenfield device includes: installing a component into the Greenfield device. The component includes the IoT UID. Embedding the IoT UID in the Greenfield device occurs prior to a sale of the Greenfield device. Embedding the IoT UID in the Greenfield device occurs after a sale of the Greenfield device.

An example system includes one or more manufacturing components structured to manufacture at least a portion of a Greenfield device; a device management platform structured to generate device property data corresponding to the Greenfield device; transmit the device property data to an Internet of Things (IoT) device registrar server; and interpret an Internet of Things Universal Identifier (IoT UID) generated by the IoT device registrar server in response to the device property data; and an embedding tool structured to embed the IoT UID into the Greenfield device.

Certain further aspects of the example system are described following, any one or more of which may be present in certain embodiments. The device property data includes at least one of an owner identifier value; a manufacturer identifier value; a Trusted Platform Module (TPM) Key; a Media Access Control (MAC) address; or a manufacturing serial number.

An example apparatus includes device property data; a memory device; and a bootstrapping circuit structured to: initiate a request for an Internet of Things Universal Identifier (IoT UID) from an IoT device registrar server, the request including the device property data; transmit the request; interpret an IoT UID generated in response to the request; and store the IoT UID in the memory device.

Certain further aspects of the example apparatus are described following, any one or more of which may be present in certain embodiments. The device property data includes at least one of an owner identifier value; a manufacturer identifier value; a Trusted Platform Module (TPM) Key; a Media Access Control (MAC) address; or a manufacturing serial number. The apparatus further including a credential circuit structured to transmit one or more credentials that demonstrate authorization to register the apparatus with an IoT device registrar. The one or more credentials are cryptographic keys. The cryptographic keys are public encryption key infrastructure (PKI) keys.

An example method includes powering-on a Greenfield device; and initiating a bootstrapping process on the Greenfield device structured to: register the Greenfield device with an Internet of Things (IoT) device registrar; and embed an Internet of Things Universal Identifier (IoT UID) issued by the IoT device registrar as part of registering the Greenfield device.

Certain further aspects of the example method are described following, any one or more of which may be present in certain embodiments. Registration of the Greenfield device with the IoT device registrar is based at least in part on device property data that includes at least one of an owner identifier value; a manufacturer identifier value; a Trusted Platform Module (TPM) Key; a Media Access Control (MAC) address; or a manufacturing serial number. Powering-on the Greenfield device occurs prior to a first sale of the Greenfield device. Powering-on of the Greenfield device is performed by a first owner of the Greenfield device.

An example method includes interpreting, via a device registration request circuit, a registration request that maps device property data to one or more Greenfield devices; generating, via an Internet of Things Universal Identifier (IoT UID) generation circuit, based at least in part on the registration request, an IoT UID for each of the one or more Greenfield devices; and transmitting, via an IoT UID provisioning circuit, the IoT UIDs for each of the one or more Greenfield devices.

Certain further aspects of the example method are described following, any one or more of which may be present in certain embodiments. The device property data includes at least one of an owner identifier value; a manufacturer identifier value; a Trusted Platform Module (TPM) Key; a Media Access Control (MAC) address; or a manufacturing serial number.

An example apparatus includes a device registration circuit structured to interpret a registration request that maps device property data to one or more Greenfield devices; an Internet of Things Universal Identifier (IoT UID) generation circuit structured to generate, based at least in part on the registration request, an IoT UID for each of the one or more Greenfield devices; and an IoT UID provisioning circuit structured to transmit the IoT UID for each of the one or more Greenfield devices.

Certain further aspects of the example apparatus are described following, any one or more of which may be present in certain embodiments. The device property data includes at least one of an owner identifier value; a manufacturer identifier value; a Trusted Platform Module (TPM) Key; a Media Access Control (MAC) address; or a manufacturing serial number.

An example method includes identifying one or more Brownfield devices; generating device property data based at least in part on the one or more Brownfield devices; transmitting, to an Internet of Things (IoT) device registrar server, a registration request that includes the device property data; and interpreting one or more Internet of Things Universal Identifiers (IoT UIDs) generated in response to the transmitting of the registration request.

Certain further aspects of the example method are described following, any one or more of which may be present in certain embodiments. The registration request is for virtual IoT UIDs for the one or more Brownfield devices. The one or more IoT UIDs are virtual IoT UIDs. At least one of identifying the one or more Brownfield devices, generating the device property data, or transmitting the registration request are performed, in part, via a Single Pane of Glass (SPG). The SPG is a graphical user interface. The SPG is hosted by the IoT device registrar server. The SPG forms part of a device management platform. The SPG is an application programming interface (API). The SPG is hosted by the IoT device registrar server. The SPG forms part of a device management platform. The method further including verifying that an entity requesting registration of the one or more Brownfield devices is authorized to do so. Verifying is based at least in part on cryptographic keys. The cryptographic keys are based at least in part on a public key encryption infrastructure. The device property data includes at least one of an owner identifier value; a manufacturer identifier value; a Trusted Platform Module (TPM) Key; a Media Access Control (MAC) address; or a manufacturing serial number. The method further including interpreting, via a device management platform, a message from the IoT device registrar server that provides confirmation that the one or more Brownfield devices were successfully registered with an IoT device registry corresponding to the IoT device registrar server. The method further including interpreting a device event message and updating a record in an IoT device registry based at least in part on the device event message.

An example apparatus includes a display circuit structured to generate a graphical user interface configured to receive one or more user input command values corresponding to device property data for one or more Brownfield devices; a requestor circuit structured to generate a virtual registration request that includes the device property data; a request provisioning circuit structured to transmit the virtual registration request to an Internet of Things (IoT) device registrar server; an Internet of Things Universal Identifier (IoT UID) processing circuit structured to interpret one or more virtual IoT UIDs generated by the IoT device registrar server in response to the virtual registration request; and an IoT UID provisioning circuit structured to at least one of: transmit the one or more virtual IoT UIDs; or display the one or more virtual IoT UIDs on an electronic display.

Certain further aspects of the example apparatus are described following, any one or more of which may be present in certain embodiments. The apparatus further including a verification circuit structured to verify that an entity requesting registration of the one or more Brownfield devices is authorized to do so. The device property data includes at least one of an owner identifier value; a manufacturer identifier value; a Trusted Platform Module (TPM) Key; a Media Access Control (MAC) address; or a manufacturing serial number.

An example apparatus includes a device registration request circuit structured to interpret a virtual registration request that maps device property data to one or more Brownfield devices; an Internet of Things Universal Identifier (IoT UID) generation circuit structured to generate, based at least in part on the virtual registration request, an IoT UID for each of the one or more Brownfield devices; a record management circuit structured to generate a record for each of the IoT UIDs, wherein the record management circuit is further structured to associate each of the IoT UIDs with portions of the device property data corresponding to a distinct one of the one or more Brownfield devices; and an IoT UID provisioning circuit structured to transmit each of the IoT UIDs.

Certain further aspects of the example apparatus are described following, any one or more of which may be present in certain embodiments. The apparatus further including a verification circuit structured to verify that an entity requesting registration of the one or more Brownfield devices is authorized to do so. The device property data includes at least one of an owner identifier value; a manufacturer identifier value; a Trusted Platform Module (TPM) Key; a Media Access Control (MAC) address; or a manufacturing serial number.

An example method including interpreting, via a device registration request circuit, a virtual registration request that maps device property data to one or more Brownfield devices; generating, via an Internet of Things Universal Identifier (IoT UID) generation circuit, based at least in part on the virtual registration request, an IoT UID for each of the one or more Brownfield devices; generating, via a record management circuit, a record for each of the IoT UIDs; associating, via the record management circuit, each of the IoT UIDs with portions of the device property data corresponding to a distinct one of the one or more Brownfield devices; and transmitting, via an IoT UID provisioning circuit, each of the IoT UIDs.

Certain further aspects of the example method are described following, any one or more of which may be present in certain embodiments. The method further including verifying that an entity requesting registration of the one or more Brownfield devices is authorized to do so. The device property data includes at least one of an owner identifier value; a manufacturer identifier value; a Trusted Platform Module (TPM) Key; a Media Access Control (MAC) address; or a manufacturing serial number.

An example method includes manufacturing at least a portion of a Greenfield device generating, via a device management platform, device property data corresponding to the Greenfield device; generating, via the device management platform, a virtual registration request that includes the device property data; transmitting, via the device management platform, the virtual registration request to an IoT device registrar server; and interpreting, via the device management platform, an IoT UID generated by the IoT device registrar server in response to the device property data.

Certain further aspects of the example method are described following, any one or more of which may be present in certain embodiments. The generating and transmitting the device property data is facilitated by a bootstrapping process initiated by the Greenfield device. The method further including verifying that an entity requesting registration of the Greenfield device is authorized to do so. The verifying authorization of the entity is based at least in part on cryptographic keys. The verifying authorization of the entity is based at least in part on a Public Key Infrastructure (PKI). The method further including interpreting a device event message and updating a record in an IoT device registry based at least in part on the device event message.

An example system including one or more manufacturing components structured to manufacture at least a portion of a Greenfield device; and a device management platform structured to: generate device property data corresponding to the Greenfield device; generate a virtual registration request that includes the device property data; transmit the virtual registration request to an IoT device registrar server; and interpret an IoT UID generated by the IoT device registrar server in response to the virtual registration request.

Certain further aspects of the example system are described following, any one or more of which may be present in certain embodiments. The device management platform comprises a Single Pane of Glass (SPG). The device property data includes an owner identifier value. The device property data includes a manufacturer identifier value. The device property data includes a Trusted Platform Module (TPM) Key. The device property data includes a Media Access Control (MAC) address. The device property data includes a serial number.

An example apparatus including device property data; and a bootstrapping circuit structured to: initiate a virtual registration request that includes the device property data; and transmit the virtual registration request to an IoT device registrar server.

Certain further aspects of the example apparatus are described following, any one or more of which may be present in certain embodiments. The device property data includes an owner identifier value. The device property data includes at least one of a manufacturer identifier value or a serial number. The device property data includes at least one of a Trusted Platform Module (TPM) Key or a Media Access Control (MAC) address.

An example method including powering-on a Greenfield device; and initiating a bootstrapping process on the Greenfield device structured to virtually register the Greenfield device with an IoT device registrar.

Certain further aspects of the example method are described following, any one or more of which may be present in certain embodiments. The registration is pre-sale. The registration is post-sale. The method further including releasing the Greenfield device for use by an end user. The method further including embedding an IoT UID in the Greenfield device, wherein embedding comprises storing the IoT UID in a memory location of the Greenfield device. The method further including embedding an IoT UID in the Greenfield device, wherein embedding comprises installing a component into the Greenfield device, and wherein the component includes the IoT UID.

An example method including interpreting, via a device registration request circuit, a virtual registration request that maps device property data to one or more Greenfield devices; generating, via an IoT UID generation circuit, based at least in part on the virtual registration request, an IoT UID for each of the one or more Greenfield devices; generating, via a record management circuit, a record for each of the IoT UIDs; associating, via the record management circuit, each of the IoT UIDs with portions of the device property data corresponding to a distinct one of the one or more Greenfield devices; and transmitting, via an IoT UID provisioning circuit, the IoT UIDs.

Certain further aspects of the example method are described following, any one or more of which may be present in certain embodiments. The IoT UIDs are transmitted to a device management platform operated by a manufacturer of the one or more Greenfield devices. The IoT UIDs are transmitted to a device management platform operated by an IoT device registrar. The IoT UIDs are transmitted to a device management platform operated by an end user.

An example apparatus includes a property-monitoring circuit structured to: generate a query for device property data for an Internet of Things (IoT) device to an IoT device registrar server; interpret the device property data received from the IoT device registrar server to determine whether there is a change in the device property data; if the property-monitoring circuit determines that there is a change in the device property data, generate a notification of the change; and transmit the notification of the change to the IoT device registrar server.

Certain further aspects of the example apparatus are described following, any one or more of which may be present in certain embodiments. The query is initiated by at least one of: the device, a user of the device, a seller of the device, a purchaser of the device, a manufacturer of the device, or the IoT device registrar server. The change is determined by analyzing historical device property data. The change is determined by monitoring a device property change flag. The change comprises a change in device hardware. The change comprises a change in a network. The change comprises a change in ownership of the device. The change comprises a security event. The determining that the device has reached end-of-life comprises receiving a user input indicating that the device has reached end-of-life. The determining that the device has reached end-of-life comprises receiving a security notification indicating a device decommissioning. The determining that the device has reached end-of-life comprises receiving a decommission notification indicating a device decommissioning. The property-monitoring circuit is further structured to generate a quarantine value indicating that a device should be quarantined. The property-monitoring circuit is further structured to generate a decommission value indicating that a device should be decommissioned. The property-monitoring circuit is further structured to generate a security value indicating that a device may be subject to a security event. The property-monitoring circuit is further structured to generate an ownership notification indicating that an ownership value corresponding to the device has changed. The apparatus further including a display circuit structured to display the notification of the change. The display circuit comprises a Single Pane of Glass (SPG) display circuit included in an SPG system. The SPG system comprises a graphical user interface. The graphical user interface is hosted by an IoT device registrar that includes the IoT device registrar server. The SPG system is included in a device management platform. The SPG system comprises an Application Programing Interface (API). The API is hosted by the IoT device registrar. The API is included in a device management platform.

An example method including generating a query for device property data for an Internet of Things (IoT) device to an IoT device registrar server; interpreting the device property data received from the IoT device registrar server to determine whether there is a change in the device property data; if it is determined that there is a change in the device property data, generating a notification of the change; and transmitting the notification of the change to the IoT device registrar server.

Certain further aspects of the example method are described following, any one or more of which may be present in certain embodiments. The query is initiated by at least one of: the device, a user of the device, a seller of the device, a purchaser of the device, a manufacturer of the device, or the IoT device registrar server. The change is determined by analyzing historical device property data. The change is determined by monitoring a device property change flag. The change comprises a change in device hardware. The change comprises a change in a network. The change comprises a change in ownership of the device. The change comprises a security event. The determining that the device has reached end-of-life comprises receiving a user input indicating that the device has reached end-of-life. The determining that the device has reached end-of-life comprises receiving a security notification indicating a device decommissioning. The determining that the device has reached end-of-life comprises receiving a decommission notification indicating a device decommissioning. The method further including generating a quarantine value indicating that a device should be quarantined. The method further including generating a decommission value indicating that a device should be decommissioned. The method further including generating a security value indicating that a device may be subject to a security event. The method further including generating an ownership notification indicating that an ownership value corresponding to the device has changed. The method further including displaying the notification of the change via a display circuit. The notification of the change is displayed via a Single Pane of Glass (SPG) system. The SPG system comprises a graphical user interface. The graphical user interface is hosted by an IoT device registrar that includes the IoT device registrar server. The SPG system is included in a device management platform. The SPG system comprises an Application Programing Interface (API). The API is hosted by the IoT device registrar. The API is included in a device management platform.

An example method includes determining that a device has reached end-of-life; generating a query for Internet of Things Universal Identification (IoT UID) data corresponding to the device to an IoT device registrar server; interpreting IoT UID data received from the IoT device registrar server to identify a set of IoT UIDs corresponding to the device; identifying a first UID list including a first subset of the set of IoT UIDs to be reused; identifying a second UID list including a second subset of the set of IoT UIDs, different from the first subset, to be retired; and transmitting the first UID list and the second UID list to the IoT device registrar server.

Certain further aspects of the example method are described following, any one or more of which may be present in certain embodiments. Either of the first subset or the second subset of the set of IoT UIDs is an empty subset. The method further including storing the second UID list, including the second subset of the set of IoT UIDs to be retired in a global retired UID registry, in the IoT device registrar server. The determining that the device has reached end-of-life comprises receiving a user input indicating that the device has reached end-of-life. The determining that the device has reached end-of-life comprises receiving a security notification indicating a device decommissioning. The determining that the device has reached end-of-life comprises receiving a decommission notification indicating a device decommissioning.

An example apparatus includes a device retirement circuit structured to determine that a device has reached end-of-life; a query-generating circuit structured to generate a query for Internet of Things Universal Identification (IoT UID) data corresponding to the device to an IoT device registrar server; an IoT UID interpretation circuit structured to: interpret the IoT UID data received from the IoT device registrar server to identify a set of IoT UIDs corresponding to the device; identify a first UID list including a first subset of the set of IoT UIDs to be reused; and identify a second UID list including a second subset of the set of IoT UIDs, different from the first subset, to be retired; and a retirement reporting circuit structured to transmit the first UID list and the second UID list to the IoT device registrar server.

Certain further aspects of the example apparatus are described following, any one or more of which may be present in certain embodiments. Either of the first subset or the second subset of the set of IoT UIDs is an empty subset. The second UID list, including the second subset of the set of IoT UIDs to be retired in a global retired UID registry, is stored in the IoT device registrar server. The determining that the device has reached end-of-life comprises receiving a user input indicating that the device has reached end-of-life. The determining that the device has reached end-of-life comprises receiving a security notification indicating a device decommissioning. The determining that the device has reached end-of-life comprises receiving a decommission notification indicating a device decommissioning.

An example method includes interpreting, via a user input processing circuit, a user input identifying a device to be retired; generating a query for Internet of Things Universal Identification (IoT UID) data corresponding to the device to an IoT device registrar server; interpreting the IoT UID data received from the IoT device registrar server to identify a set of IoT UIDs corresponding to the device; identifying a first UID list including a first subset of the set of IoT UIDs to be reused; identifying a second UID list including a second subset of the set of IoT UIDs, different from the first subset, to be retired; transmitting the first UID list and the second UID list to the IoT device registrar server; interpreting, via the IoT device registrar server, the first UID list and the second UID list corresponding to the device; and displaying, via a display circuit, the first UID list and the second UID list corresponding to the device.

Certain further aspects of the example method are described following, any one or more of which may be present in certain embodiments. Either of the first subset or the second subset of the set of IoT UIDs is an empty subset. The method further including storing the second UID list, including the second subset of the set of IoT UIDs to be retired in a global retired UID registry, in the IoT device registrar server.

An example apparatus includes a user input processing circuit structured to interpret a user input identifying a device to be retired; a query-generating circuit structured to generate a query for Internet of Things Universal Identification (IoT UID) data corresponding to the device to an IoT device registrar server; an IoT UID interpretation circuit structured to: interpret the IoT UID data received from the IoT device registrar server to identify a set of IoT UIDs corresponding to the device; identify a first UID list including a first subset of the set of IoT UIDs to be reused; and identify a second UID list including a second subset of the set of IoT UIDs, different from the first subset, to be retired; a device end-of-life interpretation circuit at the IoT device registrar server structured to interpret the first UID list and the second UID list corresponding to the device; and a display circuit structured to display the first UID list and the second UID list corresponding to the device.

Certain further aspects of the example apparatus are described following, any one or more of which may be present in certain embodiments. Either of the first subset or the second subset of the set of IoT UIDs is an empty subset. The second UID list, including the second subset of the set of IoT UIDs to be retired in a global retired UID registry, is stored in the IoT device registrar server.

An example method includes interpreting, via an input processing circuit, a device property data update request for an Internet of Things (IoT) device; determining, via an IoT UID identification circuit, one or more Internet of Things Universal Identifications (IoT UIDs) corresponding to the IoT device, based at least in part on the device property data update request; generating, via a device lookup circuit, a query that includes the one or more IoT UIDs; retrieving, via the device lookup circuit, first device property data corresponding to the one or more IoT UIDs; transmitting, via a query provisioning circuit, the query to an IoT device registrar server; interpreting, via a device property processing circuit, the device property data generated by the IoT UID server in response to the query, the device property data being included in a device entry in the IoT UID server corresponding to the IoT device; generating, via the query provisioning circuit, a request to the device for second device property data; receiving, via the query provisioning circuit, the second device property data from the device in response to the request; transmitting, via the query provisioning circuit, the updated device property data to the IoT device registrar server in response to the request to at least one of: replace at least a portion of the first device property data with the second device property data in the device entry in the IoT device registrar server; or add the second device property data to the device entry in the IoT device registrar server; interpreting, via the device property processing circuit, a comparison between the device property data the updated device property data; and displaying, via a display circuit, a result of the comparison between the device property data the updated device property data.

An example apparatus includes an input processing circuit structured to interpret a device property data update request for an Internet of Things (IoT) device; an Internet of Things Universal Identification (IoT UID) identification circuit structured to determine one or more IoT UIDs corresponding to the IoT device, based at least in part on the device property data update request; a device lookup circuit structured to: generate a query that includes the one or more IoT UIDs; and retrieve first device property data corresponding to the one or more IoT UIDs; a query provisioning circuit structured to transmit the query to an IoT device registrar server; a device property processing circuit structured to interpret the first device property data generated by the IoT UID server in response to the query, the first device property data being included in a device entry in the IoT UID server corresponding to the IoT device, wherein the query provisioning circuit is further structured to: generate a first request to the device for second device property data, receive the second device property data from the device in response to the first request, and transmit the second device property data to the IoT device registrar server in response to a second request to at least one of: replace at least a portion of the first device property data with the second device property data in the device entry in the IoT device registrar server, or add the second device property data to the device entry in the IoT device registrar server, and wherein the device property processing circuit is further structured to interpret a comparison between the first device property data and the second device property data; and a display circuit structured to display a result of the comparison between the first device property data and the second device property data.

An example apparatus includes an event data processing circuit structured to interpret an Internet of Things Universal Identification (IoT UID) and corresponding device property data; an event detection circuit structured to determine, based at least in part on the device property data, an event corresponding to a device corresponding to the IoT UID; and a record management circuit structured to update a record corresponding to the IoT UID, based at least in part on the event.

Certain further aspects of the example apparatus are described following, any one or more of which may be present in certain embodiments. The event comprises determining that the device has reached end-of-life. The determining that the device has reached end-of-life comprises receiving a user input indicating that the device has reached end-of-life. The determining that the device has reached end-of-life comprises receiving a security notification indicating a device decommissioning. The determining that the device has reached end-of-life comprises receiving a decommission notification indicating a device decommissioning.

An example apparatus includes an Internet of Things Universal Identification (IoT UID) processing circuit structured to interpret an IoT UID corresponding to a device; a record management circuit structured to identify, based at least in part on the IoT UID, a record in a database, the record including device ownership data associated with the device; an ownership analysis circuit structured to interpret, based at least in part on the record, the device ownership data associated with the device; and an ownership provisioning circuit structured to transmit the device ownership data.

Certain further aspects of the example apparatus are described following, any one or more of which may be present in certain embodiments. The device ownership data comprises a record of one or more entities. The record of one or more entities comprises an historic record of one or more entities that have owned the device. The device ownership data comprises a record of historical ownership. The device comprises a plurality of modules, each module having corresponding ownership data. The apparatus further including an access restriction circuit structured to restrict access to information about the device from an owner of the device. The access restriction circuit is further structured to restrict access to information about a first owner of the device from a second owner of the device. The apparatus further including a display circuit structured to display the device ownership data for the device. The apparatus further including an ownership data update provisioning circuit structured to provide updated ownership data to replace the device ownership data associated with the device. The ownership data update provisioning circuit is further structured to provide updated ownership data for one or more modules of the device. The updated ownership data comprises a claim of ownership of the device. Events resulting in the updated ownership data include at least one of: creation of the device, sale of the device, decommissioning of the device, transfer of ownership of the device, or licensing of the device. The apparatus further including a security notification provisioning circuit structured to: compare the device ownership data to a record of authorized owners; and generate a security notification if the device ownership data is not included in the record of authorized owners. The database comprises a blockchain. The apparatus further including a device theft notification circuit structured to certify that the device is not a stolen device. The apparatus further including a device title certification circuit structured to certify that the device has a fully accountable chain of title. The apparatus further including a trust indicator provisioning circuit structured to provide a trust indicator for the device. The trust indicator comprises a numeric value. The trust indicator comprises an enumerated value. The trust indicator is displayed as a color-coded value. A value of the trust indicator is based at least in part on a location of the device. A value of the trust indicator is based at least in part on a time period. A value of the trust indicator is based at least in part on at least one of a software version or a firmware version of the device. Determining the trust indicator is based at least in part on artificial intelligence. The trust indicator is reflective of the device being a Greenfield device. The trust indicator is reflective of the device being a Brownfield device. The trust indicator is reflective of the device being a virtual device. The trust indicator is reflective of the device being a meta-device. The trust indicator is displayed as at least one of: at least one of: numeric based, color based, symbol based, alphanumeric based, letter based. The apparatus further including an asking price evaluation circuit structured to evaluate an asking price for the device based on at least one of: the device ownership data; a certification that the device is not a stolen device; or a certification that the device has a fully accountable chain of title. The asking price evaluation circuit is further structured to evaluate an asking price for a group of devices based on ownership data for each device. The apparatus further including a supply chain validation circuit structured to validate a supply chain. The validating the supply chain comprises determining whether modules of the device were sourced from authorized vendors. The validating the supply chain comprises determining whether modules of the device were sourced from fair trade certified sources. The apparatus further including a carbon rating provisioning circuit structured to provide a carbon rating of the device based on known ratings of sources of modules of the device, determined based on the device ownership data. The apparatus further including a device property detection circuit structured to detect a device property that indicates a change in ownership data. The device property comprises a location of the device.

An example method includes interpreting, via an Internet of Things Universal Identification (IoT UID) processing circuit, an IoT UID corresponding to a device; identifying, via a record management circuit and based at least in part on the IoT UID, a record in a database, the record including device ownership data associated with the device; interpreting, via an ownership analysis circuit and based at least in part on the record, the device ownership data; and transmitting, via an ownership provisioning circuit, the device ownership data.

Certain further aspects of the example method are described following, any one or more of which may be present in certain embodiments. The device ownership data comprises a record of one or more entities. The record of one or more entities comprises an historic record of one or more entities that have owned the device. The device ownership data comprises a record of historical ownership. The device comprises a plurality of modules, each module having corresponding ownership data. The method further including restricting access to information about the device from an owner of the device. The method further including restricting access to information about a first owner of the device from a second owner of the device. The method further including displaying the device ownership data for the device. The method further including providing updated ownership data to replace the device ownership data associated with the device. The method further including providing updated ownership data for one or more modules of the device. The updated ownership data comprises a claim of ownership of the device. Events resulting in the updated ownership data include at least one of: creation of the device, sale of the device, decommissioning of the device, transfer of ownership of the device, or licensing of the device. The method further including comparing the device ownership data to a record of authorized owners; and generating a security notification if the device ownership data is not included in the record of authorized owners. The database comprises a blockchain. The method further including certifying that the device is not a stolen device. The method further including certifying that the device has a fully accountable chain of title. The method further including providing a trust indicator for the device. The trust indicator comprises a numeric value. The trust indicator comprises an enumerated value. The trust indicator is displayed as a color-coded value. A value of the trust indicator is based at least in part on a location of the device. A value of the trust indicator is based at least in part on a time period. A value of the trust indicator is based at least in part on at least one of a software version or a firmware version of the device. Determining the trust indicator is based at least in part on artificial intelligence. The trust indicator is reflective of the device being a Greenfield device. The trust indicator is reflective of the device being a Brownfield device. The trust indicator is reflective of the device being a Greenfield device. The trust indicator is reflective of the device being a Brownfield device. The trust indicator is displayed as at least one of: numeric based, color based, symbol based, alpha-numeric based, or letter based. The method further including evaluating an asking price for the device based on at least one of: the device ownership data; a certification that the device is not a stolen device; or a certification that the device has a fully accountable chain of title. The method further including evaluating an asking price for a group of devices based on ownership data for each device. The method further including validating a supply chain. The validating the supply chain comprises determining whether modules of the device were sourced from authorized vendors. The validating the supply chain comprises determining whether modules of the device were sourced from fair trade certified sources. The method further including providing a carbon rating of the device based on known ratings of sources of modules of the device, determined based on the device ownership data. The method further including detecting a device property that indicates a change in ownership data. The device property comprises a location of the device. The method further including interpreting a device event message and updating a record in an IoT device registry based at least in part on the device event message.

An example system includes a database structured to store records associating Internet of Things Universal Identifications (IoT UIDs) with device ownership data; and a server structured to: communicate with the database interpret an IoT UID corresponding to a device; identify, based at least in part on the IoT UID corresponding to the device, a record in the database, the record including the device ownership data associated with the device; interpret, based at least in part on the record, the device ownership data; and transmit the device ownership data.

Certain further aspects of the example system are described following, any one or more of which may be present in certain embodiments. The device ownership data comprises a record of historical ownership. The device comprises a plurality of modules, each module having corresponding ownership data. The server is further structured to restrict access to information about the device from an owner of the device. The server is further structured to provide updated ownership data to replace the device ownership data associated with the device.

An example method includes interpreting, via an input processing circuit, user input identifying a device ownership query for a device; generating, via a query provisioning circuit, a query for an Internet of Things Universal Identification (IoT UID), corresponding to the device, to an IoT device registrar server; identifying, via a record management circuit and based at least in part on the IoT UID, a record in a database at the IoT device registrar server, the record including device ownership data associated with the device; interpreting, via an ownership analysis circuit and based at least in part on the record, the device ownership data; and transmitting, via an ownership provisioning circuit, the device ownership data to a user.

Certain further aspects of the example method are described following, any one or more of which may be present in certain embodiments. The device ownership data comprises a record of historical ownership. The device comprises a plurality of modules, each module having corresponding ownership data. The method further including restricting access to information about the device from an owner of the device. The method further including providing updated ownership data to replace the device ownership data associated with the device.

An example apparatus includes an input processing circuit structured to interpret user input identifying a device ownership query for a device; a query provisioning circuit structured to generate a query for an Internet of Things Universal Identification (IoT UID) corresponding to the device to an IoT device registrar server; a record management circuit structured to identify, based at least in part on the IoT UID, a record in a database at the IoT device registrar server, the record including device ownership data associated with the device; an ownership analysis circuit structured to interpret, based at least in part on the record, the device ownership data; and an ownership provisioning circuit structured to transmit the device ownership data to a user.

Certain further aspects of the example method are described following, any one or more of which may be present in certain embodiments. The device ownership data comprises a record of historical ownership. The device comprises a plurality of modules, each module having corresponding ownership data. The apparatus further including an access restriction circuit structured to restrict access to information about the device from an owner of the device. The apparatus further including an ownership data update provisioning circuit structured to provide updated ownership data to replace the device ownership data associated with the device.

An example system includes an input processing circuit structured to interpret user input identifying a device ownership query for a device; a query provisioning circuit structured to generate a query for an Internet of Things Universal Identification (IoT UID) corresponding to the device; a database structured to store records associating IoT UIDs with device ownership data; and a server structured to: communicate with the database; interpret the query corresponding to the device; identify an IoT UID associated with the device; identify, based at least in part on the IoT UID associated with the device, a record in the database, the record including the device ownership data associated with the device; interpret, based at least in part on the record, the device ownership data; and transmit the device ownership data.

Certain further aspects of the example system are described following, any one or more of which may be present in certain embodiments. The device ownership data comprises a record of historical ownership. The device comprises a plurality of modules, each module having corresponding ownership data. The server is further structured to restrict access to information about the device from an owner of the device. The server is further structured to provide updated ownership data to the database to replace the device ownership data associated with the device.

An example method includes interpreting, via an Internet of Things Universal Identifier (IoT UID) processing circuit, an IoT UID corresponding to a device; identifying, via a record management circuit and based at least in part on the IoT UID, a record in a database corresponding to the device; determining, via a trust analysis circuit and based at least in part on the record, a risk indicator of the device; and transmitting, via an indicator provisioning circuit, the risk indicator.

Certain further aspects of the example method are described following, any one or more of which may be present in certain embodiments. The risk indicator is a numeric value. The risk indicator is an enumerated value. The risk indicator is displayed as a color-coded value. The risk indicator is based at least in part on at least one of a location of the device, a time period, a software, or firmware version of the device. The risk indicator is based at least in part on artificial intelligence. The risk indicator is reflective of the device being a Greenfield device or a Brownfield device. The method further including authorizing an interaction with the device based at least in part on the risk indicator. The method further including prohibiting an interaction with the device based at least in part on the risk indicator. The interaction is an exchange of data with the device or is establishing a network connection with the device. The method further including adjusting the risk indicator based on an event of the device, wherein the event is at least one of a transfer of ownership, patching of the device, or an updating of a software and/or a firmware of the device. The method further including interpreting a device event message and updating a record in an IoT device registry based at least in part on the device event message.

An example apparatus includes an Internet of Things Universal Identifier (IoT UID) processing circuit structured to interpret an IoT UID corresponding to a device; a record management circuit structured to identify, based at least in part on the IoT UID, a record in a database corresponding to the device; a trust analysis circuit structured to determine, based at least in part on the record, a risk indicator of the device; and an indicator provisioning circuit structured to transmit the risk indicator.

Certain further aspects of the example apparatus are described following, any one or more of which may be present in certain embodiments. The risk indicator is a numeric value. The risk indicator is an enumerated value. The risk indicator is displayed as a color-coded value. The risk indicator is based at least in part on at least one of a location of the device, a time period, a software, or firmware version of the device. The risk indicator is based at least in part on artificial intelligence. The risk indicator is reflective of the device being a Greenfield device or a Brownfield device. The apparatus further including a trust indicator processing circuit structured to authorize an interaction with the device based at least in part on the risk indicator. The apparatus further including a trust indicator processing circuit structured to prohibit an interaction with the device based at least in part on the risk indicator. The apparatus wherein the interaction is an exchange of data with the device or is establishing a network connection with the device. The apparatus wherein the trust analysis circuit is further structured to adjust the risk indicator based on an event of the device, wherein the event is at least one of a transfer of ownership, patching of the device, or an updating of a software and/or a firmware of the device.

An example method includes interpreting, via an Internet of Things Universal Identifier (IoT UID) processing circuit, an IoT UID corresponding to a device; generating, via a trust verification circuit, a trust indicator request value that includes the IoT UID corresponding to the device; transmitting, via a trust indicator request provisioning circuit, the trust indicator request value to an IoT device registrar server; and interpreting, via a trust indicator processing circuit, a trust indicator generated by the IoT device registrar server in response to the trust indicator request value.

Certain further aspects of the example method are described following, any one or more of which may be present in certain embodiments. The trust indicator is based at least in part on at least one of a location of the device, a time period, a software, or firmware version of the device. The method further including authorizing an interaction with the device based at least in part on the trust indicator. The method further including prohibiting an interaction with the device based at least in part on the trust indicator. The trust indicator request further comprises contextual data and wherein the trust indicator is based on the contextual data. The contextual data comprises at least one of a location, a time, or an operation for execution by the device.

An example apparatus includes an Internet of Things Universal Identifier (IoT UID) processing circuit structured to interpret an IoT UID corresponding to a device; a trust verification circuit structured to generate a trust indicator request value that includes the IoT UID corresponding to the device; a trust indicator request provisioning circuit structured to transmit the trust indicator request value to an IoT device registrar server; and a trust indicator processing circuit structured to interpret a trust indicator generated by the IoT device registrar server in response to the trust indicator request value.

Certain further aspects of the example apparatus are described following, any one or more of which may be present in certain embodiments. The trust indicator is based at least in part on at least one of a location of the device, a time period, a software, or firmware version of the device. The trust indicator processing circuit is further configured to authorize an interaction with the device based at least in part on the trust indicator. The trust indicator processing circuit is further configured to prohibit an interaction with the device based at least in part on the trust indicator. The trust indicator request further comprises contextual data and wherein the trust indicator is based on the contextual data. The contextual data comprises at least one of a location, a time, or an operation for execution by the device.

An example system includes at least one processor; an electronic display; and a memory device storing an application that adapts the at least one processor to: interpret an Internet of Things Universal Identifier (IoT UID) corresponding to a device; transmit the IoT UID; interpret at least one of a risk indicator or a trust indicator transmitted in response to transmission of the IoT UID by the at least one processor; and display the at least one of the risk indicator or the trust indicator on the electronic display.

Certain further aspects of the example system are described following, any one or more of which may be present in certain embodiments. The application further adapts the at least one processor to prohibit an interaction with the device corresponding to the IoT UID based at least in part on the at least one of the risk indicator or the trust indicator. The application further adapts the at least one processor to authorize an interaction with the device corresponding to the IoT UID based at least in part on the at least one of the risk indicator or the trust indicator. The at least one processor transmits the IoT UID corresponds to a unique combination of properties of the device. The device is registered with an IoT device registrar.

An example method includes interpreting, via an Internet of Things (IoT) Universal Identification (UID) processing circuit, an IoT UID corresponding to a device in a metaverse; identifying, via a record management circuit and based at least in part on the IoT UID, a record in a database corresponding to the device in the metaverse; determining, via a trust analysis circuit and based at least in part on the record, a trust indicator of the device in the metaverse; and transmitting, via a trust indicator provisioning circuit, the trust indicator.

Certain further aspects of the example method are described following, any one or more of which may be present in certain embodiments. The device in the metaverse is at least one of a server; a user; an avatar; an area; or an object. The device in the metaverse is at least one of a virtual device; a real-world device; or a meta-device. The device in the metaverse is an area of the metaverse. The area in the metaverse is a room in the metaverse. The trust indicator is at least one of a numeric value; or an enumerated value. The trust indicator is displayed as a color-coded value. The trust indicator comprises one or more of a trust level; a trust score; or a trust rating. The trust indicator is based at least in part on one of a location of the device; a time period; a software and/or firmware version of the device; a trust indicator of a device associated with the device; or a trust indicator of a user associated with of the device. The trust indicator is based at least in part on artificial intelligence. The trust indicator is reflective of the device being at least one of a Greenfield device; or a Brownfield device. The method further including displaying the trust indicator. The method further including authorizing an interaction with the device based at least in part on the trust indicator. The method further including prohibiting an interaction with the device based at least in part on the trust indicator. The interaction is an exchange of data with the device. The interaction is establishing a network connection with the device. The method further including adjusting the trust indicator based on an event of the device. The event is a transfer of ownership. The event is a patching of the device. The event is an updating at least one of software or firmware of the device. The method further including a parental control software agent. The method further including providing the trust indicator to a user before the user enters an area of the metaverse containing the device. Providing the trust indicator to a user before the user enters the area of the metaverse is based at least in part on a trust indicator of the area of the metaverse. The area of the metaverse contains a plurality of devices. The trust indicator of the area in the metaverse is based at least in part on a combination of trust indicators of the plurality of devices in the area. The trust indicator of the device is based at least in part on a combination of trust indicators of a plurality of modules associated with the device. The method further including updating the trust indicator based on an interaction with the device. The method further including interpreting a device event message and updating a record in an IoT device registry based at least in part on the device event message.

An example apparatus includes an Internet of Things (IoT) Universal Identification (UID) processing circuit structured to interpret an IoT UID corresponding to a device in a metaverse; a record management circuit structured to identify, based at least in part on the IoT UID, a record in a database corresponding to the device in the metaverse; a trust analysis circuit structured to determine, based at least in part on the record, a trust indicator of the device in the metaverse; and a trust indicator provisioning circuit structured to transmit the trust indicator.

Certain further aspects of the example method are described following, any one or more of which may be present in certain embodiments. The device in the metaverse is at least one of a server; a user; an avatar; an area; or an object. The trust indicator is displayed as a color-coded value. The trust indicator comprises one or more of a trust level; a trust score; or a trust rating. The trust indicator is based at least in part on one of a location of the device; a time period; a software and/or firmware version of the device; a trust indicator of a device associated with the device; or a trust indicator of a user associated with of the device. The trust indicator is reflective of the device being at least one of a Greenfield device; or Brownfield device. The apparatus further including displaying the trust indicator. The apparatus further including prohibiting an interaction with the device based at least in part on the trust indicator. The apparatus further including adjusting the trust indicator based on an event of the device. The apparatus further including providing the trust indicator to a user before the user enters an area of the metaverse containing the device. The apparatus of further including updating the trust indicator based on an interaction with the device.

An example method includes interpreting, via an Internet of Things (IoT) Universal Identification (UID) processing circuit, an IoT UID corresponding to a device in a metaverse; generating, via a trust verification circuit, a trust indicator request value that includes the IoT UID corresponding to the device in the metaverse; transmitting, via a trust indicator request provisioning circuit, a trust indicator request to an IoT device registrar server; and interpreting, via a trust indicator processing circuit, a trust indicator generated by the IoT device registrar server in response to the trust indicator request.

Certain further aspects of the example method are described following, any one or more of which may be present in certain embodiments. The device in the metaverse is at least one of a server; a user; an avatar; or an object. The trust indicator is displayed as a color-coded value. The trust indicator comprises one or more of a trust level; a trust score; or a trust rating. The trust indicator is based at least in part on one of a location of the device; a time period; a software and/or firmware version of the device; a trust indicator of a device associated with the device; or a trust indicator of a user associated with of the device. The trust indicator is reflective of the device being at least one of a Greenfield device; or a Brownfield device. The method further including displaying the trust indicator. The method further including prohibiting an interaction with the device based at least in part on the trust indicator. The method further including adjusting the trust indicator based on an event of the device. The method further including providing the trust indicator to a user before the user enters an area of the metaverse containing the device. The method further including updating the trust indicator based on an interaction with the device.

An example apparatus includes an Internet of Things (IoT) Universal Identification (UID) processing circuit structured to interpret an IoT UID corresponding to a device in a metaverse; a trust verification circuit structured to generate a trust indicator request value that includes the IoT UID corresponding to the device in the metaverse; a trust indicator request provisioning circuit structured to transmit a trust indicator request to an IoT device registrar server; and a trust indicator processing circuit structured to interpret a trust indicator generated by the IoT device registrar server in response to the trust indicator request.

Certain further aspects of the example apparatus are described following, any one or more of which may be present in certain embodiments. The device in the metaverse is at least one of a server; a user; an avatar; or an object. The trust indicator is displayed as a color-coded value. The trust indicator comprises one or more of a trust level; a trust score; or a trust rating. The trust indicator is based at least in part on one of a location of the device; a time period; a software and/or firmware version of the device; a trust indicator of a device associated with the device; or a trust indicator of a user associated with of the device. The trust indicator is reflective of the device being at least one of a Greenfield device; or a Brownfield device. The apparatus further including displaying the trust indicator. The apparatus further including prohibiting an interaction with the device based at least in part on the trust indicator. The apparatus further including adjusting the trust indicator based on an event of the device. The apparatus further including providing the trust indicator to a user before the user enters an area of the metaverse containing the device. The apparatus further including updating the trust indicator based on an interaction with the device.

An example method includes interpreting, via an Internet of Things (IoT) Universal Identification (UID) processing circuit, an IoT UID corresponding to a device in an augmented reality (AR); identifying, via a record management circuit and based at least in part on the IoT UID, a record in a database corresponding to the device in the AR; determining, via a trust analysis circuit and based at least in part on the record, a trust indicator of the device in the AR; and transmitting, via a trust indicator provisioning circuit, the trust indicator.

Certain further aspects of the example method are described following, any one or more of which may be present in certain embodiments. The device in the AR is at least one of an IoT device; a server; a user; or an avatar. The device in the AR corresponds to an area of a metaverse. The area in the metaverse is a room in the metaverse. The device in the AR is an object. The object is at least one of a virtual device; a real-world device; or a meta-device. The device in the AR is a real-world device. The trust indicator is at least one of a numeric value; or an enumerated value. The trust indicator comprises one or more of a trust level; a trust score; or a trust rating. The method, further including displaying the trust indicator in association with a real-world device. The method further including displaying the trust indicator overlaid on a real-world device. The trust indicator is displayed via an AR device. The AR device is one or more of an AR headset; AR contact lenses; AR glasses, or AR goggles. The trust indicator is displayed as a color-coded value. The trust indicator is based at least in part on one of a location of the device; a time period; a software and/or firmware version of the device; a trust indicator of a device associated with the device; or a trust indicator of a user associated with of the device. Determining the trust indicator is based at least in part on artificial intelligence. The trust indicator is reflective of the device being at least one of a Greenfield device; or a Brownfield device. The method further including displaying the trust indicator. The method further including authorizing an interaction with the device based at least in part on the trust indicator. The method further including prohibiting an interaction with the device based at least in part on the trust indicator. The interaction is an exchange of data with a device. The interaction is an exchange of data with a device. The interaction is establishing a network connection with the device. The method further including adjusting the trust indicator based on an event of the device. The event is a transfer of ownership. The event is a patching of the device. The event is an updating at least one of software or firmware of the device. The method further including a parental control software agent. The method further including providing the trust indicator to a user interacts with the device. A trust indicator of a device in the AR is based at least in part on a combination of trust indicators of a plurality of entities in the AR. The method further including providing the trust indicator of the device to a user before the user enters an area of a metaverse containing the device. A trust indicator of the device is based at least in part on a combination of trust indicators of a plurality of modules associated with the device. The method further including updating the trust indicator based on an interaction with the device. The method further including interpreting a device event message and updating a record in an IoT device registry based at least in part on the device event message.

An example apparatus includes an Internet of Things (IoT) Universal Identification (UID) processing circuit structured to interpret an IoT UID corresponding to a device in an augmented reality (AR); a record management circuit structured to identify, based at least in part on the IoT UID, a record in a database corresponding to the device in the AR; a trust analysis circuit structured to determine, based at least in part on the record, a trust indicator of the device in the AR; and a trust indicator provisioning circuit structured to transmit the trust indicator.

Certain further aspects of the example apparatus are described following, any one or more of which may be present in certain embodiments. The device in the AR is at least one of an IoT device; a server; a user; or an avatar. The device in the AR corresponds to an area of a metaverse. The apparatus further including displaying the trust indicator in association with a real-world device or overlaid on the real-world device. The trust indicator is displayed via an AR device, wherein the AR device is one or more of an AR headset; AR contact lenses; AR glasses, or AR goggles. The trust indicator is displayed as a color-coded value. The trust indicator is based at least in part on one of a location of the device; a time period; a software and/or firmware version of the device; a trust indicator of a device associated with the device; or a trust indicator of a user associated with of the device. The apparatus further including authorizing an interaction with the device based at least in part on the trust indicator. The apparatus further including prohibiting an interaction with the device based at least in part on the trust indicator. The apparatus further including adjusting the trust indicator based on an event of the device. The apparatus further including a parental control software agent. A trust indicator of a device in the AR is based at least in part on a combination of trust indicators of a plurality of devices in the AR. The apparatus further including providing the trust indicator of the device to a user before the user enters an area of a metaverse containing the device.

An example method includes interpreting, via an Internet of Things (IoT) Universal Identification (UID) processing circuit, an IoT UID corresponding to a device in an augmented reality (AR); generating, via a trust verification circuit, a trust indicator request value that includes the IoT UID corresponding to the device in the AR; transmitting, via a trust indicator request provisioning circuit, a trust indicator request to an IoT device registrar server; and interpreting, via a trust indicator processing circuit, a trust indicator generated by the IoT device registrar server in response to the trust indicator request.

Certain further aspects of the example method are described following, any one or more of which may be present in certain embodiments. The device in the AR is at least one of an IoT device; a server; a user; or an avatar. The device in the AR corresponds to an area of a metaverse. The method further including displaying the trust indicator in association with a real-world device or overlaid on the real-world device. The trust indicator is displayed via an AR device, wherein the AR device is one or more of an AR headset; AR contact lenses; AR glasses, or AR goggles. The trust indicator is displayed as a color-coded value. The trust indicator is based at least in part on one of a location of the device; a time period; a software and/or firmware version of the device; a trust indicator of a device associated with the device; or a trust indicator of a user associated with of the device. The method further including authorizing an interaction with the device based at least in part on the trust indicator. The method further including prohibiting an interaction with the device based at least in part on the trust indicator. The method further including adjusting the trust indicator based on an event of the device. The method further including a parental control software agent. The method wherein a trust indicator of a device in the AR is based at least in part on a combination of trust indicators of a plurality of devices in the AR. The method further including providing the trust indicator of the device to a user before the user enters an area of a metaverse containing the device.

An example apparatus includes an Internet of Things (IoT) Universal Identification (UID) processing circuit structured to interpret an IoT UID corresponding to a device in an augmented reality (AR); a trust verification circuit structured to generate a trust indicator request value that includes the IoT UID corresponding to the device in the AR; a trust indicator request provisioning circuit structured to transmit a trust indicator request to an IoT device registrar server; and a trust indicator processing circuit structured to interpret a trust indicator generated by the IoT device registrar server in response to the trust indicator request.

Certain further aspects of the example apparatus are described following, any one or more of which may be present in certain embodiments. The device in the AR is at least one of an IoT device; a server; a user; or an avatar. The device in the AR corresponds to an area of a metaverse. The apparatus further including displaying the trust indicator in association with a real-world device or overlaid on the real-world device. The trust indicator is displayed via an AR device, wherein the AR device is one or more of an AR headset; AR contact lenses; AR glasses, or AR goggles. The trust indicator is displayed as a color-coded value. The trust indicator is based at least in part on one of a location of the device; a time period; a software and/or firmware version of the device; a trust indicator of a device associated with the device; or a trust indicator of a user associated with of the device. The apparatus further including authorizing an interaction with the device based at least in part on the trust indicator. The apparatus further including prohibiting an interaction with the device based at least in part on the trust indicator. The apparatus further including adjusting the trust indicator based on an event of the device. The apparatus further including a parental control software agent. The apparatus wherein a trust indicator of a device in the AR is based at least in part on a combination of trust indicators of a plurality of entities in the AR. The apparatus further including providing the trust indicator of the device to a user before the user enters an area of a metaverse containing the device.

An example method includes monitoring, via at least one processor, one or more records in an internet of things (IoT) device registry for changes in device property data corresponding to one or more devices, each corresponding to one of the one or more records; detecting, via the at least one processor, a change in the device property data of at least one record; determining, via the at least one processor, that the change corresponds to a security vulnerability; generating, via at least one processor and responsive to the determined security vulnerability, a message that identifies a device corresponding to the change in the device property data; and transmitting, via the at least one processor, the message.

Certain further aspects of the example method are described following, any one or more of which may be present in certain embodiments. The method further including displaying the message. The method further including logging the change in a database. The method further including receiving the message at a device management platform and at least one of quarantining or patching the device. The message is an alert. The method further including adjusting a trust indicator based at least in part on the change. The trust indicator is at least one of a trust score, a rating, or a level value. The adjusting is an increase when the change corresponds to a patching or an updating of software and/or firmware of the device. The adjusting is a decrease when the change corresponds to a vulnerability. The change corresponds to an addition of a new module into the device. The new module is an input/output device. The input/output device is a network interface device. The input/output device is a media device. The change corresponds to a change in ownership of the device. The change is a location of the device. The security vulnerability is based on a software and/or firmware of the device. The security vulnerability is based on a hardware version of the device. The method further including accessing a security vulnerabilities database to pull security vulnerability signatures to determine if a registered device is affected. The method further including interpreting a device event message and updating a record in an IoT device registry based at least in part on the device event message.

An example method includes at a first time, interpreting, via a device property data processing circuit, device property data corresponding to a device registered with an IoT device registry; at a second time, interpreting, via the device property data processing circuit, the device property data corresponding to the device registered with the IoT device registry; detecting, via a change detection circuit, a change in the device property data between the first time and the second time; generating, via an alert circuit and responsive to detecting the change, a message that identifies the device corresponding to the device property data; and transmitting, via an alert provisioning circuit, the message.

Certain further aspects of the example method are described following, any one or more of which may be present in certain embodiments. The method further including displaying the message. The method further including receiving the message at a device management platform and at least one of quarantining or patching the device. The method further including adjusting a trust indicator based at least in part on the change. The method wherein the change corresponds to an addition of a new module into the device. The method wherein the change corresponds to a change in ownership of the device. The method wherein the change is a location of the device.

An example apparatus includes a device property data processing circuit structured to: at a first time, interpret, device property data corresponding to a device registered with an IoT device registry; and at a second time, interpret, the device property data corresponding to the device registered with the IoT device registry; a change detection circuit structured to detect a change in the device property data between the first time and the second time; an alert circuit structured to generate, responsive to the detected change, a message that identifies the device corresponding to the device property data; and an alert provisioning circuit structured to transmit the message.

Certain further aspects of the example apparatus are described following, any one or more of which may be present in certain embodiments. The apparatus further including the device property data processing circuit structured to display the message. The apparatus further including the device property data processing circuit structured to receive the message at a device management platform and at least one of quarantining or patching the device. The apparatus further including the device property data processing circuit structured to adjust a trust indicator based at least in part on the change. The change corresponds to an addition of a new module into the device. The change corresponds to a change in ownership of the device. The change is a location of the device.

An example system includes a device management platform structured to manage one or more devices registered with an IoT device registry; and a sentry device structured to: monitor the IoT device registry for changes in property data corresponding to the registered one or more devices; detect a change in the property data for at least one of the one or more devices; determine that the detected change corresponds to a security vulnerability; generate, responsive to the determined security vulnerability, a message that identifies the at least one device of the one or more devices; and transmit the message to the device management platform, wherein the device management platform is further structured to: interpret the message transmitted by the sentry device; and at least one of: quarantine the at least one device; or patch the at least one device.

Certain further aspects of the example system are described following, any one or more of which may be present in certain embodiments. The system further including the sentry device structured to display the message. The system further including the sentry device structured to receive the message at a device management platform and at least one of quarantining or patching the one or more devices. The system further including the sentry device structured to adjust a trust indicator based at least in part on the change. The change corresponds to an addition of a new module into the one or more devices. The change corresponds to a change in ownership of the one or more devices. The change is a location of the one or more devices.

An example method includes interpreting, via a device property data processing circuit, device property data corresponding to a device registered with an IoT device registry; detecting, via a security analysis circuit, based at least in part on the device property data, that the device is subject to a security vulnerability; generating, responsive to the detected security vulnerability, via an alert circuit, a message that identifies the device; and transmitting, via an alert provisioning circuit, the message.

Certain further aspects of the example method are described following, any one or more of which may be present in certain embodiments. The method further including displaying the message. The method further including receiving the message at a device management platform and at least one of quarantining or patching the device.

An example apparatus includes a device property data processing circuit structured to interpret device property data corresponding to a device registered with an IoT device registry; a security analysis circuit structured to determine, based at least in part on the device property data, that the device is subject to a security vulnerability; an alert circuit structured to generate, responsive to the determined security vulnerability, a message that identifies the device; and an alert provisioning circuit structured to transmit the message.

Certain further aspects of the example apparatus are described following, any one or more of which may be present in certain embodiments. The device property data processing circuit further structured to display the message. The device property data processing circuit further structured to receive the message at a device management platform and at least one of quarantining or patching the device.

An example apparatus includes a device property data processing circuit structured to interpret device property data corresponding to one or more devices registered with an Internet of Things (IoT) device registry; an outage detection circuit structured to detect an outage pattern in the device property data, the outage pattern corresponding to an outage of the one or more devices; an alert circuit structured to, responsive to the outage pattern, generate an alert message that identifies the one or more devices; and an alert provisioning circuit structured to transmit the alert message.

Certain further aspects of the example apparatus are described following, any one or more of which may be present in certain embodiments. The outage detection circuit comprises an artificial intelligence circuit structured to detect the outage pattern, based at least in part on analyzing the device property data using an artificial intelligence process. The artificial intelligence process includes a neural network. The neural network is trained on detecting correlations between outage patterns and at least one of a weather event; a cyber-attack; a device failure event; device ownership; a device manufacturer; a location; or a network outage. The artificial intelligence process is based at least in part on a deep learning network. The apparatus further including a visualization circuit structured to generate and transmit outage visualization data configured to depict a visualization of the outage on an electronic display. The visualization is a map. The visualization is a chart depicting an amount of the one or more devices affected by the outage. The alert provisioning circuit is structured to transmit the alert message to at least one of a device management platform corresponding to the one or more devices; a user of the one or more devices; a manufacturer of the one or more devices; or an entity that monitors the one or more devices. The outage detection circuit forms part of a device management platform. The outage detection circuit forms part of the IoT device registry.

An example method includes interpreting, via a device property data processing circuit, device property data corresponding to one or more devices registered with an Internet of Things (IoT) device registry; detecting, via an outage detection circuit, an outage pattern in the device property data, the outage pattern corresponding to an outage of the one or more devices; responsive to the outage pattern, generating, via an alert circuit, an alert message that identifies the one or more devices; and transmitting, via an alert provisioning circuit, the alert message.

Certain further aspects of the example method are described following, any one or more of which may be present in certain embodiments. The detecting, via the outage detection circuit, an outage pattern in the device property data, the outage pattern corresponding to an outage of the one or more devices comprises detecting the outage pattern via analyzing the device property data with an artificial intelligence circuit that uses an artificial intelligence process. The artificial intelligence process includes a neural network. The neural network is trained on detecting correlations between outage patterns and at least one of a weather event; a cyber-attack; a device failure event; device ownership; a device manufacturer; a location; or a network outage. The method further including generating, via a visualization circuit, visualization data configured to depict a visualization of the outage on an electronic display; and transmitting, via the visualization circuit, the visualization data. The visualization is a map. The visualization is a chart depicting an amount of the one or more devices affected by the outage. The method further including interpreting the visualization data; and displaying, via the electronic display, the visualization of the outage. The method further including interpreting a device event message and updating a record in an IoT device registry based at least in part on the device event message.

An example non-transitory computer-readable medium includes instructions to interpret device property data corresponding to one or more devices registered with an Internet of Things (IoT) device registry; detect an outage pattern in the device property data, the outage pattern corresponding to an outage of the one or more devices; responsive to the outage pattern, generate an alert message that identifies the one or more devices; and transmit the alert message.

Certain further aspects of the example non-transitory computer-readable medium are described following, any one or more of which may be present in certain embodiments. The stored instructions further adapt the at least one processor to detect the outage pattern via an artificial intelligence process. The outage pattern is detected based at least in part on one of a weather event; a cyber-attack; a device failure event; device ownership; a device manufacturer; a location; or a network outage.

An example method includes collecting a data set including: one or more outage patterns; and device property data; creating a first training set including one or more portions of the device property data that correspond to the one or more outage patterns; creating a second training set including one or more portions of the device property data that incorrectly identify the one or more outage patterns; training the AI on the first training set; and training the AI on the second training set.

Certain further aspects of the example method are described following, any one or more of which may be present in certain embodiments. At least one of the first training set and the second training set is based at least in part on at least one of a weather event; a cyber-attack; a device failure event; device ownership; a device manufacturer; a location; or a network outage.

An example apparatus includes a device property data processing circuit structured to interpret device property data corresponding to a device registered with an Internet of Things (IoT) device registry; a security analysis circuit structured to determine, based at least in part on the device property data, that the device is subject to a fraud event; an alert circuit structured to generate, responsive to the determined fraud event, a message that identifies the device; and an alert provisioning circuit structured to transmit the message.

Certain further aspects of the example apparatus are described following, any one or more of which may be present in certain embodiments. The security analysis circuit comprises an artificial intelligence circuit structured to detect the fraud event, based at least in part on analyzing the device property data using an artificial intelligence process. The artificial intelligence process includes a neural network. The neural network is trained on detecting correlations between the fraud event and at least one of a cyber-attack; a software version; a firmware version; a hardware version; an unauthorized access; a device failure event; device ownership; a device manufacturer; a location; or a network outage. The artificial intelligence process is based at least in part on a deep learning network. The apparatus further including a visualization circuit structured to generate and transmit fraud event visualization data configured to depict a visualization of the fraud event on an electronic display. The visualization is a map. The visualization is a chart depicting at least one of the device affected by the fraud event. The alert provisioning circuit is further structured to transmit the message to at least one of a device management platform corresponding to the device; a user of the device; a manufacturer of the device; or an entity that monitors the device. The security analysis circuit forms part of a device management platform. The security analysis circuit forms part of the IoT device registry. The apparatus further including a display circuit structured to display the message. The apparatus further including a fraud event log circuit structured to log the fraud event in a database. The apparatus further including a device management platform structured to interpret the message transmitted by the alert provisioning circuit; and at least one of quarantine the at least one device; disable the at least one device; disable at least part of the device; disable at least some functionality of the device; send an alert to the device; send an alert to an entity associated with the device; or patch the at least one device. The apparatus further including a trust indicator provisioning circuit structured to provide a trust indicator for the device, based at least in part on the determined fraud event. The trust indicator comprises at least one of: a numeric value, an alphabetic value, or an alphanumeric value. The trust indicator comprises an enumerated value. The trust indicator is displayed as a color-coded value. A value of the trust indicator is based at least in part on a location of the device. A value of the trust indicator is based at least in part on a time period. A value of the trust indicator is based at least in part on at least one of a software version or a firmware version of the device. Determining the trust indicator is based at least in part on artificial intelligence. The trust indicator is reflective of the device being a Greenfield device. The trust indicator is reflective of the device being a Brownfield device. The trust indicator is reflective of the device being a virtual device. The trust indicator is reflective of the device being a meta-device. The trust indicator is displayed as at least one of: numeric based, color based, symbol based, alphanumeric based, or letter based. The trust indicator provisioning circuit is further structured to adjust a value of the trust indicator is adjusted based at least in part on the determined fraud event. The adjustment is an increase when the determined fraud event corresponds to at least one of a patching or an updating of at least one of software or firmware of the device. The adjustment is a decrease when the determined fraud event corresponds to a cyber-attack. The determined fraud event corresponds to an addition of a new module into the device. The new module is at least one of an input device or an output device. The at least one of the input device or the output device is a network interface device. The at least one of the input device or the output device is a media device. The determined fraud event corresponds to a change in ownership of the device. The determined fraud event is based on detecting a change in a location of the device. The determined fraud event is based on detecting a change in at least one of a software version or a firmware version of the device. The determined fraud event is based on detecting a change in a hardware version of the device. The security analysis circuit is further structured to access a fraud event database to interpret fraud event signatures to determine that the device is subject to the fraud event. The apparatus further including an IoT Universal Identification (UID) processing circuit structured to interpret an IoT UID and the device property data; a record management circuit structured to associate the IoT UID with the device property data via a record; and a record provisioning circuit structured to transmit the record.

An example method includes interpreting, via a device property data processing circuit, device property data corresponding to a device registered with an Internet of Things (IoT) device registry; determining, via a security analysis circuit based at least in part on the device property data, that the device is subject to a fraud event; generating, responsive to the determined fraud event, via an alert circuit, a message that identifies the device; and transmitting, via an alert provisioning circuit, the message.

Certain further aspects of the example method are described following, any one or more of which may be present in certain embodiments. The determining, via the security analysis circuit, that the device is subject to a fraud event comprises detecting the fraud event via analyzing the device property data with an artificial intelligence circuit that uses an artificial intelligence process. The artificial intelligence process includes a neural network. The method further including training the neural network on detecting correlations between the fraud event and at least one of a cyber-attack; a software version; a firmware version; a hardware version; an unauthorized access; a device failure event; device ownership; a device manufacturer; a location; or a network outage. The artificial intelligence process is based at least in part on a deep learning network. The method further including generating and transmitting, via a visualization circuit, fraud event visualization data configured to depict a visualization of the fraud event on an electronic display. The visualization is a map. The visualization is a chart depicting at least one of the device affected by the fraud event. The method further including transmitting, via the alert provisioning circuit, the message to at least one of a device management platform corresponding to the device; a user of the device; a manufacturer of the device; or an entity that monitors the device. The security analysis circuit forms part of a device management platform. The security analysis circuit forms part of the IoT device registry. The method further including displaying the message via a display circuit. The method further including logging the fraud event in a database via a fraud event log circuit. The method further including interpreting, via a device management platform, the message transmitted by the alert provisioning circuit; and by the device management platform, at least one of: quarantining the device; disabling the device; or patching the device. The method further including providing a trust indicator for the device, based at least in part on the determined fraud event. The trust indicator comprises at least one of: a numeric value, an alphabetic value, or an alphanumeric value. The trust indicator comprises an enumerated value. The trust indicator is displayed as a color-coded value. A value of the trust indicator is based at least in part on a location of the device. A value of the trust indicator is based at least in part on a time period. A value of the trust indicator is based at least in part on at least one of a software version or a firmware version of the device. Determining the trust indicator is based at least in part on artificial intelligence. The trust indicator is reflective of the device being a Greenfield device. The trust indicator is reflective of the device being a Brownfield device. The trust indicator is reflective of the device being a virtual device. The trust indicator is reflective of the device being a meta-device. The trust indicator is displayed as at least one of: numeric based, color based, symbol based, alphanumeric based, or letter based. The method further including adjusting a value of the trust indicator based at least in part on the determined fraud event. The adjusting is an increase when the determined fraud event corresponds to at least one of a patching or an updating of at least one of software or firmware of the device. The adjusting is a decrease when the determined fraud event corresponds to a cyber-attack. The determined fraud event corresponds to an addition of a new module into the device. The new module is at least one of an input device or an output device. The at least one of the input device or the output device is a network interface device. The at least one of the input device or the output device is a media device. The determined fraud event corresponds to a change in ownership of the device. The determined fraud event is based on detecting a change in a location of the device. The determined fraud event is based on detecting a change in at least one of a software version or a firmware version of the device. The determined fraud event is based on detecting a change in a hardware version of the device. The method further including accessing, by the security analysis circuit, a fraud event database to interpret fraud event signatures to determine that the device is subject to the fraud event. The method further including interpreting, via an IoT UID processing circuit, an IoT UID and the device property data; associating, via a record management circuit, the IoT UID with the device property data via a record; and transmitting, via a record provisioning circuit, the record. The method further including interpreting a device event message and updating a record in an IoT device registry based at least in part on the device event message.

An example apparatus includes a device property data processing circuit structured to: at a first time, interpret device property data corresponding to a device registered with an Internet of Things (IoT) device registry; and at a second time, interpret the device property data corresponding to the device registered with the IoT device registry; a change detection circuit structured to detect a change in the device property data between the first time and the second time; a fraud detection circuit structured to determine that the change corresponds to a fraud event; an alert circuit structured to generate, responsive to the determining that the change corresponds to a fraud event, a message that identifies the device corresponding to the device property data; and an alert provisioning circuit structured to transmit the message.

Certain further aspects of the example apparatus are described following, any one or more of which may be present in certain embodiments. The fraud detection circuit comprises an artificial intelligence circuit structured to detect the fraud event, based at least in part on analyzing the device property data using an artificial intelligence process. The artificial intelligence process includes a neural network. The neural network is trained on detecting correlations between the fraud event and at least one of a cyber-attack; a software version; a firmware version; a hardware version; an unauthorized access; a device failure event; device ownership; a device manufacturer; a location; or a network outage.

An example method includes at a first time, interpreting, via a device property data processing circuit, device property data corresponding to a device registered with an Internet of Things (IoT) device registry; at a second time, interpreting, via the device property data processing circuit, the device property data corresponding to the device registered with the IoT device registry; detecting, via a change detection circuit, a change in the device property data between the first time and the second time; determining, by a fraud detection circuit, that the change corresponds to a fraud event; generating, via an alert circuit and responsive to the determining that the change corresponds to a fraud event, a message that identifies the device corresponding to the device property data; and transmitting, via an alert provisioning circuit, the message.

Certain further aspects of the example method are described following, any one or more of which may be present in certain embodiments. The determining, via the fraud detection circuit, that the change corresponds to a fraud event comprises detecting the fraud event via analyzing the device property data with an artificial intelligence circuit that uses an artificial intelligence process. The artificial intelligence process includes a neural network. The neural network is trained on detecting correlations between the fraud event and at least one of a cyber-attack; a software version; a firmware version; a hardware version; an unauthorized access; a device failure event; device ownership; a device manufacturer; a location; or a network outage.

An example system includes a device management platform structured to manage one or more devices registered with an Internet of Things (IoT) device registry; and a fraud detection device structured to: monitor the IoT device registry for changes in device property data corresponding to the registered one or more devices; detect a change in the device property data for at least one device among the one or more devices; determine that the detected change corresponds to a fraud event; generate, responsive to the determined fraud event, a message that identifies the at least one device; and transmit the message to the device management platform, wherein the device management platform is further structured to: interpret the message transmitted by the fraud detection device, and at least one of: quarantine the at least one device, disable the at least one device, disable at least part of the device, disable at least some functionality of the device, send an alert to the device, send an alert to an entity associated with the device, or patch the at least one device.

Certain further aspects of the example system are described following, any one or more of which may be present in certain embodiments. The fraud detection device comprises an artificial intelligence circuit structured to detect the fraud event, based at least in part on analyzing the device property data using an artificial intelligence process. The artificial intelligence process includes a neural network. The neural network is trained on detecting correlations between the fraud event and at least one of a cyber-attack; a software version; a firmware version; a hardware version; an unauthorized access; a device failure event; device ownership; a device manufacturer; a location; or a network outage.

An example method includes monitoring, via at least one processor, one or more records in an Internet of Things (IoT) device registry for changes in device property data corresponding to one or more devices, each of the one or more devices corresponding to one of the one or more records; detecting, via the at least one processor, a change in the device property data of at least one record among the one or more records; determining, via the at least one processor, that the change corresponds to a fraud event; generating, via the at least one processor and responsive to the detected fraud event, a message that identifies the device, corresponding to the changed device property data; and transmitting, via the at least one processor, the message.

Certain further aspects of the example method are described following, any one or more of which may be present in certain embodiments. The determining that the change corresponds to a fraud event comprises detecting the fraud event via analyzing the device property data with an artificial intelligence circuit that uses an artificial intelligence process. The artificial intelligence process includes a neural network. The neural network is trained on detecting correlations between the fraud event and at least one of a cyber-attack; a software version; a firmware version; a hardware version; an unauthorized access; a device failure event; device ownership; a device manufacturer; a location; or a network outage.

An example method includes interpreting, via an Internet of Things Universal Identification (IoT UID) processing circuit, an IoT UID and device property data corresponding to a meta-device; associating, via a record management circuit, the IoT UID with the device property data in a record in a database; and transmitting, via a record provisioning circuit, the record.

Certain further aspects of the example method are described following, any one or more of which may be present in certain embodiments. The method further including transmitting at least one of the IoT UID or the record to a user in a virtual environment. The method further including displaying at least one of the IoT UID or the record in a virtual environment. The method further including generating at least one of a trust indicator and/or a risk indicator for the meta-device; and storing the trust indicator and/or the risk indicator in the record associated with the IoT UID. The method further including transmitting the trust indicator and/or the risk indicator to a user in a virtual environment. The method further including displaying the trust indicator and/or the risk indicator in a virtual environment in relation to the meta-device. The method further including interpreting a device event message and updating a record in an IoT device registry based at least in part on the device event message.

An example apparatus includes an IoT UID processing circuit structured to interpret an IoT UID and device property data corresponding to a meta-device a record management circuit structured to associate the IoT UID with the device property data via a record; and a record provisioning circuit structured to transmit the record.

Certain further aspects of the example apparatus are described following, any one or more of which may be present in certain embodiments. The apparatus further including an authentication circuit structured to generate a trust indicator and/or a risk indicator for the meta-device; and store the trust indicator and/or the risk indicator in the record associated with the IoT UID. The meta-device lacks a real-world counterpart. The meta-device has at least one real-world counterpart. The meta-device has at least two real-world counterparts. The at least two real-world counterparts are in different locations. The device property data is at least one of an NFT, an owner identifier value, a manufacturer identifier value, a Trusted Platform Module (TPM) Key, a Media Access Control (MAC) address, a serial number, a software version, or a firmware version. The meta-device is at least one of a Greenfield device or a Brownfield device.

An example apparatus includes an IoT UID processing circuit structured to interpret an IoT UID associated with a meta-device; a device lookup circuit structured to generate a query that includes the IoT UID and is structured to retrieve device property data corresponding to the IoT UID; and a query provisioning circuit structured to transmit the query to an IoT device registrar server.

Certain further aspects of the example apparatus are described following, any one or more of which may be present in certain embodiments. The meta-device lacks a real-world counterpart. The meta-device has at least one real-world counterpart. The meta-device has at least two real-world counterparts. The at least two real-world counterparts are in different locations. The device property data is at least one of an NFT, an owner identifier value, a manufacturer identifier value, a Trusted Platform Module (TPM) Key, a Media Access Control (MAC) address, a serial number, a software version, or a firmware version.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly. Non-limiting examples include the IoT device registrar server 1126 (FIG. 1), the database 1128 (FIG. 1), apparatuses that may form part of the IoT device registrar server 1126, database, and/or any other computing devices, as disclosed herein.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein, including those relating to the IoT device registrar 1130, manufacturer 1134, user 1136, third party 1138, and/or other entities disclosed herein, may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another.

The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the present disclosure is not to be limited by the foregoing examples but is to be understood in the broadest sense allowable by law.

What is claimed is:

1. A method, comprising:
    monitoring, via at least one processor, one or more records in an internet of things (IoT) device registry for changes in device property data corresponding to one or more devices, each of the one or more devices corresponding to one of the one or more records, each of the one or more records including an IoT UID assigned to the corresponding device, wherein the IoT UID is generated based at least in part on device property data derived from the corresponding device and comprises one or more hashes corresponding to a meta identity component, a service identity component, a network identity component, and a physical identity component;

detecting, via the at least one processor, a change in the device property data of at least one record, wherein the change in the device property data is between a first value of the device property data at a first time and a second value of the device property data at a second time, and wherein the change corresponds to an outage pattern;

determining, via the at least one processor, that the change corresponds to a security vulnerability;

generating, via at least one processor and responsive to the determined security vulnerability, a message that identifies, based at least in part on the IoT UID, a device corresponding to the change in the device property data; and transmitting, via the at least one processor, the message.

2. The method of claim 1, further comprising displaying the message.

3. The method of claim 1, further comprising logging the change in a database.

4. The method of claim 1, further comprising receiving the message at a device management platform and at least one of quarantining or patching the device.

5. The method of claim 1, further comprising adjusting a trust indicator based at least in part on the change.

6. The method of claim 5, wherein the trust indicator is at least one of a trust score, a rating, or a level value.

7. The method of claim 5, wherein the adjusting is an increase when the change corresponds to a patching or an updating of software and/or firmware of the device.

8. The method of claim 5, wherein the adjusting is a decrease when the change corresponds to a vulnerability.

9. The method of claim 1, wherein the change corresponds to a change in ownership of the device.

10. The method of claim 1, wherein the change is a location of the device.

11. The method of claim 1, further comprising accessing a security vulnerabilities database to pull security vulnerability signatures to determine if a registered device is affected.

12. The method of claim 1, further comprising interpreting a device event message and updating the at least one record in the IoT device registry based at least in part on the device event message.

13. The method of claim 1, wherein the message indicates the identified device is a down device.

14. The method of claim 13, wherein the outage pattern spans a plurality of distinct entities, and the message further identifies one or more geographic locations corresponding to the plurality of distinct entities.

15. An apparatus, comprising:
a device property data processing circuit structured to:
at a first time, interpret, device property data corresponding to a device registered with an IoT device registry and assigned an IoT UID generated based at least in part on device property data corresponding to the device, wherein the IoT UID comprises one or more hashes corresponding to a meta identity component, a service identity component, a network identity component, and a physical identity component; and
at a second time, interpret, the device property data corresponding to the device registered with the IoT device registry;

a change detection circuit structured to detect a change in the device property data between the first time and the second time, wherein the change in the device property data corresponds to an outage pattern;

an alert circuit structured to generate, responsive to the detected change, a message that identifies, based at least in part on the IoT UID, the device corresponding to the device property data; and an alert provisioning circuit structured to transmit the message.

16. The apparatus of claim 15, wherein the device property data processing circuit is further structured to display the message.

17. The apparatus of claim 15, wherein the device property data processing circuit is further structured to receive the message at a device management platform and at least one:
of quarantine; or
patch the device.

18. The apparatus of claim 15, wherein the device property data processing circuit is further structured to adjust a trust indicator based at least in part on the change.

19. The apparatus of claim 15, wherein the change corresponds to an addition of a new module into the device.

20. A system, comprising:
a device management platform comprising one or more first processors structured to manage one or more devices registered with an IoT device registry, each of the one or more devices assigned an IoT UID generated based at least in part on device property data corresponding to device, wherein the IoT UID comprises one or more hashes corresponding to a meta identity component, a service identity component, a network identity component, and a physical identity component; and a sentry device comprising one or more second processors structured to:
monitor the IoT device registry for changes in property data corresponding to the registered one or more devices;
detect a change in the property data for at least one of the one or more devices, wherein the change in the device property data is between a first value of the device property data at a first time and a second value of the device property data at a second time, and wherein the change corresponds to an outage pattern;
determine that the detected change corresponds to a security vulnerability;
generate, responsive to the determined security vulnerability, a message that identifies the at least one device of the one or more devices based at least in part on the assigned IoT UID; and
transmit the message to the device management platform, wherein the one or more first processors are further structured to:
interpret the message transmitted by the one or more second processor; and
at least one of:
quarantine the at least one device; or
patch the at least one device.

21. The system of claim 20, wherein the one or more second processors are further structured to:
receive the message at the device management platform; and
at least one of quarantining or patching the one or more devices.

22. The system of claim 20, wherein the one or more second processors are further structured to adjust a trust indicator based at least in part on the change.

* * * * *